United States Patent [19]
Huang et al.

[11] Patent Number: 6,151,582
[45] Date of Patent: *Nov. 21, 2000

[54] DECISION SUPPORT SYSTEM FOR THE MANAGEMENT OF AN AGILE SUPPLY CHAIN

[75] Inventors: Ying Huang, Yorktown Heights; Ramakrishna Desiraju, North Tarrytown; Christophe Begue, White Plains; Omer Bakkalbasi, Mahopac; Lap Mui Ann Chan, Ossining; Krishnakumar Bhaskaran, Tarrytown; Awi Federgruen, Holliswood, all of N.Y.; Yossi Aviv, Edison, N.J.; Raymond J. Krasinski, Suffern; Peter Boey, Scarborough, both of N.Y.

[73] Assignee: Philips Electronics North America Corp., New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/735,634

[22] Filed: Feb. 24, 1997

Related U.S. Application Data

[60] Provisional application No. 60/005,860, Oct. 26, 1995, provisional application No. 60/008,101, Oct. 30, 1995, provisional application No. 60/022,787, Jul. 30, 1996, and provisional application No. 60/012,327, Feb. 27, 1996.

[51] Int. Cl.[7] .............................. G06F 15/46; G06F 15/24
[52] U.S. Cl. .................................... 705/8; 705/7; 705/10
[58] Field of Search ........................ 705/7, 8, 10

[56] References Cited

U.S. PATENT DOCUMENTS

| | | | |
|---|---|---|---|
| 4,646,238 | 2/1987 | Carlson, Jr. et al. | 364/468.01 |
| 4,839,803 | 6/1989 | Kawashima et al. | 705/7 |
| 5,063,506 | 11/1991 | Brockwell et al. | 705/7 |
| 5,099,431 | 3/1992 | Natarajan | 364/468.12 |
| 5,101,352 | 3/1992 | Rembert | 705/8 |
| 5,216,612 | 6/1993 | Cornett et al. | 364/468.02 |
| 5,231,567 | 7/1993 | Matoba et al. | 364/468.06 |
| 5,237,495 | 8/1993 | Morii | 705/8 |
| 5,237,496 | 8/1993 | Xagami et al. | 705/10 |
| 5,278,750 | 1/1994 | Kaneko et al. | 705/8 |
| 5,291,394 | 3/1994 | Chapman | 705/8 |
| 5,295,066 | 3/1994 | Aoki | 364/468.15 |
| 5,303,146 | 4/1994 | Ammirato et al. | 707/503 |
| 5,311,438 | 5/1994 | Sellers et al. | 364/468.02 |

(List continued on next page.)

FOREIGN PATENT DOCUMENTS

| | | | |
|---|---|---|---|
| 2293902 | 4/1996 | United Kingdom | G05B 19/418 |
| 22939021 | 4/1996 | United Kingdom | G05B 19/418 |

OTHER PUBLICATIONS

Elimam A.A., "A Decision Support System (DSS) for Agricultural Pesticide Production Planning", European Journal of Operational Research, vol. 81, No. 1, Feb. 1995, pp. 17–34.

Lacaze et al., "$C_cH_2F_2$: Case Comprehensive Hybrid–Hybrid Forecasting Framework", Emerging Technologies and Factory Automation, vol. 1, Oct. 1995, pp. 701–708.

Randhawa et al. "A Decision Aid for Coordinating Fishing and Fish Processing", European Journal of Operational Research, vol. 81, No. 1, Feb. 1995, pp. 62–75.

*Primary Examiner*—Tod R. Swann
*Assistant Examiner*—James W. Myhre
*Attorney, Agent, or Firm*—Gregory L. Thorne

[57] ABSTRACT

A decision support system for managing an agile supply chain including a server side and a client side. The server side includes a decision support system database that interfaces with a model engine that performs analysis of the data to support planning decisions. The server side also includes a server manager that coordinates requests for service and information. The client side includes decision frames that present the various view points available in the system to the users. A frame manager coordinates the requests from the decision support frames to access the needed data and models.

9 Claims, 58 Drawing Sheets

U.S. PATENT DOCUMENTS

| | | | |
|---|---|---|---|
| 5,315,509 | 5/1994 | Natarajan | 705/28 |
| 5,479,343 | 12/1995 | Matoba et al. | 364/468.13 |
| 5,630,070 | 5/1997 | Dietrich et al. | 705/8 |
| 5,712,989 | 1/1998 | Johnson et al. | 705/28 |
| 5,771,172 | 6/1998 | Yamamoto et al. | 364/468.13 |
| 5,854,746 | 12/1998 | Yamamoto et al. | 364/468.13 |
| 5,914,878 | 6/1999 | Yamamoto et al. | 364/468.13 |
| 5,946,662 | 8/1999 | Ettl et al. | 705/8 |

FIG. 53

SAVE SCENARIO

NEW SCENARIO

| SCENARIO NAME | DATE CREATED | DATE UPDATED |
|---|---|---|
| ESTIMATED BEHAVIOR | 7/18/96 8:22:39 AM | 7/18/96 8:22:39 AM |
| FUTURE SALES | 7/18/96 8:18:35 AM | 7/18/96 8:18:53 AM |
| LOST SALES | 7/18/96 8:19:54 AM | 7/18/96 8:19:54 AM |

DESCRIPTION

OK    CANCEL

FIG. 54

OPEN SCENARIO

ESTIMATED BEHAVIOR

| SCENARIO NAME | DATE CREATED | DATE UPDATED |
|---|---|---|
| ESTIMATED BEHAVIOR | 7/18/96 8:22:39 AM | 7/18/96 8:22:39 AM |
| FUTURE SALES | 7/18/96 8:18:35 AM | 7/18/96 8:18:53 AM |
| LOST SALES | 7/18/96 8:19:54 AM | 7/18/96 8:19:54 AM |

DESCRIPTION

OK    CANCEL

FIG. 55

DEMAND MANAGEMENT FRAME
FILE  EDIT  VIEW  DISPLAY  TOOLS  OPTIONS  HELP

CUSTOMERS

| CUSTOMER ID | JUL 94 | AUG 94 | SEP 94 | OCT 94 | NOV 94 | DEC 94 | JAN 95 | FEB 95 | MAR 95 |
|---|---|---|---|---|---|---|---|---|---|
| CGRP1 | 705 | 533 | 579 | 289 | 301 | 774 | 14 | 760 | 814 |
| CUST1 | 695 | 980 | 243 | 533 | 106 | 999 | 676 | 15 | 575 |
| CUST2 | 785 | 378 | 289 | 919 | 631 | 627 | 428 | 97 | 561 |
| CUST3 | 938 | 654 | 506 | 390 | 107 | 783 | 459 | 753 | 596 |
| CGRP2 | 329 | 95 | 589 | 169 | 927 | 97 | 443 | 272 | 872 |
| CGRP3 | 923 | 620 | 347 | 149 | 479 | 219 | 993 | 130 | 28 |

PRODUCTS

| PRODUCT ID | JUL 94 | AUG 94 | SEP 94 | OCT 94 | NOV 94 | DEC 94 | JAN 95 | FEB 95 | MAR 95 |
|---|---|---|---|---|---|---|---|---|---|
| PRODUCT 1 | 492 | 769 | 834 | 382 | 195 | 326 | 413 | 152 | 619 |
| PRODUCT 2 | 783 | 791 | 332 | 450 | 555 | 803 | 563 | 203 | 207 |
| PRODUCT 3 | 310 | 295 | 807 | 309 | 375 | 401 | 841 | 409 | 724 |
| PRODUCT 4 | 415 | 73 | 451 | 698 | 499 | 406 | 945 | 984 | 591 |
| PRODUCT 5 | 758 | 951 | 345 | 684 | 791 | 35 | 794 | 483 | 206 |
| PRODUCT 6 | 651 | 807 | 416 | 797 | 721 | 693 | 730 | 192 | 773 |
| PRODUCT 7 | 634 | 838 | 640 | 424 | 187 | 495 | 973 | 769 | 380 |
| PRODUCT 8 | 300 | 72 | 493 | 452 | 597 | 30 | 318 | 135 | 326 |
| PRODUCT 9 | 377 | 137 | 654 | 153 | 198 | 375 | 95 | 615 | 702 |
| PRODUCT 10 | 57 | 275 | 960 | 326 | 647 | 363 | 369 | 326 | 214 |

FRAME INITIALIZED

FIG. 56

DEMAND MANAGEMENT FRAME: TOP-DOWN FORECASTING

FILE   EDIT   VIEW   DISPLAY   TOOLS   OPTIONS   HELP

PRODUCTS

| PRODUCT ID | JUL 94 | AUG 94 | SEP 94 | OCT 94 | NOV 94 | DEC 94 | JAN 95 | FEB 95 | MAR 95 |
|---|---|---|---|---|---|---|---|---|---|
| PGRP1 | 705 | 533 | 579 | 289 | 301 | 774 | 14 | 760 | 814 |
| PROD1 | 695 | 980 | 243 | 533 | 106 | 999 | 676 | 15 | 575 |
| PROD2 | 785 | 378 | 289 | 919 | 631 | 627 | 428 | 97 | 561 |
| PROD3 | 938 | 654 | 506 | 390 | 107 | 783 | 459 | 753 | 596 |
| PGRP2 | 329 | 95 | 589 | 169 | 927 | 97 | 443 | 272 | 872 |
| PROD4 | 923 | 620 | 347 | 149 | 479 | 219 | 993 | 130 | 28 |

CUSTOMERS

| CUSTOMER ID | JUL 94 | AUG 94 | SEP 94 | OCT 94 | NOV 94 | DEC 94 | JAN 95 | FEB 95 | MAR 95 |
|---|---|---|---|---|---|---|---|---|---|
| CUSTOMER 1 | 302 | 292 | 150 | 529 | 223 | 584 | 363 | 875 | 478 |
| CUSTOMER 2 | 746 | 88 | 634 | 713 | 15 | 431 | 401 | 275 | 985 |
| CUSTOMER 3 | 557 | 909 | 657 | 441 | 692 | 64 | 756 | 700 | 497 |
| CUSTOMER 4 | 643 | 849 | 497 | 187 | 896 | 372 | 323 | 770 | 218 |
| CUSTOMER 5 | 339 | 710 | 312 | 798 | 151 | 592 | 956 | 243 | 939 |
| CUSTOMER 6 | 492 | 769 | 834 | 382 | 195 | 326 | 413 | 152 | 619 |
| CUSTOMER 7 | 783 | 791 | 332 | 450 | 555 | 803 | 563 | 203 | 207 |
| CUSTOMER 8 | 310 | 295 | 807 | 309 | 375 | 401 | 841 | 409 | 724 |
| CUSTOMER 9 | 415 | 73 | 451 | 698 | 499 | 406 | 945 | 984 | 591 |
| CUSTOMER 10 | 758 | 951 | 345 | 684 | 791 | 35 | 794 | 483 | 206 |

FRAME INITIALIZED

FIG. 57

AGILE DSS PSI SCREEN

FILE  EDIT  OPTIONS  MAINTANENCE  WINDOWS  HELP

PRODUCT: ALL PRODUCTS    MAKE SET    NEW CELL VALUE:

| | JAN 96 | FEB 96 | MAR 96 | APR 96 | MAY 96 | JUN 96 | JUL 96 | AUG 96 | CY Ttls. |
|---|---|---|---|---|---|---|---|---|---|
| PRODUCTION(P) LINE | 305924 | 344384 | 389944 | 248521 | 356541 | 457688 | 342608 | 443475 | |
| TEMPORARY P LINE | 382758 | 394911 | 370804 | 241065 | 356309 | 454131 | 362898 | 416439 | |
| INVENTORY (I) LINE | 267663 | 241861 | 196023 | 170879 | 164709 | 0 | 0 | 0 | |
| TEMPORARY I LINE | 292887 | 310936 | 312007 | 292310 | 256749 | 335635 | 344577 | 339616 | |
| SALES (S) LINE | 289126 | 369760 | 432037 | 270374 | 361960 | 355890 | 351969 | 366048 | |
| TEMPORARY S LINE | 291795 | 372720 | 366290 | 263009 | 389069 | 377763 | 352103 | 418070 | |
| TOP-DOWN (TD) | 289126 | 369760 | 432037 | 270374 | 361960 | | | | |
| BOTTOM(BU) | 289126 | 369760 | 432037 | 270374 | 361960 | | | | |
| CUSTOMER 1 | | | | | | | | | |
| CUSTOMER 2 | | | | | | | | | |
| CUSTOMER 3 | | | | | | | | | |
| TD BU | | | | | | | -351969 | | -351969 |
| TD S | | | | | | | | | -366048 |

| | BILL OF MATERIAL | ALTERNATIVE COMPONENTS | RESOURCES REQUIREMENT | KEY COMPONENTS |
|---|---|---|---|---|
| | OPTIONS | | PRODUCTION RESOURCES | |

RR1330W

RESULT → INFEASIBLE

| MONTH | APR96 | MAY96 | JUN96 |
|---|---|---|---|
| REQ'D | 3487 | 17367 | 112134 |
| START'G INV | | 1000 | 1000 |
| SAFETY STOCK | | 30600 | 95914 |
| PRODUCTION | | 16720 | 500 |
| INVENTORY | | 15720 | 0 |
| OVER | 0 | | 0 |
| UNDER | | | |

| | MAY96 | JUN96 |
|---|---|---|
| MONTH | | |
| REQ'D | 17367 | 112134 |
| LS | 12 | 24 |
| CAPACITY | 76200 | 152400 |
| PRODUCTION | 0 | 0 |
| OVER | | 152400 |
| UNDER | 0 | 0 |

FINAL LINE - 13in

● FEASIBLE ○ INFEASIBLE

BILL OF MATERIAL | ALTERNATIVE COMPONENTS | RESOURCES REQUIREMENT
OPTIONS | RESULT | PRODUCTION RESOURCES | KEY COMPONENTS

FIG. 66

| COMPONENT A | | |
|---|---|---|
| MONTH | MAY96 | JUN96 |
| REQ'D | 17367 | 112134 |
| AVAILABLE | 2000 | 500 |
| USAGE | ///// | 500 |
| OVER | 0 | 0 |
| UNDER | 0 | 0 |

◉ FEASIBLE   ○ INFEASIBLE

Tabs: BILL OF MATERIAL | ALTERNATIVE COMPONENTS | RESOURCES REQUIREMENT
OPTIONS | RESULT | PRODUCTION RESOURCES | KEY COMPONENTS

BILL OF MATERIAL AND PRODUCTION RESOURCES

| BILL OF MATERIAL | ALTERNATIVE COMPONENTS | RESOURCES REQUIREMENT | KEY COMPONENTS |
|---|---|---|---|
| OPTIONS | RESULT | PRODUCTION RESOURCES | |

◉ FEASIBLE   ○ INFEASIBLE

FINAL LINE - 13in

| MONTH | MAY96 | JUN96 |
|---|---|---|
| REQ'D | 17367 | 112134 |
| LS | 12 | 24 |
| CAPACITY | 76200 | 152400 |
| PRODUCTION | 0 | 0 |
| OVER | 76200 | 152400 |
| UNDER | 0 | 0 |

| AVAILABILITY/USAGE | | | |
|---|---|---|---|
| COMPONENTS | KEY COMPONENT | JAN-DEC | JAN | FEB |
| TUBE31 | * | 4.285641 | 4.87806 | 5.72 |
| CHASSISGR2A | * | 4.108611 | 4.813902 | 16.0 |
| CHASSISGR2B+ | * | 4.024915 | 1.581416 | 7.74 |
| CABINET20D102 | * | 3.979051 | 0.2536541 | 4.53 |
| CABINET32C510 | | 3.945524 | 0.7800252 | 7.49 |
| TUBE41 | | 3.936415 | 2.776554 | 4.90 |
| CABINET25S502 | | 3.895938 | 0.726343 | 2.86 |
| CABINET27C505 | | 3.856006 | 10.00502 | 5.40 |

KEY COMPONENTS
- CABINET20D102
- CABINETCOR5201
- CHASSISGR2A 25VTI
- CHASSISGR2B+ 27VT
- CHASSISGR3B
- CHASSISGR6B
- TUBE31

JAN-DEC

ORDERED BASED ON MONTHS

SORT COMPONENTS

KEY COMPONENTS

NOT KEY COMPONENTS

FIG. 70

DECISION SUPPORT SYSTEM FOR THE MANAGEMENT OF AN AGILE SUPPLY CHAIN

CROSS-REFERENCES TO RELATED APPLICATIONS

This application claims the benefit of U.S. Provisional Application Nos. 60/005,860, filed Oct. 26, 1995; 60/008,101, filed Oct. 30, 1996; 60/022,787, filed Jul. 30, 1996; and 60/012,327, filed Feb. 27, 1996.

BACKGROUND OF THE INVENTION

1. Field of the Invention

The present invention is directed to a system for supporting management decisions associated with manufacturing of service supply chains that span from a point of creation to a point of consumption and, more particularly, is directed to a system that allows the various decision makers in the supply chain to view the supply chain from their own perspective, obtain information and evaluate decisions concerning past, current and future performance with respect to a diverse set of often conflicting goals.

2. Description of the Related Art

Many types of manufacturing database management and inventory control systems exist today. Each of these systems views the process from the narrow viewpoint of the goals of such a system. For example, inventory control processes tend to determine when the inventory of an item is projected to be depleted and when to order goods to prevent such depletion. The inventory control process does not generally take into account the problems associated with availability of materials and machines to satisfy the inventory demand. On the other hand the manufacturing control process considers the availability problem but does not take into account the effect of a sales promotion that will deplete an inventory faster than projected. A marketing department in preparing a sales promotion will often not consider the effect that promotion will have on availability, inventory and profit margin but tends to focus on sales goals. What is needed is a system that will support managers with each of these view points in understanding the effect of the various decisions that can be made on the supply chain as a whole both currently and into the near future.

SUMMARY OF THE INVENTION

It is an object of the present invention to provide a system that allows a decision maker in a supply chain to view the chain from their own perspective and understand the effect that their decisions will have on the supply chain as a whole.

It is another object of the present invention to provide a distributed and layered architecture that allows the reuse of processing resources and data in making diverse different view point decisions concerning a supply chain.

It is also an object of the present invention to provide a User Interface that projects a view (a Decision Support Frame) into the supply chain that takes into account the view point of the particular user, such as a plant manager or sales manager.

It is another object of the present invention to provide quantitative models and analytical processes to support the plans prepared and decisions made from the various supply chain view points such that these resources are cost effectively provided and utilized in across the entire supply chain-wide.

It is also an object of the present invention to provide a scenario management system in which Scenarios can be saved, modified and data transferred between view points or frames.

It is a further object of the present invention to allow the user to specify a data domain that limits the data used for a particular view point.

It is an additional object of the present invention to provide a system that will reconcile the demand and supply aspects of a supply chain.

It is still another object of the present invention to allow the creation of an integrated production, sales and inventory (PSI) plan and provide a projection concerning what is feasible in the production, sales and inventory plan.

It is an object of the present invention to allow the manufacturer or vendor to plan the supply of goods and services for a customer that integrates all information about a product, including current, past and projected future sales and inventory, into a feasible replenishment plan.

It is a further object of the present invention to provide a planning process that reconciles top down and bottom up projections.

It is an object of the present invention to provide expert based models that allow forecasts from various view points including a bottom up view point.

It is also an object of the present invention to operate in an interactive and dynamic decision environment, providing decision support to single or a set of users.

It is also another object of the present invention to maintain overall data consistency and provide performance feedback to users reflecting the impact of "local" decisions on global supply chain performance.

The above-identified objects can be attained by a decision support system for the management of agile supply chains that provides an architecture including a server side and a client side. The server side includes a decision support system database that interfaces with one or more model engines that perform analytical processes on the data to determine requirements and make projections. The server side includes a server manager that coordinates requests for service and information. The client side includes Decision Support Frames that present the various view points available in the system to the users. A frame manager that coordinates the requests from Decision Support Frame (view points) is provided by the system to access the needed data and models.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 53 Make Product Domain Dialog Box.

FIG. 54 Save Scenario Dialog Box.

FIG. 55 Open Scenario Dialog Box.

FIG. 56 Demand Management, Bottom Up Forecast Screen.

FIG. 57 Demand Management, Top Down Forecast Screen.

FIG. 60 The Main PSI Frame Form.

FIG. 61 The Options menu choices on the PSI screen.

FIG. 63 The main capacity checking dialog box—The Options tab.

FIG. 64 The Results tab.

FIG. 65 The Production Resource tab.

FIG. 66 The Key Components tab.

FIG. 67 The Bill of Material tab.

FIG. 69 The Resource Requirement tab.

FIG. 70 Key Component Selection Dialog Box.

DESCRIPTION OF THE PREFERRED EMBODIMENTS

Introduction

Overview of the DSS Conceptual Architecture

The Decision Support System (DSS) 10 of the present invention (see FIG. 1) relies on quantitative models and data analysis routines to provide decision support. Consider for example the production, sales and inventory (PSI) planning process. An architecture to provide such support in accordance with the present invention comprises a library of models and routines that are logically linked, regularly updated and maintained. To support the PSI planning process for example, one can then employ an appropriate subset of models and routines from the library to represent the underlying supply chain abstraction and provide decision support. The present invention assembles the models and routines in a flexible manner, as needed by a decision making environment, to enable the DSS 10 to provide customized decision support with a readily upgradable and scalable library.

Principal Design Elements

Figure 1:
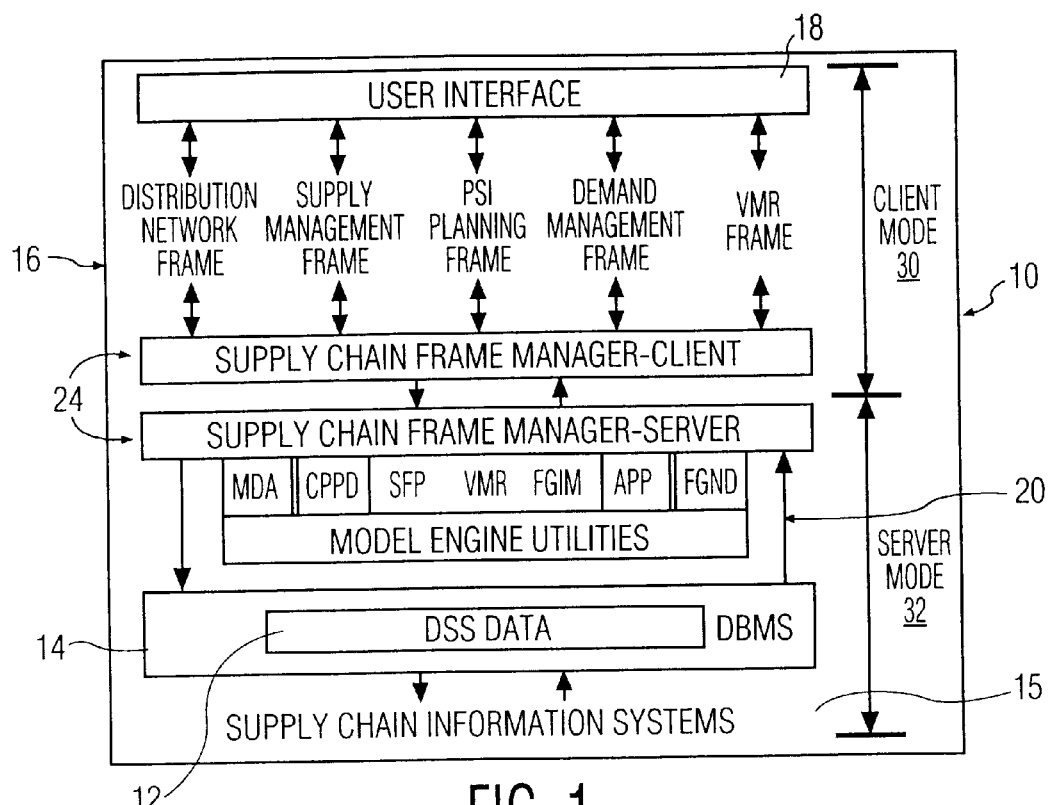
FIG. 1 DSS System Architecture in the Context of Manufacturing Supply Chains.

The architecture of the Decision Support System (DSS) 10 for a manufacturing supply chain is shown in FIG. 1 and comprises the principal design elements of: a DSS Database 12 with a Database Management System (DBMS) 14 and Supply Chain Information Systems 15, Decision Support Frames 16 which provides the various supply chain view points, a User Interface 18, a Model Engine 20 including various Model Engine Utilities (processes) 22 and a Supply Chain Frame Manager 24. The architecture of the DSS 10 in the context of an equipment repair supply chain is illustrated in FIG. 2.

Salient Features

The DSS architecture comprises two basic mode divisions: the Client Mode 30 and the Server Mode 32. These modes can be classified with respect to an implementation of the DSS 10 in a supply chain. From a design standpoint the Client Mode 30 is the portion of the DSS architecture that is specific and therefore customizable to provide decision support for any particular decision process and decision maker. The Server Mode 32, on the other hand, is the kernel of the DSS architecture that remains largely the same across different applications of the DSS 10 within a given supply chain. Hence, for a given implementation of the client-server DSS architecture in a supply chain, there will be one Server Mode 32 and a number of Client Modes to provide support for the decision processes.

Figure 2:
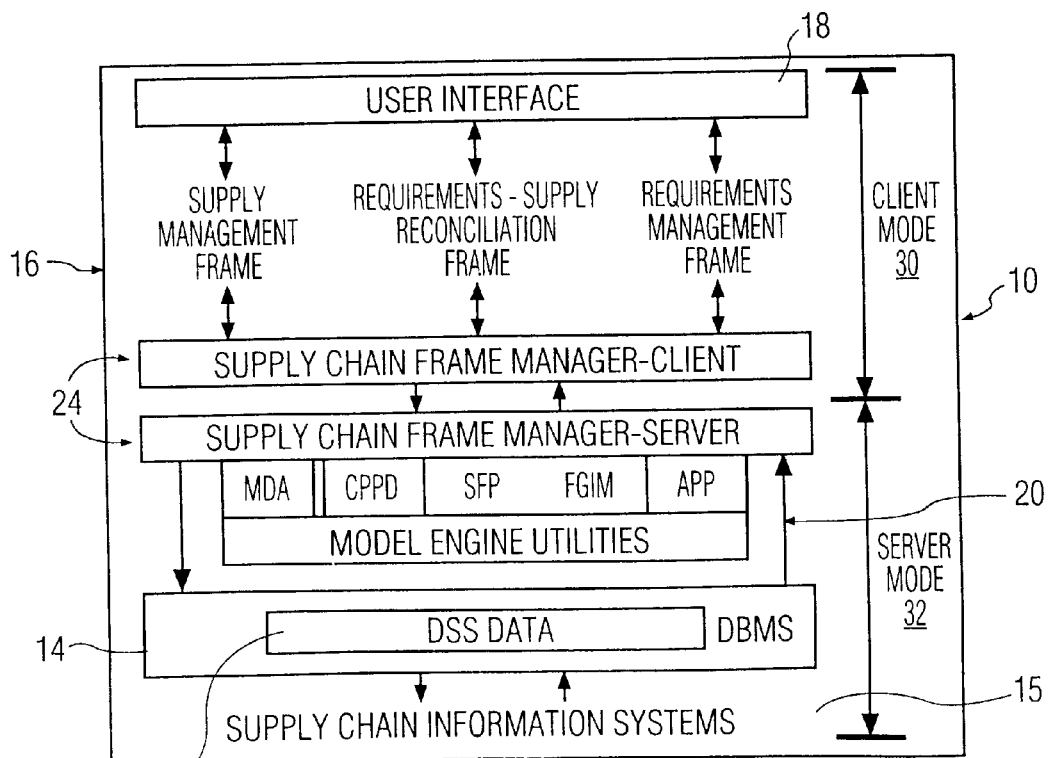
FIG. 2 DSS System Architecture in the Context of Equipment Repair Supply Chains.

As shown in FIGS. 1 and 2 the Client Mode 30 comprises the User Interface 18, the Decision Support Frames 16, and the client version of the Supply Chain Frame Manager 24. The Server Mode 32 comprises the Supply Chain Frame Manager 24, the system level services, the Model Engine 20, and the DSS Database 12. The Supply Chain Frame Manager 24, as a participant in both modes, serves to tie the Client and the Server Modes of the architecture together.

The client-server architecture makes the overall design both extensible (new functionality can be added by customizing a frame in the Client Mode 30) and scalable (new models and routines can be added to the Model Engine 20 in the Server Mode 32). Additionally this design is networkable; one can visualize the Server Mode 32 of the DSS 10 hosted by a server workstation in a client-server network while a number of Client Modes 30 of DSS 10 are hosted in the client computers. The layered design of the architecture, in terms of how the principal design elements of the DSS 10 are positioned within the architecture, provides a more resilient and stable backbone for decision support. The high level design architecture is independent of any computing and networking platform and hence applicable to a variety of environments.

The structure maintains the design of the horizontal layers for its key system elements while its functionality is more aligned vertically. The overall DSS 10 interfaces with the Supply Chain Information Systems 15 through the data exchanges between these systems and the DSS Database 12. The DSS 10 has a User Interface 18 to interact with end users through interactive and visual data exchange. Thus, the main body of the DSS 10 includes the following horizontal layers: User Interface 18; Decision Support Frames 16; Supply Chain Frame Manager 24 (Client and Server); Model Engine 20; and DSS Database 12.

As previously mentioned, the above layers of the DSS 10 can be partitioned into client and Server Modes. The system layers within the Client Mode 30 serve an interpretive role between the system data and analytic processing support and the specific end user's decision support needs. Those layers under the Server Mode 32 contain system functionalities common to a diversity of users and decision support problems, and usually require more dedicated, higher performance system processing capabilities.

Figure 3:
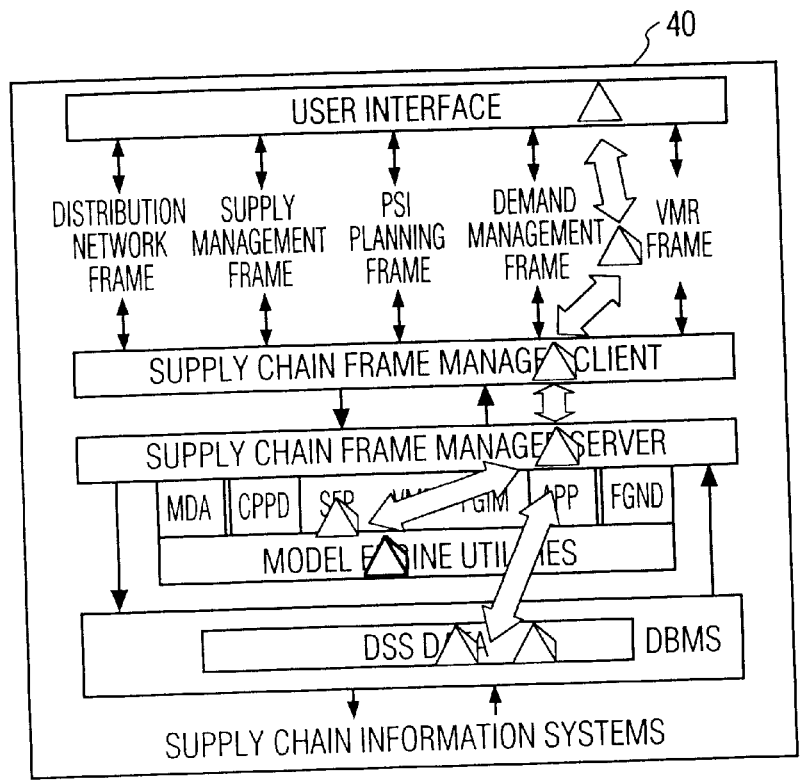
FIG. 3 Decision Support Thread.

To capture and process a user's decision support request, the DSS 10 will invoke a vertical decision support thread 40 going through visual objects of a User Interface 18, decision logic and what-if scenario manager in a Decision Support Frame, Supply Chain Frame Managers, models or analysis routines in the Model Engine 20 and appropriate data elements in the DSS Database 12. An example of a decision support thread 40 is shown by the bi-directional arrows in FIG. 3.

Relevant Supply Chains

The detailed discussion and specifications for the Decision Support Frames 16 provided in this document are generic in nature so that the functionality and system features in the resulting DSS 10 can cover decision environments for a diversity of supply chains. The system specifications and descriptions in this document address the two distinctive supply chains previously mentioned: I. Manufacturing: Finished goods are produced from raw materials, components, and subassemblies using resources (e.g., humans and machines) distributed to the demand points, and consumed by the end users. Material flow can be characterized as linear. II. Equipment Repair: Failed items are sent to the repair facilities, repaired using resources (e.g., humans and test equipment), and restored to usable condition. Material flow can be characterized as re-entrant.

Even though a typical manufacturing environment may perform a limited amount of repair operations, such as machine maintenance or product service, its resources are predominantly dedicated to material procurement, finished goods production and distribution. In this view, the distinguishing characteristic between the manufacturing and repair environments is the degree to which the environment focuses on the production of new goods versus the repair of old ones. Compared to the manufacturing supply chain, the equipment repair supply chain has complex reentrant flows, while the manufacturing is characterized by the linear material flows from material procurement to final consumption.

DSS Database

Overview

The DSS Database 12 is internal to the DSS 10 implementation. The main objective of the DSS Database 12 is to support the execution of the decision support functionality of the DSS 10. It contains the synthesized data drawn from a variety of external supply chain information sources and Supply Chain Information Systems 15. It may also maintain a set of data unique to the DSS 10 but not available in any existing Supply Chain Information Systems 15. An example of such unique data is the data derived through the analysis of synthesized data. The DSS Database 12 can be interfaced to the Supply Chain Information Systems 15 to retrieve the required data and provide updated data, as needed.

The Database Management System 14 (DBMS) communicates with the Model Engine 20 to provide the input data, and update the database 12 based on the output of the Model Engine 20. In general the DBMS 14 does not duplicate the transaction-based functionality that is typically featured in the Supply Chain Information Systems 15, unless it is critical for decision support needs.

Data Representation Scheme

Choosing an appropriate data representation is important to ensure data consistency, and reconfigurability. Structural Data Representation.

Figure 4:
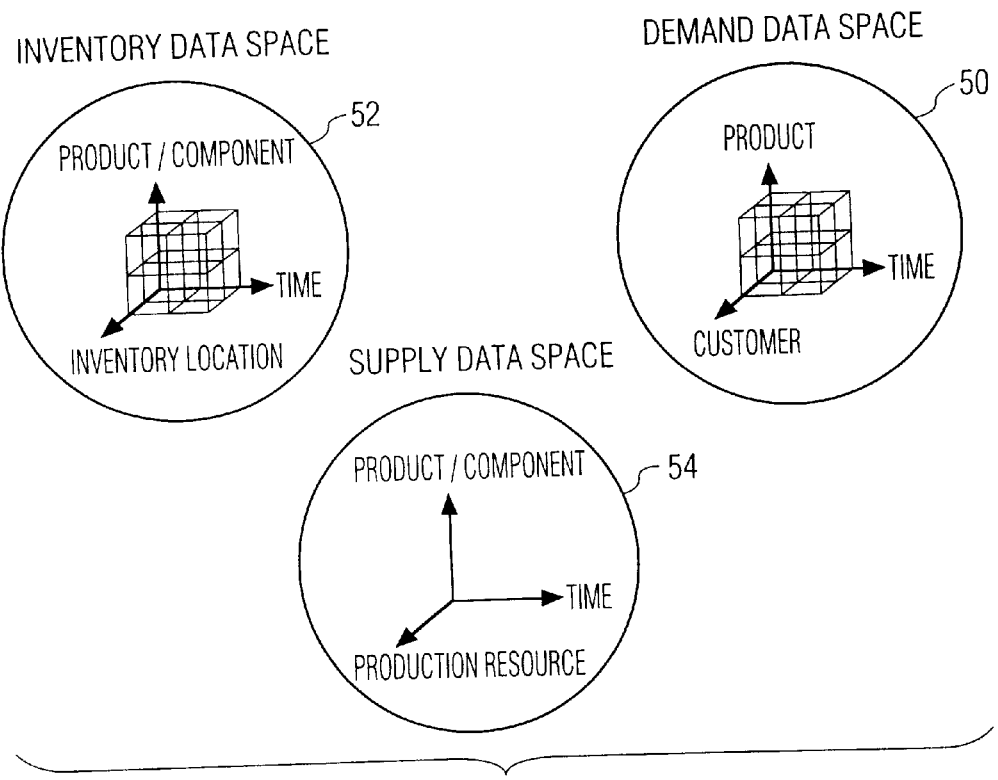
FIG. 4 The Data Spaces in Supply Chain Management.

A structural data representation of the data in various data spaces 50, 52 and 54 (see FIG. 4) is used to model the elements of the supply chain that are relatively static. Specifying these data elements typically specifies the infrastructure of the supply chain. At the highest level of abstraction, four principal nodes (see FIGS. 5 and 6) in the supply chain 58 are identified:

Demand node 59: The customer demands are characterized at this node.

Inventory Node 60: Inventories of key components or finished goods are identified to be at these inventory nodes.

Production Node 61: Production resources (or finished goods supply) are located at production nodes.

Component Supply Node 62: The supply points of key components are characterized at the component supply nodes.

Figure 5:
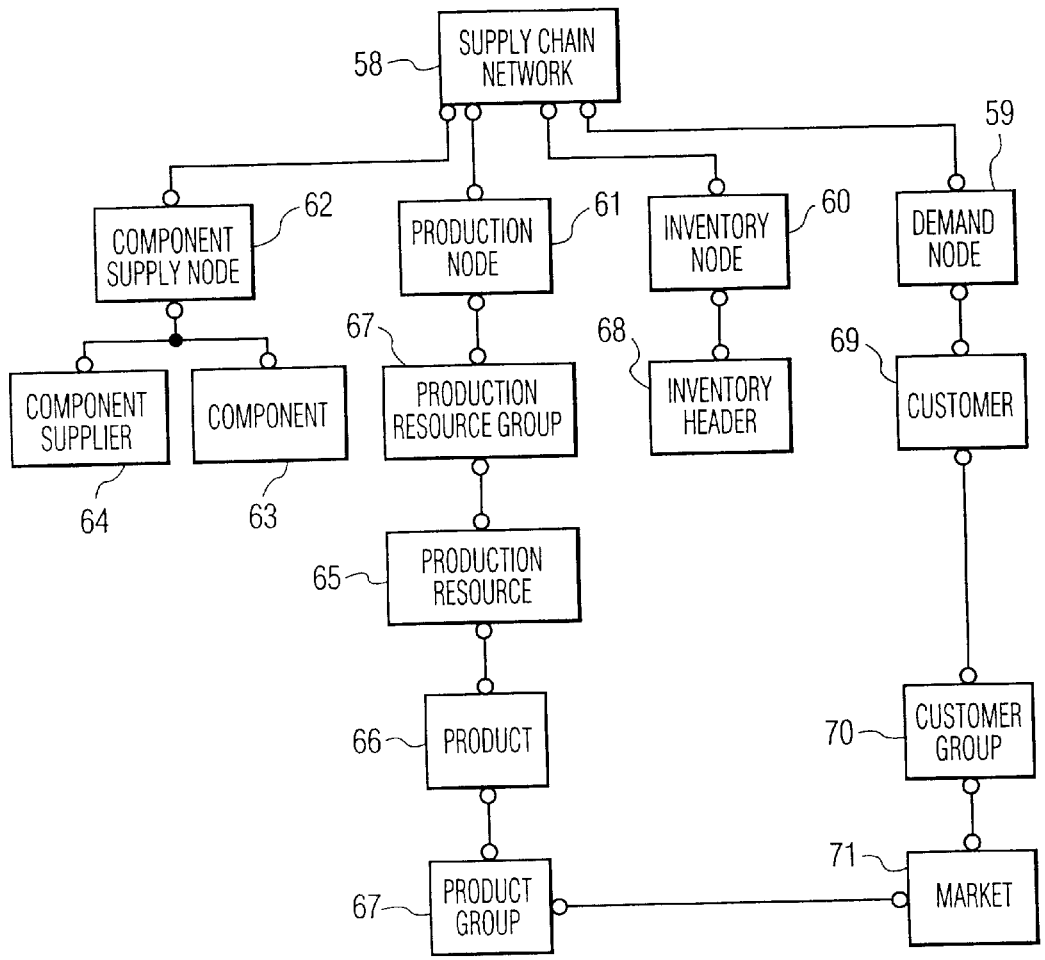
FIG. 5 Structural Elements in the DSS Database for the Manufacturing Supply Chain.

These structural data elements are spatially distributed along the supply chain 58 (see FIG. 5). The relationship between these nodes is preferably modeled in the form of a network.

The network characterization is a collection of links that connect the principal nodes. A link establishes a logical relationship between two nodes, which may have several attributes such as distance between the two nodes, transportation lead time, etc.

In greater detail, the structural data elements and their relationship to the principal nodes are described as follows. Key components 63 are supplied by component suppliers 64 tied to specific component supply nodes 62. Production resources 65 produce the various products 66. The production resources can be aggregated into production resource groups 67, and are located at production nodes 61. Products 66 are the end items that are produced and, based on their various attributes, can be grouped into various product groups 67. These products are stocked at various stock locations identified with inventory nodes 60 and inventory headers 68. Customers 69 can be grouped by various criteria into customer groups 70 and demand various products. Customers 69 are located at the demand nodes 59. Markets 71 are defined for a cross-section of customers and products.

Figure 6:
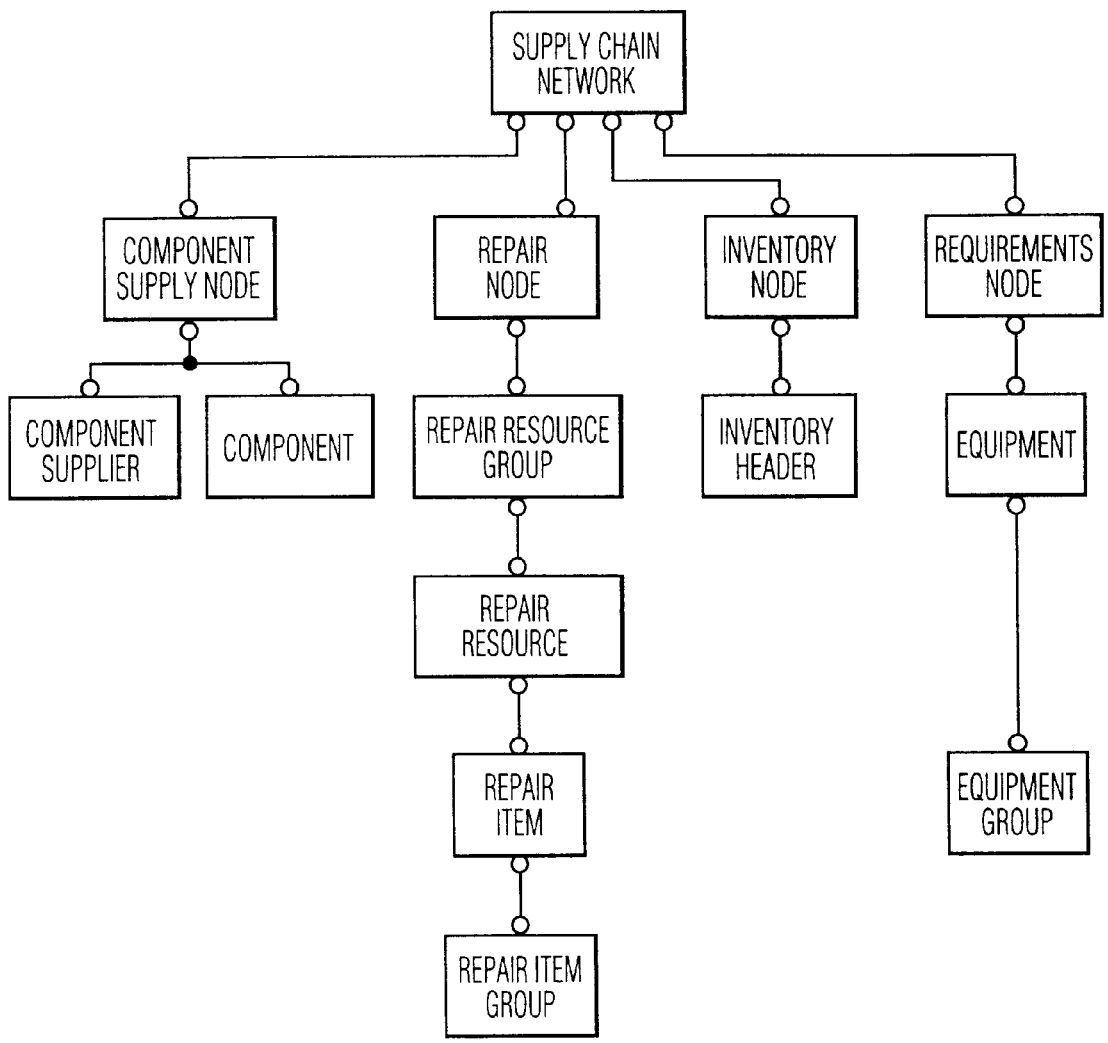
FIG. 6 Structural Elements in the DSS Database for the Equipment Repair Supply Chain.

A similar structure can be provided for the repair chain as illustrated in FIG. 6.

Such a data representation in the form of a network of nodes and the ability to group the various constituent elements, provide the flexibility to specify and reconfigure a variety of supply chains.

Process Data Representation

In addition to the structural elements, the data associated with the various processes in the supply chain need to be represented. These process data elements are relatively dynamic with respect to time and the associated processes transform data related to the various structural elements. To characterize the process data, we introduce a few additional data structures.

Data Space

A data space is a fundamental domain to characterize basic data elements associated with the supply chain management: demand, supply and inventory data. The data spaces 50, 52 and 54 tie the structural data to the process data. It has three principal dimensions: Product/Component; Time; and Node related structural element. As the node-related structural element can be a customer, an inventory location, or a production resource. The data in each data space can be at any resolution (in terms of level of aggregation) along the three dimensions and can be expressed as a quantity or value. Thus, each point in the data space characterizes the resolution of the product (or component), the time and the node-related structural element. For example, when describing the aggregate production plan data, a product can be at the resolution of product, time at a resolution of week, and the node-related structural element (Production resource in this case) at a resolution of production resource group. On the other hand, in describing bottom-up forecasts, a product can be at the resolution of product, time at a resolution of month, and node related structural element at the resolution of customer.

We identify three principal data spaces associated with supply chain management: Demand Data Space 50; Inventory Data Space 52; and Supply Data Space 54. These data spaces are pictorially represented in FIG. 4 and are explained next.

Demand Data Space 50: This data space 50 has three dimensions: Customer; Product; and Time. Customer can be at a resolution of customer or customer group or demand node. Product can be at the resolution of product or product group. Time can be at a resolution of day, week, bi-week, month, bi-month, quarter or year.

Supply Data Space 52: This data space 52 has the following three dimensions: Production Resource; Product/Component; and Time. Production resource can be at a resolution of production resource, production resource group, or production node. Product/Component can be at the resolution of component, product or product group. Time can be at a resolution of day, week, bi-week, month, bi-month, quarter or year.

Inventory Data Space 54: This data space 54 has the following three dimensions associated with it: Inventory Location; Product/Component; and Time. Inventory location can be at a resolution of stock location or inventory node. Product/Component can be at the resolution of component, product or product group. Time can be at a resolution of day, week, bi-week, month, bi-month, quarter or year.

A decision process relates or transforms data either within a data space or between data spaces. For example, aggregate production planning transforms data from the supply space to inventory space and vice versa. We will employ this data space representation to specify the various decision processes in supply chain management.

The DSS Database 12 comprises structural information (information related to relatively static information such as product groups, market groups, supply chain network, etc.), and process information (dynamic information related to demand, production plan, etc.). FIG. 5, previously discussed, graphically represents the structural data tables for the manufacturing supply chain.

Similarly, the DSS Database 12 for the equipment repair supply chain (see FIG. 6) comprises structural information (information related to relatively static information such as equipment, repair resources, supply chain network, etc.), and process information (dynamic information related to usage, requirements, repair plan, etc.). Again, the structural elements are flexibly collected into different groups to allow users to analyze data at various resolutions. For example, equipment of the same age can be grouped together to analyze the effect of age on repair requirements. FIG. 6 graphically represents the structural data tables for the equipment repair supply chain.

The process data in the DSS Database 12 are contained in two closely related table type data structures (see below): (I) header file that specifies the resolutions and values on the relevant dimensions of product, customer, time, resource, and item, (ii) corresponding data file which contains the actual data at the resolutions and values specified in the header. The process data are preferably stored in these two tables (Table 2, Table 3), rather than one consolidated table (Table 1), to avoid redundancy and updating anomalies. A loss-less join of the header and the data tables will result in the consolidated table (Table 1). The following example demonstrates this point.

TABLE 1

A single consolidated table with redundancy (not in normal form)

| Orientation HeaderID | Customer Resolution | Customer ID | Product Resolution | Product ID | Time Resolution | Calendar ID | Date Created | Time Period | Quantity |
|---|---|---|---|---|---|---|---|---|---|
| 1 | C | BESTB | P | 19PR14C | M | 1 | 1/1/96 | 8/1/96 | 10 |
| 2 | C | BESTB | P | 19PS52C | M | 1 | 1/1/96 | 6/1/96 | 20 |
| 2 | C | BESTB | P | 19PS52C | M | 1 | 1/1/96 | 7/1/96 | 30 |
| 2 | C | BESTB | P | 19PS52C | M | 1 | 1/1/96 | 8/1/96 | 75 |
| 2 | C | BESTB | P | 19PS52C | M | 1 | 1/1/96 | 9/1/96 | 50 |
| 3 | C | BESTB | P | 6P4830W | M | 1 | 1/1/96 | 6/1/96 | 12 |
| 3 | C | BESTB | P | 6P4830W | M | 1 | 1/1/96 | 7/1/96 | 40 |
| 3 | C | BESTB | P | 6P4830W | M | 1 | 1/1/96 | 8/1/96 | 57 |
| 4 | C | SEARS | P | 554528 | M | 1 | 1/1/96 | 9/1/96 | 50 |
| 4 | C | SEARS | P | 554528 | M | 1 | 1/1/96 | 10/1/96 | 2 |
| 4 | C | SEARS | P | 554528 | M | 1 | 1/1/96 | 7/1/96 | 3 |
| 5 | C | SEARS | P | 6P4830W | M | 1 | 1/1/96 | 2/1/96 | 2 |
| 6 | C | SEARS | P | 6P4830W | M | 1 | 1/1/96 | 5/1/96 | 74 |
| 7 | C | SEARS | P | 6P4830W | M | 1 | 1/1/96 | 3/1/96 | 3 |
| 7 | C | SEARS | P | 6P4830W | M | 1 | 1/1/96 | 6/1/96 | 565 |
| 7 | C | SEARS | P | 6P4830W | M | 1 | 1/1/96 | 4/1/96 | 500 |

TABLE 2

Header table that provides the series information and the various identifiers

| Orientation HeaderID | Customer Resolution | CustomerID | Product Resolution | ProductID | Time Resolution | CalendarID | Date Created |
|---|---|---|---|---|---|---|---|
| 1 | C | BESTB | P | 19PR14C | M | 1 | 1/1/96 |
| 2 | C | BESTB | P | 19PS52C | M | 1 | 1/1/96 |
| 3 | C | BESTB | P | 6P4830W | M | 1 | 1/1/96 |
| 4 | C | SEARS | P | 5S4528 | M | 1 | 1/1/96 |
| 5 | C | SEARS | P | 6P4830W | M | 1 | 1/1/96 |
| 6 | C | SEARS | P | 6P4840W | M | 1 | 1/1/96 |
| 7 | C | SEARS | P | 6P48S0W | M | 1 | 1/1/96 |

TABLE 3

Data table that contains references to the header table and the time series data

| Orientation HeaderID | Time Period | Quantity |
|---|---|---|
| 1 | 8/1/96 | 10 |
| 2 | 6/1/96 | 20 |
| 2 | 7/1/96 | 30 |
| 2 | 8/1/96 | 75 |
| 2 | 9/1/96 | 50 |
| 3 | 6/1/96 | 12 |
| 3 | 7/1/96 | 40 |
| 3 | 8/1/96 | 57 |
| 4 | 9/1/96 | 50 |
| 4 | 10/1/96 | 2 |
| 4 | 7/1/96 | 3 |
| 5 | 1/1/96 | 40 |
| 5 | 2/1/96 | 2 |
| 6 | 5/1/96 | 74 |
| 7 | 3/1/96 | 3 |
| 7 | 6/1/96 | 565 |
| 7 | 4/1/96 | 500 |

Data Tables

The data tables in the DSS Database 12 are preferably specified as follows: Name of the table; Brief description of the data contained in the table; Identifier for the data fields; Type of the data field; and Brief description of the data fields (this includes the choice of values for the data in this field, if applicable).

The specifications of the data tables for the manufacturing and equipment repair supply chains can be found in Appendices A and B, respectively. The list of the preferred tables in the DSS Database 12 for these chains is as follows: Aggregate Production Plan Data; Aggregate Production Plan Header; Budget Data; Budget Header; Calendar; Component; Component Accommodation Matrix; Component Requirement Data; Component Requirement Header; Component Supplier; Component Supply Contract; Component Supply Node; CPRD Table; Customer; Customer Group; Customer Group; Definition; Customer Orders; DataField Definition; Demand History Data; Demand History Header; Demand Node; Demand Orientation Data; Demand Orientation Header; Domain; Domain Definition; Feature Choices; Forecast Data; Forecast Header; Freight Rate; Inventory Data; Inventory Header; Inventory Node; Inventory Parameters; Market Data; Market Header; Material Delivery Schedule Data; Material Delivery Schedule Header; Planning BOM; POS Data; POS Header; Product; Product Features; Product Group; Product Group Definition; Production Accommodation Matrix; Production Capacity Data; Production Capacity Header; Production Matrix; Production Node; Production Requirements Data; Production Requirements Header; Promotion Data; Promotion Header; Resource; Resource Group; Resource Group Definition; Sales Requirements Data; Sales Requirements Header; Scenario; Scenario Data; Compatibility; Scenario Definition; Setup Matrix; Supply Chain Network; Supply Order Data; Supply Order Header; Temporary Product List; VMR Contract; VMR Data; and VMR Header.

Core Reports

The present invention preferably provides core reports that support business decision processes by characterizing the link between the various data elements and processes. They synthesize the data and information used in the decision making processes. Associated with each key business process, we will demonstrate the data flow relationships that are used to construct the various forms and reports. Some of the preferred forms and reports relevant to the DSS 10 are: Sales Plan; Customer-Demand History; Production-Sales-Inventory Plan; Master Production Plan; Production Capacity Plan; Replenishment Schedule; Customer-DC Assignment; and Supply-DC Assignment.

Decision Support Frames

Overview

From a user perspective, a Frame 16 is an integrated decision support environment based on an abstraction of the supply chain designed to address a set of related decision problems within a decision process. A Frame 16 is therefore defined based on the vantage point or view point of the users along a supply chain. This implies that a frame exists if and only if there are users with specific needs in the supply chain.

From a system perspective, a Frame 16 is a mechanism that unifies the user dialog and display, the models and analysis routines, and data in a manner that is consistent to support the underlying supply chain abstraction of the user. A summary of the frame concept from both a user and a system perspective is shown in Table 4.

TABLE 4

Frame Concept: User's and System Perspective

| User Perspective | System Perspective |
|---|---|
| An environment to address a collection of related decision problems. Always associated with a decision maker or a group of decision makers. Frame exists if and only if there are decision makers. | It is a subsystem that processes user requests in the form of Scenarios. It consists of a consistent set of process and data models. |
| Has a unique perspective of the underlying supply chain based on the responsibility of the decision makers associated with the frame. | It unifies the User Interface, Model Engine, and DSS Database elements that are specific to a decision making process. |
| Enhances the coordination of decision making implicit in the definition of the frame. Enforced through organizational accountability and responsibilities. | A convenient client-server architecture that enables the extension of the DSS functionaiity. |

Frame Architecture

Figure 7:
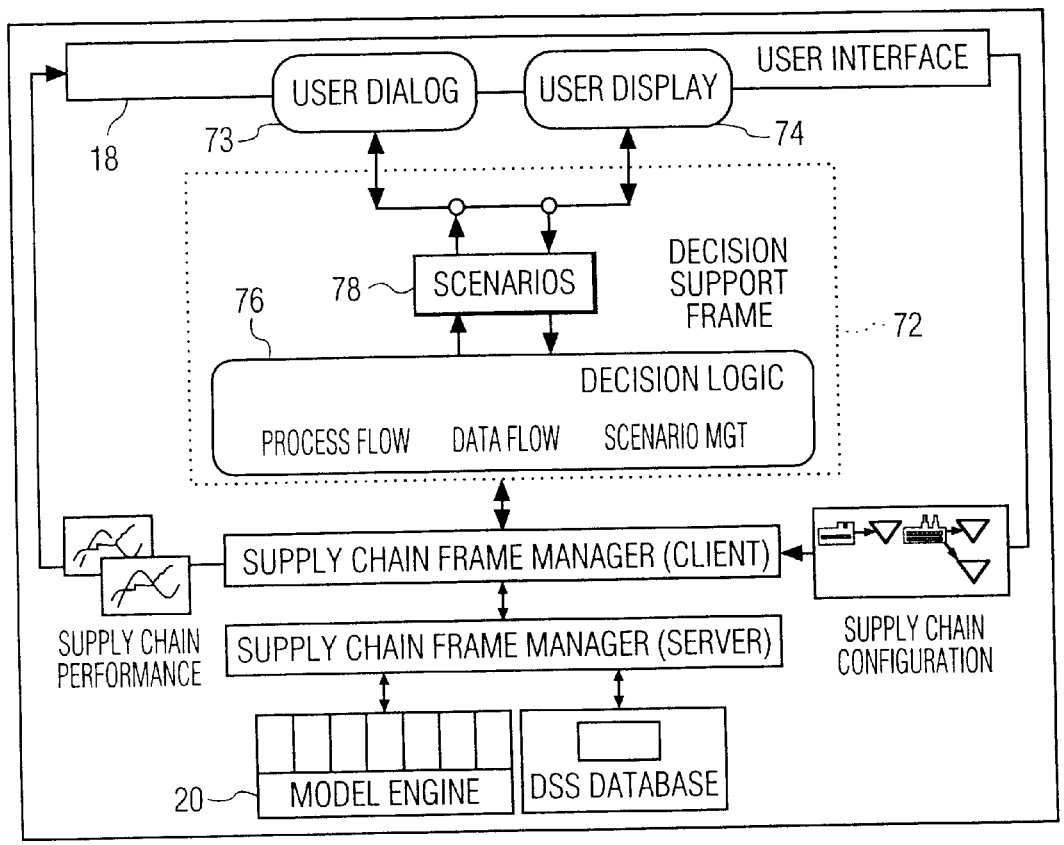
FIG. 7 Specification of Decision Support Frame.

The high level design of a Decision Support Frame 16 and its interaction with the User Interface 18, the Supply Chain Frame Manager 24, the Model Engine 20, and the Database 12 is illustrated in FIG. 7. A Frame 16/72 is the abstraction of the supply chain from a user's point of view. It essentially contains as its design elements a user dialog 72 and user display 74 and a decision logic 76. The user dialog 73 and the display 74 contain the form and style of the User Interface 18. The decision logic 76 permits the assembly of models and analysis routines and the associated data to address the set of related decision problems. For example, in the case of the PSI Planning Frame 160, the user dialog 72 and display 74 are customized to the specific needs of the PSI planning process, which further determines the design of the User Interface 18 associated with the PSI Planning Frame 160. Users will interact with the PSI Planning Frame 160 through the User Interface 18 by formulating Scenarios 78. Based upon the Scenarios 78, the decision logic 76 in the PSI frame may assemble models and routines from the Model Engine 20 along with the associated data. The decision logic 76 in a frame interacts with the Supply Chain Frame Manager 24 to execute the models and routines. The Supply Chain Frame Manager 24 then provides the performance feedback to the user.

Decision Processes in the Manufacturing Supply Chain

Figure 8:
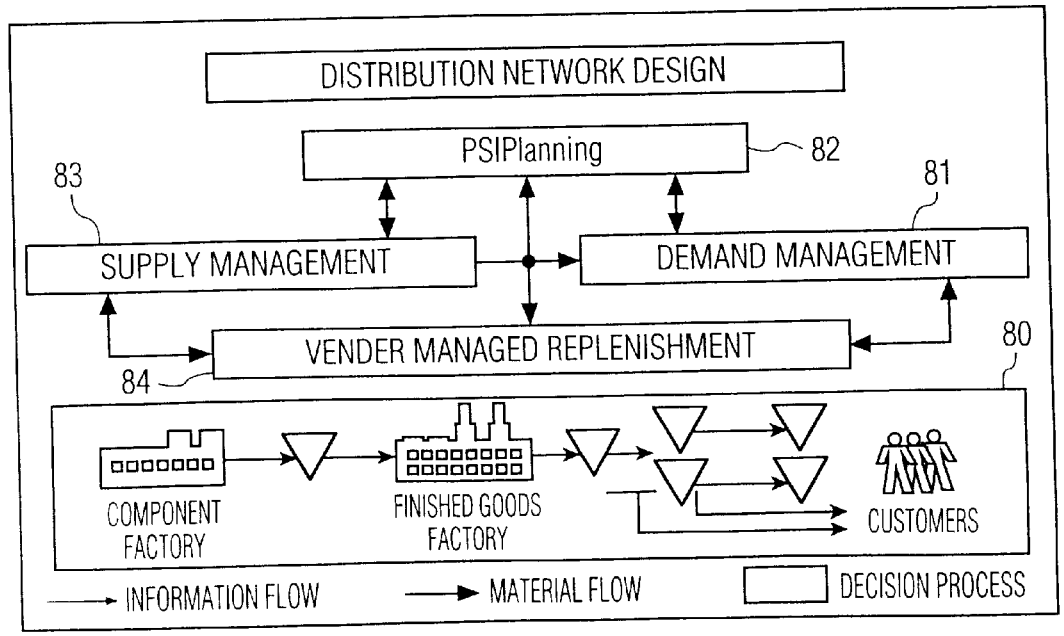
FIG. 8 Decision Processes in the Manufacturing Supply Chain.

The decision processes in the is manufacturing supply chain are depicted in FIG. 8. We have identified five decision processes closely associated with the key decision makers and potential users in a supply chain: Overall Supply Chain Management 80, Demand Management 81, PSI (Production-Sales-Inventory) Planning 82, Supply Management 83, and Vendor Managed Replenishment (VMR) 84.

Overall Supply Chain Management

A supply-chain-wide view and the necessary Management 80 is recognized by all levels of the management as being vital to managing the business. However, decision makers at different levels and points along the supply chain are primarily motivated by their individual roles and responsibilities. The broader a decision maker's responsibilities, the more likely the decision maker is interested in employing decision support capabilities that target the entire supply chain. The user requirements discussed below for decision support are posed from a supply-chain-wide perspective. Given the uncertainty in the medium- to long-term sales forecasts, determine whether or not the enterprise should expand, maintain or reduce its production capacity and/or stocks for the critical components. When changes in business conditions impact one part of the supply chain, assess the potential impact on the other parts of the supply chain. Given different future business scenarios, determine their financial consequences across the supply chain. For the enterprise's supply chain which includes major retailers, determine the appropriate division of responsibilities for all partners in the supply chain. Develop and implement performance incentives that will enhance and encourage supply-chain-wide thinking and decision making in the enterprise.

Demand Management

Demand Management 81 is the process by which the customers' requirements are characterized with the specification of prevailing uncertainty. The process involves the development and maintenance of medium-term customer (bottom-up) forecasts. These forecasts are initially developed in periodic joint meetings or communications between the decision makers of the enterprise and the customers. Subsequently, these forecasts are input into the enterprise's supply management system to obtain product allocation approval (place-keeping order). As the actual purchase orders arrive, the enterprise attempts to fulfill the requirements to their customers' satisfaction. We have identified the user requirements discuss below for decision support for this process. Synthesize information from different sources in order to manage the demand requirements effectively, e.g., accessing point-of-sales (POS) data and comparing these with shipment history and customer forecasts. For key customers, develop customer-specific sales forecasts based on historical shipment and sell-through data. Link POS data, where available, to the historical promotion information to analyze the real impact of promotion activities on demand, as opposed to relying on the estimates provides by the retailers.

PSI Planning

PSI Planning 82 is a process to determine a set of feasible sales, production and inventory requirements for medium to long-term capacity and resource planning for the logistics operations. At the beginning of each fiscal year, an initial PSI plan can be developed based on the long-term top-down sales forecast and budget plans. The planning process then becomes a continuous effort to update the existing PSI plan to accommodate the changes in the requirements before and after a series of monthly PSI planning meetings whose participants include decision makers representing all key functional areas at the enterprise. The meetings integrate the inputs from various sources, resolve possible conflicts, and balance the concerns of different functions in order to reconcile, develop and approve a new set of feasible sales, production and inventory requirements. The process represents a focal point for the entire logistics planning process, and interacts and coordinates with all major decision making processes. We have identified the user requirements discussed below for decision support for this process. Generate market trend forecasts by product categories for the enterprise as well as the entire industry. Such forecasts will be based on available shipment history, industry survey data and influential economic indicators. Generate forecasts for new products and managing product transitions. Facilitate development of medium-term top-down and bottom-up sales forecasts for the enterprise. Facilitate development of production plans and the associated requirements plans for critical components. Evaluate the effects and understand the implications of specific changes in the sales or production plans. Conflict resolution mechanisms are needed to adapt and maintain these plans. Identify those products that would be affected by the shortage of certain critical components; one possible approach is to use an implosion tool on the bill of materials. Provide a formal mechanism to determine and re-adjust appropriate inventory levels for various products.

Supply Management

Supply Management 83 is a process to determine the production (supply) plan to meet the production (supply) requirements generated by the PSI Planning process. The process involves component procurement and factory production planning based on the PSI plans and their changes. At the beginning of the process, the production line capacities are created based on long-term product plans, i.e., planned new product release. The process continuously updates the production (supply) plan based on changes in the production (supply) requirements generated in the PSI process. We have identified the user requirements discussed below for decision support for this process. Determine the feasibility and the economic viability of changes in the production (supply) plan, when changes occur in the PSI plans. This requirement is motivated by trade-offs between the PSI process and the production (supply) planning process. Evaluate possible options to accommodate changes in the production requirements, after the line structure and capacity are determined. Such an analysis is a requirement of the factory planner. Develop an aggregate level representation of the production line capacities so as to help the planners in developing aggregate production plans or checking production capacity. Develop a rough-cut analysis capability to assist the planners in translating the production requirements into critical component requirements, i.e., components featured in the planning bill of materials.

Vendor Managed Replenishment (VMR)

VMR 84 is a process in which the supplier takes on the responsibility of managing the inventory at the customer site for the products it supplies. This process operates on point-of-sales demand as opposed to demand forecasts provided by the customers. VMR involves formulating the contractual agreements between the enterprise and the retailers as well as determining the operating parameters such as shipment quantities and replenishment frequencies. We have identified the user requirements discussed below for decision support for this process. Develop a strategic analysis tool to determine mutually beneficial VMR contracts based on financial and logistics factors. Develop the replenishment plan based on factors such as sell-through and inventory information provided by the retailer, promotion activities, product availability and transportation cost trade-offs.

Decision Processes in the Equipment Repair Supply Chain

Overview of the Equipment Repair Supply Chain

Figure 9:
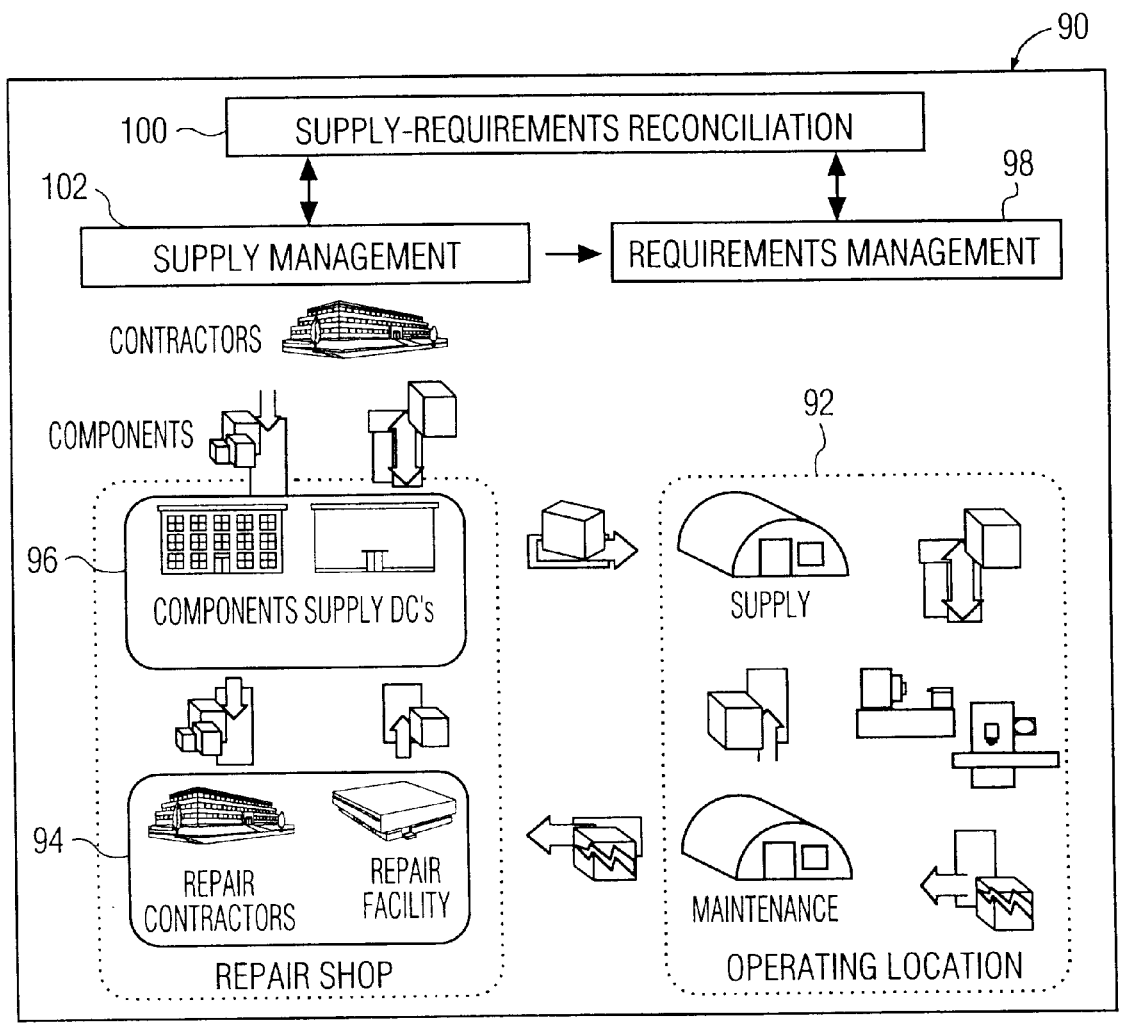
FIG. 9 High Level Model of an Equipment Repair Supply Chain and the Decision Processes.

The equipment repair supply chain 90, as depicted in FIG. 9, includes the operating location 92, i.e., the point-of-use, the repair shop 94, and the component suppliers 96. In an equipment repair supply chain, the demand (or the "requirements") are generated by equipment failures. When equipment fails, the failed module is replaced from the stock at the operating location 92, and the failed module is eventually sent to the repair shop 94 for repair. A module is made up of repair items which in turn are made up of components. At the repair shop 94, the repair is carried out by the repair resources (people and machinery). During the repair process at the repair shop 94, certain repair items and components are replaced. Based on the repair needs, repair items and components will be ordered from the sources of supply by the repair shops.

Equipment Operating Location 92: At the equipment operating location 92, personnel may replace only certain repair items of the module, instead of the whole module These replacement repair items may come from the stock or from other failed modules. This process encourages consolidation of failed modules at the operating location. In the consolidation process, the broken repair item of a broken module is replaced by a good repair item from another broken module. This process may be motivated by the structure of the repair cost function and the need for quick repair. In some cases, due to the fixed costs of sending individual modules to the repair shop, modules are batched to a certain level, before they are sent to the repair shop for a complex overhaul.

Repair Shop 94: The repair shop 94 is responsible for all the major repairs. The type of repair to perform is driven by the level of good modules at the repair location. When good modules are sent from the repair shop to the operating location, the stock level may drop below the target level, thus triggering a repair request to bring the stock level up to the target level. This target level is determined with the objective of maximizing the equipment availability and minimizing the repair costs. Component and capacity requirements corresponding to a repair request should be feasible with respect to component availability and resource capacity levels at the repair shop.

Parallel With the Manufacturing Supply Chain

We recognize the operational differences between manufacturing and equipment repair supply chains. However, the equipment repair supply chain has clear parallelism with the manufacturing supply chain where the repair items correspond to products and components correspond to materials. Equipment operating locations are similar to retailers and equipment is like customers. The repair shop is analogous to a production facility. As modules are made up of repair items, modules correspond to product groups. The repair requirements management process is analogous to demand management, and repair supply management to supply management. Similar to the PSI process, there exists a reconciliation process in the equipment repair supply chain to ensure balance between requirements and supply.

Application to a National Defense Application

For a national defense application, the following nomenclature is used. The equipment located at various operating locations are the aircraft operating at the various bases. The modules correspond to the Line Replaceable Units, or LRUs and the repair items correspond to Shop Replaceable Units (SRUs). The failure of an LRU, caused by the failure of its SRU, renders the aircraft unavailable. The function of the base is to provide immediate support to the aircraft located at that base, with the objective of maximizing availability of aircraft. For that purpose, bases stock good units of replaceable items, called serviceables, so as to be able to replace a failed LRU of an aircraft immediately. A base, usually, is not involved in major repairs. Instead, it implements a consolidation policy (replacing the defective SRU of a newly failed LRU with a good SRU of an already defective LRU), which gives the base the ability to manage the repair requirements of the depot. Managing the repair requirements refers to deciding when and which defective items the base will send to the depot for repair with the objective of maximizing the availability of aircraft located at the base and minimizing total cost of repair (which includes a fixed cost component).

A depot is responsible for all the major repairs. The type of repair to perform is driven by the level of good repairable items at the depot. When good repairable items are sent from the depot to the base, the stock level may drop below the target level, thus triggering a repair request to bring the stock level up to the target level. This target level, also called the Consolidated Serviceable Inventory (CSI) level, is determined by the depot with the objective of maximizing its service level and minimizing its repair costs. Component and capacity requirements corresponding to a repair request should be feasible with respect to component availability and resource capacity levels at the depot.

Table 5 below presents the analogy and nomenclature between the equipment repair supply chain, and the manufacturing supply chain with examples from defense and commercial environments.

TABLE 5

Analogy and nomenclature between equipment repair and manufacturing supply chains

|  | Example Defense Equipment Repair Supply Chain | Example Commercial Equipment Repair Supply Chain | Parallel with Manufacturing Supply Chain |
|---|---|---|---|
| Equipment Repair Supply Chain |  |  |  |
| Equipment | Aircraft | MRI Machine Cabinet | Customers |
| Module | LRU |  | Product Group |
| Repair Item | LRU / SRU | Circuit Boards | Product |
| Component | Bit and piece part | IC | Component |

Decision Processes in the Equipment Repair Supply Chain

The supply chain comprises (see FIG. 9) the following three decision processes: Requirements Management Process 98; Requirements-Supply Reconciliation Planning Process 100; and Supply Management Process 102.

Requirements Management Process

The Requirements Management Process 98 concentrates on the activities associated with requirements estimation. The objective of this process is to estimate future repair requirements generated by equipment failures. Equipment has several repairable parts and equipment failures are caused by failures of the repairable parts. Hence estimating future requirements refers to the process of estimating failures of the equipment and of the repairable parts that caused the failures. This is done to estimate repair time requirements (determined in Requirements-Supply Reconciliation Planning Process) and equipment availability at equipment locations, both of which depend on the part that has failed.

Requirements can be analyzed in two levels: Lower level requirements, called the Raw Requirements, correspond to all repair requirements of the equipment and upper level requirements, called the Consolidated Requirements, correspond to requirements requested from the repair shop, since equipment locations may prefer accumulating their repair requirements and sending them to the repair shop according to certain rules instead of sending them as they occur, or may prefer carrying out minor repairs within the location, with the aim of reducing the fixed and variable costs of repair. In the manufacturing analogy, raw requirements would correspond to Point of Sales (POS) data and consolidated requirements to retailer order data from the production facility.

Two different estimation approaches that have been used in this process to estimate consolidated requirements are: Bottom-up Estimation Approach; and Top-down Estimation Approach.

The bottom-up estimation approach estimates the raw requirements first and then generates the consolidated requirements from raw requirement estimates. In order to estimate raw requirements, relationships are determined between failure rates and activity schedules of the equipment. For example, the time to failure of an equipment can be a function of the number of hours it has operated and its maintenance schedule. Once the relationships between failure rates and activities are established by regression or time series models, future failure rates can be estimated based on the planned activity schedules of the equipment. Given the estimated raw requirements, the next step is to go to the upper level and estimate consolidated requirements, that is requirements as seen by the repair shop (assuming that repair shop does not have access to raw requirements data). Consolidated requirements depend on what frequency the operating location will send its repair requests to the repair shop. This is analogous to the inventory replenishment policy of a retailer in a manufacturing system. In deciding on the type and parameters of the inventory replenishment policy, the facility will use several conflicting performance measures such as minimizing total repair cost and maximizing availability of the equipment. Thus, given the inventory replenishment policy of the facility and estimates of its raw requirements, its consolidated requirements can be estimated.

The top-down estimation approach makes use of historical data to estimate consolidated requirements. Statistical forecasting techniques can be used to support this process.

The two estimates obtained by bottom-up and top-down approaches are compared, analyzed and reconciled to generate final estimates for consolidated repair requirements. The output of this process is the estimated consolidated requirements for an equipment operating location.

Requirements-Supply Reconciliation Planning Process

The second process is the Requirements-Supply Reconciliation Planning process 100 that aims at developing an integrated repair plan for the repair shop through a reconciliation process. First, the type and parameters of the repair policy of the repair shop are to be determined. Aggregate repair requirements are generated based on the repair policy of the repair shop and estimated consolidated requirements for all facilities. The next step is to generate an aggregate repair plan based on repair time estimates for each repairable part and the aggregate repair requirements. Feasibility of the aggregate repair plan is checked with respect to resource constraints which are repair resource capacities and key component availability. If the aggregate repair plan is not feasible with respect to resource constraints, then causes for infeasibility are identified and the infeasibility is removed by either changing the level of the resource constraints or moving aggregate requirements forward or backward in time. This procedure is repeated until an aggregate repair plan that is feasible with respect to resource constraints is attained. The supply management 102 (see FIG. 9) is a process to determine the repair plan considering repair people, test equipment and key components. It starts by the translation of the aggregate repair plan into a detailed plan concerning repair resources (repair persons and test equipment), and component requirements. Based on these requirements and the capacity constraints for the repair resources, repair personnel and key components, a detailed repair plan is developed using an optimized based modeling approach. The detailed repair plan is used to generate the key component delivery schedule to be transmitted to the component suppliers. In addition, the supply management process 102 is also concerned with the development of appropriate procurement policies for key components in terms of identifying the policies, and deriving the corresponding policy parameters.

Basic Frames

The basic Frames 16 of the present invention collectively provide coverage for the overall supply chain. The specific instances of these Frames 16 in a particular DSS 10 implementation depend largely on the constituent supply chain, the underlying business processes, and the organizational structure. Table 6 below lists the Decision Support Frames 16 in the context of manufacturing and equipment repair supply chains.

TABLE 6

Decision Support Frames in the Context of Manufacturing and Equipment Repair Supply Chains

| Manufacturing Supply Chain | Equipment Repair Supply Chain |
| --- | --- |
| Demand Management | Requirements Management |
| PSI Planning | Requirements-Supply Reconciliation |
| Supply Management | Supply Management |
| Vendor Managed Replenishment | |
| Finished Goods Distribution Network Design | |

Specification of the Basic Frames

Figure 10:
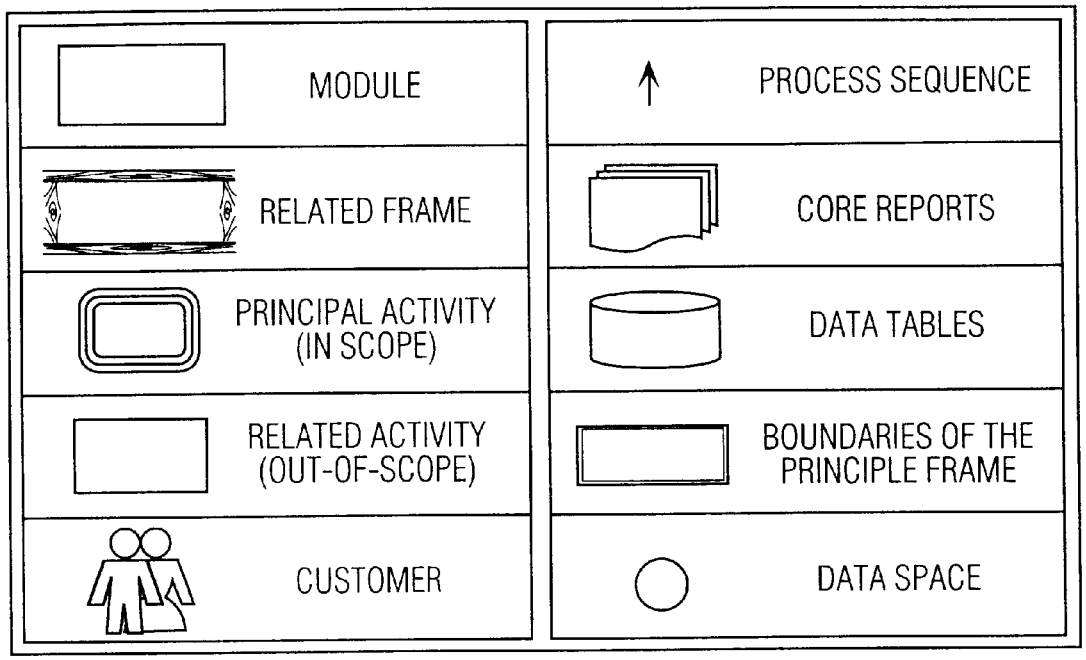
FIG. 10 Process and Data Flow Diagram Legend.

To specify each basic Frame 16, we use influence diagrams to map the modules in the Model Engine 20 and the Data Spaces to the frame. We use process flow diagrams to outline the high level design of the logical relationship among the key data tables, the modules and the basic Frames 16. We also discuss how to support key functional requirements in each frame. To complete the specification of the basic Frames 16, we use data flow diagrams to map the data tables to the core reports in each frame. The legend for the process and the data flow diagrams which will be discussed herein after is shown in FIG. 10.

Demand (Requirements) Management Frame

The Demand Management Frame 130 supports the demand management decision process described here.

Manufacturing Supply Chain

Module and Data Space Association

Figure 11:
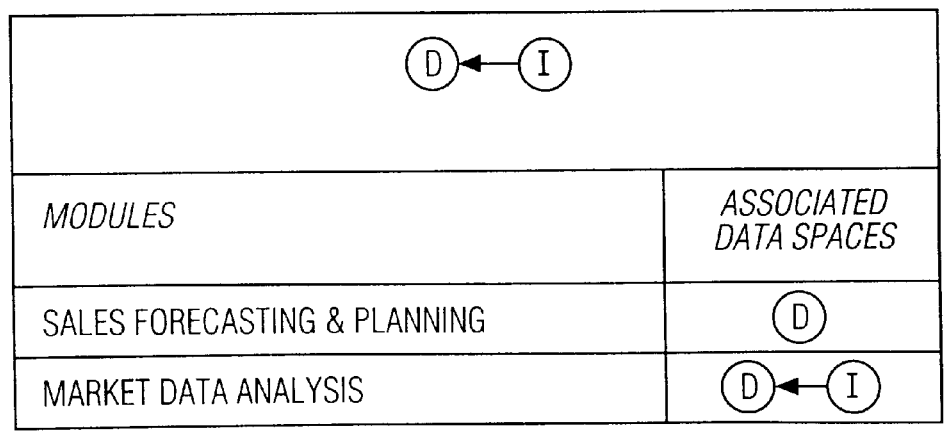
FIG. 11 Data Space Associations of the Demand Management Frame.

FIG. 11 shows the participating modules and the associated data spaces for this frame.

The Demand Management Frame 130 requires the participation of two modules: the Sales Forecasting and Planning (SFP) Module 132 and the Market Data Analysis (MDA) module 134. The SFP Module 132 in the Demand Management Frame 130 essentially operates in the D data space, i.e., it transforms data within the conceptual demand data domain. The MDA Module 134 in the Demand Management Frame 130 operates in the I and the D data spaces and relates the I data space to the D data space, i.e., it may transform data within the individual D data space as well as transform data from the I data space to the D data space. The data space representation of the Demand Management Frame 130 is the union of the data space representations of each participating module, and the interactions among participating modules.

The high level representation of FIG. 11 can be complemented by the process flow diagram for this frame, described next, that will detail the connections between the constituent modules and the associated data tables.

Process Flow

Figure 12:
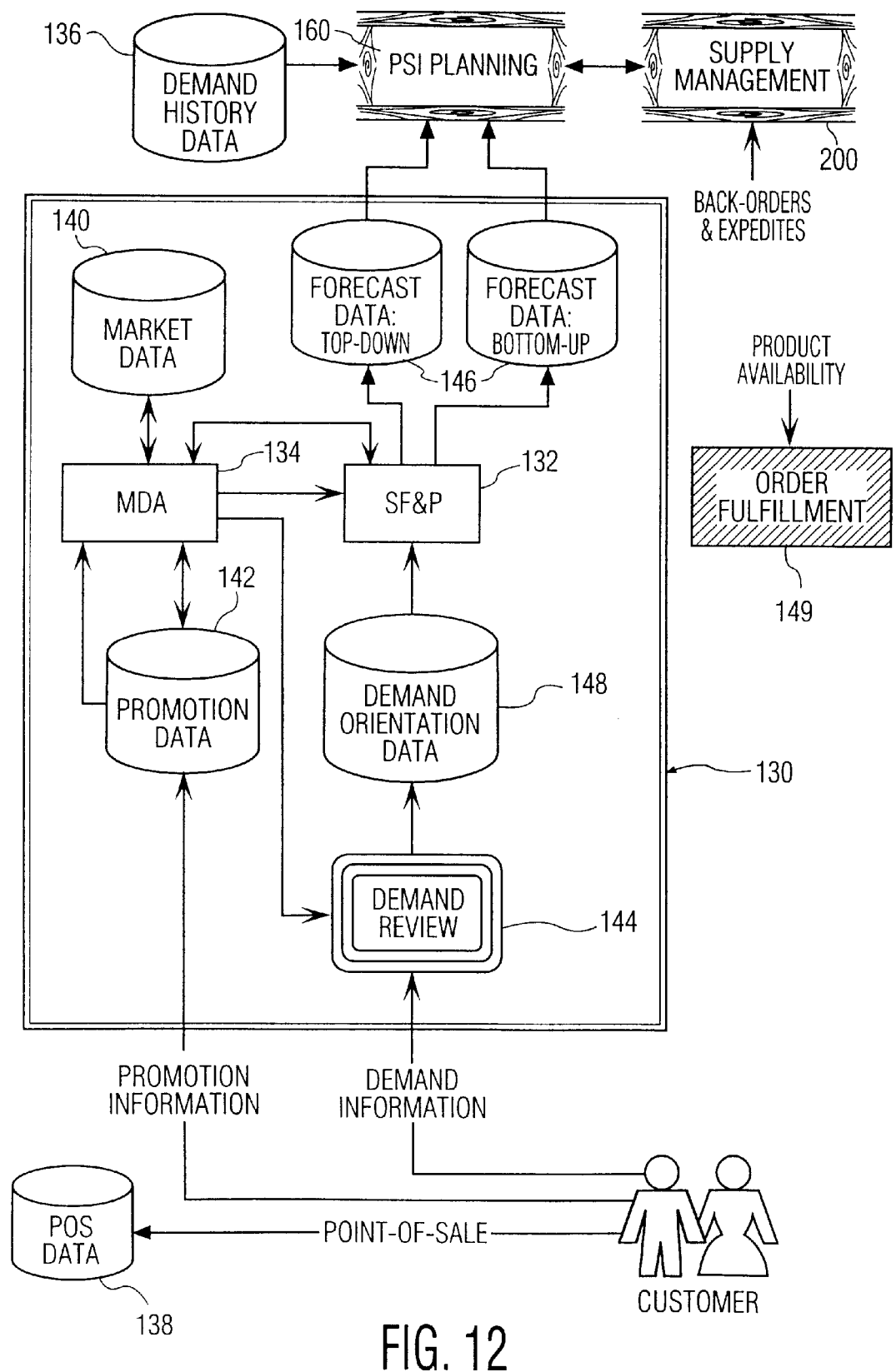
FIG. 12 Process Flow of the Demand Management Frame.
Figure 13:
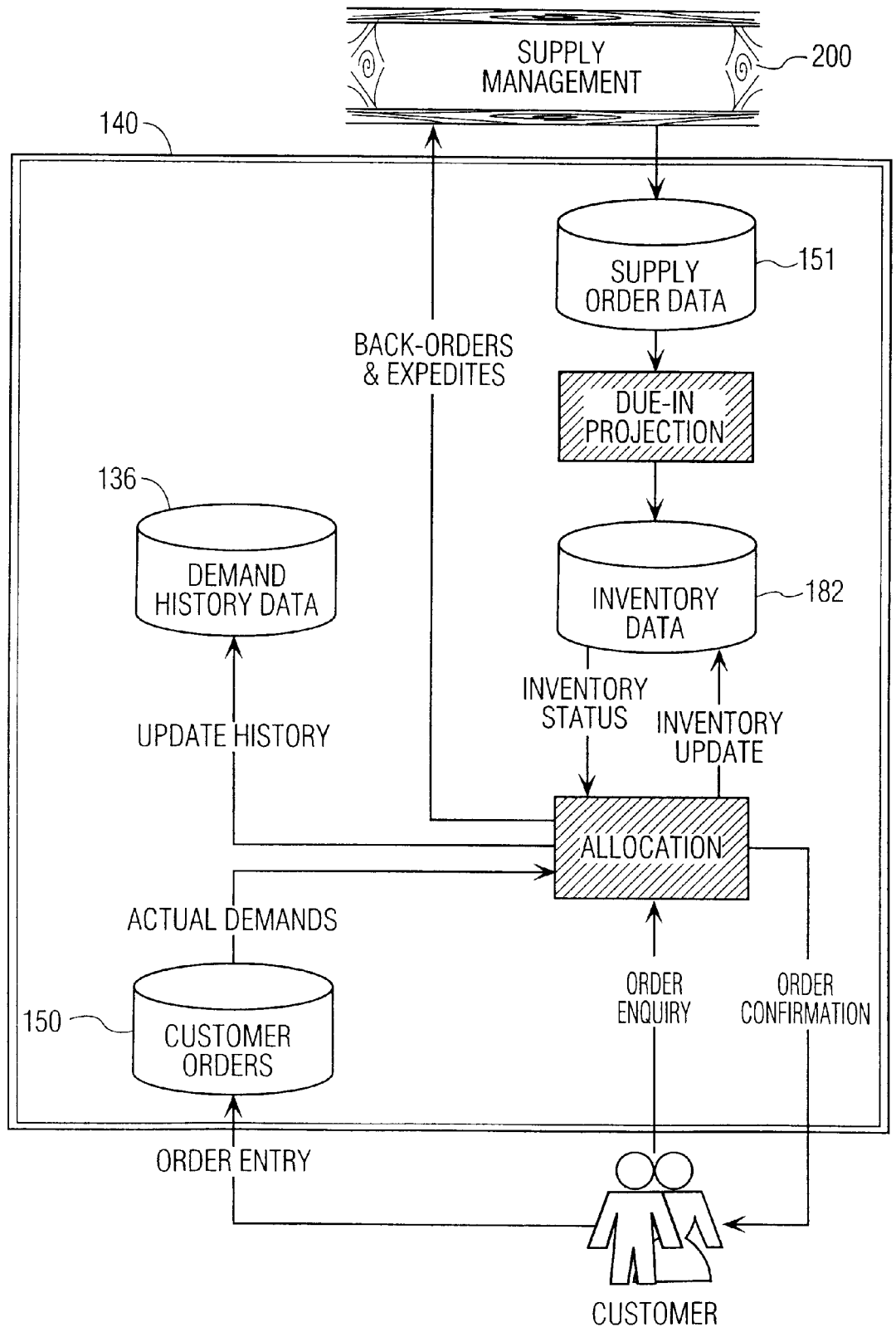
FIG. 13 Process Flow of Order Fulfillment.

The process flow diagram for the Demand Management Frame 130 is shown in FIG. 12. The modules, data tables, and the principal activities within the scope of this frame are clearly marked by the grooved double-lined border. Only the data tables that are updated by the frame are considered to be within the scope of the frame 130. Other frames, activities and data tables that are related are also shown for completeness. The Order Fulfillment 149, that is out-of-scope of the Demand Management Frame 130 but related to it, is shown separately in FIG. 13 for purposes of clarity. This representation of interaction between Frames 16 is consistent with the interaction between decision processes shown in FIG. 8.

The Demand Management Frame 130 supports the functional requirements described below. Demand Characterization—Demand data from various sources such as Demand History Data 136, POS Data 138, Market Data 140, and Promotion Data 142 as well as top-down and bottom-up Forecast Data 146 obtained by buyers and account managers will be consolidated and synthesized by the MDA Module 134 and the SFP Module 132. Bottom-up Demand Forecasting—Demand Review 144 consolidates demand information received directly from the customer along with the input from the MDA Module 134 and then develops Demand Orientation Data 148. The SFP Module 132 will then use Demand Orientation Data 148 as well as other inputs, e.g. Promotion 142 and POS 138 Data, to develop the customer-centric bottom-up forecasts in Forecast Data 146. Top-down Forecasting—The SFP Module 132 will use market and industry-wide trend analysis performed by the MDA Module 134 along with the enterprise's shipment history to generate the product-centric top-down forecasts in Forecast Data 146. Sales Promotion Analysis— The MDA Module 134 reviews the demand history from POS Data 138 and Demand History Data 136 along with the customer promotion information from Promotion Data 142 to analyze the impact of promotions on sales. The results of such an analysis are then used to help adjust sales forecasts to account for promotions. Forecast Performance Evaluation—Using Demand Orientation Data 146, Demand History Data 136 and Promotion Data 142, the SFP 132 and MDA Module 134 can evaluate the quality of enterprise's forecasts and the customer projections.

Data Flow

Figure 14:
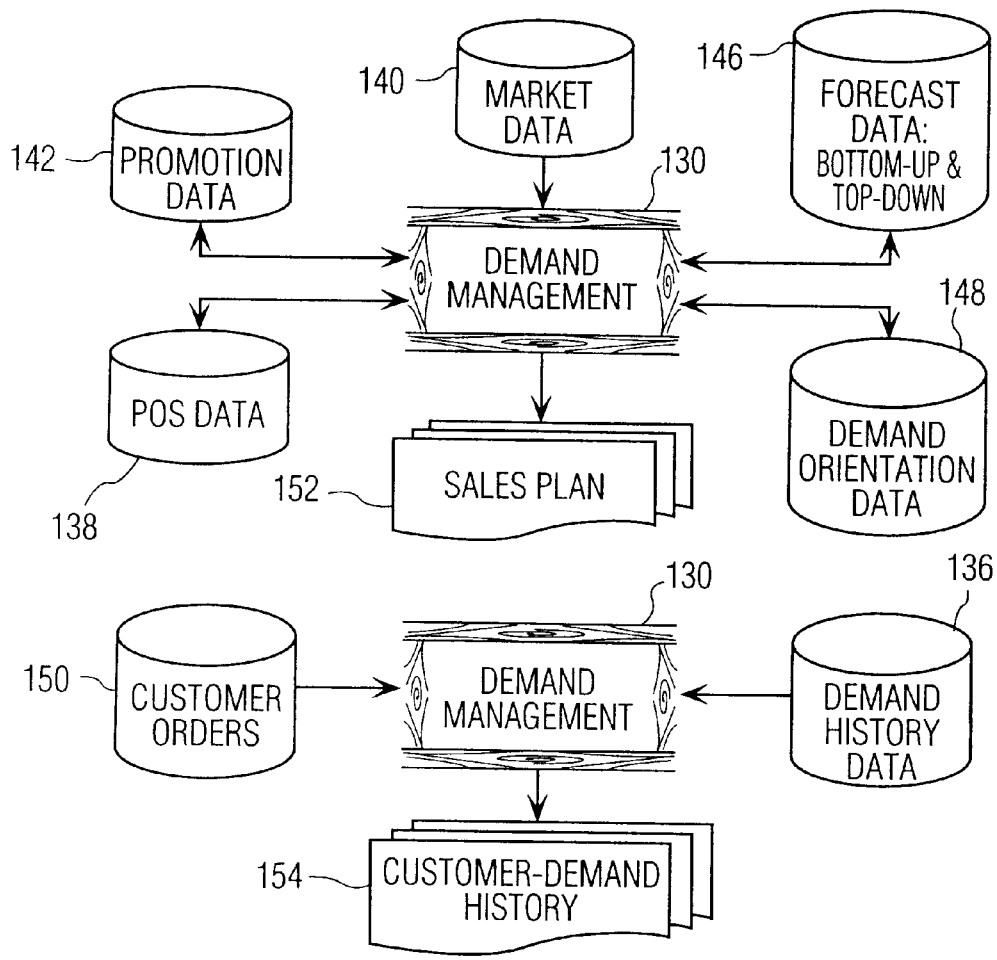
FIG. 14 Data Flow for the Demand Management Frame.

The data flow diagram for the Demand Management Frame 130 is shown in FIG. 14. The Demand Management Frame 130 generates two of the core reports listed earlier, namely, the Sales Plan 152 and the Customer-Demand History 154. For each core report, the associated data tables are shown. The dashed line indicates the influence of an out-of-scope (with respect to the Demand Management Frame 130) data table in the development of the report. For example, the Customer Orders data table 150 is out-of-scope of the Demand Management Frame 130 but influences the Customer-Demand History report 152.

Demand Management is the process in which the user determines future requirements based on past requirement history and general information related to the supply chain. In the context of the manufacturing environment Demand Management supports the analysis of past demand and of market trends as well as the development of future forecasts. For the repair environment the term Requirement Management is used in place of Demand Management. Requirement Management is the process where future requirements are estimated based on an analysis of each equipment's activity and on the projection of past requirement history.

In the manufacturing context, Demand Management regroups the set of processes by which the user analyzes Market Data 140 and past demand history for the purpose of estimating future demand requirements. The outputs of Demand Management include the analysis of past history, future forecasts, the analysis of special activities such as sales promotions, and the analysis of forecast errors. Two critical outputs of Demand Management are two different medium term forecasts corresponding to two different views on the dynamics of the processes that generate future requirements: the customer centric forecast—generated at the product level for each customer it incorporates the estimations of future demand provided by each customer (Bottom-up Forecast); and the product centric forecast— generated at the product level, it incorporates the impact of market and industry-wide trends on future demand for each product group (Top-down Forecast). These two types of forecast are generated using: Historical projection of past demand; Future orders information; Analysis of the dynamics and characteristics of the overall market and main competitors; and Analysis of the impact of future special commercial activities such as sales promotions. These analyses and projections are grouped in five functional requirements that are detailed in the rest of this section: Demand Characterization, Bottom-up Demand Forecasting, Top-down Demand Forecasting, Sales Promotion Analysis, and Forecast Performance Evaluation.

Other frames such as production, sales and inventory (PSI) or vendor managed replenishment (VMR) may directly or indirectly use the output of Demand Management.

Demand Characterization

The objective of Demand Characterization is to provide the user with an environment where (s)he can access, analyze and synthesize demand data from different sources. These data include: Sales History data (that include POS and shipment data), Inventory data (relative to the inventory position of its product at the customer's stocking points), and Market Data 140. Market Data 140 correspond to various quantitative information, usually provided by external entities such as Nielsen, that relates to the sales for the type of product considered in the entire market.

Acquire, Display, Edit Data

Data Acquisition consists of selecting a Data Domain (specific pairs of customer and product), and choosing the type of data to be displayed (POS, demand history, inventory, Market Data 140). Data can be edited and modified and saved along with results of analysis in a scenario.

Analyze & Synthesize Data

Sales History and Customer Inventory Data

This involves the operations discussed below.

Compute, display (tables and graphs), characterize and analyze sales history per product/product group or customer/customer group (see the MDA Module specification discussion for details of models and formulas): Volatility of demand, Lumpiness of demand, Trends in demand history, Demand pattern changes, and Seasonality.

Compute, display (tables and graphs) and analyze sales history statistics for different levels of aggregation: This year vs. last year, Actual sales vs. budget, and Year to date vs. balance of Year.

Compute, display (tables and graphs), and analyze trend in Demand Product Mix by product group.

Pareto analysis of sales (or inventory) to identify ABC classification for products (see MDA Module specification for details of formulas).

Compute and analyze correlation between the demand for different product groups.

Compute, display (tables and graphs), and analyze new products and model change-over profiles.

Compute, display (tables and graphs), and analyze inventory profile per customer.

Compute, display (tables and graphs), and analyze trade inventory by comparing POS and shipment data.

Market Data

This operation involves the operations discussed below.

Display (tables and graphs) Market Data 140 (volume, value, market share) by product group, region, or customer group (Nielsen, EIA, etc.).

Compute, display (tables and graphs) and analyze Market Data 140 statistics for different levels of aggregation: This year vs. last year, Trend, Actual statistics vs. budget assumption, and Seasonality.

Pareto analysis of competitors (value and volume).

Create price information: list of competitor products per price range.

Bottom-Up Demand Forecasting

The objective of the Bottom-up forecasting is to develop a customer specific sales forecast based on historical shipment to the customer, POS information at the customer location, and the customer's own forecast regarding its future orders.

Acquire, Display, Edit Data

Data Acquisition consists of selecting a data Domain (specific pairs of customer and product), and choosing the type of data to be displayed: shipment or POS (when available).

Forecasts generated in the Bottom-up forecasting frame can be saved back to the DSS Database 12 or alternatively saved as scenario.

Bottom-Up (BU) Forecast Generation
  This operation involves the operations discussed below.
  Input and maintain customer orders: Forward orders, and Orientation orders.
  Choose model for statistical forecast.
  Generate and display (tables and graphs) statistical forecast at different level of aggregation (POS or Shipment data): Customer group, Individual customers for all products, and Individual customers for each product.
  Support integration in BU forecast of expert knowledge for optimistic/pessimistic forecast.
  Formulate disaggregation logic of BU Forecast at customer level onto products.
  Incorporate impact of future promotions for customer specific promotions.
  Compute, display and edit seasonality factors.
  Review actual seasonality against planned and "company" seasonality.
  Disaggregate yearly forecasts onto each period using seasonality factors at different levels of aggregation (POS or Shipment data): Customer group, Individual customers for all products, and Individual customers for each product.
  Compute and display (tables and graphs) sales and forecast statistics: Moving average, Year to date/balance of year, This year vs. last year, and Actual/forecast vs. Budget.
  Support comparison of POS and Shipment data for analysis of change in trade inventory profile.
  Invoke forecast accuracy estimation routine.

Top-Down Forecasting
  The objective of the Top-down forecasting is to develop a product centric sales forecast based on historical demand data and industry analysis that accounts for market-wide trends.

Acquire, Display, Edit Data
  The data Acquisition consists of selecting a data Domain (specific pairs of customer and product), and choosing the type of data to be displayed: shipment or POS (when available).
  Forecasts generated in the Top-down forecasting frame can be saved back to the DSS Database 12 or alternatively saved as a scenario.

Top-Down (TD) Forecast Generation
  This operation involves the operations discussed below.
  Choose model for statistical forecast.
  Generate and display (tables and graphs) statistical forecast at different level of aggregation (POS and Shipment data): market level, product group level, and product line level.
  Incorporate industry trend analysis developed in Demand Characterization in TD forecast.
  Formulate disaggregation logic of TD Forecast at product level onto customers.
  Incorporate impact of future product specific promotions.
  Compute and display (tables and graphs) sales and forecast statistics: Moving average, Year to date/balance of year, This year vs. last year, and Actual/forecast vs. budget.
  Compute, display and edit seasonality factors.
  Review actual seasonality against planned and "company" seasonality.
  Disaggregate yearly forecasts onto each period using seasonality factors at different levels of aggregation (POS or Shipment data): market level, product group level, and product line level.
  Support forecasting of model change over, and introduction of new products.
  Invoke forecast accuracy estimation routine.

Sales Promotion Analysis
  The objective of Sales Promotion Analysis is to analyze the impact of promotional activities. It entails maintaining the promotion calendar, estimating the impact of future promotions and assessing the effect on sales of past promotional activities. The promotion calendar is a table in which the various characteristics of past and future promotions are recorded. The knowledge and insights gained in sales promotion analysis are used in adjusting bottom-up and top-down sales forecasts.
  The functional features associated with Sales Promotion Analysis are given below.
    Maintain Promotion Calendar and add new promotions: Time period of promotion.
    Type of promotion (defined by who initiates the promotion: firm, retailer, competitor), and Class of promotion (defined by the nature of the promotional activity).
    Intensity of promotion: Search and sort promotion calendar, and Analyze Past Promotions.
    Display sales data along with information of promotions under consideration.
    Establish profile for the impact of the sales promotions.
    Analyze promotion(s) effect through regression or time series models.
    Partition sales: Display actual sales attributable to normal sales, seasonal effect and promotion effect.
    Plan Future Promotions.
    Add promotion in promotion calendar—specify type, class, intensity and time period.
    Estimate impact of future promotion based on the impact of similar past promotions.

Forecast Performance Evaluation
  The objective of Forecast Performance Evaluation is to assess the accuracy of past sales forecasts. Forecast accuracy is an important measure for several purposes:
    It helps the user to refine the forecasting process by providing feedback on the ability of different models and approaches to forecast future demand;
    It provides a measure of demand variability that is used to assess necessary safety stock; and
    It guides attention to those products and customers for which demand is difficult to forecast and that require special attention.
  Two types of forecast performance evaluations are considered: forecast accuracy of one particular version of the forecast, and average accuracy of n periods ahead forecast.
  The first forecast performance type provides point estimations of forecast accuracy, while the second one is an average estimation of the accuracy as a function of the number of period in advance a forecast is produced.
  The functional features associated with Forecast Performance Evaluation are given below.
    Select data domain.
    Compute and display Forecast errors for: Bottom up forecast, Top down forecast, and Sales plan (invoked from PSI).
    Maintain Accuracy Matrix for each type of forecast (table of the forecast accuracy n periods ahead).
    Generate exception report based on level of forecast error for different level of aggregation.

Equipment Repair Supply Chain

In the context of the Equipment Repair Supply Chain the term "Requirements Management" is used in place of "Demand Management" to indicate that equipment generates "repair requirements" when it breaks down.

Requirements Management is the process of estimating the future requirements of reparable items at the equipment location. This process can be divided into two main subprocesses:

Evaluation of the raw requirements for each equipment; and

Estimation of the consolidated requirements at the level of each location (several pieces of equipment can be located at the same location).

These two approaches can be used to estimate future consolidated requirements.

Bottom-up method: This approach uses a combination of two models: (1) the first model estimates the raw requirements of an equipment by modeling its failure rate as a function of the equipment's activity (or usage) and (2) the second model estimates the consolidated requirement based on the raw requirements and the consolidation policy.

Top down method: This approach is based on the projection of historical data for the consolidated demand.

To support the two different approaches the functional requirements detailed below have been defined.

Activity Tracking for Raw Requirements Estimation

This involves the operations discussed below.

Select and Display Activity Data.

Maintain Future Activity Data: Planned Equipment upgrade/maintenance schedules; and Planned Equipment usage schedules.

Analyze Past Activities.

Review activities: Display historical raw requirements data along with activity data.

Assess impact of past activities using regression or time series models.

Per type of equipment.

Per type of activity.

Relate future raw requirements to planned activities.

Use models of past activities to project the effect of future activities.

Consolidated Requirements Estimation Based on Raw Requirements (Bottom-Up)

This operation involves the operations discussed below.

Select and Display Consolidated Requirement data.

Formulate, and refine consolidation policy (see SFP Module for explanation regarding consolidation policies).

Evaluate different consolidation policies based on past raw requirements.

Estimate future consolidated requirements based on chosen policy.

Consolidated Requirements Estimation Based on Historical Data (Top-Down)

This involves the operations discussed below.

Select and Display Consolidated Requirement data.

Choose model for statistical forecast of future usage per repair item/repair item group.

Kalman Filter based algorithm for requirements estimation (considered appropriate for forecasting equipment failures).

Other statistical forecasting techniques.

Generate and display (tables and graphs) statistical forecast at different level of aggregation: Repair item group, Individual Repair item for all equipment, and Individual Repair item for each equipment.

Compute and display statistics (tables and graphs) for actual and estimated consolidated requirements: Moving average, Year to date/balance of year, This year vs. last year, and Actual/forecast vs. Budget.

Develop disaggregation logic of consolidated requirements estimation Forecast at repair item group onto individual Repair item.

Users can override algorithm based estimates.

Requirements Reconciliation and Requirements Plan Generation

This operation involves the operations discussed below.

Compare and analyze top-down and bottom-up requirements numerically and visually.

Reconcile the top-down and bottom-up requirements to generate the requirements plan.

Use weighted average models.

Incorporate user's input and override.

Requirements Estimation Performance Evaluation

Store top-down, bottom-up and reconciled requirements estimates.

Compute and display Estimation errors for: Bottom up requirement estimation, Top down requirement estimation, and Reconciled requirement estimation.

Maintain Accuracy Matrix for each type of requirement estimation (table of the accuracy n periods ahead).

Generate exception report based on level of estimation accuracy for different level of aggregation.

Production-Sales-Inventory Planning (Requirements-Supply Reconciliation) Frame The PSI Planning Frame 160 supports the PSI planning decision process described here.

Module and Data Space Association

Figure 15:
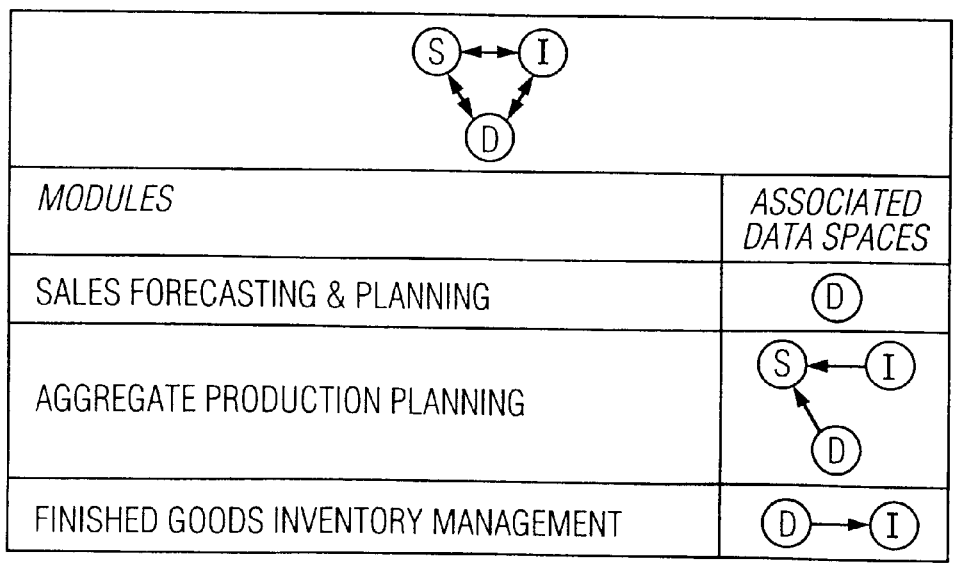
FIG. 15 Data Space Associations of the Production-Sales-Inventory Planning Frame.

FIG. 15 shows the participating modules and the associated data spaces for this frame.

The PSI Planning Frame 160 requires the participation of three modules: the Sales Forecasting and Planning (SFP) Module 132, the Aggregate Production Planning (APP) Module 162, and the Finished Goods Inventory Management (FGIM) Module 164. The PSI Planning Frame 160 as a whole involves S, I, and D data spaces with iterative data transformations among each pair.

Process Flow

Figure 16:
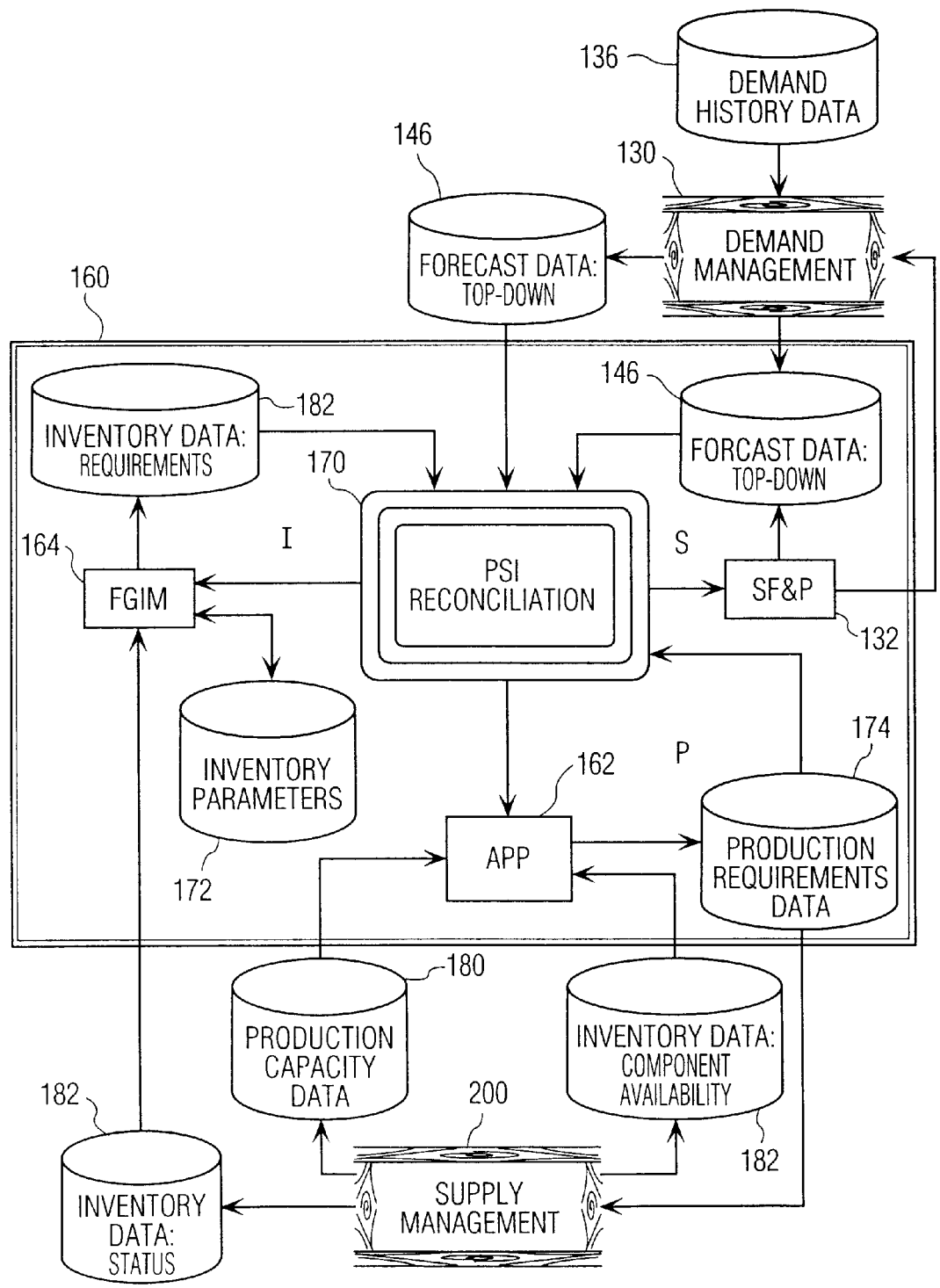
FIG. 16 Process Flow of the Production-Sales-Inventory Planning Frame.

The process flow diagram for the PSI Planning Frame 160 is shown in FIG. 16. The PSI Planning Frame 160 supports the following functional requirements identified for the PSI planning decision process:

Forecast Reconciliation

The Demand Management Frame 130 supplies the Forecast Data 146 (bottom-up and top-down forecasts). The PSI Reconciliation Activity 170 in concert with the SFP Module 132 revises the top-down forecasts and reconciles the bottom-up and top-down forecasts. This is an iterative process which is shown as the "S" loop (in the top right quadrant) in the process flow diagram. If any changes to the bottom-up forecasts are warranted, the PSI Planning Frame 160 interacts with the Demand Management Frame 130 to make the necessary changes.

Inventory Planning

The PSI Reconciliation activity 170 in concert with the FGIM Module 164 determines the inventory requirements in an iterative fashion. This is shown as the "I" loop (in the top left quadrant) in the process flow diagram. The inventory requirements are written to Inventory Data 182. The FGIM Module 164 as part of the PSI Planning Frame 160 also formulates the finished goods inventory policies; the policy parameters are written to Inventory Parameters 172.

Supply Requirement Planning

The PSI Reconciliation Activity 170 in concert with the APP Module 160 determines the production requirements that are consistent with the sales plan and the inventory requirements in an iterative fashion. This is shown as the "P" loop (in the bottom right quadrant) in the process flow diagram. The production requirements are written to Production Requirements Data 174. The APP Module 160 as part of the PSI Planning Frame 160 also checks aggregate production capacity and key component availability using Production Capacity Data 180 and Inventory Data 182 (component availability).

Production-Sales-Inventory-Plan Coordination

The PSI Reconciliation Activity 170 interacts with the APP Module 160, the SFP Module 132, and the FGIM Module 164 to coordinate the integrated production-sales-inventory planning. This involves the evaluation of various plan options, checking the consistency of the constituent plans and resolving conflicts, if needed.

Data Flow

Figure 17:
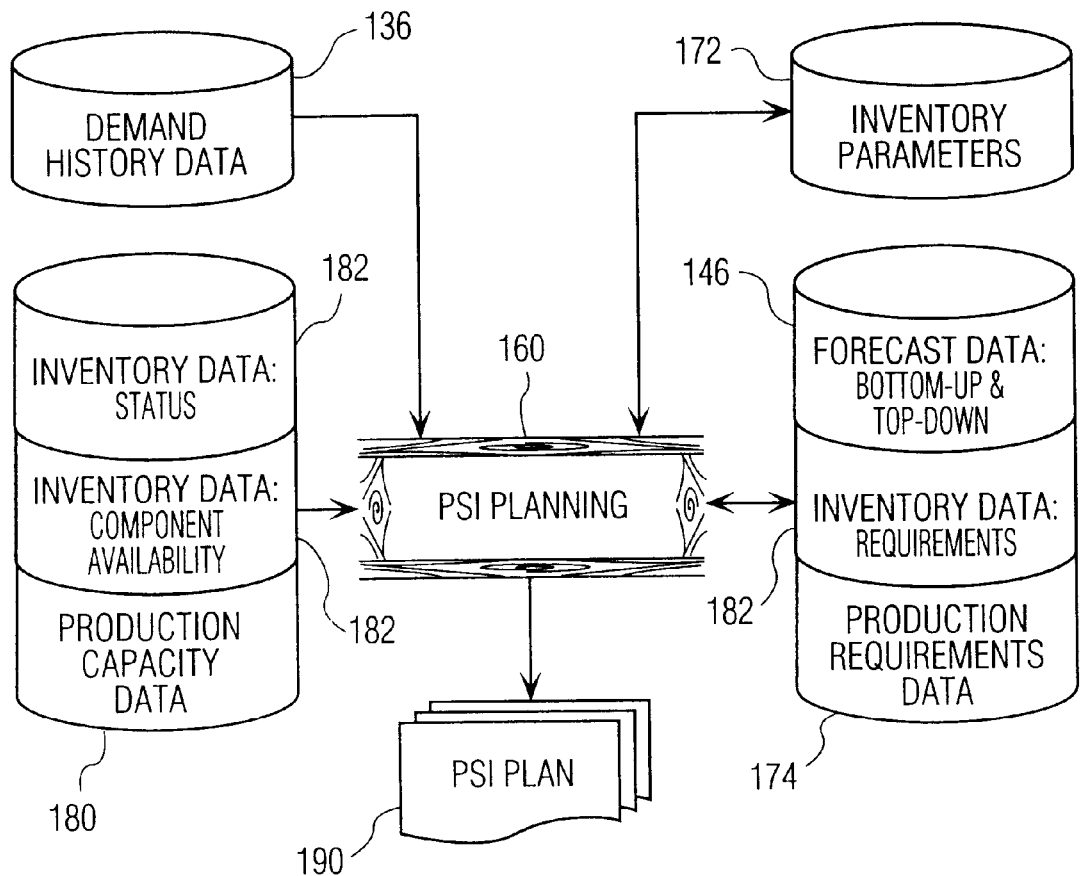
FIG. 17 Data Flow for the Production-Sales-Inventory Planning Frame.

The data flow diagram for the PSI Planning Frame 160 is shown in FIG. 17. The PSI Planning Frame 160 generates the Production-Sales-Inventory Plan report 190 listed earlier.

The Production-Sales-Inventory (PSI) Planning is a process to reconcile demand and supply requirements in a supply chain. In the manufacturing environment, the PSI Planning Frame 160 helps to reconcile production, sales and inventory requirement discrepancies. In the repair environment, the requirements-supply reconciliation helps to reconcile requirements and supply.

Manufacturing Supply Chain

The PSI Planning Frame 160 supports the process that develops an integrated production-sales-inventory plan for a selected product group. The objective is to ensure that the resulting PSI plan 190 meets customer requirements and satisfies supply capability constraints and the inventory objective of the company. The current PSI plan 190 is displayed together with a temporary PSI plan 190. The temporary PSI plan 190 can be imported from various data sources (including data series from Scenarios 78). The user can then analyze and modify the temporary PSI plan 190 with easy reference to the current PSI plan 190. The user can replace the current PSI plan 190 by the temporary one once the latter has been improved to satisfaction.

The PSI planning process requires the support of three modules: the Sales Forecasting and Planning (SFP) Module 132, the Aggregate Production Planning (APP) Module 162 and the Finished Goods Inventory Management (FGIM) Module 164.

Forecast Reconciliation

The Demand Management Frame 130 supplies the Forecast Data 146 (bottom-up and top-down forecasts) and an indication of the methods used to generate them. The user can use the same methods to generate new forecasts and/or compare the forecasts generated by different methods. The user analyzes and reconciles these forecasts to generate an appropriate set of sales requirements. The PSI Reconciliation 170, with the support of the SFP Module 132, revises forecasts and reconciles top-down and bottom-up forecasts.

Revise Forecasts

The forecast revision process acquires, displays, analyzes and edits the bottom-up or top-down forecast. The user first acquires forecasts generated using different methods from the Demand Management Frame 130. After analyzing these forecasts and comparing the results, the user then selects the most appropriate one to be used. The following features are identified for this process: Acquire and display forecasts; Check forecast errors; Compute and display related statistics of sales; and Select forecasts. Individual descriptions of these four features are as follows.

Acquire and Display Forecasts

This feature consists of the following four steps:

Choose product group: The user specifies the product group of interest.

Choose aggregation level: The user specifies the aggregation level (e.g. month, year) for data display.

Import forecasts: The DSS 10 acquires the bottom-up and top-down forecasts generated in Demand Management Frame 130 for the selected product group from the DSS Database 12.

Display forecasts: The DSS 10 aggregates/disaggregates as appropriate the forecasts to display at the chosen aggregation level.

Check Forecast Errors

The forecast error checking feature supported by the SFP Module 132 computes and displays various n-period-ahead historical errors of the bottom-up and top-down forecast.

Compute and Display Related Statistics of Sales

The sales statistics computation feature supported by the SFP Module 132 computes: mean and variance over a selected time interval, moving average, trend, and/or seasonality factors of any chosen sales line and display result in several forms (graphical, tabular or both).

Select Forecasts

The forecast selection feature interacts with the Demand Management Frame 130 to check bottom-up forecasts from various sources and the result of various top-down forecast methods (e.g. moving average, regression, combinations, etc.) The user then chooses the most appropriate set of bottom-up and top-down forecasts based on their accuracy, statistics and consistence with each other.

Reconcile Top-Down and Bottom-Up Forecasts

The process of top-down and bottom-up reconciliation checks the discrepancy between the two forecasts and if necessary, resolves the conflicts between the two forecasts to generate a more desirable sales forecast. The following features are provided to support this process: Compute the difference between top-down and bottom-up forecasts; Generate weighted average of top-down and bottom-up forecasts; and Manually overwrite temporary sales (S') line (see the screens discussed later herein). Individual descriptions of these three features are as follows.

Compute the difference between top-down and bottom-up forecasts.

The difference between top-down and bottom-up forecasts is computed and displayed to show the discrepancy between the two forecasts.

Generate weighted average of top-down and bottom-up forecasts.

The conflicts between the top-down and bottom-up forecasts can be resolved by using a weighted average of them to generate a new temporary sales forecast in the S' line.

Manually Overwrite Temporary Sales (S') Line

The user manually overwrites the forecast on the S' line to adjust the sales forecast to reflect various considerations of influential factors. For example, adjust sales forecasts to account for unrecorded or anticipated upcoming market changes.

Inventory Planning

The process of Inventory Planning supported by the FGIM Module 164 and the Demand Management Frame 130 determines the finish goods inventory requirements. In inventory planning, the user first selects a product group. To help the user to select an appropriate inventory policy, the DSS 10 computes and displays various sales measures which characterize the sales pattern of the chosen product group. For example, a Min-Max policy might be appropriate for a product group facing steady demand. The DSS 10 then, based on the inventory policy selected by the user and the managerial sales and service targets, determines the policy parameters and inventory level requirements. The user can then modify the policy parameters and inventory level requirements to satisfy various managerial requirements and production resources limitations. The following two features are identified for this functional requirement:

Formulate finished goods inventory policies; and

Determine finished goods inventory requirements.

Formulate Finished Goods Inventory Policies

The formulation of finished goods inventory policies involves the selection of inventory policies for chosen product groups and specifying the corresponding policy parameters. It is broken down into the following features: Choose inventory policies for product groups; Choose policy parameters; and Compute estimated inventory statistics.

Individual descriptions of these three features are as follows.

Choose Inventory Policies for Product Groups

In this feature, the user select inventory policies for product groups based on the patterns of sales the product groups are facing. It involves the following three steps: Choose product group: The user specifies the product group (s) of interest; Acquire the following sales measures from the Demand Management Frame 130: Usage rate—fast, medium or slow moving, Lumpiness—sparseness of significant demands, and Volatility—coefficient of variation; and Select inventory policy: The user chooses among the following an inventory policy for the chosen product group(s) based on the sales information acquired.

For single product group with non-lumpy demands: User-specified base-stock policy, Periodic review cost optimization policy, and Period review model with service level constraints.

For related multiple product groups (e.g. groups sharing the same production resources.) with non-lumpy demands: Leveled Policy, Synchronized Policy, and Optimal Policy.

For single product group with lumpy demand: Maximum n-Period Coverage Policy.

Choose Policy Parameters

The FGIM Module 164 based on the service level constraints and managerial objective (e.g. minimize inventory carrying cost with a stock out probability of at most 5%) determines the policy parameters to be used for the inventory policy chosen by the user. The user can then observe the results of the estimated inventory statistics and adjust the policy parameters as appropriate.

Compute Estimated Inventory Statistics

The estimated inventory statistics calculation feature supported by the FGIM Module 164 computes and displays the following inventory related measurements: average inventory level (as weeks of sales); expected stock-out probability; service level (fill rate); inventory carrying cost; and total cost (including production, inventory holding, stock out penalty and transportation costs) for the chosen inventory policy and policy parameters.

Determine Finished Goods Inventory Requirements

The FGIM Module 164 based on the inventory policy and policy parameters determines the finished goods inventory requirements for the product groups. The user can then modifies the inventory level requirements as appropriate. The following features are identified for determining the finished goods inventory requirements: Compute and display inventory level at chosen aggregation level; Manually override inventory levels; and Compute and display inventory level at chosen aggregation level.

The PSI Planning Frame 160 supported by the FGIM Module 164 computes the inventory levels based on the chosen inventory policies and parameters. The result will be displayed in the temporary inventory (I') line. If the computation is done at a lower aggregation level than the chosen one for display, the corresponding appropriate aggregation will be done before display.

Manually Override Inventory Levels

The user can manually overwrite inventory levels to reflect various managerial concerns. For example, the unavailability of production resources at certain periods requires the decrease in corresponding inventory levels or the suggested inventory level exceeds the given management target.

Supply Requirement Planning

The supply requirement planning feature supported by the APP Module 160 help determines the production requirements that are consistent with the sales plan and the inventory requirements. It also checks the feasibility of the production requirements with respect to production capacity and key component availability. In case of infeasibility, the feature will provide information about the cause of corresponding infeasibility to the user. The user can then modifies sales requirements, increases available resources (production capacity or key component availability) and/or prioritizes the sales requirements and restricts attention to satisfy a reduced set of high priority sales requirements only in order to achieve feasibility.

Determine Production Requirements to Sustain Sales

The process of determining production requirements to sustain sales consists of the following two features: Generate production requirements; and Manually overwrite the production requirements. Individual descriptions of these two features are as follows.

Generate Production Requirements

The production requirements generation feature supported by the APP Module 160 determines the production requirements based on sales and inventory requirements. There inventory requirements may take two different forms: Inventory levels, or Safety stocks.

In case of inventory level requirements, the production requirements are generated using the inventory balance formula discussed herein.

In case of safety stock inventory requirements, the user can choose one of the following objectives to determine the production requirements: Minimize the maximum production capacity utilization; Minimize the maximum inventory level; Minimize the total inventory level; and Minimize the total inventory cost (inventory holding and backlog penalty costs required).

The production requirements generated are displayed in the temporary production (P') line. If result of sanity check is at a lower aggregation level than the one chosen for display, aggregation will be done before display.

Manually Overwrite the Production Requirements

The production requirements are modified to reflect various considerations. For example, insufficient production resources during certain periods.

Check Aggregate Production Capacity & Key Component Availability

In the process of checking the feasibility of sales, inventory and production requirements against the availability of production capacity and key components, the following features are identified: Define key components; Check sanity of a given set of sales requirements (in S' line) and safety stock constraints; Check feasibility of production requirements (in P' line); and Update and display production capacity load and key component availability. Individual descriptions of these four features are as follows.

Define key components.

Each user defines a list of key components, which is recorded and can be modified whenever necessary. The list of all components which are sorted according to their availability/usage ratio is displayed to help the user to define or modify the list of key components.

Check sanity of a given set of sales requirements (in S' line) and safety stock (in I' line) constraints The process of sanity check utilizes the capacity checking model in the APP Module 160 to help determine the production requirements for the given set of the sales requirements and safety stock constraints. Furthermore, the user can scope the capacity checking model appropriately through modification of: Location(s), Products or product groups, Time horizon, Production lines, and Key components.

If the results of the capacity model are infeasible, critical under-capacitated production resources and key components are suggested to the user for further modifications.

Check feasibility of production requirements (in P' line)

This process checks sanity of a given set of production requirements against the production capacity and key component availability. This is also supported by the capacity checking model in the APP Module 160. Similar to the previous sanity check described above, the user chooses the appropriate scope of the capacity checking model and if it turns out to be infeasible, critical under-capacitated production resources and key components are suggested to the user for further modification.

Update and display production capacity load and key component availability

After a few iterations of the sanity checks and capacity requirement adjustment, the user can reach a feasible set of production requirements. The remaining available production capacity and key components are updated and can be displayed if requested. The user can then accept or reject new production requirements based on the availability of production capacity and key components.

Production-Sales-Inventory Plan Coordination

The coordination of the production-sales-inventory plan ensures consistency among the production, sales and inventory plans and helps determine a feasible and appropriate PSI plan 190.

Check and ensure consistency in PSI plan

The user can utilize this feature in either: the independent mode or the consistent mode.

In the former mode, the user can edit the production, sales and inventory requirements separately by disregarding any consistency requirement. In the latter mode, the DSS 10 always ensures the consistency of the production, sales and inventory requirements. In the consistent mode, the following features are identified: Modify the plan according to the user defined sequence; Maintain the consistency in other lines due to the change of one line; Update the production (P), sales (S) and inventory (I) lines (see display figures discussed herein) by their corresponding temporary lines; Maintain consistency at different aggregation level (for either the consistent or independent modes only). Individual descriptions of these features are as follows.

Modify the plan according to the user defined sequence

When the user first switches to the consistent mode, two of the temporary production, sales and inventory lines have to be selected to generate the third line using the inventory balance formula discussed herein.

Maintain the consistency in other lines due to the change of one line

Whenever a temporary production, sales or inventory line is overwritten, it will be modified together with one of the remaining two lines (pre-selected and can be re-selected anytime by the user) to maintain consistency.

Update the production (P), sales (S) and inventory (I) lines by their corresponding temporary lines The user can replace the set of P, S and I display lines (see display discussion herein) by a set of consistent P', S' and I' lines. The P, S and I lines can always be saved as a scenario. Only user with the appropriate system privilege can save the P, S and I lines to the DSS Database 12 permanently.

Maintain consistency at different aggregation level

The DSS 10 can display data at any resolution higher than the primary data resolution level. Whenever display at a higher resolution is modified, disaggregation will be done to maintain consistency. The DSS 10 computes a set of default disaggregation logic based on existing lowest resolution data. The user can overwrite the disaggregation logic whenever appropriate.

Evaluate PSI plan options

The PSI plan options evaluation feature computes and displays the performance metrics for various versions of the PSI plan 190 for the user to compare and choose a desirable one. The following two features are identified to support this feature: Compute relevant performance metrics; and Compare different plans. Individual descriptions of these two features are as follows.

Compute relevant performance metrics

The following performance metrics are computed using the routines specified in the SFP 132, FGIM 164 and APP Module 160 to assist the user to select a more desirable version of the PSI plan 190: Total and breakdown of costs, Average inventory level, Average expected stock-outs, Expected Throughput Time, and Expected Service level.

Compare different plans

Different PSI plans 190 over the same or different time periods together with their corresponding performance metrics are displayed side by side for comparison purposes.

Repair Environment

In the Repair Environment the term "Requirements-Supply Reconciliation" is used in place of Production-Sales-Inventory planning. This reflects the fact that there is no production nor sales in a repair environment but "repair requirements" and "repair supply" in the form of repair workstation capacity and component availability. "Requirements-Supply Reconciliation" Planning is a reconciliation process that develops an integrated and feasible plan.

The Requirements-Supply Reconciliation comprises of two main processes: Estimation of the aggregate repair requirements based on the inventory position of serviceable parts at the repair location and the target level for this inventory; and Feasibility assessment for the aggregate repair requirements under resource capacity (skills and workstations) and component availability constraints. To support these processes the following functional requirements have been defined.

Evaluate and propose Consolidated Serviceable Inventory (CSI) Levels based on past usage and future usage requirements.

The following operations are performed: Refine variability and lumpiness estimates of usage; Refine repair lead time estimates; and Propose target CSI levels.

Determine Aggregate Repair Requirements

This includes using target CSI levels, and current inventory positions to determine aggregate repair requirements.

Generate Aggregate Repair Plan

This includes the following: Verify repair resource capacities to satisfy aggregate repair requirements based on; repair personnel skill sets; workstations features; Verify key component availability to satisfy aggregate repair requirements; and Generate aggregate repair plan under capacity and component constraints.

Supply Management

The Supply Management Frame 200 supports the Supply Management decision process.

Module and Data Space Association

Figure 18:
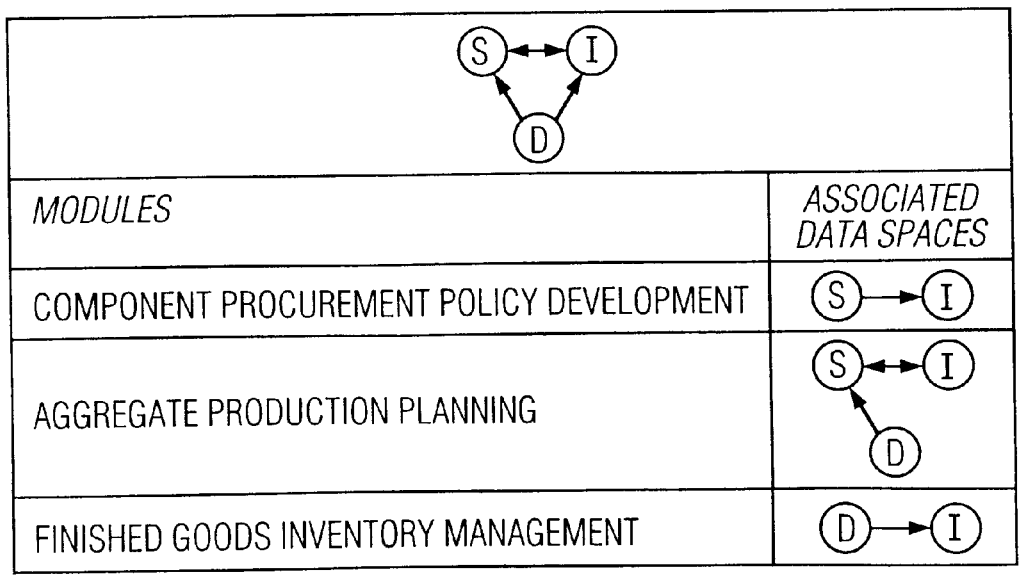
FIG. 18 Data Space Associations of the Supply Management Frame.

FIG. 18 shows the participating modules and the associated data spaces for this Frame 200.

Process Flow

Figure 19:
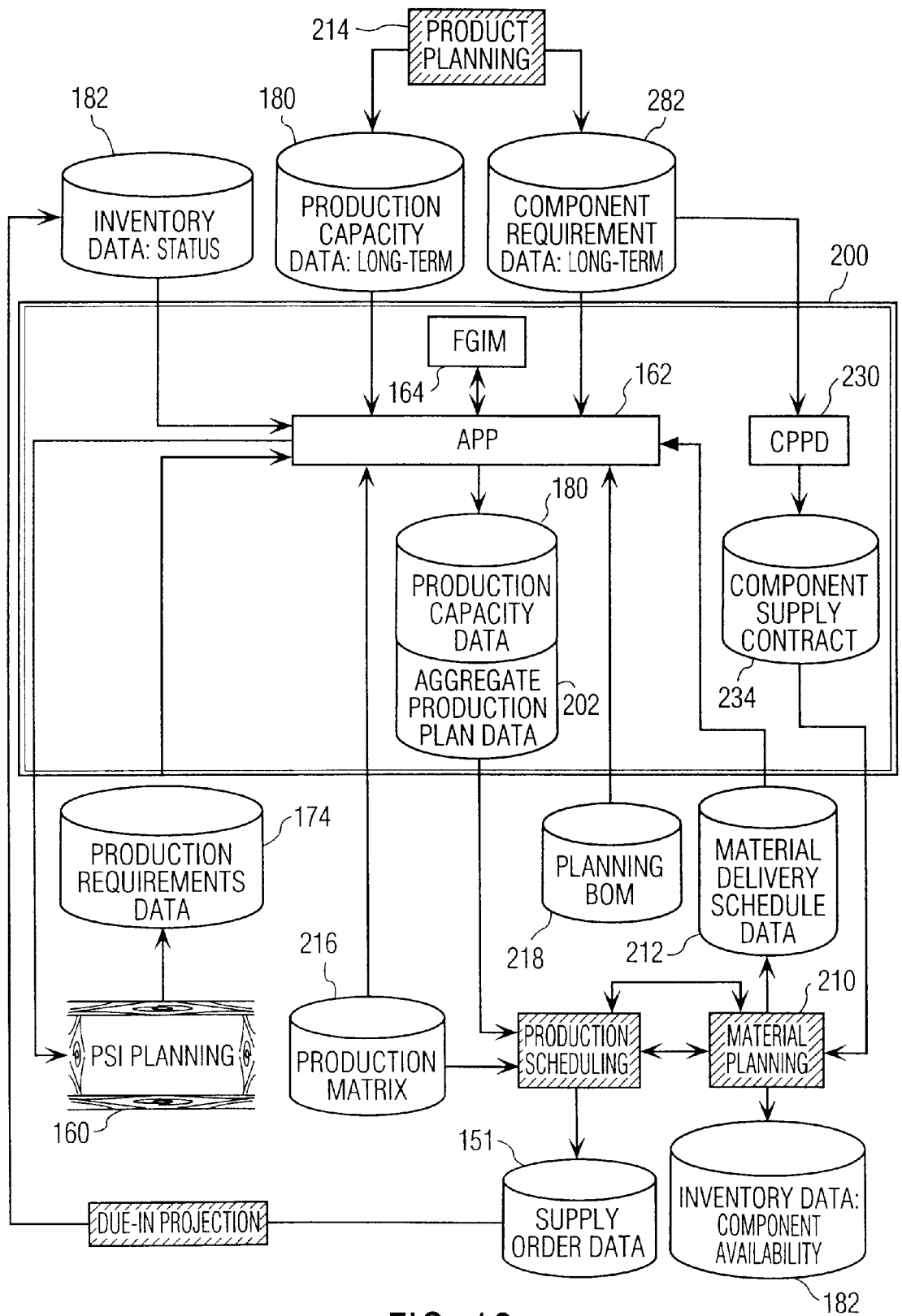
FIG. 19 Process Flow of the Supply Management Frame.

The process flow diagram for the supply planning frame 200 is shown in FIG. 19. The Supply Management Frame 200 supports the following functional requirements identified for the Supply Management decision process:

Aggregate Production Planning

The APP Module 160 works closely with the FGIM Module 164 and uses Inventory Data 182 and the Production Capacity Data 180 to evaluate production and inventory trade-offs. The APP Module 160 also uses the Production Requirements Data 174 from the PSI Planning Frame 160 to generate aggregate production plans. These are written to the Aggregate Production Plan Data 202.

Dynamic Replanning

The aggregate production plan is often modified by the APP Module 160 to reflect either changing production requirements provided by the PSI Planning Frame 160 through the Production Requirements Data 174 or changing component availability from the Material Planning activity 210 through Material Delivery Schedule 212.

Capacity Planning

The APP Module 160 utilizes long-term Production Capacity Data 180 from the Product Planning activity 214, the production parameters such as process times from Production Matrix 216, and the planning bill-of-material for the product from Planning BOM 218 to determine the production capacity requirements. In so doing, the APP Module 160 may evaluate a number of production capacity options such as various production line structures and allocation of resources. The capacity plan is written to Production Capacity Data 180.

Component Procurement Policy Development

The Component Procurement Policy Development (CPPD) Module 230 reviews the long-term component requirements in Component Requirement Data 232 and other relevant component supply information to formulate component procurement policies. The component procurement policy parameters are then written to Component Supply Contract 234.

Data Flow

Figure 20:
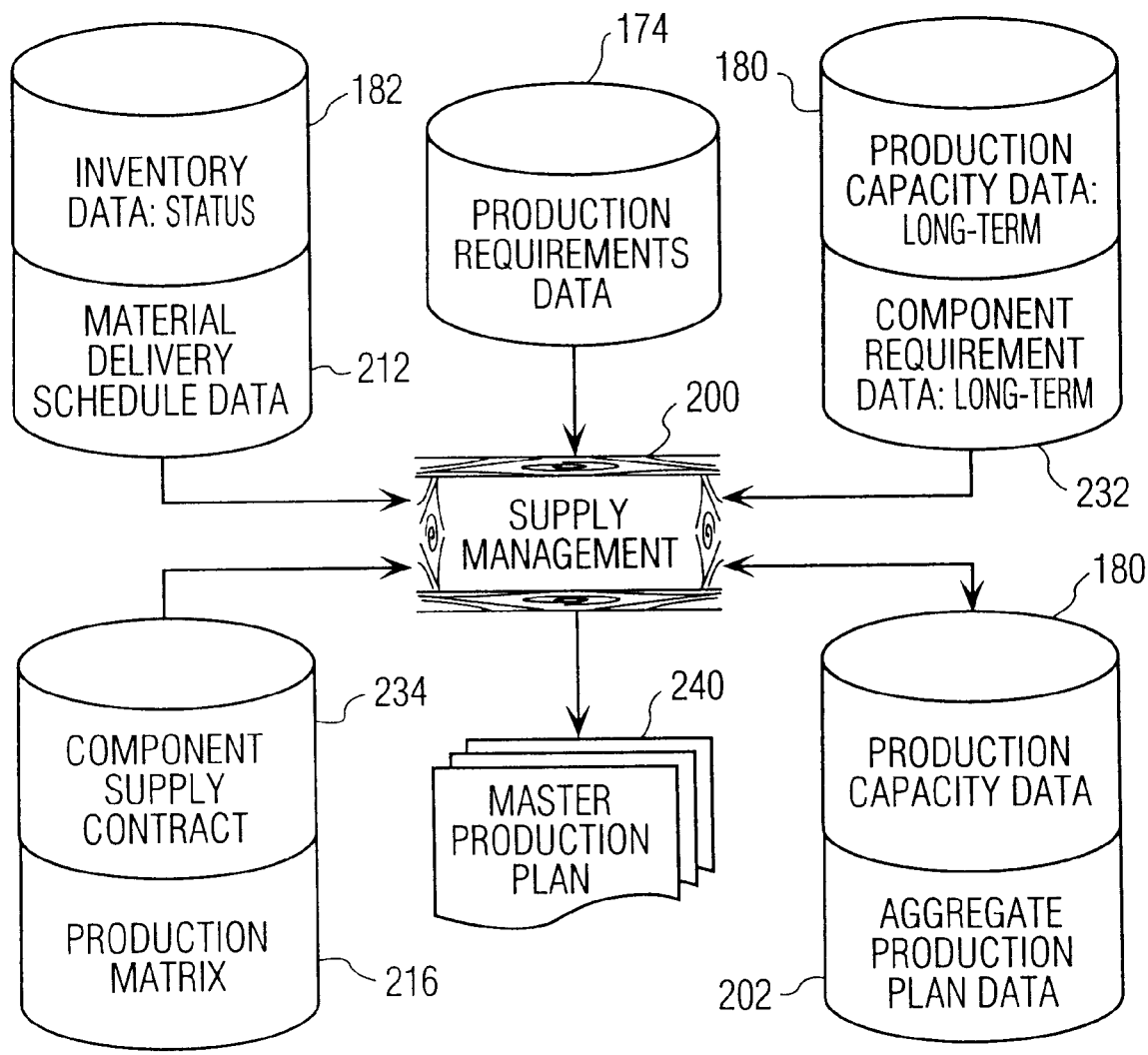
FIG. 20 Data Flow for the Supply Management Frame.
Figure 21:
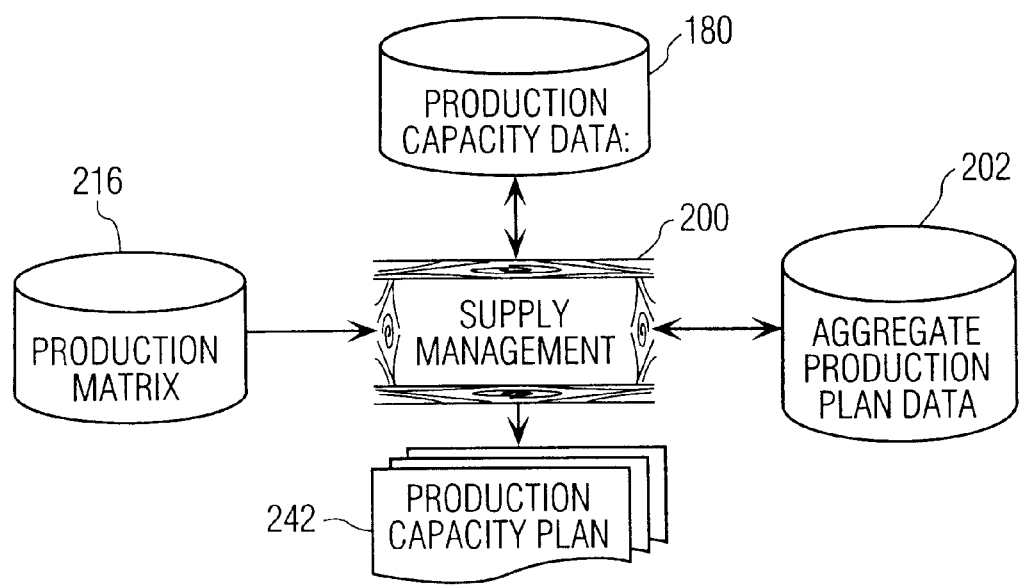
FIG. 21 Data Flow for the Supply Management Frame.

The data flow diagrams for the Supply Management Frame 200 are shown in FIG. 20 and FIG. 21. The Supply Management Frame 200 generates the core report previously discussed, namely, the Master Production Plan 240 and the Production Capacity Plan 242.

Vendor Managed Replenishment Frame

The Vendor Managed Replenishment (VMR) Frame 250 supports the VMR decision process.

Module and Data Space Association

Figure 22:
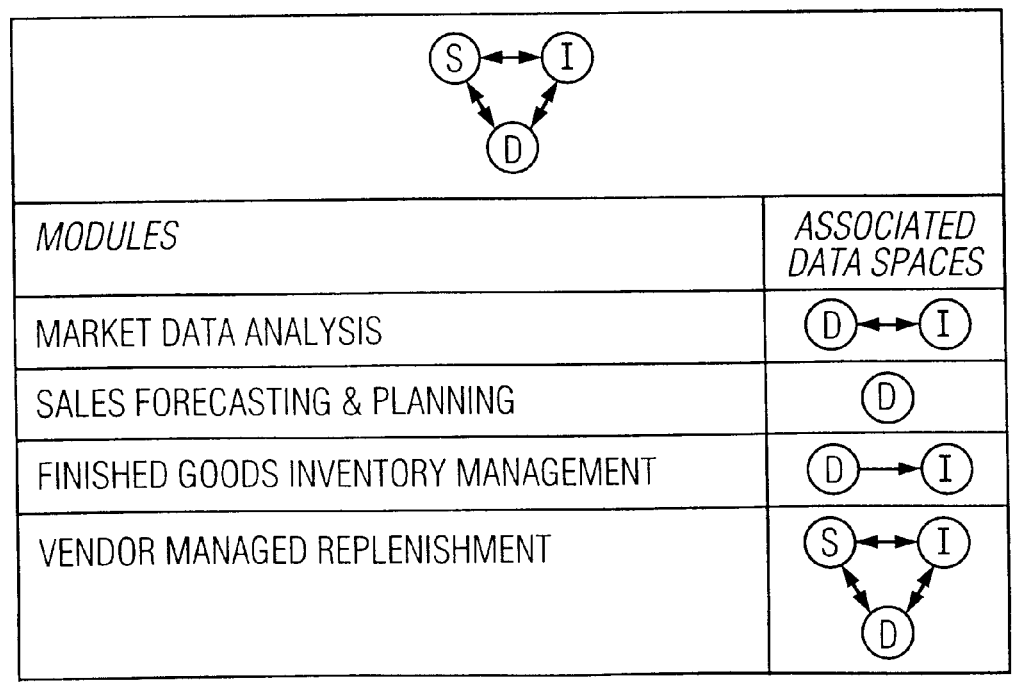
FIG. 22 Data Space Associations of the Vendor Managed Replenishment Frame.

The Data Space associations for Frame 250 are illustrated in FIG. 22.

Process Flow

Figure 23:
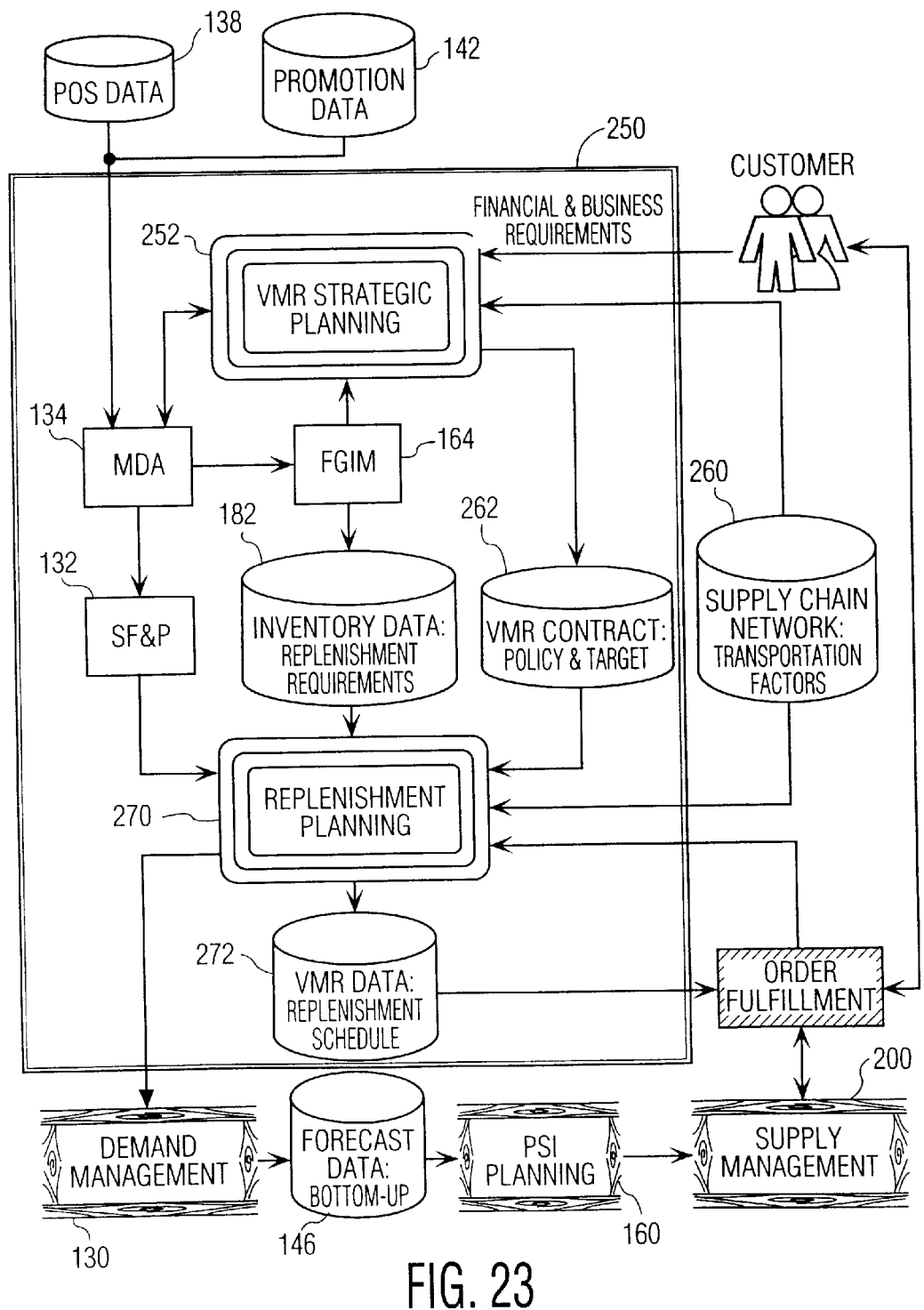
FIG. 23 Process Flow of the Vendor Managed Replenishment Frame.

The process flow diagram for the VMR Frame 250 is shown in FIG. 23. The VMR Frame 250 supports the functional requirements identified for the VMR decision process:

VMR Strategic Planning

The VMR Strategic Planning activity 252 in concert with the MDA Module 134 and the FGIM Module 164 considers the financial and business requirements supplied by the customers, distribution infrastructure, POS history and the transportation factors in the Supply Chain Network data table 260 to evaluate various service contract options. The VMR contract parameters are then written to VMR Contract 262.

Replenishment Planning

The Replenishment Planning activity 270 working with the MDA 134 and the SFP Module 132 reviews the sell-through information and provides input to the FGIM Module 164 to generate the corresponding replenishment requirements. These requirements are refined according to the VMR Contract 262. Based on these inventory requirements, the VMR Contract 262 and the order fulfillment activity, the replenishment schedule is generated and written to VMR Data 272.

Data Flow

Figure 24:
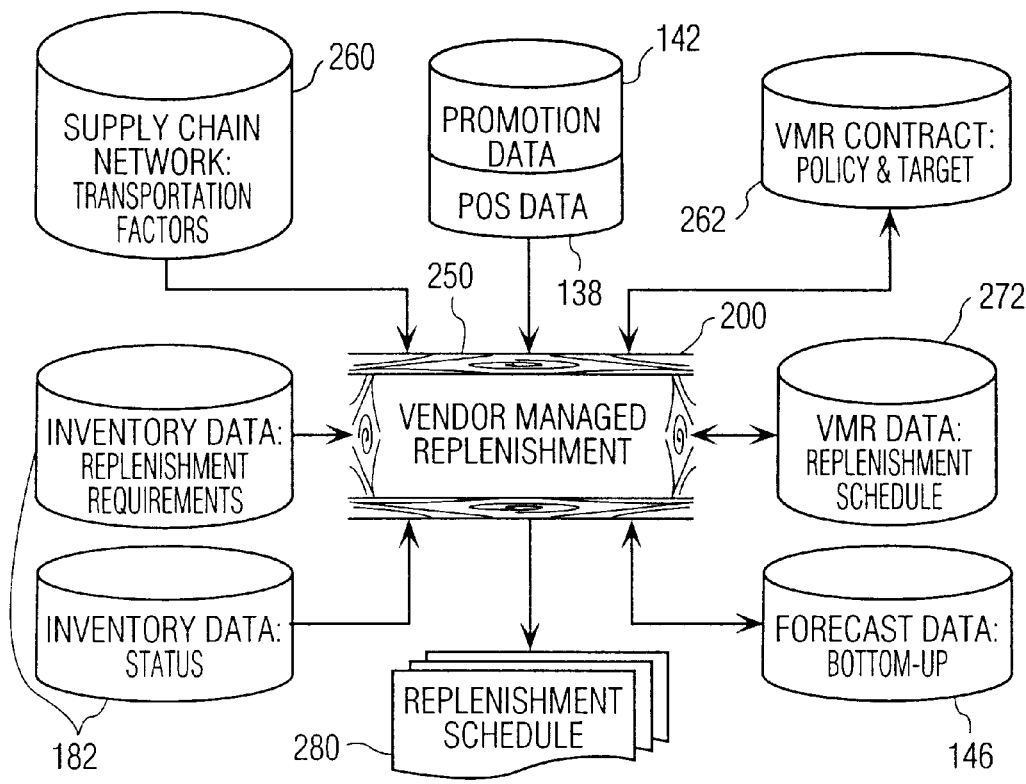
FIG. 24 Data Flow for the Vendor Managed Replenishment Frame.

The data flow diagram for the VMR Frame 250 is shown in FIG. 24. The VMR Frame 250 generates the Replenishment Schedule report 280 listed earlier.

VMR, also referred to as direct replenishment, is a growing agile logistics partnership agreement where the vendor takes on the responsibility of managing the inventory at the customer sites for the products it supplies, i.e., monitoring, planning, and directly replenishing the inventory in the customer's distribution network. In other words, under a VMR arrangement, it is the vendor who determines when stocks are to be replenished and in what quantities, rather than responding passively to orders placed by the retailer. This arrangement is usually typified by a contract which specifies the financial terms, inventory constraints, and performance targets such as service measures. VMR is almost invariably based on the availability of direct access to point-of-sale data and the customer's inventory positions. Such an arrangement can be mutually advantageous to the customer and the supplier.

On the other hand, VMR requires the integration of inventory and transportation planning processes of the supplier and the customer. Although much has been written in the general literature about VMR as a concept (e.g., Wal-Mart's relationships with its suppliers) there are few known quantitative models, if any, to support VMR. Existing VMR systems are transaction oriented and provide little or no decision support capabilities.

The VMR Frame 250 consists of a set of decision support tools that can be used in the development of VMR programs. The features offered by the VMR Frame 250 support the decision making processes in the VMR programs at both strategic and operational levels. More specifically, at the strategic level, the user can invoke the features provided by the Frame 250 to study of the feasibility of VMR programs;

evaluate the terms of VMR contracts; and periodically review the overall performance of the VMR program.

At the operational level, the user can invoke the Frame features to develop sell-through forecasts; obtain suggested replenishment quantities; revise replenishment quantities; and monitor sales and other VMR related statistics.

In this section, we will provide the functional specification for the VMR Frame 250. The entire Frame 250 can be partitioned into three main parts: basic and VMR specific data maintenance, strategic planning and replenishment planning. It supports the following two functional requirements: VMR Strategic Planning: Evaluate financial and logistical tradeoffs in a VMR contract, and Comparative analysis of various service contract options; and Replenishment Planning: Review sell-through and determine inventory requirements at retailer's location, and Formulate the replenishment plan.

The main decision modules to support the VMR Frame 250 include MDA 134, SFP 132, VMR and APP 160. We will discuss the functional specifications that are applicable to the manufacturing environment.

Data Maintenance

To support general functionality of the VMR Frame 250, the system should maintain two types of data: the Basic Structural Data and the Replenishment Data. In the following two sub-sections we discuss the details of these two sets of data.

Basic Structural Data

These include the essential data elements required to describe the basic characteristics of the products, distribution network, etc. This set of data are relatively stable and require only infrequent updates (e.g., at the time when the VMR program is being initialized, or when new models are being added to the program). These include:

Distribution Network: Define the customer as well as the vendor's product distribution networks that are relevant to the VMR program. It identifies which product is being distributed from which vendor warehouse and which customer Distribution Center (or store) are assigned to each warehouse.

Distribution Center (DC) Profile: Define the main attributes of a customer DC or a vendor warehouse including its location (city and state) information.

Lead-times: Define the lead-time for product distribution between a given pair of locations and the corresponding transportation modes.

Transportation Costs: Define the transportation costs for product distribution for given transportation modes.

Product Profile: Define the main attributes of the products participating in the VMR program including their IDs and physical characteristics. It also specifies whether a product is currently in the VMR program.

Product Replacement Relationship: Define the relationship between a current product and its predecessor (being replaced). This provides the basic information to establish a continuous demand stream for a pair of closely related products.

Replenishment Data

Replenishment data are more dynamic, and record the details about the replenishment activities as well as the characteristics of the VMR program itself. These include:

Product and DC Watch List: A set of products and DCs that are defined by the user to be monitored by the system so that any special movements or activities can be detected and reported.

Seasonality Factors: The set of factors calculated by the system or provided by the user to characterize the basic seasonal fluctuation patterns in the sales activities.

Replenishment Orders (Receipts, In-transit, Incomplete, etc.): The detailed order status information that is recorded to capture the replenishment activities included in the program.

Maximum and Average Inventory Levels: The targeted maximum and average inventory levels specified in the VMR contract. They can be used to monitor the current performance of the VMR program.

Service Levels: The targeted customer service levels specified in the VMR contract.

Delivery Frequency: The delivery frequency is defined by the user or the system and it specifies the frequency at which the products are replenished for a particular customer DC.

Promotion Calendar: The calendar captures the relevant promotion activities. This information is then used to ensure that a sufficient additional amount is included in the regular replenishment quantity.

Strategic Planning

Strategic planning features mainly support VMR decisions during the initial program setup; important during VMR contract negotiation stages. They are also useful to provide critical operating parameters, e.g., replenishment frequencies. Finally, they are also needed to conduct long-term performance reviews. Therefore, the functions provided at the strategic level are addressing the issues which are of long-term importance, even though these decisions are not made so frequently.

VMR Contract Setup

During the initial stage of potential engagement in a VMR program, the conditions in the VMR contract are proposed, studied and negotiated. Under such circumstances, the user needs to evaluate the costs and benefits of many different program options. When the terms are conflicting, tradeoffs have to be made. In addition, one also has to choose a set of operating parameters and procedures which optimize total cost measures while satisfying given constraints. The features provided below are to support these decision making problems.

For a product/product group, a customer DC, and a delivery frequency defined by the user, the system will provide the computed relationship between expected service level and maximum (average) inventory level. Such a relationship will also be useful for the user to evaluate what-if Scenarios and can be used in other features in this Frame (e.g., the Replenishment Planning below).

Compute and display expected service level for the maximum inventory requirement defined by the user.

Estimate and display the proper inventory level for a given service level defined by the user.

When evaluating the optimal VMR operating parameters or conditions in the contract, the system can help the user to either check the compatibility of a set of constraints including service level, inventory level and delivery frequency, or select an optimal set of these parameters after the evaluation of all feasible combinations.

To use this feature, the user first needs to choose the product/product group and the DC of interest.

For a given replenishment scenario (a given set of delivery frequency, target inventory level and customer service level), the system will estimate the total cost including customer DC inventory carrying cost, transportation cost and manufacturing plant inventory carrying cost.

Different replenishment Scenarios can be generated based on different values of delivery frequency, target average inventory level and target customer service level. In order to compare these different options without using total projected costs like the one suggested in the feature above, the system will compute key statistics such as expected inventory levels at customer DCs and manufacturing plants. By comparing these statistics, a better replenishment scenario can be identified.

Contract Parameter Monitoring and VMR Program Review

After a VMR program has been setup and the execution started, it requires constant monitoring of the key policy parameters and performance measures. If there are substantial changes, it is critical to report them back to the users. This is because the optimal operating parameters in the VMR program set at the strategic level are obtained under certain assumptions about these key indicators. In addition, periodically, the management will be interested in the actual effectiveness of the VMR program. To support such program reviews, the system will record and generate management reports regarding the actual performance of the VMR program compared to the inventory and customer service level targets set in the VMR contract.

Periodically (which can be defined by the user), the system will compute the mean and standard deviation of the sell-through for a given product of a given customer DC. The resulting numbers can then be compared to the historical norm defined by the user, the quantitative modeling assumptions, or recorded by the system. If the mean and standard deviation are outside of the defined range, then the user has to be informed through a product sales exception report or other similar reports. The user will be asked to define the following: Frequency of such evaluation; Historical norm of the mean and standard deviation; and The ranges of the mean and standard deviation.

One of the key objectives of any VMR program is to reduce the total inventory levels at different parts of the supply chain. The system will compute and record average inventory levels and compare it to maximum and average inventory targets. The results can then be reported to the user as requested.

When the inventory level of a given product/product group at a customer DC is much higher than needed, part of the inventory should be considered as excess. The system will report the list of products whose inventories are in excess. These products then will be off the replenishment product list until the inventory levels return to a normal range. During these periods, the production and many other logistics operations planning will have to be notified about the reduction in planned quantities.

Replenishment Planning

This is to support more operational decision problems on a regular basis after the VMR program has started its execution. During this stage, the main concerns of the user will be shifted to those of a more operational flavor such as the generation and revision of the replenishment order to satisfy target customer service levels and maximum inventory constraints. In addition, in order to ensure the validity of the decision support models and prepare the decision makers for changes in the market place, the system will monitor certain operational indicators relating to the VMR program. The indicators and purpose of this monitoring are distinctively different from the monitoring and review function offered at the strategic level.

Sell-Through and Demand Orientation Forecasts

Before we can start to use the system to generate replenishment orders, a set of sell-through forecasts have to be developed. We will use the models developed in SFP 132 using POS as the primary data source. On the other hand, the production planner at the manufacturing vendor needs to know longer term forecasts to plan for future capacities. To that end, the system allows the user to develop and examine not only the replenishment quantity of the next replenishment cycle but also to extend several periods ahead so that these longer term forecasts can also be estimated and used for other (e.g., manufacturing) planning purposes.

Based on the sell-through data provided by the customer for a given product/product group at a customer DC, the system will generate sell-through forecasts including mean and standard deviation for any given product at a customer DC. The actual forecast algorithm will invoke an appropriate one specified in the SFP Module 132 which should consider trend, and seasonality among other basic aspects of the data stream. In case of a product having too little sell-through history, the system will use the product replacement relationship defined to establish more continuous sell-through history. In addition, the system will also permit the user to select an appropriate length of historical data to account for abnormal sales activities for the product.

The system will also generate longer term replenishment requirements for the demand orientation for a given product so that the user can plan for the longer term demands for the product. To generate medium to long term forecasts, the system will first forecast the sell-through for the specified time periods by invoking appropriate forecasting algorithms in the SFP Module 132. Then, a set of replenishment quantities will be generated using the replenishment algorithm in the VMR module. These replenishment quantities will then become the demand forecasts for the product.

Replenishment Order Generation

The generation of replenishment orders is the main functionality of the replenishment planning of the VMR Frame 250. The main objective of the functionality is to provide the user with an initial set of replenishment quantities for a set of products with the consideration of the sell-through forecasts as well as VMR specific operating parameters. The quantities will then be approved by the user and converted into actual purchase orders.

Based on the forecasts of the future sell-through, user defined VMR operating parameters (e.g., customer service level, maximum inventory level and delivery frequency), and other related indicators (e.g., last reported customer DC inventory level), the system will generate a suggested replenishment quantity for a future replenishment date.

If the product model year changes are regular, then it is necessary to treat the replenishment quantity needed for product (or VMR program) initialization and termination differently from the regular replenishments. Therefore, the above feature has to be modified to be applicable to these settings:

Set Initial Replenishment Quantities: The main difference between the initial replenishment quantity setup and the regular one is that it may require additional quantities to fill customer DCs or stores. In addition, because there is no sell-through history available for these new products, the history for the replaced products will have to be used in the computation. It is also necessary to set a time frame for the computation algorithm to use a new product's data when it accumulates enough data of its own.

Balance-out at the End of a Season: At the end of a selling season, a product needs to be phased out. In such a situation, the system will not generate any further replenishment quantities for the product unless the user decide to overwrite the suggested (zero) quantities for a special reason.

For a given customer DC, when the products are being considered for replenishment, the system will help the user set joint replenishment orders so that the total cost for the replenishment batch can be minimized. The basic logic is to add or delete products included in a replenishment batch to optimally use the transportation means while maintaining satisfactory customer service level and inventory level.

The system will also automate the replenishment quantity generation for a set of products selected by the user. This feature is useful especially when the number of products in the VMR program is relatively large and the user prefers to work only on exceptional issues rather than examining the details of each product's replenishment activities.

Replenishment Order Revision

After the initial replenishment quantity has been generated for each product, the user may be interested in examining the entire or only a selected set of products to make sure that the soft information can be reflected in the actual replenishment orders. In addition, a number of constraints such as product availability and production capacity will also have to be taken into consideration. The objective of the features listed below is to help the user revise the replenishment orders with relevant analysis and search support tools.

The user can define a set of exceptional report generation criteria so that the system can search for and display the products falling into the range. The sample user-defined criteria will include Mean and standard deviation exceeding certain limits of the historical norm The customer DC inventory exceeding the maximum inventory level after the suggested replenishment quantity arrives For a given replenishment quantity (either recommended by the system or input by the user), the system will estimate and display the probability of stock-outs. To compute the probability value, a search algorithm is needed in addition to the relationship between inventory quantity, customer service level and delivery frequency. The user can use the feature to evaluate whether the replenishment quantity suggested is satisfactory or not.

Most of the replenishment quantities discussed here are appropriate for non-promotional sales. When a promotion for a product is planned, the user should be informed so that the final replenishment quantities can incorporate additional quantities due to the promotion. The objective of this feature is to identify promotion events during a given replenishment review period and help the user incorporate additional quantity for the events.

Before the replenishment orders can be finalized, the DSS 10 will make sure that the vendor can supply the required quantities in the specified time frame. If the replenishment order shipment date is close to the review date, then the product (finished goods) availability will be checked; and if the shipment date is further into the future, then the production capacity will be examined.

In order to properly make tradeoffs between different replenishment Scenarios, the system will estimate the total cost (including the inventory and transportation among others) for a given set of replenishment quantities. The cost will be computed automatically as the user is making modifications in the replenishment orders.

To reduce the transportation cost, a rough-cut truckload planning tool will be provided to the user so that the room left on a truck can be filled by other most-needed products for the same customer DC. The underlying logic is to build a truckload of shipment whenever it is possible.

Sales Activity Monitoring and Replenishment Review

The movement of product sales reflected in the sell-through data will have different impacts on the future replenishment activities as well as the methods used to generate recommended replenishment quantities. Therefore, the system will provide the monitoring and tracking capabilities for the user to better manage the sales changes. In addition, the operating parameters specified in the contract will also be monitored so that the user can be reminded whenever the replenishment quantities are likely to exceed the limits in the contract.

The system will compute and maintain the historical norms of mean and standard deviation of sell-through so that they can be compared to the similar quantities in the most recent periods. It is an indicator of substantial sales changes if the recent sales deviate from the user specified ranges of the historical norms.

The system will monitor whether the suggested replenishment quantity is going to exceed the maximum inventory level allowed in the VMR contract. The user will then be notified to take further action.

On a regular basis, the system will record a set of tracking signals and compute forecast errors so that when substantial changes occur, it should be reported back to the user to take further action.

Distribution Network Design

The Distribution Network Design Frame 290 supports the Distribution Network Design.

Module and Data Space Association

Figure 25:
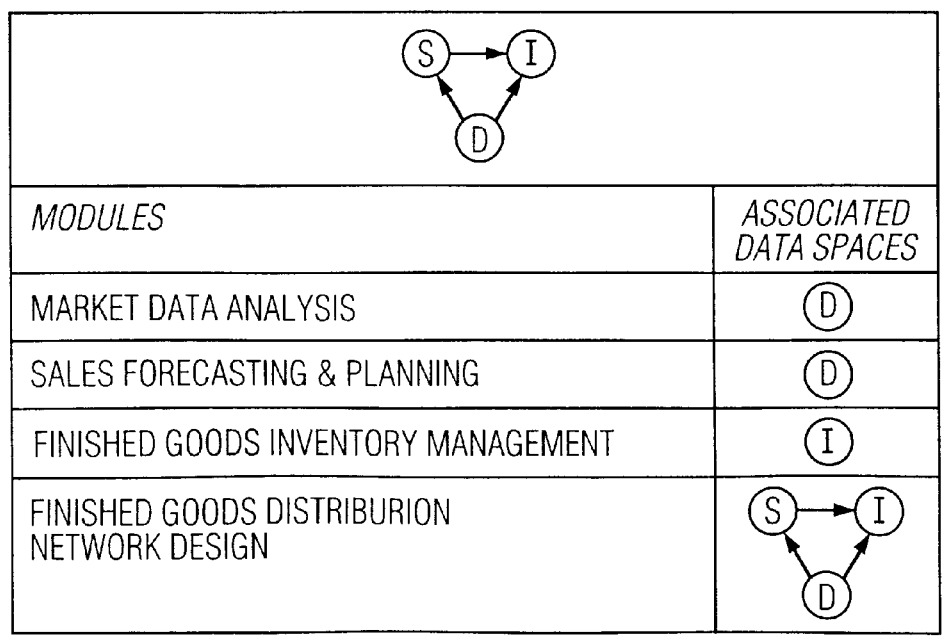
FIG. 25 Data Space Associations of the Distribution Network Design Frame.

FIG. 25 shows the participating modules and the associated data spaces for this frame.

Process Flow

Figure 26:
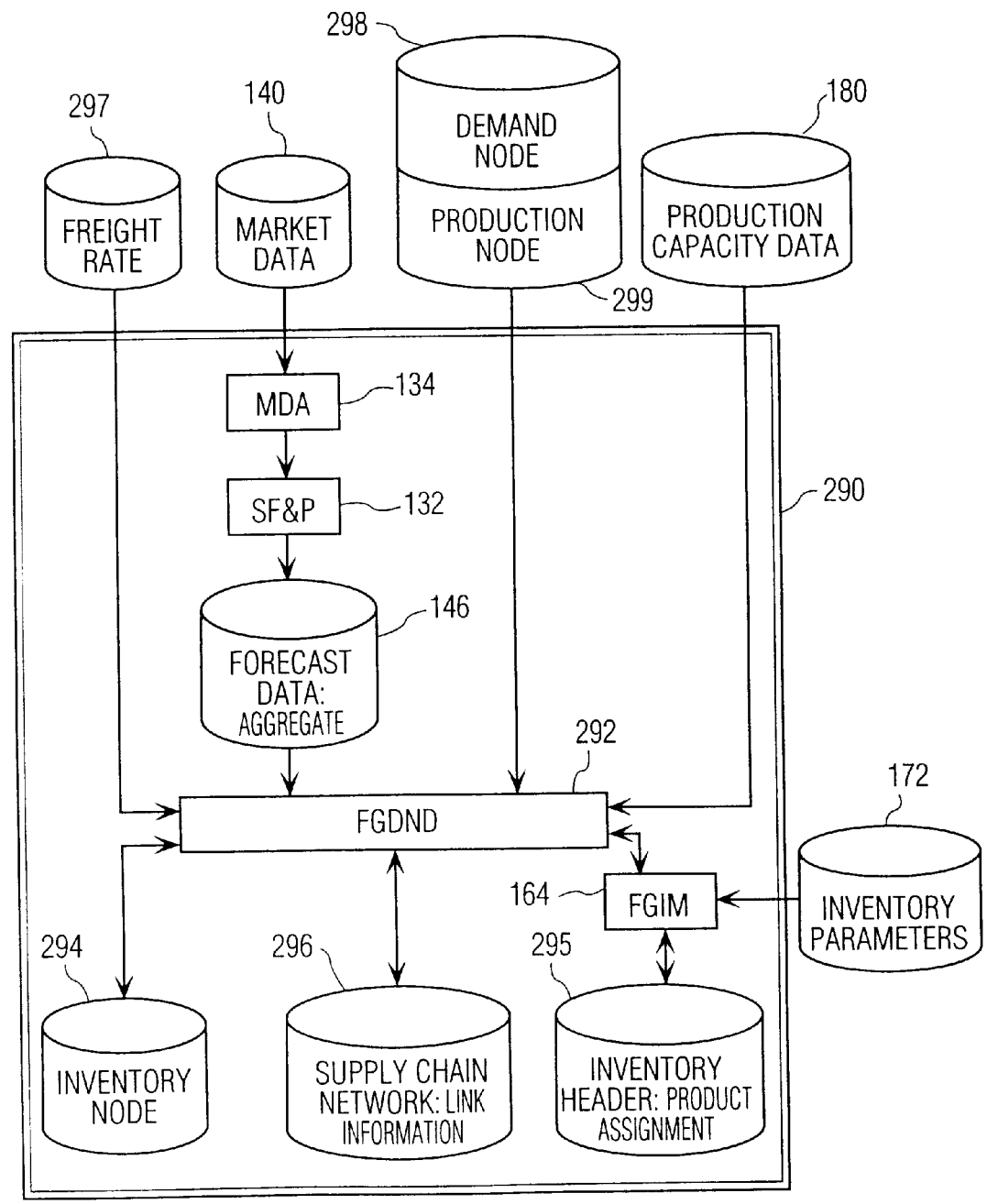
FIG. 26 Process Flow of the Distribution Network Design Frame.

The process flow diagram for the Distribution Network Design Frame 290 is shown in FIG. 26. The Distribution Network Design Frame 290 supports the functional requirements identified for the Distribution Network Design decision process:

1. Distribution Location Analysis

The Finished Goods Network Design (FGDND) Module 292 works with the MDA Module 134 and the SFP Module 132 to develop a forecast of aggregate long-term demand which is then used to evaluate potential Distribution Center (DC) locations. The chosen DC locations are then written to Inventory Node 294.

2. Distribution Network Optimization

The FGDND Module 292 works in concert with the FGIM Module 164 to optimize the overall network configuration. The result of this optimization is the assignment of demand nodes to DCs and the assignment of production nodes to DCs. This information is then written to Supply Chain Network 296.

Data Flow

Figure 27:
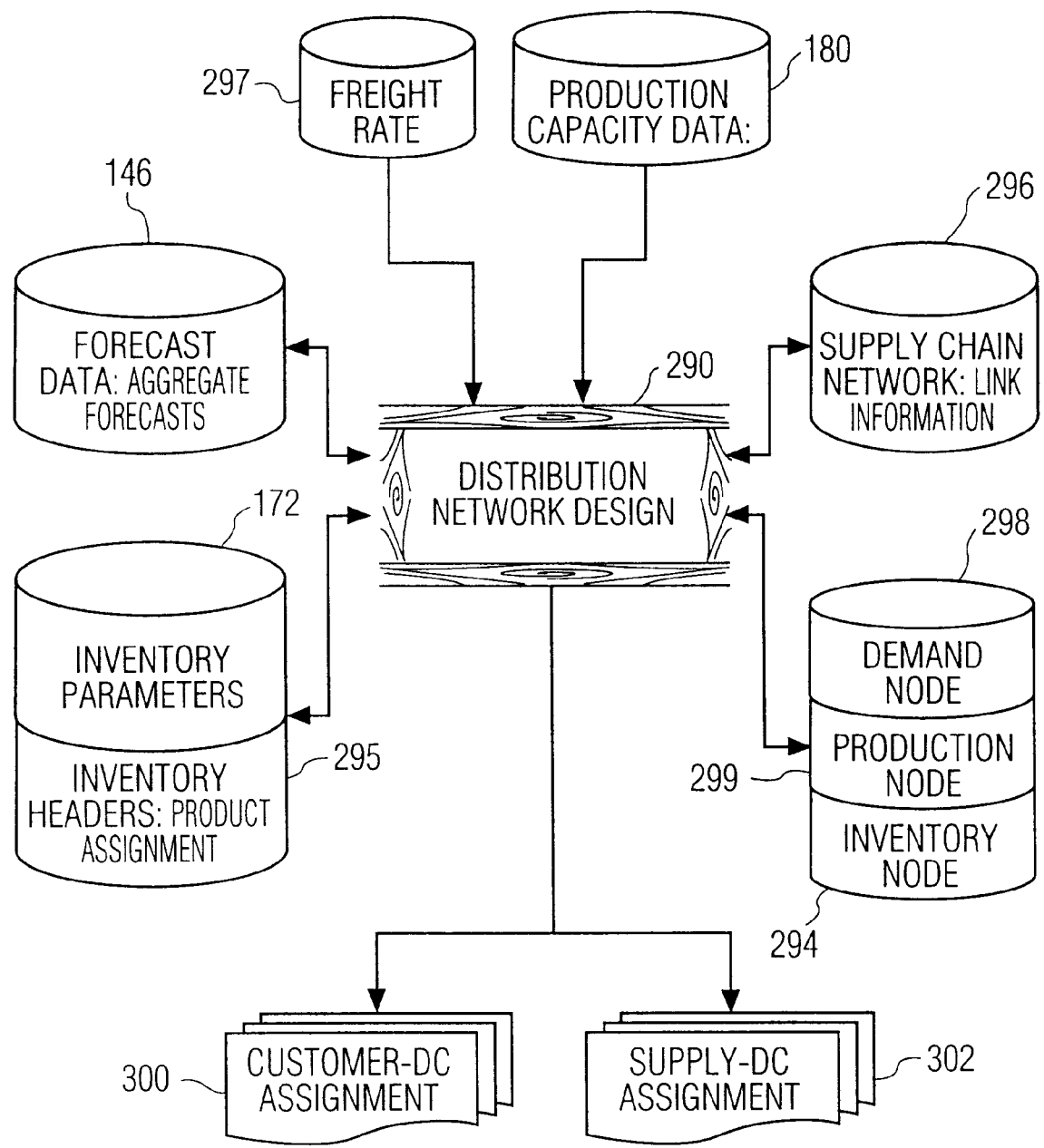
FIG. 27 Data Flow for the Distribution Network Design Frame.

The data flow diagram for the Distribution Network Design Frame 290 is shown in FIG. 27. The Distribution Network Design Frame 290 generates two of the core reports listed earlier, namely, the Customer-DC Assignment 300 and the Supply-DC Assignment 302.

Model Engine and the Modules

In this subsection, the overall design of the Model Engine 20 is introduced. The objective, scope, and features of the seven constituent modules of the Model Engine 20 are discussed.

The Model Engine 20 consists of a library of specialized quantitative models and analysis routines. To address the needs of a set of users, a Decision Support Frame calls and assembles these models and analysis routines with the appropriate data.

Figure 28:
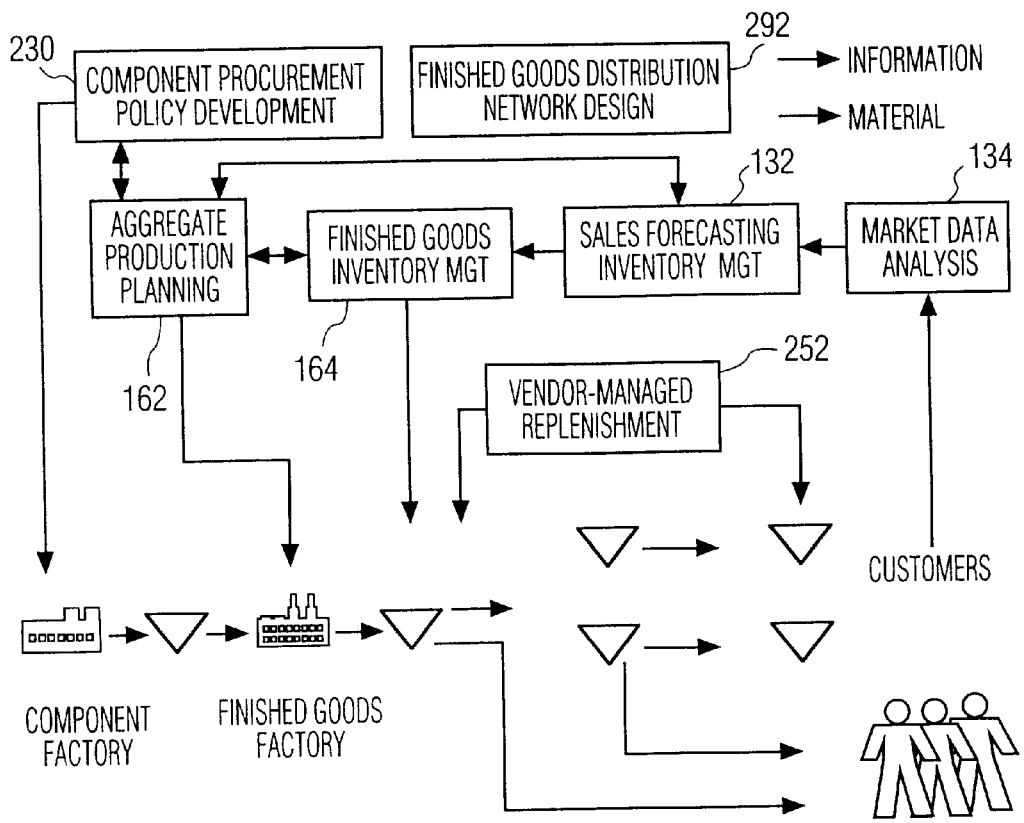
FIG. 28 Seven Modules and Supply Chain Management.

The number of models and analysis routines within the Model Engine 20 could be quite large by virtue of the modular design and inherent complexity of the DSS 10. To better manage the Model Engine 20, there is a need for logically grouping the models and analysis routines. Furthermore, these models and analysis routines support major decision-making areas in a supply chain. Therefore, the models and analysis routines are grouped into seven modules corresponding to the principal decision-making areas in the supply chain as shown in FIG. 28: Market Data Analysis (MDA) 134; Sales Forecasting & Planning (SFP) 132; Vendor Managed Replenishment (VMR) 252; Finished Goods Inventory Management (FGIM) 164; Aggregate Production Planning (APP) 162; Component Procurement & Policy Development (CPPD) 230; Finished Goods Distribution Network Design (FGDND) 292; A frame by virtue of its definition may require the participation of some subset of modules (i.e., the models and analysis routines of these modules will be involved). In the case of the PSI Planning Frame 160, the MDA 134, SFP 132, FGIM 164, and APP 160 Modules will be involved in constituting the decision logic 76.

In many cases, the same models and analysis routines may be employed by distinct frames in different contexts, where the relationships between the models and the associated data linkages vary accordingly. This requires that the Supply Chain Frame Manager 24 interact directly with the models and analysis routines in the Model Engine 20. The models and analysis routines will therefore have standard data and logic input/output (I/O) formats. The standard I/O formats will also facilitate the maintenance of the individual models and analysis routines, e.g., updating and replacement.

In addition to the seven modules defined above, there is also a group of general purpose numerical routines that are not specific to any of the above seven modules. These routines are collected into a design element referred to as the Model Engine Utilities 22, as shown in FIG. 1. Examples of the Model Engine Utilities 22 include generic linear programming solvers, and statistical analysis routines.

Table 7 lists the modules in the DSS architecture for the two supply chains.

TABLE 7

Modules in the Manufacturing and Equipment Repair Supply Chain

| Manufacturing Supply Chain | Equipment Repair Supply Chain |
|---|---|
| Market Data Analysis (MDA) | Market Data Analysis (MDA) |
| Sales Forecasting & Planning (SFP) | Sales Forecasting & Planning (SFP) |
| Finished Goods Inventory Management (FGIM) | Finished Goods Inventory Management (FGIM) |
| Aggregate Production Planning (APP) | Aggregate Production Planning (APP) |
| Component Procurement & Policy Development (CPPD) | Component Procurement & Policy Development (CPPD) |
| Vendor Managed Replenishment (VMR) | |
| Finished Goods Distribution Network Design (FGDND) | |

Market Data Analysis (MDA) 134

The MDA Module 134 contains quantitative models and computational routines that compile and synthesize hybrid sources of market information to support Sales Forecasting & Planning, and VMR. The models and routines of the MDA Module 134 are used in support of Demand Characterization, Bottom-up Forecasting, Top-down Forecasting, Sales Promotion Analysis and Vendor Managed Replenishment. The models and the routines in this module are used to: Analyze relevant industry data from various sources; and Provide quantitative analyses of sales.

Scope and Objective

Objective: Compile and synthesize hybrid sources of market information for the purpose of sales forecasting and planning, and VMR.

Scope: Industry-wide, company specific and point-of-sale data.

Features: Analyze relevant industry data from sources such as Nielsen and EIA (Electronics Industry Association); Develop customer and customer/product profiles; Maintain promotion calendars of major customer and the enterprise; analyze promotional effects; and Provide quantitative analyses of sales at retail outlets whenever point-of-sale data are available.

Demand Characterization

The models and routines in the MDA 134 module to support demand characterization in the commercial setting are equally applicable to support requirements characterization in the defense setting.

For national defense applications, the actual repair item usage data correspond to the POS Data 138 in the commercial setting. Analysis for POS Data 138 can be performed on the repair item usage data to characterize demand for various parts. Furthermore, in order to intuitively access relevant repair item-related data and information, the relationship among different parts has to be established. To that end, we will develop a tree structure to represent the bill of material where each node of the tree corresponds to a repair item, and each arc represents a parent-child relationship. For ease of presentation we employ commercial nomenclature in the following section.

Analysis Routines for Demand Characterization

In the following, we describe three types of analyses that will be performed on industry survey data, Demand History Data 136, and Point-Of-Sales Data 138 to characterize the demand for the products (or services in defense applications). There are other types of analysis that can be performed on these data sets which will be discussed separately when each individual data set is being considered.

Product Family Composition Trend and Percentage

This involves the analysis of the trends in quantity and percentage of each product family over a given period of time of the time series. The input of the analysis routine is the set of time series corresponding to the product families and the associated product family names. The output is the trend of the quantity, and composition percentage for each individual product family. For example, Table 5 below provides the percentage changes for major color television product families (13"–14", 15"–24", 25", 26" and 27" & above televisions) from 1988 to 1994.

TABLE 8

Sample Product Family Composition Change from 1988–1994

| | 13"–14" | 15"–24" | 25" | 26" | 27"+ |
|---|---|---|---|---|---|
| 1988 | 24.76% | 55.87% | 6.05% | 7.14% | 6.18% |
| 1989 | 24.98% | 54.86% | 7.28% | 5.01% | 7.87% |
| 1990 | 22.12% | 54.79% | 8.06% | 4.56% | 10.47% |
| 1991 | 23.08% | 49.53% | 10.53% | 3.90% | 12.96% |
| 1992 | 20.62% | 48.18% | 13.29% | 3.40% | 14.51% |

TABLE 8-continued

Sample Product Family Composition Change from 1988–1994

|      | 13"–14" | 15"–24" | 25"    | 26"   | 27"+   |
|------|---------|---------|--------|-------|--------|
| 1993 | 19.13%  | 45.12%  | 15.87% | 2.10% | 17.78% |
| 1994 | 18.57%  | 41.58%  | 17.58% | 1.55% | 20.71% |

Pareto Analysis of Sales

Figure 29:
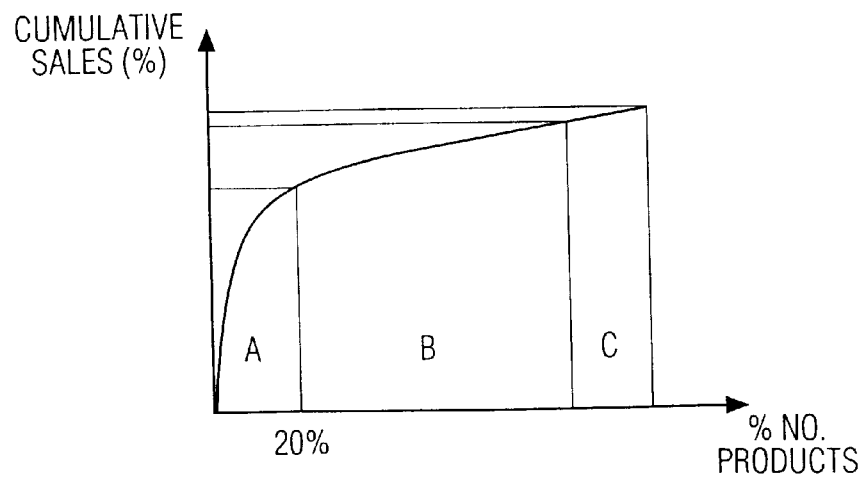
FIG. 29 Pareto Analysis for ABC Classification.

The analysis involves the plotting of the percentage cumulative sales levels vs. the percentage of total number of products to determine the ABC classification of each product as illustrated in FIG. 29.

Objective

To identify the products or customer that contribute the most to the overall sales or production volume. To establish the ABC classification of products (or customers).

Input

POS Data 138, Shipment or production data.

Output

Plot of the cumulative percentage sales (or production) levels vs. the percentage of total number of products or customer generating this sales (see FIG. 29)

Algorithmic Steps

Rank products or (customers) in decreasing order of sales.
Starting from the top of the list compute:
cumulative sales
cumulative number of product (or customers)
Plot percentage of cumulative sales as a function of percentage of total number of products (or customers).

Figure 30:
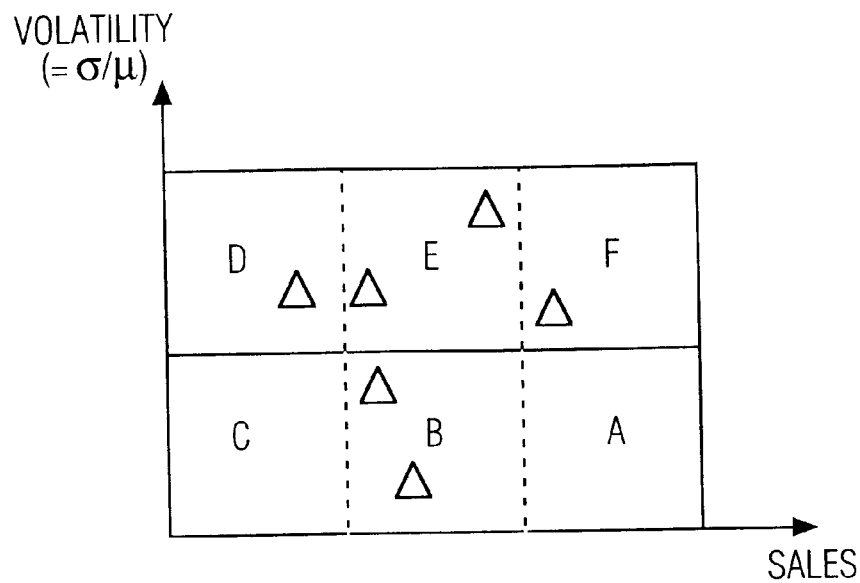
FIG. 30 Scatter Plot for Sales-Volatility Classification.

In addition, another scatter plot can be drawn to show the volatility vs. sales (where measure of the volatility is the coefficient of variation) as shown in FIG. 30. Each point in the second plot corresponds to a product (or product family), and the result of these two plots can be used to develop differentiated inventory control policies for products with different demand patterns.

Correlation Analysis Among Product Families

This involves the analysis of the correlation among the time series corresponding to different product families. The input of the analysis routine is the set of time series corresponding to the product families and the associated product family names. The output is the correlation coefficient for related product families.

Industry Survey (EIA) Data

Electronics Industry Association (EIA) collects manufacturer to retailer Demand History Data 136 monthly from all major consumer electronics manufacturers. After consolidation by EIA, the data are sent back to the manufacturers for their own usage in analyzing industry wide sell-in activities. The data may be obscured by temporary stocking and other short-term dealings between individual manufacturers and retailers, and they are usually a few months late. Therefore, the data are normally not suitable for short term demand characterization and forecasting. However, for longer term, the data are useful in revealing trends and changes in the sales of overall and individual product families. The three types of analyses described herein can be performed on the EIA data to monitor the long-term demand level and composition changes.

Demand History Data

Not all retailers are capable of collecting and providing the POS Data 138 to their manufacturer suppliers. For this reason, more traditional Demand History Data 136 should be analyzed to characterize the demand for the manufacturer's products. We realize that the demand data are a reflection of the customer demand but they can be altered by a number of factors. For instance, meeting the quarter-end sales target or taking advantage of temporary sales promotion deals may make true consumer demand for the products less apparent. Nevertheless, the Demand History Data 136 are an important source of demand information that can complement the short term demand information from the analysis of POS Data 138 and the long term demand information obtained from EIA data. In general, Demand History Data 136 are more suitable to analyze the medium term sales level and trend information. The three analysis routines described herein can be applied to the Demand History Data 136 to derive the medium term sales level and trend change information.

Point-of-Sales (POS) Data

Major retailers are now collecting the sales transaction data from the scanners at the sales counter and sending the data to their manufacturer suppliers after summarization. The data directly reflect the consumer demand for the manufacturer's products and response to sales promotions. They can serve as signals to the changes in sales trend and consumer reactions to marketing efforts. In essence, the POS Data 138 can be used to detect short term sales levels and their changes for the manufacturer's products at various retailing outlets. The three types of analyses described herein can be performed on the POS Data 138 to monitor the short term demand levels and their ongoing changes.

The inventory status represented in the POS should be verified in order to be used to assess the supply chain finished goods inventory situation. Shipment quantities from the manufacturer to the retailer are determined by consumer demand, and retailer's inventory carrying policies, among other influential factors while the POS Data 138 are much more direct in reflecting the true consumer demand. The following three analysis routines will be applied to POS Data 138 in addition to the three general ones mentioned herein.

Inventory Status Verification

To verify the inventory status, the POS Data 138 can be used in combination with the shipment data, and the inventory balance equation to compute the deduced inventory status. Then, the deduced inventory status can be compared to the reported inventory status.

Inventory Profile

The inventory profile corresponds usually to the management decision of an organization, and can be used to judge the over- and under-stocking situation along the supply chain. The normal inventory profile for each product and customer combination will be captured and stored so that it can be later retrieved and compared to the current and future (projected) inventory profiles to determine the possible over- and under-stocking situations.

Detection of the Changes in POS Data

The normal sales levels and associated variance intervals can be either calculated from the POS Data 138 for a given product by a customer, or specified by a user who is knowledgeable about the sales activities for the product. When the sales level fluctuates beyond the normal sales variance intervals, the tool can detect and report the exceptions automatically.

Volatility of Demand

Objective

To measure the volatility of demand. The volatility of demand can be measured by the coefficient of variation of the demand. The coefficient of variation of a random variable is equal to the ratio of the standard deviation to the mean. A large value of the coefficient of variation indicates that the standard deviation is larger than the mean; the demand is therefore very volatile. While a small value of the coefficient of variation indicates a stable demand (low levels of volatility).

Input

POS Data 138 or Shipment data by product (product group) or customer (customer group)

Output

Volatility measure $C_s$.

Algorithmic Steps

Compute mean of demand:

$$\overline{S} = \frac{1}{n} \sum_{t=1}^{n} S_t$$

Compute standard deviation of demand:

$$\sigma_s = \sqrt{\frac{1}{n-1} \sum_{t=1}^{n} (S_t - \overline{S})^2}$$

Compute coefficient of variation:

$$C_s = \frac{\sigma_s}{\overline{S}}$$

Lumpiness of demand

Objective

To measure the level of lumpiness of demand. The lumpiness is a measure of the time dispersion of demand. A demand pattern is said to be lumpy when the demand is concentrated in only a few number of time periods with numerous periods with no demand.

Input

POS Data 138 or Shipment data by product (product group) or customer (customer group)

Output $C_1$ the lumpiness measure.

Algorithmic Steps $C_1$=the percentage of the total number of time periods with demand equal zero.

Demand pattern changes

Objective

To detect rapid changes in level and variability of sales.

Input

POS Data 138 or Shipment data by product (product group) or customer (customer group).

Range for "normal" sales level and variability.

Output

Exception signal indicating a normal change in sales levels.

Algorithmic Steps

Compute normal sales levels and associated variance from the POS Data 138 for a given product by a customer.

Alternatively user sets range for normal sales level and variability.

Compute actual level of sales and variance each period.

When the sales level fluctuates beyond the normal sales variance intervals, detect and report the exceptions.

Demand history trend

Objective

To characterize demand by trend and level parameters. To assess changes in the dynamics of demand based on changes in trend.

Input

POS Data 138 or Shipment data by product (product group) or customer (customer group)

Output

Estimation of trend and level.

Algorithmic Steps

For variable $X_t$ over time period I=0 to n.

Compute trend (b) and level (a) parameters:

$$b = n \sum_{i=t-n+1}^{t} (i - t + n) X_i - n \frac{(n+1)}{2}$$

$$a^2 = [\overline{X} - b(n+1)/2] / \left[ n^2(n+1) \frac{(2n+1)}{6} - n^2 \frac{(n+1)^2}{4} \right]$$

TABLE 9

Usage of MDA Models

| MODEL | WHERE USED |
| --- | --- |
| Volatility of demand | Demand Characterization |
| | PSI |
| | VMR |
| Lumpiness of demand | Demand Characterization |
| | PSI |
| | VMR |
| Demand pattern changes | Demand Characterization |
| | Bottom-up Forecast |
| | Top-down Forecast |
| | VMR |
| Demand history trend | Demand Characterization |
| Pareto analysis | Demand Characterization |
| | PSI |

Sales Forecasting and Planning (SFP) 132

The Sales Forecasting and Planning Module 132 contains all the models and routines that are used to generate forecasts. These models and routines are used in the Demand Management Frame 130 for Bottom-up, Top-down forecasting, for the analysis of sales promotions and to estimate forecast accuracy. The SFP Module 132 is also used in the VMR Frame 250.

The models and routines of SFP 132 fall into three categories: generic models common to the manufacturing and repair environments; models specific to the manufacturing environment; and models specific to the repair environment.

Scope and Objective

Objective: Develop top-down and bottom-up sales forecasts.

Scope: Products and selected customers.

Features: Statistical forecast based on historical sales; Statistical forecast based on point-of-sale data if warranted; Customer provided forecast and orientations; and Reconciliation tools to support expert judgment such as exception flags and sanity checks.

Models Common to Manufacturing and Repair Environments

Three types of generic models are common to the manufacturing and repair environments. The first type consists of the various statistical forecasting models that can be used to forecast any time series (demand or consolidated requirement). The second type concerns the estimation of seasonality factors based on the same approach in both the repair and the manufacturing environments. The third type of model relates to forecast accuracy estimation.

Statistical Forecast Models

The objective of the Statistical models is to generate a forecast based on the projection of some historical characteristics of the time series. These models can be applied to any time series in the context of demand characterization, bottom-up, top-down forecasts and VMR.

Below we discuss the following models: Moving average; Linear trend; Exponential smoothing; Holt-Winters model; Winter's method; Regression based forecasting model; and Autoregressive/moving average model (Box Jenkins).

Moving Average

This conventional model is appropriate when the dependent variable is assumed to fluctuate around a constant (stationary) average value, i.e.:

$$X_t = \beta + \epsilon_t, t=1, 2, \ldots$$

where $\beta$ is an unknown constant corresponding to the mean of the series and $\epsilon_t$ is a random error with mean zero and variance $\sigma^2$. Moreover, the model assumes that the variables $\{\epsilon_t\}$ and hence $\{X_t\}$ are independent.

Input

Time series data to be forecasted (for example POS or shipment)

Window n: number of periods to be considered for averaging.

Output

Future forecasts and their variances.

Algorithmic Steps

Compute next period forecast based on the average of the last n periods $$F_{t+1} = \overline{X} = \frac{1}{n} \sum_{i=t-n+1}^{t} X_i$$

Estimate $\hat{\sigma}^2$ for $\sigma^2$:

$$\hat{\sigma}^2 = \frac{1}{n-1} \sum_{i=t-n+1}^{t} (X_i - \overline{X})^2$$

var $(F_{t+1} - X_{t+1}) = \sigma^2(n+1)/n$, estimated by $\hat{\sigma}^2((n+1)/n)$ Linear Trend This conventional model is appropriate when the dependent (forecastable) variable is assumed to fluctuate around a trend line, specified as a linear formulation of time, i.e. $X_t = a + b \cdot t + \epsilon_t$ where $\epsilon_t$ is a random error with mean zero and variance $\sigma^2$. As above, $\{\epsilon_t\}$ and hence $\{X_t\}$ are assumed to be independent. The model may be viewed as a special case of the regression based models below, with "time" as the only explanatory variable.

Input

Time series data to be forecasted (for example POS or shipment) window n.

Output

Future forecasts and their variances.

Algorithmic Steps

Select appropriate time period for trend estimation (the "window" of n periods).

Compute trend and level parameters:

Estimate forecast based on trend projection $$b = n \sum_{i=t-n+1}^{t} (i-t+n) X_i - n \frac{(n+1)}{2}$$

$$a^2 = [\overline{X} - b(n+1)/2] \bigg/ \left[ n^2(n+1)\frac{(2n+1)}{6} - n^2 \frac{(n+1)^2}{4} \right]$$

$$F_{t+1} = a + b(t+1)$$

Estimate variance of forecast $$\hat{\sigma}^2 = \frac{1}{n-1} \sum_{i=t-n+1}^{t} (X_i - \overline{X})^2$$

Exponential Smoothing

This conventional model is appropriate when the dependent variable is assumed to fluctuate around a constant (stationary) average value, i.e.:

$$X_t = \beta + \epsilon_t, t=1, 2, \ldots$$

It puts progressively smaller weights on more remote observations from the past:

$$F_{t+1} = \alpha X_t + \alpha(1-\alpha) X_{t-1} + \alpha(1-\alpha)^2 X_{t-2} + \ldots$$

Input

Time series data to be forecasted (for example POS or shipment)

Smoothing parameter $\alpha$

Output

Future forecasts and their variances.

Algorithmic Steps

Initiate $F_1$ as $D_0$.

$$F_{t+1} = \alpha D_t + (1-\alpha) F_t.$$

Estimate variance of forecast $$\hat{\sigma}^2 = \frac{1}{n-1} \sum_{i=t-n+1}^{t} (X_i - \overline{X})^2$$

Estimate variance of forecast error = Var $(F_{t+1} - X_{t+1}) = (\sigma^2)^2/(2-\alpha)$ Holt-Winters Model This conventional model is also appropriate when the dependent (forecastable) variable is assumed to fluctuate around a linear trend line, i.e. when $X_t$ is specified by:

$$X_t = a + b \cdot t + \epsilon_t$$

with the associated assumptions regarding $\epsilon$. As with exponential smoothing, progressively smaller weights are attributed to more remote observations.

Inputs

Time Series Data to be forecasted (for example POS or shipment).

Smoothing parameters $1 > \alpha \geq \beta > 0$.

Outputs

Future forecasts and their variances.

Algorithmic Steps

Initial $S_o$ and $G_o$, intercept and slope of trend line.
Update recursively $$S_t = \alpha X_t + (1-\alpha)S_{t-1} + G_{t-1}$$

$$G_t = \beta(S_t - S_{t-1}) + (1-\beta)G_{t-1}$$

Set $$F_{t+1} = S_t + G_t$$

$$F_{t+\tau} = S_t + \tau G_t$$

$$F_t = \alpha D_t + \alpha(1+\beta)(1-\alpha)X_{t-1} + \alpha(1-\alpha)(1-\alpha-\alpha\beta)X_{t-2} + \alpha(1-\alpha-\alpha\beta)(1-\alpha)^2 X_{t-3} + \alpha(1-\alpha-\alpha\beta)(1-\alpha)^2 X_{t-4}$$

$$\text{Var}(F_t) = \alpha^2\{\alpha^2 + (1+\beta)^2(1-\alpha)^2 + \alpha(1-\alpha-\alpha\beta)^2(1-\alpha)^2/(2-\alpha)\}$$

Estimate variance of forecast $\sigma^2$ by $$\hat{\sigma}^2 = \frac{1}{t-1}\sum_{i=1}^{t-1}[X_i - G_t i - \overline{X} - 1/2(t+1)G_t]^2$$

Estimate variance of forecast error by:

Var $(F_{t+1} - D_{t+1}) = \sigma^2\{1 + \alpha^2 + (1+\beta)^2(1-\alpha)^2 + (\alpha(1-\alpha-\alpha\beta)^2(1-\alpha)^2)/(2-\alpha)\}$ Winters Method This conventional model is appropriate when the dependent (forecastable) variable is assumed to fluctuate around a linear trend line modulated by seasonality factors, i.e.

$$X_t = (\mu + G_t)c_t + \epsilon_t$$

$\mu$ is the initial deseasonalized level, G the trend or slope component and $c_t$ the multiplicative seasonality factor. Assume that the season consists of N periods, i.e. $c_t = c_{t+N}$ for all t. The seasonality factors are normalized such that:

$$\sum_{t=1}^{N} C_t = N$$

Winters' method uses three smoothing factors, $\alpha, \beta$ and $\gamma$ as follows:
Inputs
  Time Series Data to be forecasted (for example POS- or shipment).
  Season length N.
  Smoothing factors, $\alpha$, $\beta$ and $\gamma$.
Outputs
  Future forecasts and their variances.
Algorithm Steps
  Step 1: (Initialization). Use first two seasons (periods $-2N+1, -2N+2, \ldots, 0$) to initialize values:
    1a: Calculate sample means for two separate seasons of data.

$$V_1 = \frac{1}{N}\sum_{j=-2N+1}^{-N} X_j$$

$$V_2 = \frac{1}{N}\sum_{j=-N+1}^{0} D_j$$

1b: Define $G_0 = (V2-V1)/N$ as the initial slope estimate.
1c: Set $S_0 = V2 + G_0 (N-1)/2$, as an estimate of the value of the series at time $t=0$.
1d: Compute initial estimates of seasonal factors; these are obtained by dividing each of the initial observations by the corresponding point on the line connecting $V_1$ and $V_2$, i.e., compute:

$$C_i = X_i/[(V_i - (N+1)/2 - i)G_0], \ i = -2N+1, \ldots, 0$$

1e: Average seasonal factors as computed for the two seasons $$C_{-N+1} = \frac{C_{-2N+1} + C_{-N+1}}{2}, \ldots, C_0 = \frac{C_{-N} + C_0}{2}$$

1f: Normalize seasonal factors:

$$C_j = C_j / \sum_{i=0}^{-N+1} C_j N, \ -N+1 \leq j \leq 0$$

Step 2: Update recursively:

$$S_t = \alpha(X_t/C_{t-N}) + (1-\alpha)(X_{t-1} + G_{t-1})$$

$$G_t = \beta[S_t - S_{t-1}] + (1-\beta)G_{t-1}$$

$$C_t = \gamma(D_t/S_t) + (1-\gamma)C_{t-N}$$

Step 3: Create forward forecast in period t for period $t+\tau$:

$$F_{t,t+\tau} = (S_t + \tau G_t)C_{t+\tau-N}$$

Regression Based Forecasting Models

In this conventional model, it is assumed that the forecastable variable X is determined by $m(\geq 1)$ exogenously measurable (forecastable) variables $Z^{(1)}, Z^{(2)}, \ldots Z^{(3)}$ as follows:

$$X_t = a + b_1 Z^{(1)}_t + b_2 Z^{(2)}_t + \ldots + b_m Z^{(m)}_t + \epsilon_t$$

where $\{E_t\}$ are independent with mean zero and variance $\sigma^2$.
Inputs
  Time series for $\{X_t\}$ and all explanatory variables $\{Z^{(1)}, Z^{(2)}, \ldots, Z^{(m)}\}$ For example market share, total market value, installed base, GNP, etc.
  Time series data to be forecasted (for example POS or shipment).
Outputs
  Estimates of coefficients $a, b_1, b_2, \ldots, b_m$ as well as $\sigma^2$.
  Forecast for future value of X, on the basis of estimated future values of $Z^{(1)}, Z^{(2)}, \ldots, Z^{(m)}$.
Algorithm Steps
  Use of standard multiple regression method.
  Autoregressive/Moving average model (Box Jenkins)

In this category of models, it is assumed that the forecastable variable $\{X_t\}$ exhibits an autocorrelated structure. The most general model of this type is specified as an ARMA (p,q) model, i.e.

$$X_t = \beta_1 X_{t-1} + \beta_2 X_{t-2} + \ldots \beta_p X_{t-p} + \epsilon_t$$

Where $$\epsilon_t = \gamma_1 \epsilon_{t-1} + \gamma_2 \epsilon_{t-2} + \gamma_q \epsilon_{t-q} + u_t$$

with $\{u_t\}$ independent with mean zero and variance $\sigma^2$.

Inputs
  Time series data to be forecasted (for example POS or shipment).
Outputs
  Identification of optimal values of p and q.
  Estimates of coefficients $\beta_1, \ldots, \beta_p$ and $\gamma_1, \ldots, \gamma_q$ as well as $\sigma^2$.
  Forecast of future value.
Algorithmic Steps
  Standard Box-Jenkins Algorithm and Process with forecasted value computed as follows:

$$F_{t+1} = \hat{\beta}_1 X_{t-1} + \hat{\beta}_2 X_{t-2} + \ldots + \hat{\beta}_p X_{t-p}$$

Seasonality Factors Estimation
Objective
  To estimate for each time bucket (quarter, month, week) its percentage of the yearly volume.
Input
  Historic data by aggregated at the same level as the seasonality
  POS
  Shipment
  Total market volume, etc.
Output
  Seasonality factors for each time bucket.
Algorithmic Steps
  Compute for each time bucket the proportion of the yearly volume it represents.
Forecast Accuracy Models
  To estimate the accuracy of the various types of forecasts. Measures of forecast accuracy are used in various contexts.
  It is a proxy measure for the variance of the forecast when this one cannot directly be computed. Forecast variance is used in several inventory and safety stock calculations.
  Forecast error measures can also be used to identified those products and customers for which demand patterns are particularly unstable and thus require special attention.
Forecast Error Calculation
Objective
  To compute forecast error for the forecast produced n periods ahead.
Input
  Actual Sales
  n periods ahead Sales Forecast (BU, TP, etc.).
Output
  Average Absolute Error as of percentage
  Mean Square Error
  Table of forecast accuracy as function of n
Algorithmic Steps
  Compute the percentage difference between the forecasted and actual sales.
  Compute average absolute error and mean square forecast error.
Exception Report Generation
Objective
  To generate the list of the products or customers for which the forecast error was greater that a predetermined forecast error threshold.
Input
  Average Absolute Error
  Mean Square Error
  Forecast error threshold
Algorithmic Steps
  Rank list in decreasing order of Average Absolute Error or Mean Square Error
Output
  Exception list: ordered list of products for which the forecast error was higher than the threshold
Models Specific to the Manufacturing Environment
  The particular aspects of the manufacturing environment call for specific models in the area of forecasting and planning. In particular a forecast approach that specifically models the ordering pattern of retailers based on their replenishment policy and level of sale to the final consumer is considered. Approaches for the modeling of sales promotions are also proposed.
Expert Based Model for Bottom-Up Forecast
  This discussion describes an algorithm to compute bottom-up forecasts designed so as to result in the best available point estimates of sales as well as a characterization of the degree of uncertainty surrounding these estimates. The system develops forecasts for each account, each model and each time-period. These are subsequently aggregated over all accounts.
  The analysis starts with a characterization of the account's anticipated sales pattern for a given model. Its order to the manufacturer are obtained as derivatives of this sales pattern, assuming that a specific systematic replenishment policy is followed by the account. The prevalence of a systematic replenishment policy (in the absence of capacity problems) is an important assumption but one which we have verified in our analysis of real retailer's behaviorior.
  Previous investigations of point-of-sales data have established that the accounts' sales pattern is much more predictable and regular than the normal order stream. It is therefore appropriate to start the forecasting process with a characterization of the account's sales pattern. Moreover, we envision that the inputs to the system be provided by the retailer in cooperation with or as a result of monthly meetings with account representatives (buyers, logistics managers). The account representatives are clearly more familiar with their sales pattern than the resulting order stream to their supplier; their estimates for future orders are clearly driven by their anticipation of future sales.
  The need to characterize the uncertainty of the manufacturer's model sales stems primarily from the fact that this characterization is to be used as the foundation for inventory planning, i.e. the determination of the so-called I-line or lower bounds for the I-line required to assure customer service levels which are compatible with the manufacturer's Quick Response targets.
  To assess minimum inventory requirements one needs to characterize cumulative sales over time rather than or in addition to sales per month. Extreme care needs to be exercised in aggregating sales over consecutive months since these are highly correlated. Thus, a straightforward convolution of orders in consecutive months would lead to serious underestimates of the variability of cumulative orders and hence to the determination of inappropriately low safety stocks (minimum inventory levels), exposing the manufacturer to undesirable frequent stockouts. These would result in inappropriate customer service, loss of market share and last but not least, a continuation of the vicious cycle preventing the manufacturer from establishing reliable forecasts in the first place.
  Our approach provides an exact characterization of the statistical distribution of cumulative sales based on a given characterization of the underlying sales pattern.

The calculus used to characterize the distributions of account orders and aggregate orders is based on simple but rigorous probability calculus.

The system is intuitive and fully transparent to all users. Below we give a brief outline of the inputs required by the system and the user interfaces which we envision developing to provide the user with various types of background information to facilitate the task of specifying forecast inputs.

The calculus used to derive all order and aggregate order distributions is explained.

Required Inputs; User Interfaces

The user will be responsible for entering forecasts for specific account/model combinations under his/her responsibility. For any given account/model combination, forecasts are to be provided for the next 12 months on a rolling horizon basis. The user will be confronted with a main menu permitting a choice between: (I) whether to provide estimates of the accounts' sales (I1) or orders (I2); and (II) whether to provide estimates of monthly total sales (orders) (II1) or to provide separate estimates (II2) for (a) regular sales activities, and (b) Promotional activities We will strongly encourage LAMs to opt for (1) providing estimates for sales, and (2) providing separate estimates for regular and promotional sales If option (I2) is chosen, the calculations described below will be circumvented and by default orders in consecutive months will be treated as independent. (This may result in important distortions as explained in the introduction but is unavoidable under this option; the user cannot be expected to estimate the intertemporal correlation pattern. It is conceivable that an "average" correlation factor may be inferred from historical orders.)

All accounts managed by the three LAMs whom we have interviewed follow or would like to follow a simple replenishment policy of the following type: (a) the model's inventory position is reviewed periodically (e.g. once a week, once in two weeks, once a month); and (b) at review epochs the account places an order to increase the model's inventory position to a target level of a given number of weeks of future expected demands (e.g. 6 weeks, 8 weeks) unless the current inventory position is already above this target level in which case no order is placed.

The formulae below are based on this type of replenishment policy which is characterized by two parameters only (the review period and the target order-up to level in weeks). This policy structure is easy to use and efficient from more than one point-of-view. However, it will be easy to make appropriate modifications should it become apparent that other types of replenishment policies are used by some accounts.

Inputs $s_t$=sales in period t (random variable)

$v_t = E\, s_t$

W=number of periods of future demands to which the inventory position is to be increased every time an order is placed.

The distribution of $s_t$ is obtained by fitting an appropriate distribution to the three point information provided by the user. We fit a shifted Binomial distribution: Let $S_t^{min}$=minimum sales for period t $S_t^{max}$=maximum sales for period t $S_t^{most}$=most likely sales volume for period t Let $\bar{s}_t = s_t - S_t^{min}$ and assume $\bar{s}_t$ is Binomial (n,p) with $n = S_t^{max} - S_t^{most}$ $$[np+(1-p)]+1 = s_1^{most},$$

e.g. $p = (s^{most}_1 - s_1^{min} - 1)/n$ ([x]~ denotes the largest integer smaller than or equal to x)

Outputs $o_t$=order in period t $$o_t = \sum_{s=1}^{t}$$

$o_s$=cumulative orders in periods 1, . . . , t $IP_t$=inventory position at end of period t after placing an order (=inventory on hand+outstanding orders)

$T_t$=target order-up to level at end of week t $$= \sum_{i=1}^{W} \mu_{t+i}$$

The following recursive relationships hold (assuming backlogging; the equations are easily adjusted for the cost of lost sales)

$$IP_t = IP_{t-1} - s_t + [T_t - IP_{t-1} + s_t]^+ \quad (1)$$

$$o_t = [T_t - IP_{t-1} + s_t]^+ \quad (2)$$

$$0_t = o_{t-1} + [T_t - IP_{t-1} + s_t]^+ \quad (3)$$

We assume here that the $s_t$—variables are independent of each other.

Calculating $IP_t$ and $o_t$—Distributions

The distribution of the $IP_t$—variables can be computed recursively. Observe the $IP_{t-1}$ and $s_t$ are independent of each other.

$$\text{Prob}[IP_t = T_t | IP_{t-1} = 1] = \Pr[s_t \geq 1 - T_t] \quad (4)$$

Hence, $$\text{Prob}[IP_t = T_t] = \sum_{l=T_{t-1}} \text{Prob}[IP_{t-1} = 1] \text{Prob}[s_t \geq 1 - T_t] \quad (5)$$

For $l' > T_t$, $$\text{Prob}[IP_t = l' | IP_{t-1} = l] = \text{Prob}[s_t = l - l']$$

Hence, $\text{Prob}[IP_t = l] =$ $$\sum_{l=\max(T_t-1, l)}^{\infty} \text{Prob}[IP_{t-1a<Tt} = 1] \cdot \text{Prob}[S_t = 1 - 1'] \quad (6)$$

$$\text{Prob}[o_t = 0 | IP_{t-1} = l] = \text{Prob}[s_t \leq l - T_t] \quad (6)$$

$$Prob[o_t = 0] = \sum_{l=T_t}^{T_{max}} Prob[s_t \le 1 - T_t]Prob[IL_{t-1} = 1] \quad (8)$$

Calculating Cumulative Order Distributions The distributions of cumulative orders, i.e. the ($0_t$)—distribution can be computed recursively as well but only by computing the joint distribution of $0_{t-1}$ and $IP_{t-1}$:

Case 1 Let k'>k:

$$Pr[0_t=k' \text{ and } IP_t=T_t|0_{t-1}=k, IP_{t-1}=l]= \quad (9a)$$

$$Pr[s_t=k'-k+l-T_t]$$

$$Pr[0_t=k' \text{ and } IP_t=l'|0_{t-1}=k, IP_{t-1}=l]=0 \quad (9b)$$

for all $l' \ne T_t$

Case 2 k'=k:

$$Pr[0_t = k \text{ and } IP_t = 1' \mid 0_{t-1} = k \text{ and } IP_{t-1} = 1] = \quad (10)$$

$$\begin{cases} Pr[s_t = 1 - 1'] & \text{if } T_t \le 1' \le 1 \\ 0, & \text{otherwise} \end{cases}$$

Thus $$Pr[0_t=k' \text{ and } IP_t=T_t]=Pr[0_{t-1}=k, IP_{t-1}=l]$$

$$Pr[s_t = k' - k + 1 - T_t] + \sum_{l=1'}^{T_{max}} Pr[0_{t-1} = k' \text{ and } IP_{t-1} = 1] \, Pr[s \quad (11)$$

$$Pr[0_t = k' \text{ and } IP_t = 1']$$

$$Pr[0_{t-1}=k' \text{ and } IP_{t-1}=l].$$

$$Pr[s_t=l-l'] \quad (12)$$

Past Promotions Effects Estimation

Objective

To assess the total impact on sales of past promotions.

Promotions perturb the regular pattern of sales and various types of promotional activities influence the sales volumes according to rather different patterns. The objective of the model is therefore to assess the pattern of the impact of the promotion over time.

Inputs

Times series of sales.

Time period of the promotion.

Class of the promotion.

Type of the promotion.

Intensity of the promotion.

Outputs

Overall impact of the promotion

Profile of the impact over time.

Algorithmic Steps

The model is based on the use of time series models. First, an analysis is applied to a "censored" time series of sales volumes, in which all promotion (and after promotion) periods have been eliminated. One of several basic time series models is applied to identify trend factors, seasonality indices and/or auto correlation structures.

These basic time series models include exponential smoothing (weighted) moving averages, Winters' model, Box-Jenkins models. The following Modified Winters' Procedure uses the demand (POS or shipment) data to remove seasonality and trend effects.

Select time series model for estimation of demand for non-promotion periods.

Initial Estimation of Level (including trend) at each Historical Period.

Calculate the moving average of seasons, with each season having period P. If P is an even number, take the average of two consecutive moving averages to let the estimate centered on the time period.

Estimate Seasonal Factors

Divide the actual demand by the centered moving average to obtain the estimate seasonal factor. Dampen the random effects by taking averages for similar periods in different years. Then, normalize the estimate seasonal factors that totals to P. Using the normalized seasonal factors remove the seasonality effects from the demand data.

Estimate Level and Trend Terms

Using the regression equation algorithm specified in the MDA 134 module, find the regression parameters for level and trend coefficients to fit the regression line. Using the regression coefficients remove the trend effects from the demand data.

After an appropriate time series model has been selected for all non-promotion periods, interpolate base-line sales volumes in the promotion periods which would have arisen in the absence of the special promotion activities.

Calculate the ratios of the actual sales volumes during the promotion periods and the calculated "base line" values, for each promotion period separately. This defines the impact curve of the promotion.

Aggregate the impact curves pertaining to different promotion periods of a given type into a single curve using standard curve fitting techniques.

The resulting impact factors for each of the periods belonging to and following after a promotion interval can now be used in future forecasting efforts.

Future Promotion Impact Estimation

Objective

To estimate the impact of a future promotion

Inputs

Time period of the promotion

Class of the promotion

Type of the promotion

Intensity of the promotion

Outputs

Estimated overall impact of the promotion.

Estimated profile of the impact over time.

Algorithmic Steps

Search promotion calendar for past promotions with similar characteristics.

Assess impact of the planned promotion based on computed effect of similar past promotions.

Identify generic profile of promotion impact corresponding to the planned promotion.

Compute estimated profile of the planned promotion by combining estimated total impact and generic profile.

Analyze Promotion Effects

This analysis includes the following three types of promotional activities: price promotions, where the item price is reduced by a given percentage for a limited period of time (e.g. 1–2 weeks); promotions via feature advertisements; and promotions via special store displays.

The characterization of the impact of promotional activities is to be used as the basis of the statistical forecasting procedures in the Forecasting module of our DSS 10. It will also be invoked as guiding information in the bottom-up forecasting procedure.

The sales promotion activities perturb the regular sales pattern in the commercial setting. Correspondingly, special events such as scheduled exercise in the defense application will also significantly change the usage of parts. Therefore, the models developed for analyzing the effects of sales promotions will also be applicable in understanding the effects of the special events in the defense setting. In the following section we employ commercial terminology for ease of explanation, while the models are equally applicable to both the defense and commercial applications.

It is both intuitive and extensively substantiated by several statistical studies in the conventional marketing literature (see e.g., Blattberg and Naslin (1993)) that the various types of promotional activities influence the sales volumes according to rather different patterns. Price promotions typically result in a significant increase in the sales volume during the course of the promotion period. The increase in the sales volume is due to:

a. consumers increasing their normal purchase quantities to take advantage of the temporary price discounts;

b. consumers making a purchase during the promotion period who otherwise would have waited until a future point in time;

c. consumers being enticed into a purchase who otherwise would have opted for a different brand or who otherwise would not be in the market for this item.

Only factor (c) results in a significant long term increase of the sales volume. The first two factors (a) and (b), on the other hand, cause an increase of the sales volume during the promotion period, but the increased volume is partially or completely compensated for by a decline in sales after the promotion period.

Figure 31:
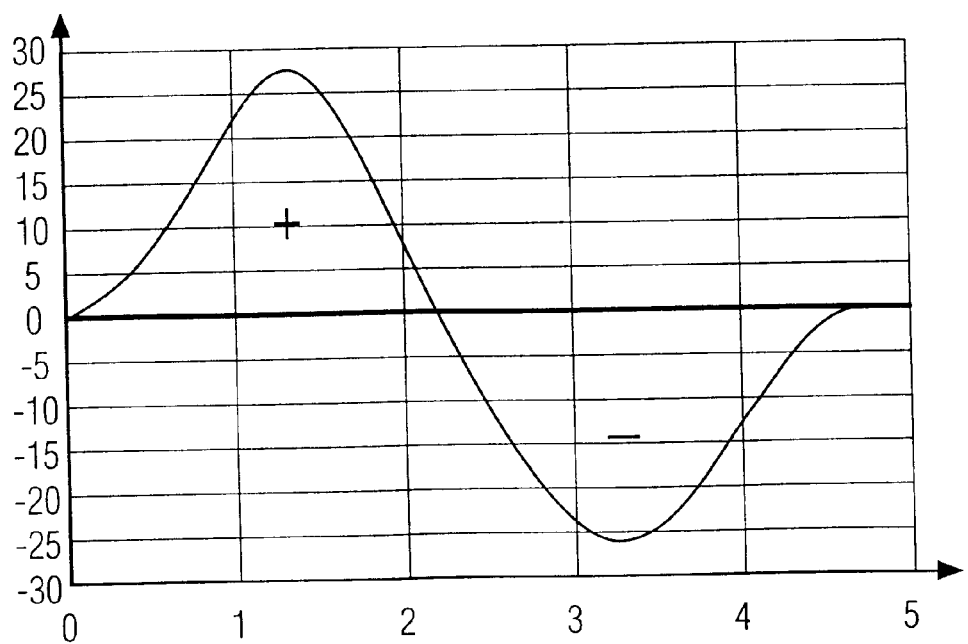
FIG. 31 Impact of Sales Promotion.

FIG. 31 displays a typical pattern for the percentage increases over time, resulting from a price promotion. As mentioned, the percentage increase is positive during the promotion period; the magnitude of the impact first increases and then decreases. The promotion period may be followed by an interval of time with a negative impact; the magnitude of the decline first increases and then decreases. See Lewandowski (1985) for more details.

The impact of promotions via feature advertisements or special in-store displays may exhibit a similar pattern (as in FIG. 18); alternatively the impact of these types of promotions may be confined to the promotion period itself.

Regression Models

Our menu of regression equations consists of variants of the following basic equation used in Blattberg and Wisniewski (1988) and with minor changes in Wittink et al. (1987).

Let:

$S_{it}$=Weekly retail sales for item i at time t, $R_{it}$=The regular (shelf) price of item i at time t, $P_{it}$=The observed price (actually paid by the consumer) for item i at time t, $D_{it}$=The deal discount for item i at time t $((R_{it}-P_{it})/R_{it})$, $CP_{jt}$=The price of a competitive item j at time t with j not equal to i, $X_{it}$=A dummy variable which equals 1 if a display is run for item i at time t, $Y_{it}$=A dummy variable which equals 1 if a feature ad is run for item i at time t, $L_{it}$=A variable representing deal decay, equaling $k^{j-1}$ with j being the time since the beginning of the deal and $0<k<1$, The basic regression model is:

$$S_{it} = \exp\left\{\alpha_1 + \alpha_2 R_{it} + \alpha_3 D_{it} + \sum_j \delta_j CP_{jt} + \alpha_4 X_{it} + \alpha_5 Y_{it} + \alpha_6 L_{it}\right\} \quad (1)$$

All of the data required for this model are available in our data sources. The only possible exceptions are the $CP_{jt}$— numbers which reflect prices charged for items provided by competing vendors. We foresee that the latter may not be available in some commercial supply chain settings. If so, the item $\Sigma_j \delta_j CP_{jt}$ is eliminated from equation (1). On the other hand, a trend and seasonality factors (expressed e.g. via indicator variables) may be added to equation (1). For example, if the year is divided into four distinct seasons, add the variables $Z_{it}=1$ if period t is part of season l (l=1,K, 3) (along with a trend term) to the right hand side of (1):

$$S_{it}=\exp\{\alpha_1+\beta\gamma_1 Z_{1t}+\gamma_2 Z_{2t}+\gamma_3 Z_{3t}+\alpha_2 R_{it}+\alpha_3 D_{it}+\alpha_4 X_{it}+\alpha_5 Y_{it}+\alpha_6 L_{it} \quad (2)$$

The log-linear formulation in equations (1) and (2) has been shown to provide significantly better predictions than the simple linear formulation. The specification in the conventional Blattberg and Wisniewski model implicitly assumes that the impact of a promotion is restricted to the promotion period itself and that the magnitude of the impact exponentially declines over time. To allow for a general pattern of impacts as in FIG. 30, we are considering the following variant. Let denote an upper bound on the number of periods over which a price promotion exercises a significant impact, and let $U_{1t}=1$ if period t arises l periods after the beginning of the last promotion period, $$l=1,K, u \quad (3)$$

$$S_{it} = \exp\left\{\alpha_1 + \alpha_2 R_{it} + \left(\sum_{l=1}^{u} \beta_l U_{1t}\right)(1 + \alpha_3 D_{it}) + \alpha_4 X_{it} + \alpha_5 Y_{it}\right\}$$

The coefficients of the above regression equations will be determined by using the generic regression routine specified elsewhere herein.

Time-Series Models

An alternative approach to analyze retailer promotions is based on the use of time series models. First, an analysis is applied to a "censored" time series of sales volumes, in which all promotion (and after promotion) periods have been eliminated. One of several basic time series models is applied to identify trend factors, seasonality indices and/or auto condition structures. These basic time series models include exponential smoothing (weighted) moving averages, Winters' model, Box-Jenkins models. The following Modified Winters' Procedure uses the demand (POS or shipment) data to remove seasonality and trend effects.

Step 1. Initial Estimation of Level (including trend) at each Historical Period.

Calculate the moving average of seasons, with each season having period P. If P is an even number, take the average of two consecutive moving averages to let the estimate centered on the time period.

Step 2. Estimate Seasonal Factors.

Divide the actual demand by the centered moving average to obtain the estimate seasonal factor. Dampen the random effects by taking averages for similar periods in different years. Then, normalize the estimate seasonal factors that totals to P. Using the normalized seasonal factors remove the seasonality effects from the demand data.

Step 3. Estimate Level and Trend Terms.

Using the regression equation algorithm specified elsewhere herein, find the regression parameters for level and trend coefficients to fit the regression line. Using the regression coefficients remove the trend effects from the demand data.

Figure 32:
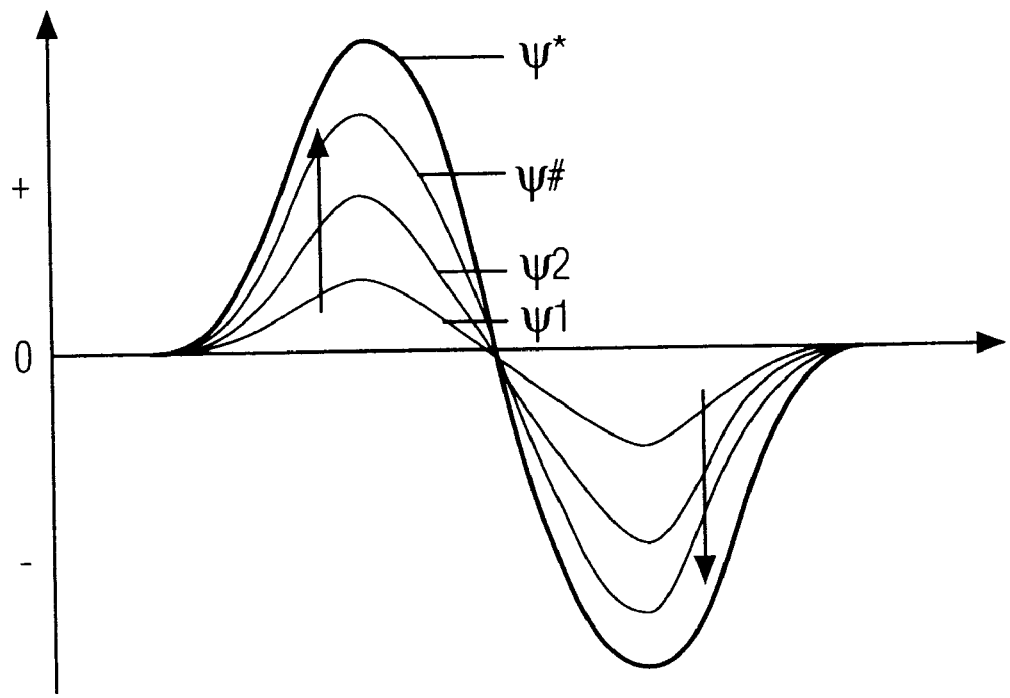
FIG. 32 Curve Fitting for Promotion Effect Analysis.
Figure 33:
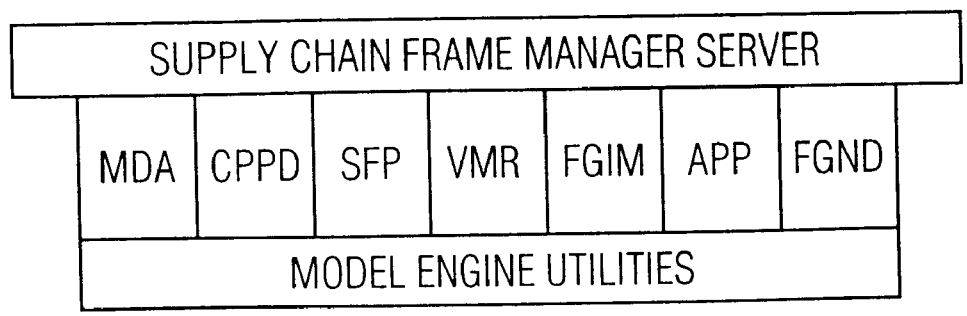
FIG. 33 System Level Services, the Seven Modules and Model Engine Utilities.

After an appropriate time series model has been selected for all non-promotion periods, one can interpolate the so-called base-line sales volumes in the promotion periods which would have arisen in the absence of the special promotion activities. By calculating the ratios of the actual sales volumes during the promotion periods and the calculated "base line" values, one constructs an impact-curve as in FIG. 31 for each promotion period separately. The impact curves pertaining to different promotion periods of a given type can next be aggregated into a single curve using standard curve fitting techniques, see FIG. 32. The resulting impact factors for each of the periods belonging to and following after a promotion interval can now be used in future forecasting efforts, as guided by our Forecasting Module. This approach follows that of Abraham and Lodish (1992) who have successfully adopted the methodologies in their earlier PROMOTER system to analyze retailer promotions. The PROMOTER model has four primary steps: (1) adjustment of the data for trend, seasonality, (2) elimination of data points influenced by promotion, (3) extrapolation of data points not influenced by promotion into promotion period, and (4) computation of promotion effect as the difference between this baseline and actual sales.

TABLE 10

Usage of SPP Models

| MODEL | WHERE USED |
|---|---|
| Statistical forecasting models: | Demand Characterization |
| | Bottom-up Forecast |
| • moving average | Top-down Forecast |
| • trend | VMR |
| • smoothing models | |
| • Holt Winters model | |
| • Winter's method | |
| • Regression based forecasting | |
| • Autoregressive/ Moving average models | |
| Expert based forecasting model: | Bottom-up Forecast |
| Seasonality factors estimation routine | Demand Characterization |
| | Bottom-up Forecast |
| | Top-down Forecast |
| | PSI |
| | VMR |
| Forecast accuracy routines: | Bottom-up Forecast |
| | Top-down Forecast |
| • Forecast error calculation | PSI |
| | VMR |
| • Exception report generation | |
| Past promotions impact estimation model: | •Sales Promotion Analysis |
| • Regression | Bottom-up Forecast |

TABLE 10-continued

Usage of SPP Models

| MODEL | WHERE USED |
|---|---|
| model | Top-down Forecast |
| • Time series model | |
| Future promotion impact estimation model | Sales Promotion Analysis |
| | Bottom-up Forecast |
| | Top-down Forecast |

Models Specific to Repair Environment

Definitions

Equipment consists of modules that are composed of reparable items, and repairable items are made of components.

Requirement: failure of an equipment.

Consolidation policy: the policy of replacing the defective reparable item of a failed module with a good reparable item of an already defective module and reinstalling into the equipment.

Defective ratio: ratio of number of defective reparable item to the total number of reparable items in a module.

Target level: maximum defective ratio acceptable before a module can be sent back from the equipment location to the repair depot. The target level is one of the two parameters of the consolidation policy.

Raw requirements (pre-consolidation requirements): total requirements generated by all equipment at the equipment location Consolidated requirements (post-consolidation requirements): requirements for equipment after consolidation policy is applied to raw equipment requirements (number of modules sent to repair depot for repair from the equipment location)

Raw Requirements Estimation (for Bottom-up estimation).

Objective

To estimate raw requirements for all equipment located at a particular equipment location based on the planned activity (usage) schedules of the equipment.

Input

Equipment located at the equipment location.

Activity schedules for all the equipment at the equipment location such as:

equipment upgrade/maintenance schedules (preventive and breakdown maintenance schedules)

activities (i.e., operation time, number of setups, cumulative operation time) planned activity schedules for all equipment at the equipment location Output Estimations of the raw requirements for each equipment at the equipment location Algorithmic Steps Establish relationships between raw requirements and activities of the equipment based on analysis of graphs, etc.

Analyze the effects of activities on requirements using regression or time-series models Estimate raw requirements for each equipment given the equipment's planned activity schedule by the models used above.

Consolidated Requirements Estimation (for Bottom-Up Estimation)

Objective

To estimate consolidated requirements for all equipment located at an equipment location based on the estimated raw requirements.

Input

Estimated raw requirements for each equipment at the equipment location and the time of requirement Batching parameter for the batching policy of the equipment location Consolidation policy (target level and the search rule)

Inventory positions at the equipment location for modules and reparable items

Performance measures: stock level, service level (availability of equipment), repair cost associated with repair at equipment locations and the repair depot.

Output

Estimates of consolidated requirements for all equipment at an equipment location Values of performance measures Algorithmic Steps Search under consolidation policy Identify repairable items to be sent to repair depot under batching policy of the equipment location Consolidation Policy A consolidation policy consists of two elements: a search rule for selecting the defective repairable item to be consolidated, and a target level, that is the maximum defective ratio acceptable before a module can be sent back from the equipment location to the repair depot.

Given a newly failed module of type I with a defective reparable item of type j, the consolidation policy defines which reparable item should be chosen out of which module to perform the consolidation. The chosen repairable item should already be part of a module with at least one defective reparable item but containing a good component of type j. The search rule select the reparable item for consolidation among all such defective modules. The following search rules are considered:

Carry out the search for defective modules of type I only. Sort the defective modules of type I in decreasing order of the defective ratio and starting from the top of the list, select the first module that has a good component j in it, if one exists. If not, sort all the other defective modules in decreasing order of the defective ratio and starting from the top of the list, select the first module that has a good reparable item j in it, if one exists. If not, (consolidation cannot take place) replace the failed module I with a good one, if one is available at the equipment location. If not, equipment becomes unavailable until either a consolidation or a replacement can be made.

Determine all module types for which stocks of good items at the equipment location are below a threshold value. Sort the defective modules of all such types in decreasing order of the defective ratio and starting from the top of the list, select the first module that has a good reparable item j, if one exists. If not, sort all the other defective modules in decreasing order of the defective ratio and starting from the top of the list, select the first module that has a good reparable item j, if one exists. If not, (consolidation cannot take place) replace the failed module of type I with a good module of type I, if a good one is available at the equipment location. If not, the equipment becomes unavailable until either a consolidation or a replacement can be made.

Sort the defective modules of all types in decreasing order of the defective ratio and starting from the top of the list, select the first module that has a good reparable item j in it, if one exists. If not, (consolidation cannot take place) replace the failed module of type I with a good one, if one is available at the equipment location. If not, equipment becomes unavailable until either a consolidation or a replacement can be made.

Batching Policy

The batching policy is defined by the size of a batch, TH1, (TH1 can be equal to 1). The inventory policy is in the form of: count the number of defective modules with defective ratio greater than the target level. If this number is greater than TH1, then send TH1 units of repairable items to the repair shop else wait until this condition is satisfied.

Consolidated Requirements Estimation (for Top-Down Estimation)

Objective

To estimate consolidated requirements for all equipment located at a particular equipment location based on historical data.

Input

Time series of consolidated requirements for each equipment locations.

Output

Estimates of consolidated requirements for all equipment at an equipment location Algorithmic Steps Use a conventional Kalman filter based algorithm and conventional statistical forecasting methods to estimate consolidated requirement for the equipment Determining a Repair Plan Objective To determine a repair plan based on aggregate repair plan, and repair constraints (resource capacities and key component availability).

Input

Aggregate repair plan

Available resource capacities and degree of flexibility to change resource capacities Key component availability (projected inventory positions, supplier and lead time information, inventory replenishment policy)

Output

Repair plan for the repair shop that is feasible with respect to the repair constraints (capacity and key component availability).

Finished Goods Inventory Management (FGIM) 164

Scope and Objective

Objective: Decide where to stock, how much and when to replenish in (hybrid) made-to-stock/made-to-order environment.

Scope: Single and dual echelon.

Features: Single and dual echelon inventory models for how much and when to replenish stocking points. Cost vs. service trade offs to determine where to stock.

Deployment

Models specific to manufacturing environment

Overview

Objectives

This module contains a collection of finished goods' inventory models enabling the selection and evaluation of inventory policies. The module returns an I- and P-line extended to a given horizon (of T periods) beyond the current period. At this stage, all of the models represent settings where any given item is distributed to the customers from a single location.

Input

Forecasts of mean demands per item, per period (S' line); standard deviations of demands per period per item ($\sigma$' line); mean production lead times for each period per item (L' line); standard deviations of lead times for each period, per item (τ' line).

Output

Inventory (I) line

Production (P') line

Inventory strategies

Models are classified as follows: MI. Models with Non-Lumpy Demand; and MII. Models with Lumpy Demand. Lumpy demands refers to settings where demands are sporadic or experience extreme variability. The demand process for a given item will be classified as lumpy if the percentage of zero demand periods or the coefficient of variation of the demands is above pre-specified critical levels.

Within the category MI we next differentiate between: MI.1 Models managing inventories or on an item-by-item basis; and MI.2 Multi-item models with joint capacity constraints.

The choice between these two categories depends on whether or not important interdependencies prevail between the items (in the form of joint capacity constraints or joint cost structures). Within each of the subcategories MI.1 and MI.2, different models can be selected based on the extent to which policy parameters are to be pre-specified by the user or computed based on an appropriate tradeoff between cost and service measures.

MI Inventory Models for Non-Lumpy Demand

MI.1 Models for Independent Items

As mentioned above, in this category inventories are managed on an item-by-item basis. Different models need to be invoked dependent upon the extent to which policy parameters are to be specified by the user. Alternatively, the models to be used can be determined endogenously based on an appropriate tradeoff analysis or optimization of various cost and service measures.

MI.1.1 User-Specified Base-Stock Policies

Objective

In this model, the user specifies an order-up-to or base-stock level as a given number of weeks of inventory. Based on this inventory policy, the model projects out an I' and P' line for a scenario in which the forecasted mean demands are realized.

Additional Inputs

The desired base-stock level for each period $n_t$=number of periods of future forecasted demands in which the inventory position is to be increased at the beginning of period t, if below Algorithm Step 1: Compute $b_t=S_t+S_{t+1}+ \ldots +S_{nt}$. (If $n_t$ is specified as a fractional value, $b_t$ equals:

$$b_t=S_t+S_{t+1}+ \ldots +S_{\lfloor nt \rfloor}+(n_t-\lfloor n_t \rfloor)S_{\lceil nt \rceil})$$

Step 2: Project I' and P' line. Let:

$I_b$=inventory position (inventory level plus outstanding orders) before ordering at beginning of period b 1.

$P_t$=production volume ordered at beginning of period t.

Set $P_1=b_1-I_o$; project recursively for t=1, ..., T-1:

$I_{t+1}$=max $(b_t, I_t)+P_t-S_t$ $P_{t+1}$=max $(b_{t+1}-I_{t+1}; 0)$

Step 3: Evaluation of various service and cost measures.

a) e.g., expected average inventory level, b) probability of stock-out, c) fill rate or percentage of demands satisfied from stock, d) number of setups, e) average backlog sizes.

MI.1.2 MIN-MAX Policies Based on Optimization of Aggregate Cost Measures

Objective

In this model, a policy is computed which minimizes the expected value of the aggregate of all relevant cost components, i.e. 1) setup costs; 2) inventory carrying costs; and 3) backlogging costs. The model is appropriate in settings where stock-outs are fully backlogged and where the inventory carrying and backlogging costs are proportional with the inventory levels and backlog sizes.

Additional Inputs

Holding cost rates per item per period (h' line)

Backlogging cost rate per items per period (p' line)

Variable production cost rate per item per period (c' line)

Algorithm

Step 1: Load S' (Sales), σ' (Standard deviation), L' (Lead times), τ' (Standard deviations of lead times), K' (setup costs), h' (Holding cost rates), p' (backlogging cost rates), c' (variable production cost rates);

Step 2: Fit appropriate demand distribution to S', σ' lines. Fit appropriate lead time distributions to L' and τ' lines.

Step 3: Solve for time-phased optimal (s,Q) policy.

Such a policy has for each period t=1, ..., T, two critical levels $s_t$ and $Q_t$ such that whenever beginning inventory position $I_t<s_t$ an order is placed for $(s_t+Q_t-I_t)$ units. Parameters $(s_t, Q_t)$ are computed from the following recursion.

Let:

$V_t(I)$=expected minimum costs in periods t, t+1, ..., T given that period t starts with an inventory position of I units.

$G_t(y)$=expected (inventory carrying and backlogging) costs associated with period t. (This function uses the lead time and demand distributions computed in Step 2 as well as the h' and p' lines.)

$D_t$=demand in period t.

Solve:

$$V_t(I) = \min_{x \geq 0} \left\{ \begin{bmatrix} K_t, & \text{if, } x > 0 \\ 0, & \text{if, } x = 0 \end{bmatrix} + c_t x + G_t(I + x) + E \cdot v_t + 1(I + x - D_t) \right\}$$

Note: the user is provided with the option to specify ranges for the production quantities $x_t, x_{t+1}, \ldots, x_T$. These ranges may reflect capacity limits per item, or flexibility limits in view of prior determined P' and I' lines. The ranges will be used to restrict the choice of x.

Output

For all t=1, ..., T;

$x_t^*(I)$=optimal order quantity at the beginning of period t, when inventory position=I.

Step 4: Create I' and P' lines.

$I_1$ is known; set $P_1$=production lot initiated in period 1 equal to $X^*_1$ (I). Then project recursively for t=1, ..., T $I_{t+1}=I_t+x^*_t (I_t)-S_t$ $P_{t+1}=x^*_{t+1} (I_{t+1})$ Step 5: Evaluation of various cost and service measures, as in Step 2 of model M1.1.

MI.1.3 Periodic Review Models Under Service Level Constraints

Objective

In this category of models the inventory policy minimizes expected setup and holding costs subject to user specified service level constraints. The user may choose between the two types of conventional service measures.

Type 1 Service Constraints:
 Maximum permitted probability of a stock-out during lead-time following potential order at beginning of a given period. Let:
  $\alpha_t$=maximum permitted likelihood of stock-out during lead-time following potential order at beginning of period t.

Type 2 Service Constraints:
 Minimum acceptable fill rate during lead time following a potential order at beginning of period. Fill rate is defined as the percentage of demand satisfied from stock. Let:
  $\beta_t$=minimum acceptable fill rate during lead time following a potential order at beginning of period t.

The model is based on the same assumptions as MI.1 except that stock-out frequencies are controlled via service level constraints (of Type 1 or Type 2) as opposed to explicit stock-out or backlogging costs.

Additional Inputs holding cost rates per item per period (h' line)
 maximum permitted stock-out probabilities per item per period ($\alpha'$ line), or minimum acceptable fill rates per item per period ($\beta'$ line)

Algorithm

Step 1: Load S' (Sales), $\sigma'$ (standard deviations), L' (lead-times), K' (setup costs), h' (holding cost rates), c' (variable production cost rates), $\alpha$ (service level type 1) or $\beta'$ (service level type 2). (Lead-times are specified either as constants or via ranges with associated likelihood for each value in the range.)
 Step 2: Fit appropriate demand distribution to S', $\alpha'$ lines. Determine lead time demand distributions.

Let:
 $LD_t$=lead time demand for order placed at beginning of period t. If lead time demand distribution is chosen to be Normal (for example), then set its mean and variance as follows:

$$\sum_{l=1} = Pr[L = l]\{S_t + S_{t+1} + \ldots + S_{t+l}\}$$

$$\sigma^2(LD_t) = \sum_{l=1} Pr[L = l]\{\sigma_t^2 + \sigma_{t+1}^2 + \ldots + \sigma_{t+l}^2\} +$$

$$\sum_{l=1} Pr[L = l]\{S_t + S_{t+1} + \ldots + S_{t+l}^2 - \mu^2(LD_t)\}$$

Step 3: Compute minimum inventory positions after ordering $S_t$, via Reorder Point Algorithm, below:
 Step 4: Solve for time-phased optimal (s,Q) policy.

Let:
 $V_t$(I)=expected minimum costs in periods t, t+1, ..., T given that period t starts with an inventory position of I units.
 $G_t$(y)=expected inventory carrying and backlogging costs associated with period t.
 Dt=demand in period t.

Solve:

$$V_t(I) = x \geq S_t - I \left\{ \begin{bmatrix} K_t \text{ if } x > 0 \\ 0 \text{ if } x = 0 \end{bmatrix} + c_t x + G(I + x) + Ev_{t+1}(I + x - D_t) \right\}$$

$$t = 1, \ldots, T; \text{ all } I$$

Output
 for all t=1, ..., T;
 $x^*_t$ (I)=optimal order quantity at the beginning of period t, when inventory position=I.
 Note: the user is provided with the option to specify ranges for the production quantities $x_t, x_{t+1}, \ldots, X_T$. These ranges may reflect capacity limits per item, or flexibility limits in view of prior determined P' and I' lines. The ranges will be used to restrict the choice of x in (2).
 Step 4: Create I' and P' lines.
  $I_1$ is known; set $P_1$=production lot initiated in period 1 equal to $x^*_1$ (I). Then project recursively for t=1, ..., T
  $I_{t+1}=I_t+x^*_t (I_t)-S_t$
  $P_{t+1}=x^*_{t+1} (I_{t+1})$
 Step 5: Evaluation of various cost and service measures, as in Step 2 of model M1.1.

MI.2 Multi-Item Capacitated Periodic Review Models With Service Level Constraints Objective This category of models plans simultaneously for a complete family of items incorporating various joint capacity constraints. The model plans production quantities on the basis of estimated mean demands; however, minimum inventory levels are specified to satisfy user specified service constraints (of Type 1 or Type 2, see MI.1.3, above). The P' and I' line are in this case determined by the solution of an LP-model. The user specifies whether minimum inventory levels are to be determined on the basis of Type 1 or Type 2 constraints. In addition, the user chooses among a number of possible objective functions (performance measures) to select among feasible plans.

LP Formulation

Model

LP formulation for I products (or product group) K resources (Key Component and/or Lines) sets and T periods Input
 $S_{it}$=Demand for product i at period t
 $s_{it}$=Minimum amount of product i at the end of period t
 $I_{i0}$=Initial inventory of product i at the beginning of the planning horizon
 $a_{mi}$=Units of resource m, among resources in set $S_k$, required per unit production/repair of product i
 $c_{mt}$=Units of resource m which becomes available at period t (In case resource m is a key component, $c_{m0}$ is the amount of it available at the beginning of the horizon under consideration.)

Decision Variables
 $P_{it}$=Units of product i to produce in period t
 $x_{mit}$=Units of product i to produce in period t using resource m in $S_k$
 $I_{it}$=Inventory of product i at the end of period t LP (A)
 Optimize:
  OV1, OV2, OV3 or OV4 specified below: subject to $$I_{it-1}+P_{it}-s_{it}=I_{it} \text{ for } i=1, 2, \ldots, I \text{ and } t=1, 2, \ldots, T \quad (1)$$

$$\Sigma_{m \text{ in } Sk}x_{mit}=P_{it} \text{ for } k=1, 2, \ldots, K, i=1, 2, \ldots, I \text{ and } t=1, 2, \ldots$$

$$, T \quad (2)$$

$$\Sigma_{s=0 \text{ to } t} \Sigma_i a_{mi} x_{mis} <= \Sigma_{s=0 \text{ to } t} c_{ms} \text{ for each key component m and } t=1, 2 \ldots, T \quad (2.1)$$

$$\Sigma_i a_{mi} x_{mit} <= C_{mt} \text{ for each line resource m and } t=1, 2, \ldots, T \quad (2.2)$$

$$I_{it} \geq s_{it} \text{ for } i=1, 2, \ldots, I \text{ and } t=1, 2, \ldots, T \quad (3)$$

$$x_{mit} \geq 0 \text{ for m in } S_k, k=1, 2, \ldots, K, i=1, 2, \ldots, I \text{ and } t=1, 2, \ldots, T \quad (4)$$

Constraints
  calculate the inventory levels,
  (2.1) and (2.2) ensure that consumption does not exceed resource availability,
  ensure inventory is no less than pre-specified levels and
  ensure that production/repair is non-negative.
Output
  Feasibility of LP
  If yes, a production plan: $P_{it}$ for $i=1, 2, \ldots, I$ and $t=1, 2, \ldots, T$ the corresponding inventory levels: $I_{it}$ for $i=1, 2, \ldots, I$ and $t=1, 2, \ldots, T$ and remaining resources: slacks in (2.1) and (2.2).
  If no, display sources of infeasibility: surpluses in (2.1) and (2.2).
    OV1: Maximize maximum slack in resource constraints (2.1) and (2.2)
    OV2: (Balance Workload). min $\Sigma [a_{mi} x_{mit}/c_{mt}]$
    OV3: Minimize variable production and holding costs min $\Sigma [c_{it} P_{it} + h_{it} I_{it}]$
    OV4: Minimize maximum inventory in weeks min $\max_{it}[I_{it}/S_{it}]$
Algorithm
  Step 1: Load S' (sales), σ' (standard deviations), L' (lead times), h' (holding cost rates), c' (variable production cost rates), τ' (standard deviations of lead times); resource utilization matrix $[a_{mi}]$ capacity levels $[C_{mt}]$.
  Step 2: Determine lead time distributions $LD_l$, as in Step 2 of MI.1.3.
  Step 3: Compute minimum inventory positions after ordering $s_1, \ldots, s_T$ via Reorder Point Algorithm.
  Step 4: Solve above LP.
  Step 5: Identical to Step 5 of model MI1.1.
MII. Inventory Models for Lumpy Demand
  Apply to lumpy demand. The lumpiness of demand is measured as proposed herein.
M3.1 Maximum Demand during Period 'n' Policy
Objective
  This policy is suitable for low cost slow moving items with lumpy demand.
Inputs
  S' line, cover period n.
Outputs
  MAX level, inventory target.
  Frames using these models include
  PSI Planning Frame 160 (CF8)
  VMR Frame 250 (CF19 and CF20)
Algorithm
  Step 1. Use method 1 to categorize lumpy demand
  Step 2. Determine 'n'; a worst case scenario would be to set 'n' as the replenishment lead-time.
  Step 3. Determine the maximum demand during period 'n' and set it as the inventory target, MAX.
  Step 4. Compute I' line:

$$I_{jt-1} + x_{jt} - d_{jt} = I_{jt} \text{ for } j=1, 2, \ldots, J \text{ and } t=1, 2, \ldots T$$

M 3.2 Expected Deficit MIN–MAX
Objective
  This policy is suitable in cases where there are fairly expensive items that have lumpy demand.
Inputs
  S' line
Outputs
  Max level, inventory target
  Frame using the model includes
  PSI Planning Frame 160
Algorithm
  Step 1. Use method 2 to categorize lumpy demand
  Step 2. Define expected deficit due to lumpiness as average amount that the quantity on hand is likely to fall before a replenishment order is placed.
  Step 3. Approximate the expected deficit (average period sales) as one-half of the beginning and ending quantity on hand between quantity-on-hand record updates.
  Step 4. Set ROP as safety stock plus demand during the lead-time and expected deficit.
  Step 5. Set the MAX level as the ROP quantity plus the order quantity less the expected deficit.
  Step 6. When the inventory level reaches the reorder point, the difference between the targeted quantity MAX and the quantity-on-hand is ordered. Compute the I' line:

$$I_{jt-1} + x_{jt} - d_{jt} = I_{jt} \text{ for } j=1, 2, \ldots, J \text{ and } t=1, 2, \ldots T$$

TABLE 11

Usage of FGIM Models

| MODEL | WHERE USED |
| --- | --- |
| Inventory models for independent items with non-lumpy demand:<br>• User specified base-stock policies<br>• Min-max policies based on optimization of aggregate cost measures<br>• Periodic review models under service level constraints | PSI Planning<br>VMR |
| Inventory models for multi-item with non-lumpy demand:<br>• Capacitated periodic review model with service level constraints | PSI Planning |
| Inventory models for lumpy demand<br>• Maximum demand during period 'n' policy<br>• Expected deficit min-max policy | PSI Planning |

Models specific to repair environment Determining CSI levels
Objective
  To determine CSI level for each module type.
Input
  repair shop repair time estimates
  consolidated requirements for equipment for the previous periods Output
    CSI levels for each repairable item type
Algorithm Step
    For each repairable item, set CSI level to $CSI_{min}$, calculate the corresponding performance measures. Based on values of the performance measures and the estimated consolidated requirements, change the CSI level and repeat.
    Performance measures that can be considered for determining the CSI level for each repairable item are the total cost of repair (setup cost+repair cost), and the fill rate (service level) at the repair shop.
    CSI level for each repairable item must be greater than or equal to the value of $CSI_{min}$, which is simply the sum of the requirements during repair time and a safety stock. $CSI_{min} \geq E$[requirements over all equipment locations during repair time of one unit]+safety stock where safety stock is a user defined parameter, based on past requirements.

Determining Aggregate Repair Resource Requirements
Objective
    This process includes the objectives:
        (i). to estimate number of consolidated requirements for equipment triggering repair at the repair shop;
        (ii). given (i), to estimate number of repairable items requiring repair at the repair shop; and
        (iii). given (ii), to estimate aggregate repair requirements at the repair shop
Input
    CSI levels
    consolidation policy target level
    Types and numbers of repairable items in each equipment
    BOM for each repairable item (to go to the component level)
    Final estimations of consolidated requirements for the equipment
    Final estimated repairable item requirements corresponding to the consolidated requirements for equipment
    Repair data for each repairable item (operation sequence and repair time estimates for each operation)
Output
    Aggregate repair requirements at the repair shop
Algorithmic Steps
    Estimate number of consolidated requirements for equipment triggering repair at the repair shop
    Estimate number of repairable items requiring repair at the repair shop
    Estimate aggregate repair requirements at the repair shop Generation of a Feasible Aggregate Repair Plan
Objective
    To generate an aggregate repair plan based on aggregate repair requirements, and repair constraints (resource capacities and key component availability).
Input
    Aggregate repair requirements
    Available resource capacities and degree of flexibility to change resource capacities
    Key component availability (projected inventory positions, supplier and lead time information, inventory replenishment policy)
    BOM for each repairable item family (to go to the component level)
Output
    Aggregate repair plan for the repair shop that is feasible with respect to the repair constraints (capacity and key component availability)
Algorithmic Steps
    Check if aggregate repair requirements are feasible with respect to capacity constraints of the resources
    If not, change capacity levels of flexible resources. If still infeasible, point out infeasibility and go back and move aggregate repair requirements forward or backward in time
    Determine key component requirements and time of requirement from aggregate repair requirements
    Check if aggregate repair requirements are feasible with respect to key component availability constraints
    If not, point out infeasibility in terms of component availability. Change key component availability (if it can be changed) equipment based on the purchasing policies for the components. If still infeasible, go back and move aggregate repair requirements forward or backward in time until a feasible repair plan is generated.

Aggregate Production Planning (APP) 162
    The Aggregation Production Module 162 focuses on its PSI Frame 160 application. The following two capacity checking models are identified and developed to support the Model Engine 20 requirements in the PSI Frame 160.
Objective and Scope
    Objective: Facilitate the master production scheduling process.
    Scope: Finished goods production in some aggregate view.
    Features: Rough-cut capacity checking for finished goods; Major components (feeder plants) represented in constraints; and Ability to identify violated constraints.
Capacity Checking Models
    In the Capacity Checking models, the problem of checking whether there is enough resources to satisfy requirements is formulated as Linear Programming Problems. These models are applicable to both the manufacturing and repairing environment in the PSI frame. The capacity checking models are presented in manufacturing terms these models also apply to the repair environment and are used in the context of the Requirement-Supply Reconciliation frame to assess the feasibility of a repair plan.
Sales and Safety Stock Sanity Check
Objective
    Check whether there is a feasible production plan to satisfy given sales and safety stock requirements.
Input
    I=The number of products to be considered.
    K=The number of resources (production lines and key components) sets.
    $S_k$=The set of resources.
    T=The planning horizon.
    $S_{it}$=Demand for product I at period t.
    $ISS_{it}$=Safety stock of product I at the end of period t
    $I_{i0}$=Initial inventory of product I at the beginning of the planning horizon.
    $a_{mi}$=Units of resource m, among resources in set $S_k$, required per unit production of product I.
    $c_{mt}$=Units of resource m which becomes available at period t. (In case resource m is a key component, $c_{m0}$ is the amount of it available at the beginning of the horizon under consideration.)

Output
  Feasibility of LP
  If yes,
    a production plan:
      $P_{it}$ for i=1, 2, ..., I and t=1, 2, ..., T the corresponding inventory levels:
      $I_{it}$ for i=1, 2, ..., I and t=1, 2, ..., T and remaining resources (slacks in constraints (3) and (4)):
      $\Sigma_{s=0\ to\ t}c_{ms} - \Sigma_{s=0\ to\ t}\Sigma_i a_{mi}x_{mis}$ for each key component m and t=1, 2, ..., T and $c_{mt} - \Sigma_i a_{mi}x_{mit}$ for each production line m and t=1, 2, ..., T.
  If no, display sources of infeasibility (surpluses in constraint (3) and (4)):
    $\Sigma_{s=0\ to\ t}\Sigma_i a_{mi}x_{mis} - \Sigma_{s=0\ to\ t}c_{ms}$ for each key component m and t=1, 2, ..., T and $\Sigma_i a_{mi}x_{mit} - c_{mt}$ for each production line m and t=1, 2, ..., T.
  Linear Programming Formulation
Decision Variables
  $P_{it}$=Units of product I to produce at period t,
  $x_{mit}$=Units of product I to produce at period t using resource m in set $S_k$,
  $d_{it}$=Demand for product I during the period t,
  $I_{it}$=Inventory of product I at the end of period t.
Objective Functions
  Minimize maximum production line utilization (smooth production line utilization):
    Minimize z
      subject to $\Sigma_i a_{mi}x_{mit}/c_{mt} <= z$ for each line resource m and t=1, 2, ..., T.
  Minimize maximum inventory level:
    Minimize z subject to $I_{it} <= z$ for i=1, 2, ..., I and t=1, 2, ..., T.
  Minimize total inventory level:
    Minimize $\Sigma_i \Sigma_t I_{it}$
  Minimize total inventory cost:
    Minimize $\Sigma_i \Sigma_t (h_{it}I_{it}^+ + p_{it}I_{it}^-)$
      subject to $I_{it} = I_{it}^+ - I_{it}^-$, $I_{it}^+ >= 0$ and $I_{it}^- >= 0$ for I=1, 2, ..., I and t=1, 2, ..., T
      where $h_{it}$=cost per unit holding and
      $p_{it}$=cost per unit backlog of product I at the end of period t.
Constraints
  Inventory balance formula
    $I_{it-1} + P_{it} - d_{it} = I_{it}$ for i=1, 2, ..., I and t=1, 2, ..., T.
  Resource allocation
    $\Sigma_{m\ in\ Sk} x_{mit} = P_{it}$ for k=1, 2, ..., K and t=1, 2, ..., T.
  Key component availability
    $\Sigma_{s=0\ to\ t}\Sigma_i a_{mi}x_{mis} <= \Sigma_{s=0\ to\ t}c_{ms}$ for each key component m and t=1, 2, ..., T.
  Production line capacity
    $\Sigma_i a_{mi}x_{mit} <= c_{mt}$ for each production line m and t=1, 2, ..., T.
  Safety stock requirement
    $I_{it} >= ISS_{it}$ for i=1, 2, ..., I and t=1, 2, ..., T.
  Non-negative resource allocation
    $x_{mit} >= 0$ for m in $S_k$, k=1, 2, ..., K, i=1, 2, ..., I and t=1, 2, ..., T.
Capacity Checking Model
  CCM1: User selected objective function subject to the above constraints.
  Frames using this model include PSI planning (CF13), VMR. (CF 20)
  This LP formulation, with minor changes, is also applicable to a repair environment, where reparable items correspond to products, repair requirements for reparable items correspond to demands for products, and broken reparable items awaiting repair at the repair shop correspond to key components.
  For the repair environment, key component availability constraint (the fourth constraint) should be modified as in the following to represent broken reparable item availability at the repair shop:
  4) Broken reparable item availability:
    $\Sigma_{s=0\ to\ t}\Sigma_m x_{mis} <= \Sigma_{s=0\ to\ t}c_{is}$ for each repairable item i and t=1, 2, ..., T.
  Objective functions and the other constraints in a repair environment will be similar to those of a production environment, which are given above. The LP model for the repair environment will either produce a capacity feasible aggregate repair plan that satisfies the repair requirements generated by reparable item failures or display sources of infeasibility.

Production Requirement Feasibility Check

Objective
  Check whether a given production plan is feasible with respect to aggregate production capacity and key component availability.

Input
  I=The number of products to be considered.
  K=The number of resources (production lines and key components) sets.
  $S_k$=The set of resources.
  T=The planning horizon.
  $P_{it}$=Units of product i to produce at period t.
  $a_{mi}$=Units of resource m, among resources in set $S_k$, required per unit production of product i.
  $c_{mt}$=Units of resource m which becomes available at period t. (In case resource m is a key component, $c_{m0}$ is the amount of it available at the beginning of the horizon under consideration.)

Output
  Feasibility of LP
  If yes, display remaining resources (slacks in constraints (3) and (4)):
    $\Sigma_{s=0\ to\ t}c_{ms} - \Sigma_{s=0\ to\ t}\Sigma_i a_{mi}x_{mis}$ for each key component m and t=1, 2, ..., T and $c_{mt} - \Sigma_i a_{mi}x_{mit}$ for each production line m and t=1, 2, ..., T.
  If no, display sources of infeasibility (surpluses in constraint (3) and (4)):
    $\Sigma_{s=0\ to\ t}\Sigma_i a_{mi}x_{mis} - \Sigma_{s=0\ to\ t}c_{ms}$ for each key component m and t=1, 2, ..., T and $\Sigma_i a_{mi}x_{mit} - c_{mt}$ for each production line m and t=1, 2, ..., T.
  Linear Programming Formulation Decision Variables
  $x_{mit}$=Units of product I to produce at period t using resource m in set $S_k$.

Capacity Checking Model
  CCM2: Objective function 1) subject to constraints 2), 3), 4) and 6).

TABLE 12

Usage of APP Models

| MODEL | WHERE USED |
| --- | --- |
| Capacity checking models: | PSI Planning |
|  | VMR |
| Sales and safety stock sanity check |  |
| Production requirement feasibility check |  |

Vendor Managed Replenishment (VMR) 252
Overview

This section describes the specifications of the various models used in the VMR modules. The description is divided into three main categories: (1) Inventory Requirements Setting Models, (2) Strategic Models, and (3) Operational Models. The notation for these models is introduced as necessary throughout this section.

The models developed in this section are based on prior results in the professional literature as well as from other sources.

Scope and Objective

Objective: Analyze contractual agreements with customers; and Decide on what to ship, in what quantities and when.

Scope: Selected products for selected customers.

Features: Evaluate policy parameters such as bounds on customer inventories, target service level and delivery frequencies. Statistical forecast of retailers' sales (i.e. forecast of sales of PCEC's customers to their customers). Determine shipment requirements and delivery schedules.

Inventory Positioning: The Multi-Item, Two Echelon Model

Overview

This section presents two models; the first model describes an algorithm for the calculation of required echelon inventories. (Echelon inventory=inventory in transit from the plant to the DC+inventory on hand at the DC+inventory in transit from the DC to the stores+inventory on hand at the stores.) The second model estimates the expected level of service provided at a certain D.C, given a delivery quantity. Two important parameters used in both models are the expected value and standard deviation of the lead-time demand. These models compute the stock-out probability of today's delivery on the day of its arrival to the stores. This is based on the approximation that was developed as part of prior research on the Multi-Item, Two-Echelon production/inventory systems.

Setting Inventory Requirement: Model (R)

Objective

This module computes the required echelon inventory levels (R' line) at the beginning of each review period over the whole planning horizon. Clearly, these requirements depend on the delivery frequency used (the requirements increase as the delivery becomes less frequent). Thus, the required inventory levels (R' line) are calculated separately for each one of the pre-specified delivery frequencies.

Input

Network structure.

Demand forecast (means, standard deviations and dispersion factor).

Required service levels (in terms of stock-out probability).

Set of possible delivery frequencies.

Lead-times from each plant to every DC it replenishes, and the average lead-times from every DC to the stores it supplies.

Planning horizon specifications

Output

Required inventory lines (R' lines).

Notation $t_0$—beginning period of the planning horizon (assuming that 'today' is the beginning of period number 1).

T—the length of the planning horizon.

$R^t_f(i,j)$—required inventory level, of product j at DC I, at the beginning of period t, when delivery frequency f is applied.

$\alpha_{ij}$—required service level for product j at DC I.

$\mu^t_{ij}$—mean demand for product j at DC I during period t.

$\sigma^t_{ij}$—standard deviation of the demand for product j at DC I during period t.

$\delta^t_{ij}$—demand dispersion rate for product j at DC I. The dispersion rate is defined as follows:

$$\delta_{ij} \triangleq \left( \sum_{=restores(i)} \sigma^{t;ijr} \right) / \sigma^{t;ij}, \quad (R.1)$$

and is assumed to be constant over time. stores(I) denotes the set of stores replenished by DC I. Note that we do not require the data $\sigma^t_{ijr}$ which represents standard deviation of demands at individual stores. The parameters $\delta^t_{ij}$'s can be calculated (or even roughly estimated) by an observation of a set of historical stores' data.

$L_{ij}$—Lead-time from the plant that produces product j to DC I.

$\lambda_{ij}$—Average lead-time from DC I. to its stores, for product j.

Q—Set of 'quarters' into which the planning horizon is split. Each quarter is a continuous time interval consisting of one or more periods.

$Q_q$, $|Q_q|$—Quarter number q and the number of periods in it (note that).

F—The set of all possible delivery frequencies. Each delivery frequency f is specified as the minimal number of periods between two consecutive delivery periods. The values f must be integral (for non-integral values, redefine the base period, e.g. half a week instead of a week).

$\mu^t_{ij}(m)$—The mean and standard deviation of the demand for product j at all stores supplied by DC I, over periods t until t+$L_{ij}$++m (m≥0 is a parameter of these functions). The term t+$L_{ij}$++m represents the expected time at which a delivery shipped from the plant at period t+m (next possible delivery time), arrives to the stores.

Algorithm Steps

For all product-DC couples (i,j)
For all frequencies f in F
  time:=0
  For all 'quarters' q in Q
    For all periods t=1 to $|Q_q|$
      time:=time+1
      // compute the time to next feasible delivery period, t_del. //
      t_del:=f−[(t+f−1)mod f]
      time_to_DC:=t_del+$L_{ij}$
      time_to_stores:=time_to_DC+$l_{ij}$ compute the values $$\hat{\mu}_{ij}^{time}(t\_del) = \sum_{\lambda=time}^{time+(t\_del-1)+L_{ij}+1_{ij}} \mu_{ij}^{\lambda} \qquad (R.2)$$

and $$\sigma_{ij}^{time}(t\_del) = \sqrt{\sum_{\lambda=time}^{time+(t\_del-1)+L_{ij}} \sigma_{ij}^{\lambda} + \delta_{ij}^2 \sum_{\lambda=time+L_{ij}+1\_del}^{time+(t\_del-1)+L_{ij}+1_{ij}} \sigma_{ij}^{\lambda}} \qquad (R.3)$$

for a part of a period use the following interpolation method: Let $\lambda$ be the period number and let $0<a<1$ be the fraction of that period. Then, (R.4) mean=$\alpha \cdot \sigma_{ij}^{\lambda}$ $$std = \sqrt{\alpha} \cdot \sigma_{ij}^{\lambda} \qquad (R.5)$$

Use (R.5) if the demand in this part of the period is assumed to be independent of the demand during the rest of the period. Another way to calculate the standard deviation can be, for instance, $$std = \alpha \cdot \sigma_{ij}^{\lambda}$$

The inventory requirement for period time is now computed via $$R_f^{time}(i,j) = \hat{\mu}_{ij}^{time}(t\_del) + \Phi^{-1}(1-\alpha_{ij})\hat{\sigma}_{ij}^{time}(t\_del) \qquad (R.6)$$

End For (t)
End For (q)
End For (f)
End For (i,j)
Estimate Stock-out Probability for a Given Replenishment
Quantity: Model (OR1):
Objective For a given replenishment quantity of product j, delivered from plant p(j) to DC I, this model estimates the expected projected stock-out probability. The stock-out probability is defined as the probability of shortage in at least one of the stores replenished by the DC The word "projected" refers to lead-time periods later, when goods are expected to reach the stores.
Notation In addition to the notation defined up to this point, we define:

DELIV—delivery size.
date—date of delivery.
arr—(expected) arrival date of goods to stores
$X_{ij}^{date}$—the echelon inventory level of product j in DC I, at (period) time date.

Algorithm Steps
Use formula (R.2), with t_del=1, to calculate the expected demand over the lead-time, $$\hat{\mu}_{ij}^{date}$$

(1). Similarly calculate the standard deviation of this demand, $$\hat{\sigma}_{ij}^{date}$$

(1), via formula (R.3) (again, by setting t_del=1). The projected stock-out probability can be approximated by:

$$\tilde{\alpha}_{ij}^{arr} = \Phi\left(\frac{X_{ij}^{date} + DELIV - \hat{\mu}_{ij}^{date}(1)}{\hat{\sigma}_{ij}^{date}(1+k)}\right) \qquad (OR.1)$$

In certain situations the user may be interested in knowing the projected service levels for periods further than arr. Such interest may arise when no deliveries are planned for subsequent (number of) period(s). To evaluate the projected stock-out probability at period arr+k, when no deliveries are to be made during the following k periods (i.e. date+1, . . . , date+k), use the formula:

$$\tilde{\alpha}_{ij}^{arr+k} = \Phi\left(\frac{X_{ij}^{date} + DELIV - \hat{\mu}_{ij}^{date}(1+k)}{\hat{\sigma}_{ij}^{date}(1+k)}\right) \qquad (OR.2)$$

Strategic Model: VMR Contract Setup©

Objective

This module consists of a set of models tailored to support replenishment planning by integrating: (1) service level requirements; (2) limits on customers' inventory investments; (3) transportation costs; and (4) delivery frequency.
Input Below is the input which is common to all of the models described in this particular discussion:

Network Structure,
Demand Forecast,
Lead-times from each Plant to each DC and (an average) from each DC to its Stores,
Planning Horizon Specifications,
Current Inventory Positions,
Transportation Cost Structure and Trucks Volumes,
Products' Volumes (for Transportation Cost Calculations), Computing The Optimal Delivery Frequencies: Model (C1)
Objective This model computes delivery frequencies from each plant to the DC it replenishes such as to minimize total transportation costs. The delivery frequencies are set such that given requirements on service levels are satisfied and such that constraints on average inventories are not violated.
Input Inventory Requirements (R' Line, see Model R).
Set of Possible Delivery Frequencies,
Required Service Levels (in Terms of Stock-out Probabilities),
Limits on Maximal Inventory Investments (in terms of Weeks of Demand).

Output
Delivery Frequencies,
Estimated Level of Service,
Estimated Transportation Costs,
Estimated Inventory Levels, Notation We use the same notation as in Model R (except for the notation for delivery frequencies) plus the following:

Indices
 i—DC index
 j—product (module) index
 p—plant index f—delivery frequency index
s—index of line segment of transportation cost function (the cost structure is approximated by a piece-wise linear function)
t—time index
q—quarter index ( ) p1 Sets
I—set of all DCs
J—set of all products
P—set of all plants
F—set of possible delivery frequencies
$J^i$—all products sold to DC i.
$J_p$—all products produced in plant p.

Transportation cost parameters (for deliveries from plant p to DC i)
$vol_{ip}$—total volume of a single truck
$c_{ip}$—cost of full truck load (FTL)
$fix_{ip}$—fixed cost of less than full truck load (LTL)
$\tau_{ip,s}$—(right) end point of the s-th line segment (i.e., [$\tau_{ip,s-1}$, ip,s]) of the LTL cost function. $rate_{ip,s}$—transportation cost rate for volumes in segment s (i.e., in between $\tau_{ip,s-1}$ and $\tau_{ip,s}$), for LTL shipments.
$v_j$—volume of product j (for cost calculation purpose)
—upper limit on the average number of weeks of inventory in DC i in quarter q.

Decision variables
$X^t_{ij}$—echelon inventory of product j at DC I (including outstanding orders) in the beginning of period t.
$S^t_{ij}$—delivery quantity of product j to DC I in period t.
$F^q_{ipf}$—an indicator set to 1 if in quarter q a delivery frequency f is followed for the replenishment of DC I by plant p. Otherwise it is set to zero.
$NFT^t_{ip}$—number of full-truck-load sent to DC I from plant p during period t.
$LTL^t_{ip}$—volume of LTL (zero if none) shipment sent to DC I from plant p during period t.
$Y^t_{ip,s}$—total volume of LTL shipment that falls into line segment (cost rate category) number s. Note that.
$Z^t_{ip,s}$—an indicator set to 1 if the LTL shipment size is larger than $\tau_{ip,s-1}$; i.e., segment s is partially or entirely covered. Note that $Z^t_{ip,s}$ is always less or equal to $Z^t_{ip,s-1}$.

Algorithm Steps

The following Mixed-Integer Linear Programming problem is solved:

Problem (C1):

$$\text{MIN} \sum_{q \in Q} \sum_{t \in Q_q} \sum_{p \in P} \left[ c_{ip} \cdot NFT^t_{ip} + fix_{ip} \cdot z^t_{ip,1} + \sum_s rate^t_{ip,s} \cdot Y^t_{ip,s} \right]$$

S.T.

Initialize inventory positions:

$$X^1_{ij} = x^1_{ij} \ i,j \quad (C1.1)$$

System dynamics: (expected) beginning DC echelon inventory=(expected) beginning inventory of last period+ delivery quantity to the DC during the last period−expected demand in the last period:

$$X^t_{ij} = X^{t-1}_{ij} + S^{t-1}_{ij} - \mu^{t-1}_{ij} \ i,j, \ t>1 \quad (C1.2)$$

Beginning (expected) inventory level needs to satisfy the requirement constraint, for the relevant frequency level:

$$X^t_{ij} \geq \sum_{f \in F} R^t_f(i,j) \cdot F^q_{ipf}; t \in Q_q \ j \in J_p \ i, p, q \quad (C1.3)$$

Only one frequency is chosen for each triple (DC, product and quarter):

$$\sum_{f \in F} F^q_{ipf} = 1 \ i, p, q \quad (C1.4)$$

Average echelon inventory (across all products) should not exceed a given level. This level is given in terms of weeks of inventory. Note that we subtract one half since X is the beginning inventory level (while we are interested in average over the period, i.e., X-$\mu$/2):

$$\frac{1}{|Q_q|} \cdot \frac{1}{|J^i|} \cdot \left[ \left( \sum_{j \in J^i} \sum_{t \in Q_q} X^t_{ij} \Big/ \sum_{j \in J^i} \sum_{t \in Q_q} \mu^t_{ij} \right) - \frac{1}{2} \right] \leq \bar{x}^q_i i, q \quad (C1.5)$$

Upper bound on the number of full truck loads (FTL):

$$NFT^t_{ip} \leq \frac{1}{vol_{ip}} \cdot \left( \sum_{j \in J_p} v_j \cdot S^t_{ij} \right) i, p, t \quad (C1.6)$$

Lower bound on the number of FTLs:

$$NFT^t_{ip} \geq \frac{1}{vol_{ip}} \cdot \left( \sum_{j \in J_p} v_j \cdot S^t_{ij} \right) - 1 \ i, p, t \quad (C1.7)$$

Deliveries not send by the FTLs are sent by LTL:

$$LTL^t_{ip} = \sum_{j \in J_p} v_j \cdot S^t_{ij} - NFT^t_{ip} \cdot vol_{ip} \ i, p, t \quad (C1.8)$$

Setting the transportation cost constraints (See 4.8.1):

$$\sum_s Y^t_{ip,s} = LTL^t_{ip} \ i, p, t \quad (C1.9)$$

$$(\tau_{ip,s} - \tau_{ip,s-1}) \cdot Z^t_{ip,s+1} \leq Y^t_{ip,s} \leq (\tau_{ip,s} - \tau_{ip,s-1}) \cdot Z^t_{ip,s} \ i,p,t,s \quad (C1.10)$$

$$Z^t_{ip,s} \geq Z^t_{ip,s+1} \ i,p,t,s \quad (C1.11)$$

$$Z^t_{ip,s} \in \{0,1\} \ i,p,t,s \quad (C1.12)$$

Integrality constraints $$F^q_{ipf} \in \{0,1\} \ i,p,q,f \quad (C1.14)$$

$$NFT^t_{ip} \in \text{Integers} \ i,p,t \quad (C1.15)$$

To estimate the operating parameters, described above as part of the output of this model, use Model (C4) (described later).

Computing Maximal Average Levels of Service: Model (C2)
Objective: Given the delivery frequencies and limits on the average number of weeks of (echelon) inventories, this model calculates the maximal average service level that can be obtained.

Input
  Inventory Requirements (R' Line, see Model R)
  Delivery Frequencies
  Limits on Maximal Inventory Investments (in terms of Weeks of Demand).
Output
  Estimated Level of Service
  Estimated Transportation Costs
  Estimated Inventory Levels
Notation
  We use the same notation as in Model C1 plus the following:
  $\alpha^t_{ij}$—"projected" (i.e. "lead-time" periods after period t) level of service for product j in DC I at period t.
  $T_{ip}$—a given set of periods in which replenishment (from plant p to DC I) is permitted.
  $w_{ij}$—values of objective coefficients (see discussion later)
Algorithm Steps: The following problem is of interest:

Problem (C2): $\text{MAX} \sum_{q \in Q} \sum_{i \in I} \sum_{t \in Q_q} \sum_{j \in J^i} w_{i,j} \cdot \alpha^t_{ij}$

S.T.
  (C2.1) (C1.1)
  (C2.2) (C1.2)
  (C2.3) (C1.5)

Formula used to approximate the "projected" level of service (see Model (OR1):

$$\alpha^t_{ij} = \Phi\left(\frac{X^t_{ij} - \mu^t_{ij}}{\sigma^t_{ij}}\right) \; i, j, t \qquad (C2.4)$$

No delivery can be made in periods that are not compliant with the given delivery frequencies $$S^t_{ij} = 0 \text{ for all } t \notin T_{ip} \; i,j,t \qquad (C2.5)$$

Note that Problem (C2) is separable both in I and in q. In addition, in order to deal with the non-linear constraint (C2.4) we approximate the Standard-Normal cumulative distribution function ($\Phi$) by a piece-wise linear function (with m segments); for further details, see below.

As in Model (C1), we define for the piece-wise linear function the parameters and variables (for further details, see below):
  m—number of "segments" in the piece-wise linear function.
  $\theta_s$—the s-th breakpoint of the piece-wise linear function (s=0, ..., m); i.e. the s-th segment is given by [$\theta_{s-1}$, $\theta_s$].
  $\partial_s$—the slope of the s-th segment of the piece-wise linear function (s=1, ..., m).
  $Z^t_{j,s}$—the binary variables associated with this transformation.
  $Y^t_{j,s}$—the continuous variable associated with this transformation.

In the following problems we use $Z^t_{j,s}$ and $Y^t_{j,s}$ with respect to $$T = (X^t_{ij} - \hat{\mu}^t_{ij})/\hat{\sigma}^t_{ij},$$

see below.

Problem $(C2)^q_i$: $\text{MAX} \sum_{t \in Q_q} \sum_{j \in J^i} w_{i,j} \cdot \alpha^t_{ij}$ S.T.
  (C2'.1) (C1.1) only for the relevant value of i and $t \in Q_q$
  (C2'.2) (C1.2) only for the relevant value of i and $t \in Q_q$
  (C2'.3) (C1.5) (single constraint)
See the discussion herein for details on (C2'.4)–(C2'.8):

$$\alpha^t_{ij} \sum_{s=1}^{m} \partial_s \cdot Y^t_{j,s} \; j, t \qquad (C2'.4)$$

$$(\theta_s - \theta_{s-1}) \cdot Z^t_{j,s+1} \leq Y^t_{j,s} \leq (\theta_s - \theta_{s-1}) \cdot Z^t_{j,s} \; j,t,s \qquad (C2'.5)$$

$$Z^t_{j,s} \geq Z^t_{j,s+1} \; j,t \; s=1, \ldots, m-1 \qquad (C2'.6)$$

$$Z^t_{j,s} \in \{0,1\} \; j,t,s \qquad (C2'.7)$$

$$\sum_{s=1}^{m} Y^t_{j,s} = (X^t_{ij} - \hat{\mu}^t_{ij})/\hat{\sigma}^t_{ij} \; j, t \qquad (C2'.8)$$

(C2'.9) (C2.5) only for the relevant value of I
Remarks
  The weights $w_{ij}$ should be set such that $$\sum_{t \in Q_q} \sum_{j \in J^i} w_{i,j} = 1$$

To determine the appropriate weights one should consider the relevant factors that need to be taken into account (e.g. priorities, demand volumes, etc.) In case that some products have low service levels, the problem can be resolved with the addition of the following constraint $$\alpha^t_{ij} \geq \phi_{ij} \; j,t \qquad (C2'.10)$$

where $\phi_{ij}$ are pre-specified lower bounds on the level of service. Another option, which does not require the specification of $\phi_{ij}$ is $$\alpha^t_{ij} \geq \eta \cdot \sum_{t \in Q_q} \sum_{j \in J^i} w_{i,j} \cdot \alpha^t_{ij} \; j, t, \qquad (C2'.11)$$

with $\eta \leq 1$.

Minimizing Average DC Echelon Inventory Levels:
Model (C3)
Objective: Given the delivery frequencies and required service levels, this model computes the minimal average number of weeks of inventories at each one of the DCs in every quarter.
Input
  Inventory Requirements (R' Line, see Model R)
  Delivery Frequencies
  Required Service Levels (in Terms of Stock-out Probabilities)

Output
  Estimated Level of Service
  Estimated Transportation Costs
  Estimated Inventory Levels
Notation
  We use the same notation as in Model C2 plus the following:
  p(j)—the plant in which product j is produced,
  q(t)—the quarter to which period t belongs,
  $R^t(i,j)$—this is the inventory requirement as defined for Model R, but without the subscript f.
It now refers to the given delivery frequency from plant p(j) to DC I in quarter q(t).
  $AVG^t_i$—the average echelon inventory level in terms of weeks of demand (for DC I in quarter q).
Algorithm Steps
  For each DC I in I:
  Step 1: For each product j, $j \in J^i$:
  Solve the following problem:

$$\text{MIN} \sum_t X^t_{ij}$$

S.T.
  (C3.1) (C1.1) (single constraint)
  (C3.2) (C1.2)
  Beginning inventories must satisfy minimal requirements:

$$X^t_{ij} \geq R^t(i,j) \; t \in T_{ip(j)} \quad (C3.3)$$

End For (j)
  Step 2: For each q in Q
  Calculate the value $$AVG^q_i = \frac{1}{|Q_q|} \cdot \frac{1}{|J^i|} \cdot \left[ \left( \sum_{j \in J^i} \sum_{t \in Q_q} X^t_{ij} \Big/ \sum_{j \in J^i} \sum_{t \in Q_q} \mu^t_{ij} \right) - \frac{1}{2} \right] \quad (C3.4)$$

End For (q)
  End For (I)
Computation of Operating Parameters: Model (C4)
Objective
  Given a delivery plan (i.e. the values $S^t_{ij}$), this model computes the following operating values: (1) estimated inventory levels, (2) estimated levels of service, and (3) estimated transportation costs.
Input
  Delivery Plan ($S^t_{ij}$).
Output
  Estimated Level of Service
  Estimated Transportation Costs
  Estimated Inventory Levels
Notation
  $p^i$—Set of all plants that replenish DC I.
Algorithm Steps
  For each DC I in I:
  Step 1: Evaluate the expected (echelon) inventory positions at the beginning of each period via the equations (C1.1), (C1.2)
  Step 2: For each quarter q in Q
    2.1 Evaluate the value $AVG^t_i$ via (C3.4)
    2.2 Evaluate the expected levels of service ( ) via (C2.4).
    2.3 Evaluate total transportation costs over the quarter (can be done by an external procedure) for each plant.
  End For (q)
Check Compatibility of a Given Set of Constraints: Model (C5)
Objective
  This model checks whether a set of constrains (service levels, maximal echelon inventory levels and delivery frequencies) is compatible or not.
Input
  Inventory Requirements (R' Line, see Model R)
  Set of Possible Delivery Frequencies
  Required Service Levels (in Terms of Stock-out Probabilities)
  Limits on Maximal Inventory Investments (in terms of Weeks of Demand)
Output
  Feasibility (Yes or No)
Algorithm Steps
  For each I in I:
  Step 1: For each plant $p \in P$:
    Select the most frequent among the feasible delivery frequencies from plant p to DC I (this represent the less restrictive constraint).
    For this delivery frequency, evaluate the inventory requirements $R^t(i,j)$ by using Model R.
    Calculate the values $X^t_{ij}$ as in Model C4.
  End For (p)
  Step 2: For each q in Q
    Evaluate the value $AVG^t_i$ via (C3.4)
    Check that $$AVG^q_i \leq \overline{x}^q_i$$

is satisfied. If not, STOP! the set of constraints is incompatible.
  End For (q)
  End For (I)
Determine Production and Delivery Schedules: Model (C6)
Objective
  This model suggests both production and delivery schedules which minimizes total transportation costs and (in-plant) inventory holding costs. The plan is determined under service level constraints and constraints on average inventories at the DC (echelon) levels.
Input
  Inventory Requirements (R' Line, see Model R)
  Set of Possible Delivery Frequencies
  Required Service Levels (in Terms of Stock-out Probabilities)
  Limits on Maximal Inventory Investments (in terms of Weeks of Demand)
Output
  Delivery Frequencies
  Estimated Level of Service
  Estimated Transportation Costs
  Estimated Inventory Levels
  Estimated In-Plant Inventory Costs
  Proposed Production Plan
Notation
  We use the same notation defined up to this point plus the following:

Parameters
- $h_j$—holding cost, for unit of product j (in plant p(j)), per period.
- $inv^1_j$—inventory of product j in plant (p(j)) at the beginning of the planning horizon.
- M—"big" number (see (C6.5)).

Sets
- I(j)—set of all DCs that carry product j.

Decision variables
- $PROD^t_j$—production batch size of product j in period t.
- $INV^t_j$—inventory of product j in plant p(j) at the beginning of period t.

Algorithm Steps

The following Mixed-Integer Linear Programming problem is solved:

Problem (C6):

$$\text{MIN} \sum_{q \in Q} \sum_{t \in Q_q} \sum_{p \in P} \left[ c_{ip} \cdot NFT^t_{ip} + \text{fix}_{ip} \cdot Z^t_{ip,1} + \sum_s \text{rate}^t_{ip,s} \cdot Y^t_{ip,s} \right] + \sum_{j \in J} h_j \sum_t INV^t_j$$

S.T.

(C6.1) (C1.1)
(C6.2) (C1.2)

Initialize levels of in-plant inventories:

$$INV^1_j = inv^1_j \quad j \quad ((6.3)$$

Inventory dynamics beginning inventory=last period beginning inventory+ production quantity in the last period−goods delivered during the last period:

$$INV^t_j = INV^{t-1}_j + PROD^{t-1}_j + PROD^{t-1}_j - \sum_{i \in T} S^{t-1}_{ij} \quad j, t \quad (C6.4)$$

Delivery can be made only if period t is consistent with the chosen delivery frequency:

$$S^t_{ij} \leq \left( \sum_{f \in F(t)} F^{q(t)}_{i,p(j),f} \right) \cdot M \quad i, j, t \quad (C6.5)$$

(C6.6) (C1.4)
See (C1.3):

$$X^t_{ij} \geq \sum_{f \in F} R^t_f(i, j) \cdot F^q_{ipf}; t \in Q_q \; j \in J_p \; i, p, q \quad (C6.7)$$

(C6.8) (C1.5)
(C6.9) (C1.6)
(C6.10) (C1.7)
(C6.11) (C1.8)
(C6.12) (C1.9)
(C6.13) (C1.10)
(C6.14) (C1.11)
(C6.15) (C1.12)
(C6.16) (C1.14)
(C6.17) (C1.15)

Options for Production Capacity Constraints:

$$PROD^t_j \leq \overline{prod}^t_j \quad j, t \quad (6.18)$$

This set of constraints represents individual limit on production quantity for each product in any period.

$$\sum_{j \in J_p} \lambda^t_j \cdot PROD^t_j \leq cap^t_p \quad p, t \quad (C6.19)$$

This set of constraints is relevant when the different products, manufactured in a certain plant p, share critical capacity resources. Although (C6.19) represent a single constraint for each plant (in a give period t), more constraints can be easily added. Note that both in (C6.18) and in (C6.19) lower bounds can be introduced.

Limits on Storage Capacity

Similarly to (C6.18) and (C6.19), analogous sets of constraints can be constructed in order to express, for each plant: (1) limits on individual storage volumes, and (2) upper limits on total volume (value) of storage, respectively.

Operational Models (OP)

Overview

In this section we describe a family of models, analogous to Models (C1)–(C3). The models are built to assist production and delivery planning for the short-term horizon. The major characteristics of these models are:

Rolling horizon planning: production and delivery plans are made frequently (even before the end of previous planning horizons), thus taking into advantage updated information about demands and production capacities.

High level of details: capacity constraints are more detailed so that the resulting plan will both be feasible and smoothly translated into production orders.

Flexibility in setting non-delivery periods: the user is allowed to specify periods in which delivery cannot be made. This replaces the requirement for following a certain delivery frequency. For instance, even if there is a certain guideline on delivery frequency, it can be relaxed at any (arbitrarily chosen) period. This reflects in added flexibility, which is especially important in cases of unexpected, high levels of demands (i.e. when deliveries must be made quickly).

The number of constraints (per period) is larger in these models, however, the planning horizon is usually much shorter than that of the strategic model. In addition, since we do not need to select certain delivery frequencies there is no need to incorporate the integer variables $F^q_{ipf}$. This results in a significantly faster solution time.

Joint Production-Delivery Plan: Model (OP1)

Description

This model minimizes the total transportation and (in-plant) inventory holding costs (see Model C6 for more details).

Notation

The notation here is similar to that of Model C6 with the addition of the following:

Parameters
- $req^t_{ij}$—requirement for echelon inventory level of product j at DC I in period t, in order to maintain a certain level of "projected" level of service (see Model OR1 for further clarification). This minimal level depends on the delivery schedule, see Model R for explanation on how to calculate these values (very similar to the calculation of the values $R^t_f(i,j)$).

$\bar{x}_i$—the same as $\bar{x}_i^q$ but now without the quarter index.

$cap^t_p(k)$—the availability of resource k in plant p, in period t.

$\lambda^t_j(k)$—the amount of resource k required for a production of unit of product j in period t.

$storage^t_p(k)$—maximal total volume/value (etc.) of inventory remaining at the end of period t in plant p.

$\beta^t_j(k)$—the volume/value (etc.) of unit of product j in period t $setup^t_j$—setup cost to initiate a production batch of product j in period t.

Sets $NoDel_{ip}$—set of periods in which no delivery is allowed from plant p to DC I.

Decision variables $PROD^t_j$—production batch size of product j in period t.
  $INV^t_j$—inventory of product j in plant p(j) at the beginning of period t.
  $SET^t_j$—an integer variable indicating whether a setup is required in period t for product j.

Algorithm Steps

The following Mixed-Integer Linear Programming problem is solved:

$$(OP1): \text{MIN} \sum_{t \in T} \sum_{p \in P} \left[ c_{ip} \cdot NFT^t_{ip} + fix_{ip} \cdot z^t_{ip,1} + \sum_s rate^t_{ip,s} \cdot Y^t_{ip,s} \right] + \sum_{j \in J} h_j \sum_t INV^t_j$$

S.T.

(OP1.1) (C1.1)
(OP1.2) (C1.2)
(OP1.3) (C6.3)
(OP1.4) (C6.4)

Deliveries can be set to zero at any period the user chooses:

$$S_{ij}^t = 0 \quad i,j,t \in NoDel_{i,p(j)} \quad (OP1.5)$$

Echelon inventory levels must exceed certain levels:

$$X_{ij}^t \geq req_{ij}^t \quad i,j,t \quad (OP1.6)$$

(OP1.7) (C1.5)
(OP1.8) (C1.6)
(OP1.9) (C1.7)
(OP1.10) (C1.8)
(OP1.11) (C1.9)
(OP1.12) (C1.10)
(OP1.13) (C1.11)
(OP1.14) (C1.12)
(OP1.15) (C1.14)
(OP1.16) (C1.15)

Production capacity constraints (see also Model (C6)):

$$\sum_{j \in J_p} \lambda^t_j(k) \cdot PROD^t_j \leq cap^t_p(k) \quad p, t, k \quad (OP1.17)$$

Storage capacity constraints (see also Model (C6)):

$$\sum_{j \in J_p} \beta^t_j(k) \cdot INV^t_j \leq storage^t_p(k) \quad p, t, k \quad (OP1.18)$$

Introducing setup costs:

The operational model can be extended so as to include setup costs (and/or setup times) as follows:

$$\sum_{j \in J} setup^t_j \cdot SET^t_j \quad \text{The term}$$

is added to the objective function of Model (OP1). Appropriate set of constraints should be added as well; for instance:

$$SET_j^t \in \{0,1\} \quad (OP2.1)$$

$$PROD_j^t \leq M \cdot SET_j^t \quad (OP2.2)$$

This constraint is pertinent if product j requires a new setup in each period it is produced. (M is a "large" number.)

$$PROD_j^t \leq M \cdot (SET_j^t + SET_j^{t-1}) \quad (OP2.3)$$

(with $SET^0_j$ initialized according to the production/non-production of product j in the last period before the planning horizon). The intuitive behind this constraint is that if a product is produced in a given period, no setup is required at the subsequent period.

Maximizing Short-Term Level of Service: Model (OP2)

Description

The purpose of this model is similar to that of its long-term counterpart, Model (C2). In the same spirit of that model (C2), we change Model (OP1) as follows:

Algorithm Steps $$(OP2): \text{MAX} \sum_{t \in T} \sum_{i \in I} \sum_{j \in J^i} w_{ij} \cdot \alpha_{ij}^t$$

S.T.

(OP2.1) (OP1.1)
(OP2.2) (OP1.2)
(OP2.3) (OP1.3)
(OP2.4) (OP1.4)
(OP2.5) (OP1.5)
(OP2.6) (OP1.7)
(OP2.7) (C2'.4)
(OP2.8) (C2'.5)
(OP2.9) (C2'.6)
(OP2.10) (C2'.7)
(OP2.11) (C2'.8)
(OP2.12) (OP1.5)
(OP2.13) (OP1.17)
(OP2.14) (OP1.18)

Remarks

Constraints (OP2.7)–(OP2.11) use the piece-wise linear approximation to the Standard-Normal cumulative distribution function (CDF), see below.

For explanation about the coefficients $w_{ij}$, see Model $(C2)^q_i$.

Note that in this case, in contrary to Model C2, the problem is not separable in I. This is due to the capacity and storage constraints (OP2.13) and (OP2.14), respectively.

Minimizing Average DC Echelon Inventory Levels: Model (OP3)

Description

This model is analogous to the long-term model, (C3). We modify Model (OP1) as follows:

Algorithm Steps

Step 1: solve the following problem:

$$(OP3):\ MIN \sum_{t \in T} \sum_{i \in I} \sum_{j \in J^i} X_{ij}^t$$

S.T.

(OP3.1) (OP1.1)
(OP3.2) (OP1.2)
(OP3.3) (OP1.3)
(OP3.4) (OP1.4)
(OP3.5) (OP1.5)
(OP3.6) (OP1.6)
(OP3.7) (OP1.17)
(OP3.8) (OP1.18)

Step 2: For each DC I:
Compute the values (OP3.9)

$$AVG_i = \frac{1}{|T|} \cdot \frac{1}{|J^i|} \cdot \left[ \left( \sum_{t \in T} \sum_{j \in J^i} X_{ij}^t \Big/ \sum_{t \in T} \sum_{j \in J^i} \mu_{ij}^t \right) - \frac{1}{2} \right]$$

End For (I)

TABLE 13

Usage of VMR Models

| MODEL | WHERE USED |
|---|---|
| Inventory positioning models for multi-item and two echelons: | Strategic Planning/ Operational Planning |
| Setting inventory requirements Estimating stock-out probability for a given replenishment quantity | |
| Strategic models for VMR contract setup: Computing maximal average service levels Minimizing average DC echelon inventory levels Computing optimal operating parameters Checking compatibility of a given set of constraints Determining production and delivery schedule | Strategic Planning |
| Operational models Determining joint production-delivery plan Maximizing short-term service levels Minimizing average DC echelon inventory levels | Operational Planning |

Component Procurement Policy Development (CPPD) 230

Objective

Determine which procurement policy should be used for which component.

Scope

All components in planning bill of materials.

Features

Heuristic to identify the procurement policy to use for each component. The policies considered are: Just in Time; Bulk purchase, managed via stock policy, such as (s, S); and MRP calculus implying periodic purchase orders. Finished Goods Distribution Network Design (FGND) 292

Objective

Determine the number, location and capacity of distribution warehouses from a given set of potential locations.

Scope

Distribution network excluding VMR arrangements.

Features

Use market demand projections to reengineer the existing distribution network.

Global optimization of system-wide costs including inbound /outbound transportation, fixed and variable warehousing, and inventory carrying costs.

Model Engine Utilities 22

In addition to the seven modules defined above, there is also a group of general purpose numerical routines that are not specific to any of the above seven modules. These routines are collected into a design element referred to as the Model Engine utilities 22, as shown in FIG. 35A. Examples of the Model Engine utilities 22 include generic linear programming solvers, and statistical analysis routines.

An Approximation of the Standard Normal Distribution Function

In this section, we suggest few continuous. piece-wise linear approximations for the cumulative Standard Normal distribution curve. We use the following notation throughout:

$$\Phi(z) \approx \begin{cases} 0 & \text{if } \theta_0 \equiv -\infty < z < \theta_1 \\ \alpha_2 + \partial_2 \cdot (z - \theta_1) & \text{if } \theta_1 \leq z < \theta_2 \\ M & M \ \vdots \\ 1 \ \vdots & \text{if } \theta_{m-1} \leq z < \theta_m \equiv +\infty \end{cases} \quad (A.1)$$

This function consists of m segments, s=1, . . . , m. Each segment s, ranges from break-point $\theta_{s-1}$ to break-point $\theta_s$. The slope of segment s is denoted by $\partial_s$. Hence, any segment s can be written as the linear function $a_s + \partial_s (\theta_s - \theta_{s-1})$. In our model we limit the functions to be continuous (although unnecessary), thus having $$\alpha_s = \begin{cases} \sum_{l=1}^{s-1} \partial_l \cdot \begin{matrix} 0 & \text{for } s = 1 \\ (\theta_l - \theta_{l-1}) & \text{for } s \geq 2 \end{matrix} \end{cases} \quad (A.2)$$

Note that in order to define the piece-wise linear function we only require the values $\theta_s$, s=1, . . . , m−1 and $\partial_s$, s=2, . . . , m−1 (since $\partial_1 = \partial_m = 0$).

TABLE 14

Suggested functions to approximate normal distribution

| Type | | | Remarks |
|---|---|---|---|
| Symmetric, 7 segments | $_1$ = −2.7, $_2$ = −1.8, $_3$ = −0.9, $_4$ = 0.9, $_5$ = 1.8, $_6$ = 2.7 | $_2$ = 0.039923, $_3$ = 0.164589, $_4$ = 0.351044, $_5$ = 0.164589, $_6$ = 0.039923 | Enables to reach reasonable level of accuracy over all |

TABLE 14-continued

Suggested functions to approximate normal distribution

| Type | | | Remarks |
|---|---|---|---|
| Symmetric, 5 segments | $_1 = -2.7$, $_2 = -1.4$, $\theta_3 = 1.4$, $_4 = 2.7$ | $_2 = 0.057692$, $_3 = 0.660714$ $\theta_4 = 0.057692$ | argument's values. Less accurate then the 7 segments, but requires less binary decision variables. |
| Asymmetric, 7 segments | $_1 = -2.5$, $_2 = -1.1$, $_3 = 1.1$, $_4 = 1.7$, $_5 = 2.15$, $_6 = 2.9$ | $_2 = 0.096904$, $_3 = 0.331213$, $_4 = 0.151834$, $_5 = 0.063973$ $_6 = 0.021037$ | Reaches good accuracy levels for the highest cumulative values. |

Introducing Piece-wise Linear Function Into a Mixed-Integer Linear Programming (MILP)

Consider an LP/MILP which minimizes a (linear) function of the decision variables $X=(X_1, \ldots, X_M, \ldots, X_N)$ and their piece-wise linear functions $F_1(X_1), \ldots, F_M(X_M)$, $M \leq N$. That is, an objective function of the type $$\text{Min} \sum_{i=1}^{N} c_i X_i + \sum_{i=1}^{M} d_i F_i(X_i) \tag{B.1}$$

with all $d_i > 0$. Similarly to the variables $X_1, \ldots, X_M, \ldots, X_N$, the functions $F_i(X_i)$ can appear in the (linear) constraints without any limitation; i.e. the constraints are of the type $$\sum_{i=1}^{N} a_i X_i + \sum_{i=1}^{M} e_i F_i(X_i) \geq b \tag{B.2}$$

For simplicity, but without loss of generality, we assume M=1. Also, for clarity, we rename the variable $X_1=T$. We thus describe a technique that transforms the function $F(T)$ into a new decision variable, say H, such that the relationship $H=F(T)$ is maintained for any solution obtained by solving the new MILP.

Algorithm Steps

Let the function $F: \Re^+ \to \Re$, be as follows:

$$F(T) = \begin{cases} 0 & T = \tau_0 \equiv 0 \\ F(\tau_0) + \delta_0 + \gamma_1 \cdot T & \tau_0 \equiv 0 < T \leq \tau_1 \\ F(\tau_1) + \delta_1 + \gamma_2 \cdot (T - \tau_1) & \tau_1 < T \leq \tau_2 \\ M : & M : \\ F(\tau_{s-1}) + \delta_{s-1} + \gamma_s \cdot (T - \tau_{s-1}) & \tau_{s-1} < T \leq \tau_s \\ F(\tau_{m-1}) + \delta_{m-1} + \gamma_m \cdot (T - \tau_{m-1}) & M : \\ & \tau_{m-1} < T < \tau_m \equiv \infty \end{cases} \tag{B.3}$$

F consists of m segments; segment s is given by $[\tau_{s-1}, \tau_s]$. We now introduce the following 2m decision variables:

$Y_s$—Is a continuous variable ($Y_s \in \Re^+$) that represents the part of segment s "covered" by T, $s=1, \ldots, m$; that is, $$Y_s = \max \{\min \{\tau_m, T\} - \tau_{m-1}, 0\} \tag{B.4}$$

$I_s$—Is a Binary variable ($I_s \in \{0, 1, 2, \ldots \}$) that indicates whether) that indicates whether T covers any positive part of segment s; that is, $$I_s = \begin{cases} 0 \text{ if } T > \tau_{m-1} \\ 1 \text{ otherwise} \end{cases} \tag{B.5}$$

To modify the current LP/MILP we do follow the steps below:

Replace each $F(T)$ by the term $$F(T) \to \sum_{s=0}^{m-1} \delta_s \cdot I_{s+1} + \sum_{s=1}^{m} \gamma_s \cdot Y_s \tag{B.6}$$

Add the following constraints:

$Y_s$ (s=1, ..., m) are the split of T into the segments. Hence, $$\sum_{s=1}^{m} Y_s = T \tag{B.7}$$

To maintain (B.5), $$(\tau_s - \tau_{s-1}) \cdot I_{s+1} \leq Y_s \leq (\tau_s - \tau_{s-1}) \cdot I_s; \; s=1, K, m-1 \tag{B.8}$$

Other constraints:

$$I_s \geq I_{s+1}; \; s=1, K, m-1 \tag{B.9}$$

$$I_s \in \{0,1\}; \; s=1, K, m \tag{B.10}$$

Mean

This algorithm computes the statistical sample mean of a given time series for a given period of time.

$$\overline{X} = \frac{i}{n} \sum_{t=1}^{n} X_t$$

The input for the routine is the time series, and time periods that the mean is computed over. The output is the unbiased sample mean quantity $$\overline{X}$$

Standard Deviation

The algorithm computes the statistical sample standard deviation of a given time series for a given period of time.

$$\sigma_x = \sqrt{\frac{1}{n-1} \sum_{t=1}^{n} (X_t - \overline{X})^2}$$

The input for the routine is the time series X, and time periods n that the standard deviation is computed over. The output is the unbiased sample standard deviation quantity $\sigma_x$.

Moving Average

The algorithm computes the moving averages for a given time series for a given period of time with specified averaging periods.

$$X_k(K) = \frac{1}{K}\sum_{t=k}^{k+K-1} X_t \text{ for } k = 1, K, n - K + 1.$$

The input for the routine is the time series X, time periods n that the moving average is computed over, and the moving average period length K. The output is the moving average quantity $$X(K) = (X_k(K))_1^{n-K+1}$$

Seasonality Factors and Trend
Seasonality Factors

The algorithm computes the seasonality factors for a given time series for a 12-month year period. The input for the routine is the time series, and time periods that the moving average is computed over (at least two seasonal cycles). The output is the seasonality factors.

Trend

The algorithm computes the trend information for a given time series for a given period of time. The input for the routine is the time series, and time periods that the trend is computed over. The output is the trend value of the time series.

There are several different methods to calculate the seasonality factors and the trend in a time series. The most popular ones include Winter's conventional linear and seasonal exponential smoothing, and (multiplicative) decomposition method developed by the U.S. Census Bureau, and its variant X-11 method).

Correlation Coefficient

This algorithm computes the correlation coefficient for a given pair of time series with properly defined time periods (there might be certain shifts in time periods in the two time series).

$$r(X, Y) = \frac{\sum_{t=1}^{n}(X_t - \bar{X})(Y_t - \bar{Y})}{\sqrt{\sum_{t=1}^{n}(X_t - \bar{X})^2(Y_t - \bar{Y})^2}}$$

The input for the routine is the pair of two time series X and Y, and corresponding time periods n used to compute the correlation coefficient for the two time series. The output is the correlation coefficient r(X,Y).

Curve Interpolation

This conventional algorithm determines a curve with desirable shape to link a set of given points on a 2-dimensional space. The input for the routine is the set of given points, and the desired curve shape. The output is the curve that satisfies the required conditions.

Weighted Sum of Two Time Series

The algorithm computes the weighted sum of two time series.

$$Z_t = \alpha X_t + \beta Y_t.$$

The input for the routine is the two time series X and Y, the weight factors $\alpha$ and $\beta$ and the given time periods n. The output is the weighted sum time series $$Z = (Z_t)_1^n.$$

Coefficient of Variation

This algorithm computes the coefficient of variation for a given time series using unbiased statistical mean and standard deviation.

$$c_x = \frac{\sigma_x}{\bar{X}}$$

The input for the routine is the time series X and the given time periods n. The output is the coefficient of variation for the time series $c_x$.

Goodness-of-Fit (Measure of Accuracy)

This algorithm computes the goodness-of-fit (measure of accuracy) for a given pair of time series: one is the original time series and the other is the simulated one. The input for the routine is the pair of two time series, and corresponding time periods used to compute the goodness-of-fit for the two time series. The output is the goodness-of-fit (one measure of accuracy) for a given simulated method. The measure of accuracy can take one of the following forms (assume that $X = X_t)_1^n$ is the original time series, $F = (F_t)_1^n$ is the forecast time series and $e_i = X_i - F_i$ are the error terms):

$$\text{Mean Error: } ME = \frac{1}{n}\sum_{i=1}^{n} e_i$$

$$\text{Mean Absolute Deviation: } MAD = \frac{1}{n}\sum_{i=1}^{n} |e_i|$$

$$\text{Mean Squared Error: } MSE = \frac{1}{n}\sum_{i=1}^{n} e_i^2$$

$$\text{Standard Deviation of Errors: } SDE = \sqrt{\frac{1}{n-1}\sum_{i=1}^{n} e_i^2}$$

$$\text{Percentage Error: } PE_t = \frac{X_t - F_t}{X_t} 100$$

$$\text{Mean Percentage Error: } \frac{1}{n}\sum_{i=1}^{n} PE_i$$

$$\text{Mean Absolute Percentage Error: } MAPE = \frac{1}{n}\sum_{i=1}^{n} |PE_i|.$$

Regression Equation

This conventional algorithm computes the coefficients of a regression equation for a given set of time series. We will choose a standard computational routine to calculate these coefficients. The input to this routine is the set of time series. The output will be the calculated coefficients of the regression equation.

Supply Chain Frame Manager 24
Overview

A Frame 16 is designed to integrate User Interfaces, models, analysis routines and data in order to address a set of related decision issues. The Supply Chain Frame Manager 24 constitutes the backbone of the DSS 10 through which the User Interfaces, the models in the modules and the data are connected. The Supply Frame Chain Manager 24 facilitates the integration of the client side of the system, with which the user interacts, with the server side of the system where the modules and the DSS Database 12 reside.

Figure 34:
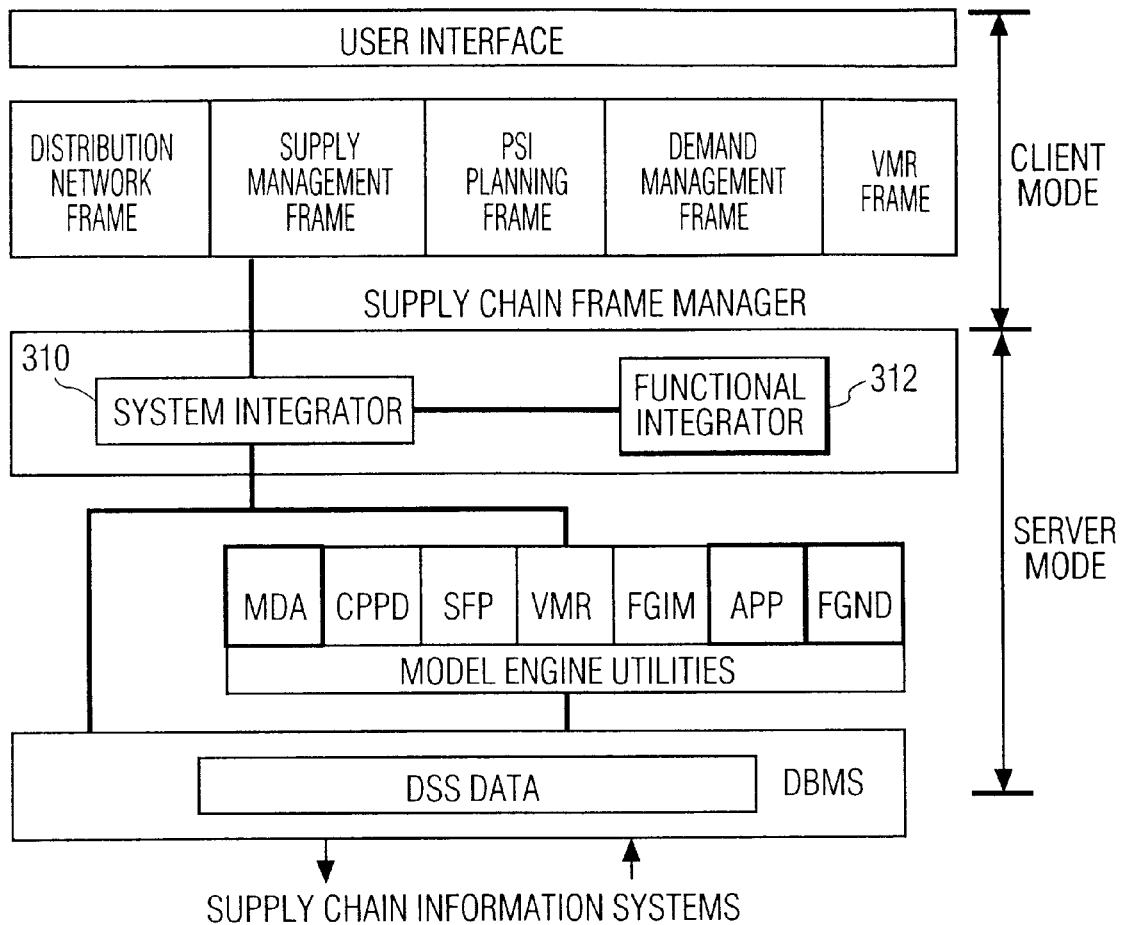
FIG. 34 Supply Chain Frame Manager: High Level Architecture.

The Supply Chain Frame Manager 24 is responsible for two types of integration: System Integration and Functional Integration. The System Integrator 310 (see FIG. 34) is responsible to interpret the client's request, dispatch the request to the appropriate servers and to coordinate the computation load and data access. The Functional Integrator 312 provides the functionality associated with overall supply chain instead of individual frame. These functionalities include Supply Chain Configuration, Domain Management, user access or privilege administration and performance monitoring or simulation.

System Integration

The Frame Manager 24 is responsible for the client-server integration in the DSS 10. In this aspect, the Frame Manager 24 provides the linkage between the Frames 16, Model Engine 20 and the DSS Database 12; responds to the decision requests from the client programs by accessing the models and data; and maintains the "component objects" (e.g., object linking and embedding OLE objects) that share functionality between different Frames 16. Based on the decision requests, the Frame Manager 24 launches the appropriate object with the appropriate data, manages the requests from different clients for the same service and executes the appropriate server programs. The server programs execute the request, and return the results to the Frame Manager 24. The Frame Manager 24 will interpret and return the results to the Frames 16.

Figure 35:
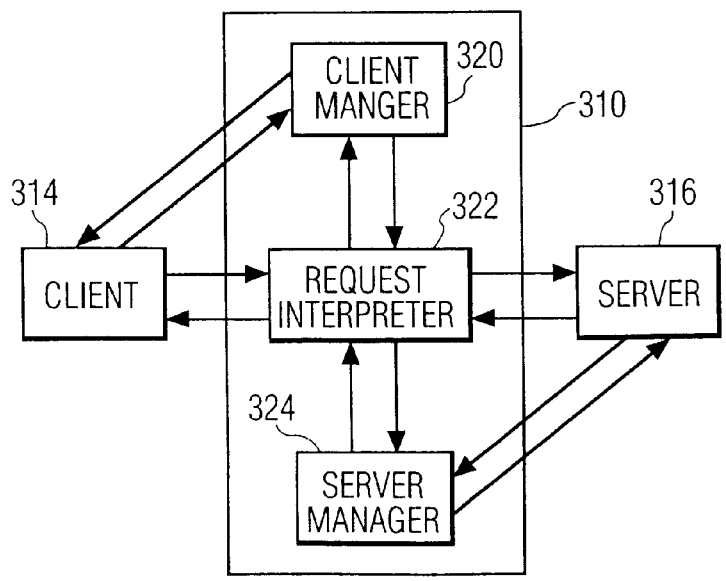
FIG. 35 High Level Architecture of the System Integrator.

The high level architecture of the System Integrator 310 is shown in FIG. 35 and includes a Client Manager 320, a Request Interpreter 322 and a Server Manager 324.

The architectural design of the Frame Manager 24 reflects maximum flexibility and robustness of the DSS 10. The client side includes all the User Interface 18 of each Decision Support Frame, such as Demand Management, Supply Management, etc. The Frame Manager 24 includes two major pieces, the Functional Integrator 312 and the System Integrator 310. Two other components running on the server side are Decision Support System Database (DSS Database 12) and the Mathematical Model Engines 20. The client program 314 talks to the Frame Manager 24. The Frame Manager 24 is the one responsible to call individual components running on the server to fulfill the client's request.

For example, a user is working on a PSI frame to develop production plan for a specific scenario. After deciding several key parameters, the user wants to check on the production capacity. The user makes this request from the User Interface 18 (click a button or select a menu item). The request is sent to the Frame Manager 24. The Frame Manager 24 interprets the request and determines that it needs to move the Capacity Checking Model to get the answer. (In a more general case, it may need to call more than one Model to accomplish the job.) Then the Frame Manager 24 determines whether a model Server already running and on which machine it is running. If there is one, it sends the capacity checking request, along with the necessary data, to that server. If there is no Server running at that time, the Frame Manager 24 will start up one on a selected machine and sends the request there. Sophisticated dispatching policies can be implemented at the Frame Manager 24 to balance the load or improve response times. After the Model Engine 20 finishes the job, it returns the result to the Frame Manager 24. The Frame Manager 24 then synthesizes the result and returns the result to the client.

When the Frame Manager 24 calls the Model Engine 20, it has two options in terms of passing the data. First, it can obtain the data from the DSS Database 12 and pass it to the Model Engine 20. This will be done when the amount of data that need to be sent to the Model Engine 20 is not very large. The advantage of this approach is that the particular Model Engine 20 does not require the capability to access DSS Database 12. But the data has to travel from DSS Database 12 to Frame Manager 24 and then from Frame Manager 24 to the Model Engine 20. The second way to pass data to the Model Engine 20 is for the Frame Manager 24 to only pass the key information directly to the Model Engine 20. Then the Model Engine 20 accesses the data directly from the DSS Database 12 using the key information. This will be used when the amount of data needed by the Model Engine 20 is quite substantial, e.g. a situation of solving a Linear Programming model. The key information passed from the Frame Manager 24 to the Model Engine 20 will include the location of the DSS Database 12, among others.

The Client 314 only interacts with the System Integrator 310 part of the Frame Manager 24. The Functional Integrator 312 part of the Frame Manager 24 provides the functionality through the System Integrator 310. The relationship between the Functional Integrator 312 and the System Integrator 310 is logically the same as the relationship between the Model Engine 20 and the System Integrator 310.

The System Integrator 310 in turn is composed of the Client Manager 320, the Request Interpreter 322 and the Server Manager 324. The Client Manager 320 manages and monitors the client connection. For example, it may disconnect a client if the client's machine is down or if the client is inactive for extended period of time. The Server Manager 324 manages the server side connection. It is responsible to start up and shut down servers. It is also manages disparching. The Request Interpreter 322 is the one that the client directly interact with. It will parse the client request and generate request to the servers. It will consult with the Server Manager 324 before making connection to one specific server.

Figure 36:
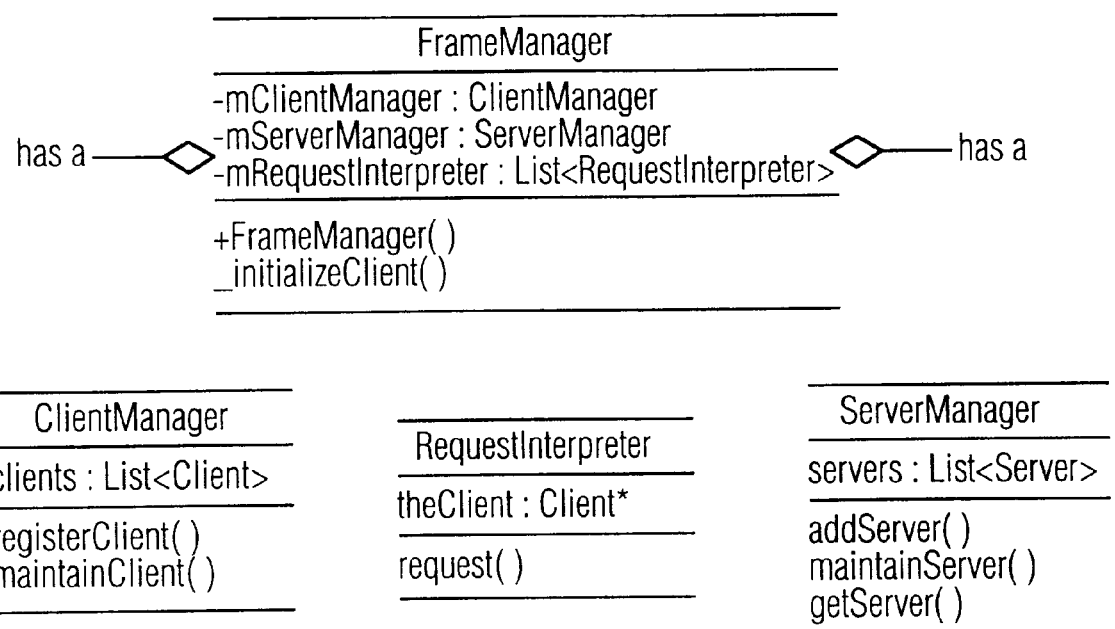
FIG. 36 High level object representation of the system integrator portion of the frame manager.
Figure 37:
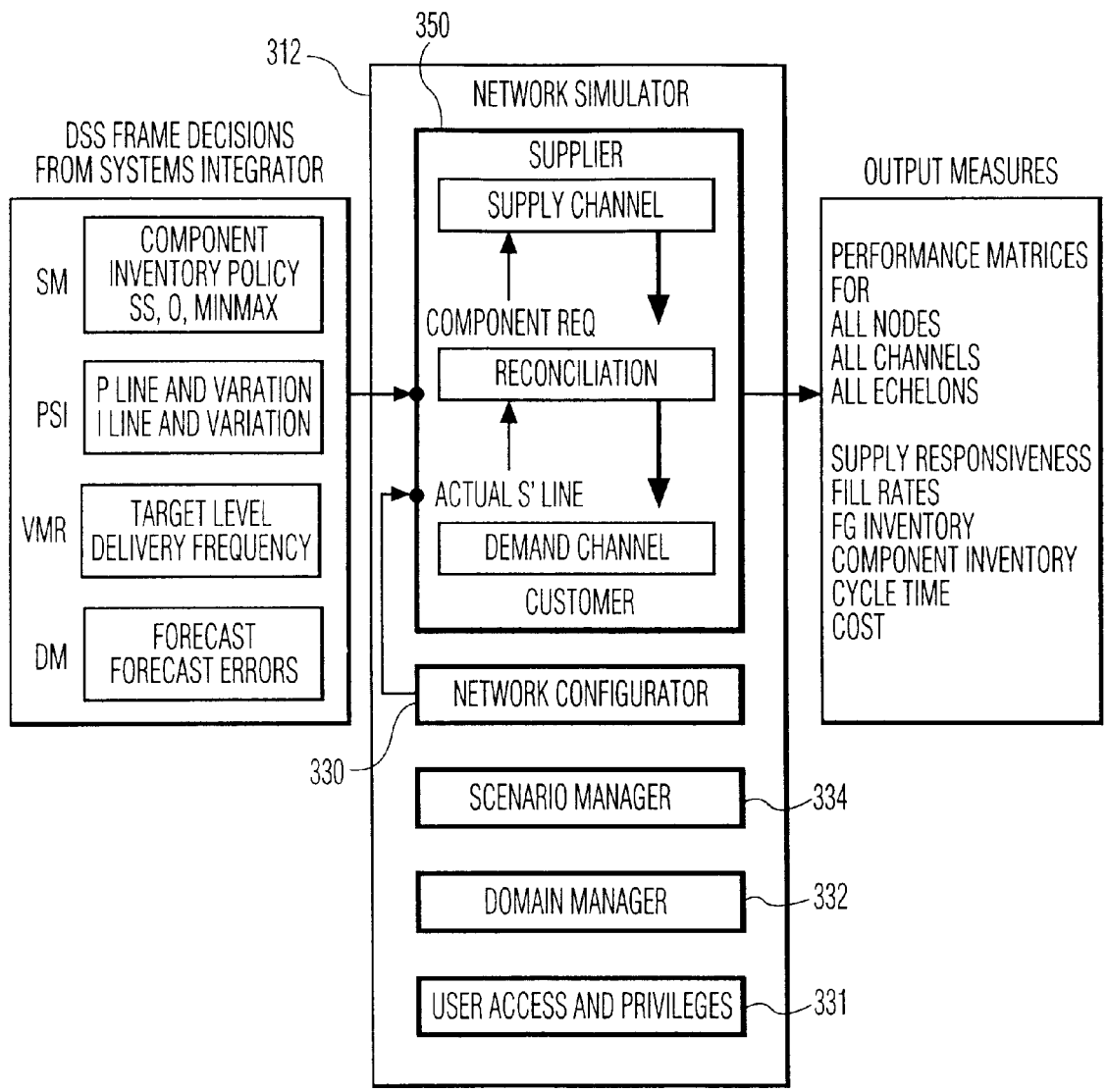
FIG. 37 High Level Architecture of the Functional Integrator.

The high level object representation of the system integrator 310 portion of the Frame Manager 24 is shown in FIG. 36 and the high level architecture is depicted in FIG. 37. The implementation documentation can be found in Appendix C.

Functional Integration

The Functional Integrator 312 enables the advanced user to define the supply chain configuration, manages user access and privileges, supports and enables the customization of the DSS 10, manages domains to support user defined data groupings, manages user defined Scenarios 78 and ensures data consistency across the DSS 10, and dynamically monitors the impact of the user's decisions on the performance of the entire supply chain by using supply chain simulation.

Supply Chain Configuration

The Supply Chain Frame Manager 24 allows the advanced user to specify the configuration of the supply chain. The advanced-user will be able to specify the structural (static) elements of the supply chain. These include: Customers or Equipment; Products or Repair Items; Components; Production Resources or Repair Resources; For each of these structural elements, the advanced user will be able to define the various attributes such as; Names and the values of features; Group definitions; and Nodes and locations.

Figure 38:
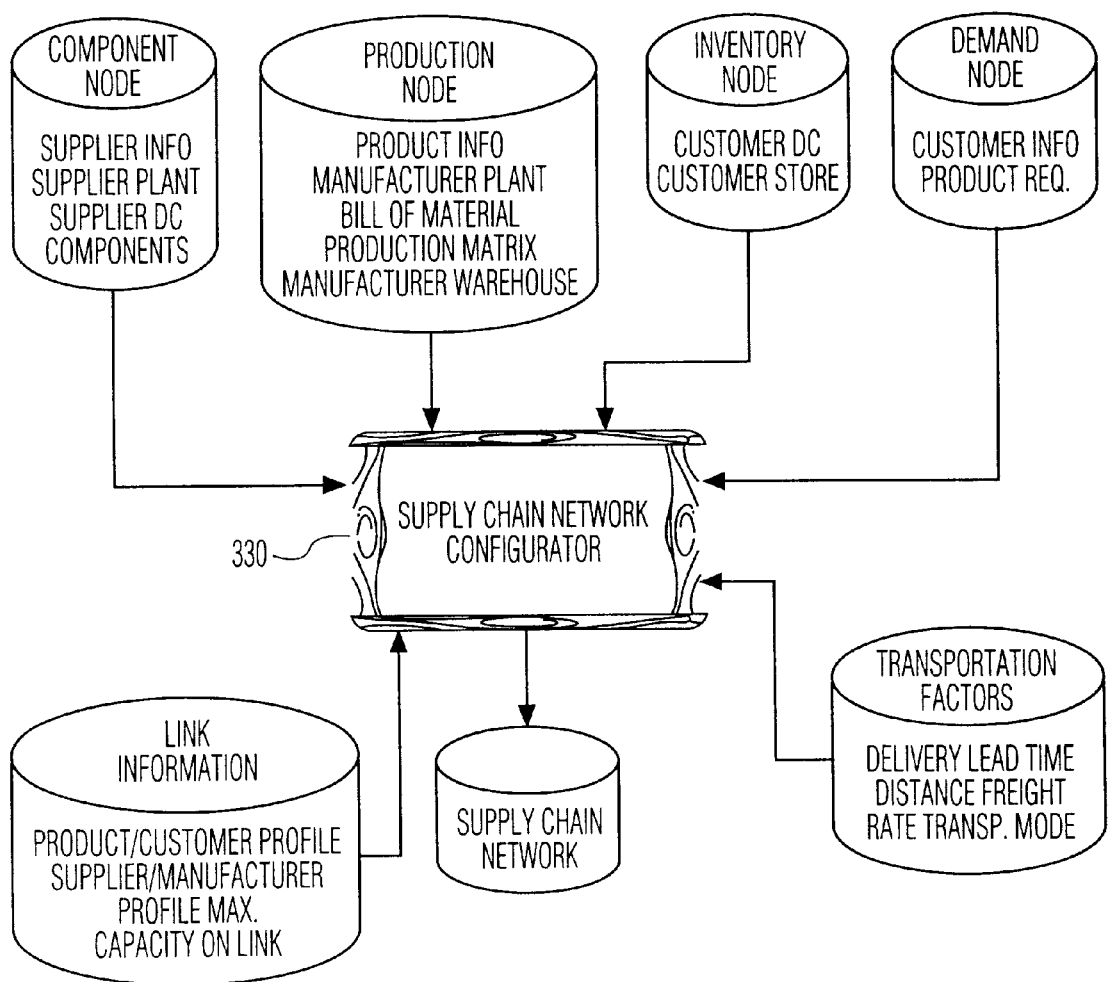
FIG. 38 Data Flow Diagram for the Supply Chain Network Configurator.

In addition, the advanced user will be able to define the inter-relationships between these structural elements. These interrelationships include: Distances, costs, and flow limits on the arcs between the various nodes of the network; Customer-Product-Resource (Equipment-Repair Item-Resource) relationship matrix; Bill of Material structure that relates components to products; and Production Matrix that relates production resources (repair resources) to products (repair items). The data flow diagram associated with the Supply Chain Network Configurator 330 is shown in FIG. 38.

User Access and Privileges

The DSS 10 is a secure system where a userid and password are required for access and is managed by a User Access and Privileges Manager 331. An account consists of a userid, password and membership in various groups. A user derives rights from group membership that can be individually amended. The DSS System Administrator is responsible for assigning each user to a group and assigning rights to every new account. The lowest access possible allows read only access to one specific frame, with no ability to save Scenarios 78 or domains. Each table in the DSS 10 database 12 has a designated owner. Only the owners are allowed to update the DSS Database 12. A scenario can be used to update the DSS Database 12 when the user who generated it is the owner of the data table that needs update.

Customization

The DSS 10 is customizable to the application and environment where the tool will be used. The customization involves: Terminology and nomenclature, Modules and models in the Model Engine 20, Displays and reports, and Graphical User Interface objects.

The first two aspects of customization are administered by the analyst/systems administrator. For the last two points of customization, the user has the flexibility to customize displays, reports and GUI objects. The DSS 10 uses the proper terminology in the User Interface 18 for the information presented to be clear and intuitive. The DSS 10 conforms to the user's environment and nomenclature. The DSS 10 uses a table of terminology to implement the nomenclature suitable to the user's application environment. Images on buttons as well as text are dynamically adapted to the local environment at either the time of installation or execution. Screen appearance elements, such as colors and fonts, are modifiable through a User Preferences window. The user has the ability to change the layout of screen elements.

Domain Management

The Supply Chain Frame Manager 24 provides the user with the ability to define combinations of products, customers, and resources to be reused in the context of various analyses. These are called Data Domains and are managed by a Domain Manager 332.

Figure 39:
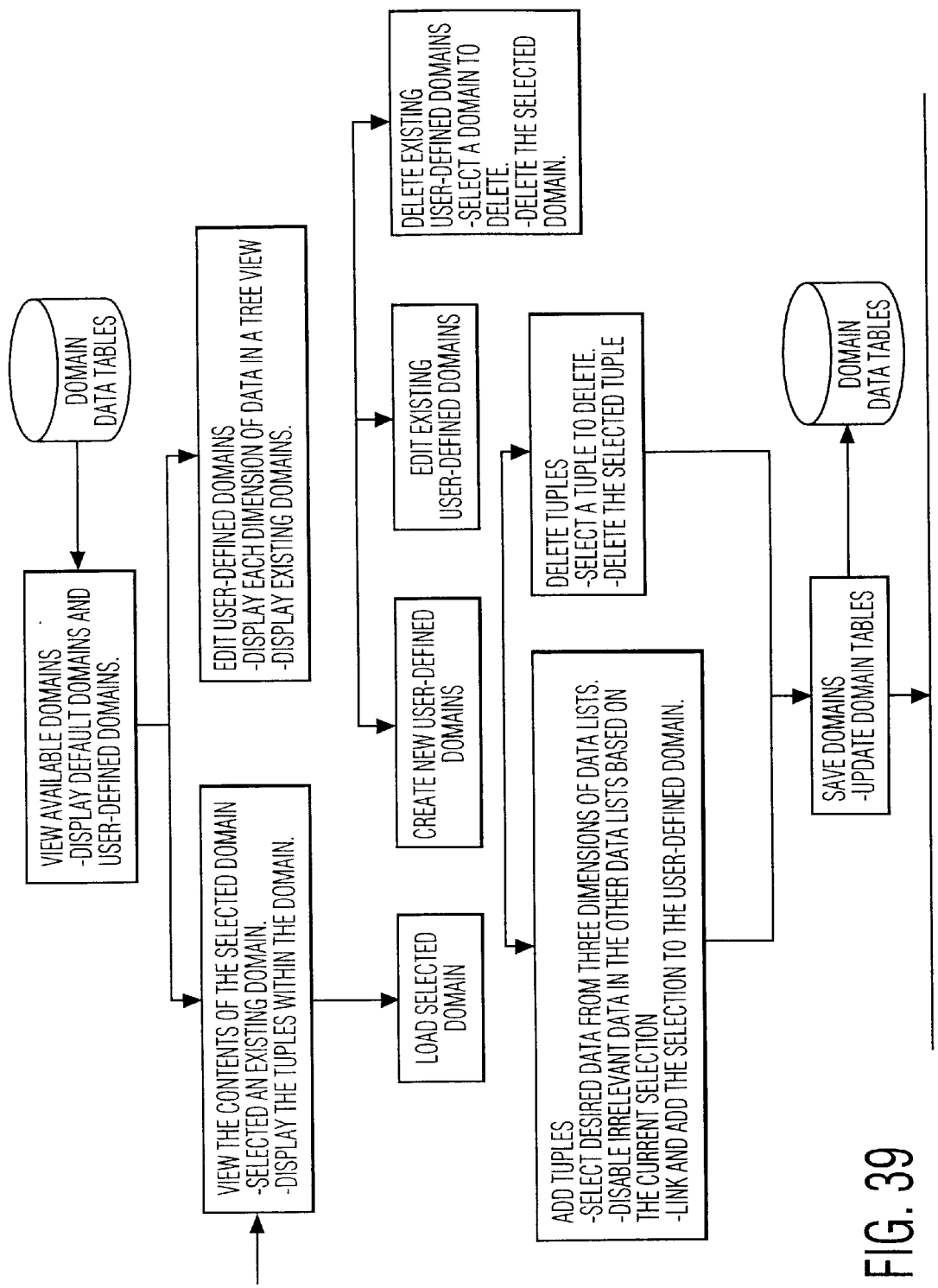
FIG. 39 Functionality in the Domain Manager.

Data Domains provide a convenient mechanism for the user to define the products and customers with which (s)he is interested in working. For example, an account manager can define a data domain that consists of the customer accounts that (s)he is responsible for. A data domain is a set of customer, product, or resource combinations. Data Domains may be used from different Frames 16. The data domain can be defined at various levels of aggregation (resolution) along each dimension: Product/product group, customer/customer group and resource/resource group. A data domain is independent of a data source (forecast, point of sales, shipments). The data sources are determined by the type of analysis that is performed and are therefore contingent on the frame where the data domain is used. For example, a domain can be used in the context of the sales promotion analysis functionality and could also be used for forecasting: different data sources will be used in order to perform each analysis but both refer to the same data domain. Not attaching a particular time range or data series to the Data Domains facilitates their portability from function to function and frame to frame. The user is allowed to build, edit and delete Data Domains that are owned by the user. In addition, the user is allowed read-access to the definitions of the Data Domains of other users. This facilitates a set of users to perform similar analysis and share carefully constructed Data Domains. The Data Domain Database comprises two tables: Domain Description and Domain Definition. From these two tables, the list of available user domains and the member tuples of each domain can be created and displayed for the user. The domain management interface can consist of multiple tree-views. Each tree-view represents the logical grouping of customers, products or resources. From each of the tree-views, the user can select the product, customer, or resource combinations and add the selection to the domain. The User Interface 18 should optionally reflect the data availability, and the intrinsic relationship between the customers, products, and resources. For example, if the user chooses a specific customer first, he should be able to choose only the products that are sold to this customer (or any product, depending on his preference) to make a domain. Since a customer (or product or resource) can belong to multiple customer (or product or resource) groups, the user should be able to visualize the groups in which the customer (or product or resource) is a member. This can be visually implemented by reversing the tree-view, based on user selected customer (or product or resource). This tree-reversal will display the bottom-up version of the tree, rather than the usual top-down. Data Domains can also be dynamically constructed based on the features of the product. For example, a PSI user can use the domain management tool to define that a data domain to consists of Televisions with 19" screen and GR3A chassis. The tool will then generate a data domain that consists of all the televisions with these features. The data domains contains the data groups which a DSS user is interested in working. For example, a plant manager can define a domain that consists of products and production resources. An air force commander can define a domain that consists of aircraft and line repairable units. The domain can be defined at various levels of aggregation along each dimension. Once a domain is defined and saved, it can be retrieved and used in the context of various decision analysis. FIG. 39 shows the process of using the Domain Manager 332, and also shows the operations of the Domain Manager 332.

Scenario Management

In the context of the different Frames 16 users generate changes to databases or instances of visual objects that can be saved as Scenarios 78 which are managed by a Scenario Manager 334. Scenarios can contain: edited data, results of analysis, graphs and charts, and performance metrics The Supply Frame Chain Manager 24 supports the following functions regarding Scenarios 78:

Save: Scenarios are saved in the local database.

Load: Saved Scenarios are loaded.

Edit: Saved Scenarios are modified.

Delete: Saved Scenarios are deleted.

A Scenario 78 can be used to update the DSS Database 12 when the user who generated it is the owner of the data table that needs update. The Supply Frame Chain Manager 24 maintains the data consistency across the entire DSS 10 by restricting the update of the DSS Database 12. Scenarios 78 have note fields to allow the user to enter free form comments. Scenarios 78 should have a date stamp to indicate the time of last modification. Scenarios 78 are typically defined within a frame and are associated with a user. Scenarios 78 are specific to users but can be accessed in the context of different Frames 16, providing that the user has the adequate access privileges. This enables the output of an analysis in one frame to be saved as a scenario and used as an input in the context of another frame. Scenarios 78, while belonging to specific users, can be shared between users. A scenario may be deleted only by the user who created it or the system administrator. A user should have the facility to load the scenario from different workstations. A user should also be allowed to load portions of a scenario into a different frame. For example, a user is able to save the top-down and bottom-up forecasts from the Demand Management Frame 130, and load the top-down forecasts in the PSI Frame. The DSS 10 should warn the user in case of data incompatibility. A user is able to save the models and the parameters that were used to modify loaded data. The user is then able to apply these models and parameters to different data sets.

Figure 40:
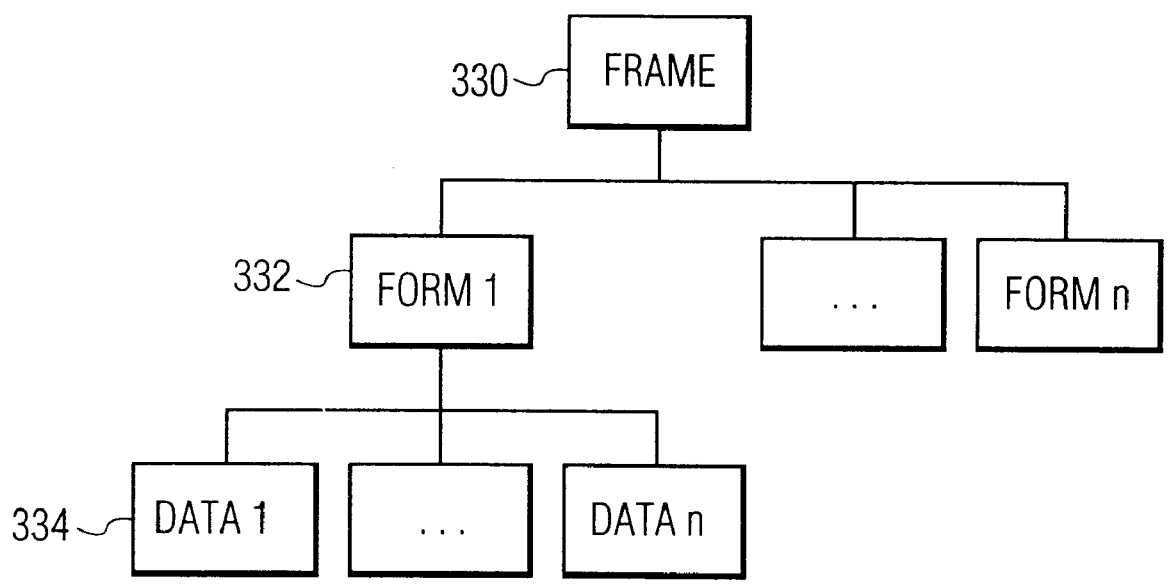
FIG. 40 Hierarchical Structure of a Scenario.

A frame 330 has several forms 332 associated with it as depicted in FIG. 40. If the user attempts to close a form on which data 334 has been changed, the user will be prompted to Save the changes to a scenario, Abandon Changes, or Update the actual database. Updating the actual database requires necessary access privileges. A Scenario 78 is anchored to a frame, and can have multiple forms associated with it. A Scenario 78 can be loaded into the frame to which it is anchored, in which case, all the data and other information will automatically be loaded into the appropriate locations. Alternately, a Scenario 78 can be opened to access specific data that are contained in the Scenario 78. This feature will enable the user to load the data created in a different frame to a different frame. To facilitate this implementation, forms are specified to have a pre-specified number of data-"pockets." Elements of a scenario include:

Header information for each of the data pockets in each of the forms of each of the Frames 16. For example, DM-1-[1]=POS1245=Point of Sales Information May 25, 96; DM-1-[2]=TD1245=Top Down Information May 25, 96; and DM-1-[3]=BU1245=Bottom Up Information May 25, 96.

Model and parameter information. For example, ARMA with (1,1) applied to Top Down data.

Graph and parameter information

User comments

Date stamp

Performance Monitoring Using Simulation

Two levels of integration required in supply chain Decision Support Systems have been embedded in our DSS architecture; data integration and decision integration to provide a Network Simulator 350 (see FIG. 37). The former has been obtained by having a common Decision Support System (DSS) Database 12, from which input data to the decision models are retrieved and outputs updated. By having such bi-directional data flows between models and the Database 12 a complete data level integration is realized. In order words, all decisions are based on consistent and up-to-date information. This is the primary level of integration for a supply chain DSS 10.

The secondary level of integration is the decision integration. The purpose is to avoid sub-optimization among functional processes. An ideal case would be to have a "meta analytical decision model" which could optimally solve the entire supply chain wide problem. With the state of the art in decision sciences and computing, this is not. Thus, in our DSS architecture, various Frames 16 are linked by the performance simulator. For instance, Forecast Data 146 from the Demand Management Frame 130 is used in PSI planning and VMR 250 frames, VMR schedules are entered to the PSI planning and so on. With this approach, it is necessary to have a supply chain wide performance simulator to monitor the effects due to the systems dynamics along the supply chain to provide a functional integration. The purpose of such an integration is to provide the user visibility beyond his functional boundary in order to facilitate a feedback control. This feedback will make it possible to dynamically monitor the impact of his decision on the performance of the entire supply chain.

The discussion below begins with background on decision integration and the system architecture. Then, the underlying supply chain simulation modeling logic with regards to data flow and process flow are described. Finally, originality of such an approach to use a supply chain simulator for the DSS integration is discussed.

High Level Architecture

The Simulator 350 resides at the Supply Chain Frame Manager 24 as a Functional Integrator 312 together with the Network Configurator 330 and Domain Manager 332 as shown in FIG. 37; Supply Frame Chain Manager—High Level Architecture. The Simulator 350 can be initially configured with product flow, network structures and domain information with the other modules of the Functional Integrator 312. Then, the Simulator 350 will read major decisions from the individual Frames 16 that will have impact on the total supply chain performance. Monte Carlo simulation will be carried out driven by demand processes captured from the domain information and replenishment and PSI decisions from the DSS Frames 16. Total systems performance representing the supply chain dynamics will be tracked according to the performance matrices specified in our DSS specification. These mainly cover cost and service tradeoffs including fill rates and response times. The performance will be monitored in aggregation according to various levels such as; nodes, echelons, distribution channels and the total system. In essence, the architecture facilitates the primary objectives of complementing decision integration among models to provide a cross-functional optimization.

User Interface

User Interface 18 of the performance Simulator 350 will have three major features; network configuration, decision and parameter settings and the simulation and monitoring.

Network Configurator

The system will invoke the Network Configurator 330 module of the Functional Integrator 312 at the Supply Chain Frame Manager 24. Detailed features and User Interfaces have been described in the previous sections.

Decision and Parameter Settings

Parameter, frame decision settings and empirical demand distributions will be displayed in the editable screens. These screens will also be accessible during the simulation run so that the user can interrupt the execution and modify the parameters interactively. The following screens are included: Demand distribution screens and Frame decision screens.

Performance Monitoring and Simulation

The user is able to visualize the impact of the decisions taken at the level of one frame on the overall performance metrics of the entire supply chain. The Supply Frame Chain Manager 24 supports this performance monitoring functionality. In all the Frames 16 users can easily access the "performance monitoring screen." The performance monitoring screen displays global performance metrics that are available to all users and that cannot be deleted or modified. The performance is tracked and displayed along the: channel (such as VMR, Non-VMR, etc.); echelon (such as supplier, plant, DC and stores); individual nodes; and the total system. The performance monitoring screen also contains user formulated performance metrics that are customizable and available only to the user who formulated them.

The Supply Frame Chain Manager 24 supports the following functions for user formulated performance metrics:

Formulate: a new user-formulated performance metric, Edit: an existing user-formulated performance metric, and Delete: a user-formulated performance metric. The function "edit" and "delete" are restricted to the user who defined the performance measure.

The value of the performance measures can be updated each time the user modifies the value of a field in the local database associated with the frame in which the user is working or by using an explicit recalculate function or at user-specified time intervals.

Users can choose "a ticker-tape" to always display the current values of user selected key measures.

The User Interface 18 is designed to support the conventional "Visual Interactive Simulation (VIS)" approach. According to this approach, the simulation can be carried out not only in the batch mode but also in the event-by-event or period-by-period mode. The performance metrics could be viewed and parameters adjusted interactively. To facilitate this approach: Inventory, service level and cost profiles for each aggregated measure (such as node, channel or echelon) will be displayed as time series graphs. This will highlight the systems dynamics along the chain.

Summary performance matrices will be displayed in the summary report screen or saved to a file.

Simulation Logic: Data Flow Description

Figure 41:
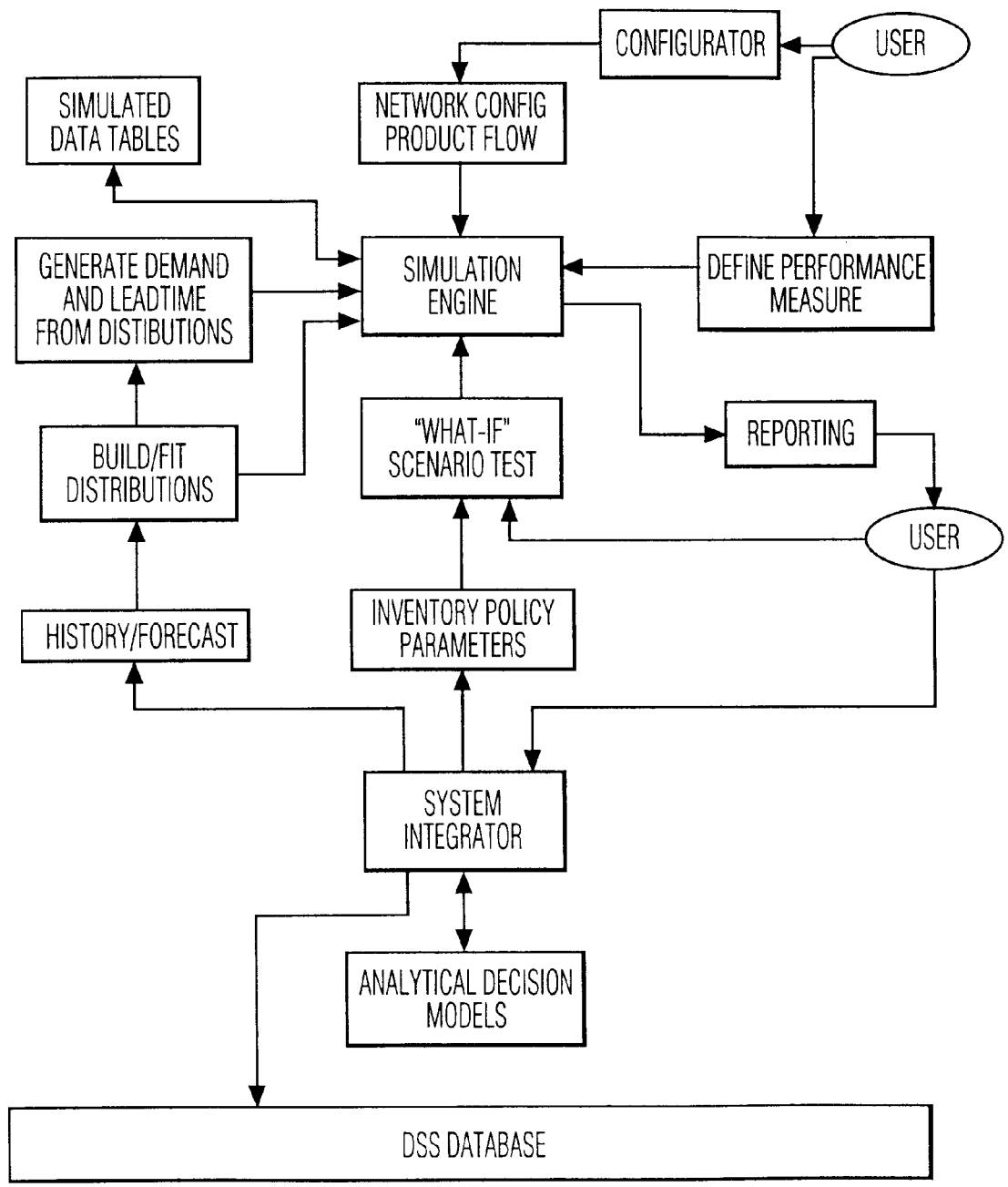
FIG. 41 Data Flow Diagram for the Performance Simulator.

The supply chain simulation model primarily mimics the material and information flow controlled by the frame decisions along the supply chain (see FIG. 41). The Simulator 350 is built around data tables for each node which are linked according to the information and product flow. These data tables are stored as simulated data in the system.

In the initialization phase, these data tables will be populated with inventory information including inventory position, on hand, on order and schedule receipt. Then, these tables are connected using pointers according to the network structure, order and product flow directions. Then, demand and lead time information is loaded from Demand Management Frame 130 through system integrator and appropriate distribution is built. Using the distributions, customer orders are generated according to the demand processes at the customer facing echelon and replenishments are triggered according to the control rules along the logistics pipe line for each event due time.

The major inputs required are the decisions that will effect the total performance of the supply chain. The following are included: FGDND or Network Configurator—Network design and Product flow; Demand Management—Forecast and forecast errors; Vendor Managed Replenishment—Replenishment policy, Target inventory, and Delivery frequencies; PSI Planning—P' line and its variation, and I' line and its variation; Supply Management; and Component inventory policy and parameters.

Depending on the configuration of the network, other supply chain system parameters such as FG inventory policy and parameters may also be needed for the non-VMR channel.

The outputs from the model are based on the performance assessment plan of the DSS 10 for a commercial setting including the followings: Supply responsiveness, On-time delivery performance, Fill rate, FG inventory levels, Component inventory levels, Order cycle time, and Financial measures.

The Simulator 350 builds up the above performance metrics from the event-level (lowest) measures. This "bottom-up" approach in simulation makes it possible to support user formulated performance matrices that will be customizable.

Simulation Logic: Process Flow Description

A more detailed process flow of the simulation engine can be described in terms of either the demand processes or the control rules. Two basic control rules considered in our DSS 10 are production (reconciliation) policies and replenishment (inventory) policies.

Demand Processes

The performance of the total supply chain mainly depends upon the control policies and parameter settings along the multilevel material and information flows from the supplier to customers. Both independent and dependent demand processes will be supported. They dictate the way requirement at each node is generated. In the independent demand customer orders are generated for all nodes from random distributions developed from the Forecast Data 146 at each node. In the dependent case, customer order generation from the random distribution is applied only to the customer facing echelon. The demand for the higher echelons are calculated from the lower ones with the lead time offsets.

The following systems will be driven by independent demand processes: Vendor Management Replenishment (VMR); Continuous Replenishment (CR); Reorder Point System (r, Q); Just-in-time (JIT); and Min-Max (s, S).

The following systems will be driven by dependent demand processes: Distribution Requirement Planning Systems (DRP); and Materials Requirement Planning System (MRP).

As for the case of One-for-one (S-1, S) system for the repair systems, Poisson demand process will be applied. Demand generation will be carried out by an inverse transform of the specified distribution. For high volume items, normal approximation of forecast error will be used. For the others, empirical distributions will be used. Time series forecast and its error distribution (or parameters) will be obtained as frame decisions from Demand Management.

Replenishment Processes

Both pull versus push controls are supported. In the pull control system, inventory is depleted by demand and whenever it reaches the replenishment point an order is placed to a supplier. In the VMR, the supplier places a reverse order to the store. For the demand channel, inventory decision processes (models) for the following pull systems will be included: Vendor Management Replenishment (VMR); Continuous Replenishment (CR); One-for-one Replenishment (S-1, S); Reorder Point System (r, Q); and One-for-one system for repair will be logically treated the same as the Continuous Replenishment in the commercial settings.

For the push (planning) systems a time-phased plan for the planning interval is established and replenishment is triggered based on the requirement, schedule receipt and on hand inventory. For the demand channel, pull systems are: Distribution Requirement Planning Systems (DRP)

Similarly, for the supply channel, the following pull systems will be supported: Just-in-time (JIT); and Min-Max (s, S).

The push planning systems for the supply channel are: Materials Requirement Planning System (MRP)

Transportation and information flow logic will be embedded in the replenishment processes. The capacity limitations, cost and lead time for various modes of transportation and information flow (orders) will be checked to execute the replenishments.

Reconciliation Processes

The production planning logic refers to the way MPS is created. Given a PSI plan 190 for the planning horizon with possible variation, the system need to track the dynamic outcomes along the supply chain. This will be carried out by generating the dynamic demand along the demand channel and consolidating them to obtain the simulated S' line. The simulated S' line (line refers to as the time series sales information) will be checked against P' (production) and I' (inventory) lines of the PSI plan 190 to compute service fill rates. Then production plan P' line will be offset by simulated production lead times.

Once the actual P' line is established, component usage can be computed using the Bill of Material (BOM) tables. This usage is translated as requirements (demand) to the supply channel. Then, component flows along the supply channel will be traced according to the respective component replenishment policies and demand processes at each node following a similar logic as described in the demand channel.

User Interface 18

One of the primary objectives of our DSS 10 is to provide a decision support environment that facilitates the decision-making processes using quantitative models and associated business data. The interaction between the users and the DSS 10 during the decision-making process can be characterized as follows: The communication of process information and management input; Formulation of decision problems; Generation of problem solutions or evaluation of decision alternatives; and Coordination of the above. To facilitate the communication and coordination between the users and the DSS 10, it is necessary to choose the appropriate User Interface 18 design paradigm.

User Interface Design Paradigm

The User Interface 18 is based on the conventional human computer interaction paradigm referred to as "direct manipulation". In this paradigm there is no clear separation of input and output. For example, in exercising a certain model the user may either evaluate the impact of a decision option by specifying the decision variables or generate the optimal values of the decision variables. In the former setting the decision variables serve as input while, in the latter setting, the decision variables constitute the output.

Another characteristic of the direct manipulation paradigm is the quick feedback feature where a user initiates an action such as posing a particular query through direct manipulation of some interface object and the system responds with reasonable speed.

User-DSS Interaction

In each Decision Support Frame discussed previously, the users will be aided in making several decisions. The principal process underlying these decisions will serve as the basis for the design of the User Interface 18.

Figure 42:
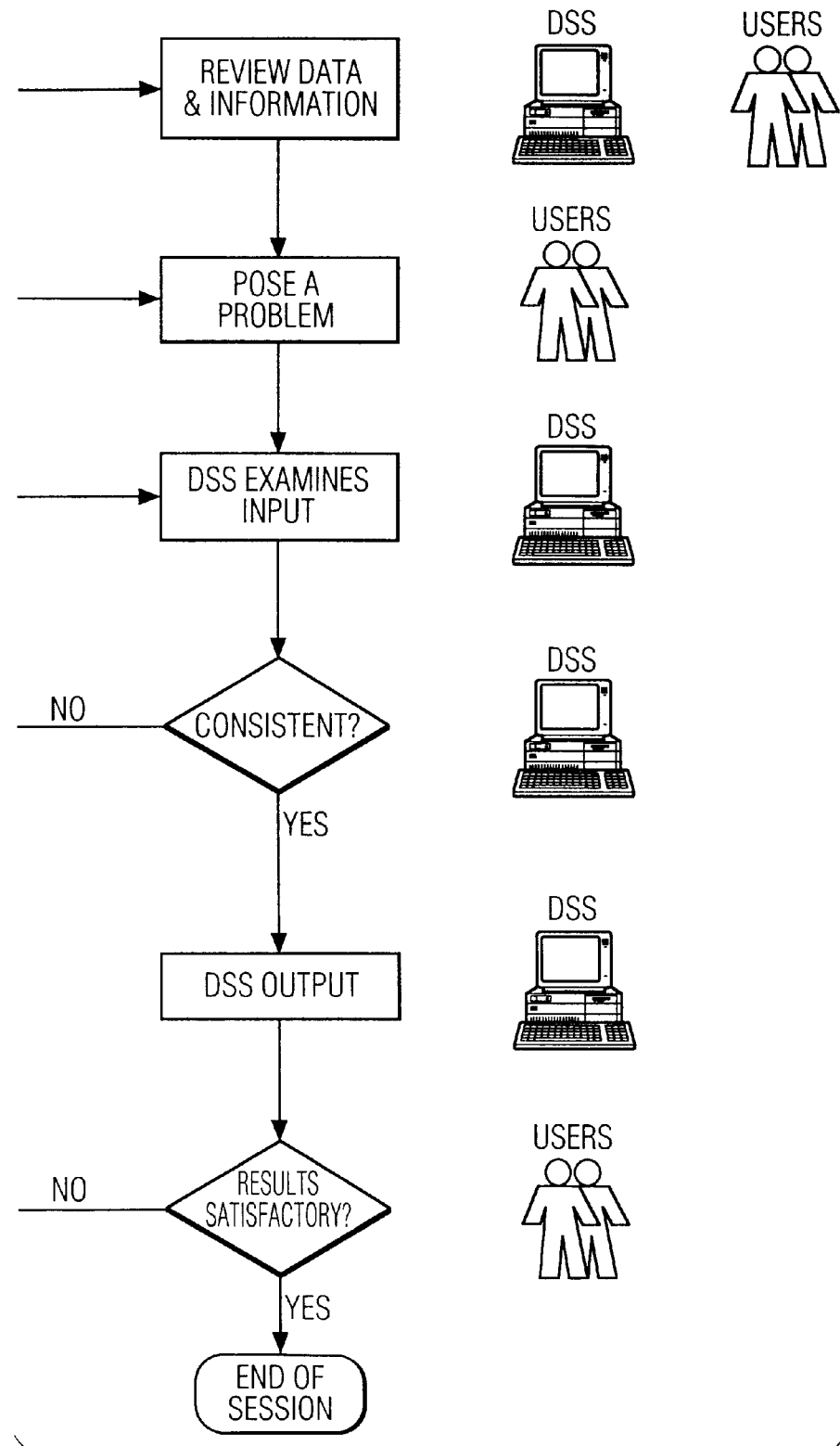
FIG. 42 User-DSS Interaction Process.

A typical user-DSS 10 interaction (see FIG. 42) begins with the users reviewing 402 the initial conditions and default values related to a decision problem retrieved from the DSS Database 12. Then the users communicate their preferences through proper selection of options, specification of parameters and values, and choice of analysis routines. The DSS 10 examines the inputs provided by the users and assists the users in resolving any inconsistency in the inputs. Then, to look for the solution of the problem, the DSS 10 invokes the decision logic 76 of the frame. The Supply Chain Frame Manager 24 associated with the frame executes the appropriate quantitative models and routines in the Model Engine 20. The users can review the output through the User Interface display, and repeat the above process if warranted.

The general guidelines for the preferred User Interface design are described in the next subsection.

Design Guidelines

The general design guidelines are as follows:

User Friendliness

Intuitiveness: Conformance to established standards.
Integrated graphical display: Simple and visually clean graphical screen layout.
User customization: Ability to customize the interface into user's desired style.
Minimal typing: Use of menus, pull down lists and buttons.

User Guidance

Flexible sequence control: Ability to access the DSS 10 functionality without a pre-imposed sequence.
Context-sensitive on-line help.
Semantic feedback: Use of visual and audio cues for confirmation and progress.
Use of colors for clarity, focus and aesthetics.

User Interaction

Data visualization: Visual aids to interpret data.
Object orientation.
Local/remote concurrent usage.
Single/group usage. Ability for multiple users to collaborate in decision making.
Multiple levels of user expertise: Support for novice as well as advanced users.

Implementation Principles

Consistency: Similar "look and feel" for user-interface objects across the DSS 10.
Modularity: Reusable and object-oriented user-interface code.
Configurability: Adaptability to the specific user environment.

Design Elements

The key design elements for the DSS User Interface 18 include; Frame GUI; and Standard Object Library.

Figure 43:
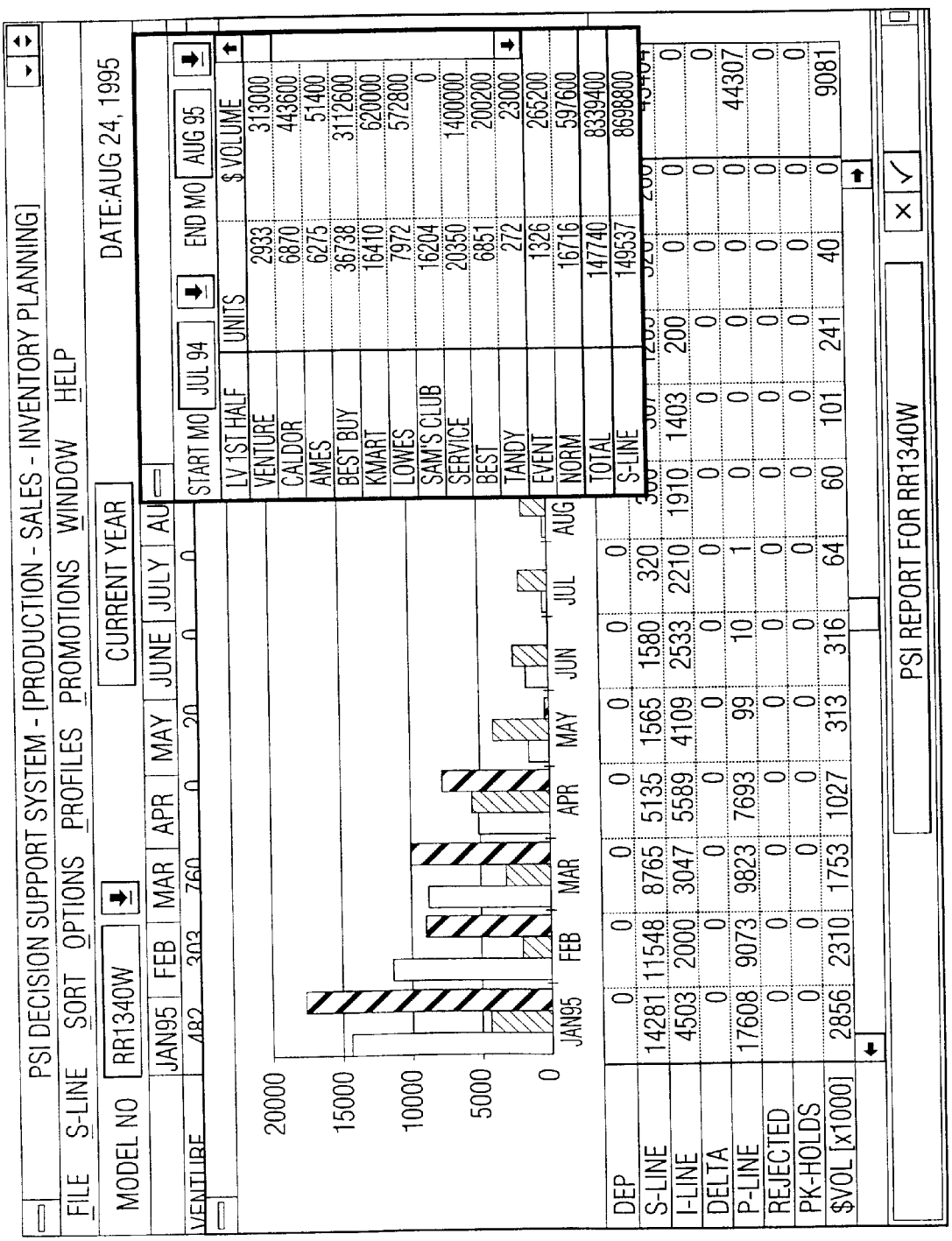
FIG. 43 Sample Screen from PSI DSS.

Frame GUI: Since the DSS 10 will be an interactive environment, we adopt the most common environment used for interactive computing, known as the WIMP environment which stands for Windows, Icons, Menus, and Pointers. A frame-specific graphical User Interface (GUI) in this environment is necessary to support the interaction between the users and the DSS 10 in a decision process. The Frame GUI is customized using a standard set of User Interface objects. An example of this Frame GUI is given in FIG. 43.

Standard Object Library: The standard set of the User Interface objects used to build Frame GUIs is contained in a standard object library. The forms, positions and contents of the objects are set according to the specific needs of each Frame GUI. For example, these are the sample objects in the standard library employed in the PSI DSS shown in FIG. 43.

Selection: to choose among various action options

Grid: to input data and display results

Chart: to display input data and results graphically

Command Button: to execute an action

List Box: to list user choices

Example Implementation Architecture

The basic objective of the DSS 10, is to provide customized decision support for the decision makers to manage an integrated agile supply chain. It generates the following two specific systems requirements: DSS 10 should provide decision support capabilities that work with the prevailing information systems which is mainly data transaction based systems. These decision support capabilities may include data analysis, decision process modeling, scenario management among many others; and DSS 10 must integrate data from various sources along the Supply Chain Information Systems 15. This requires the DSS 10 to interact with multiple information systems to gather raw data and distribute processed data.

These two basic systems requirements motivate the architecture and the choice of the platforms.

Three-Tier DSS Architecture

In an enterprise-wide supply chain, the potential users of the DSS 10 are decision makers with different operational responsibilities and concerns. The views about the supply chain and functional requirements for decision support may therefore vary accordingly. The data to support these functional requirements reside often on a number of information systems possibly with different hardware and software platforms.

Consequently, the DSS 10 needs to interact with the users through a unified User Interface 18 to address diverse business concerns while it should also be capable of interfacing with different Supply Chain Information Systems 15 to gather and distribute data.

Figure 44:
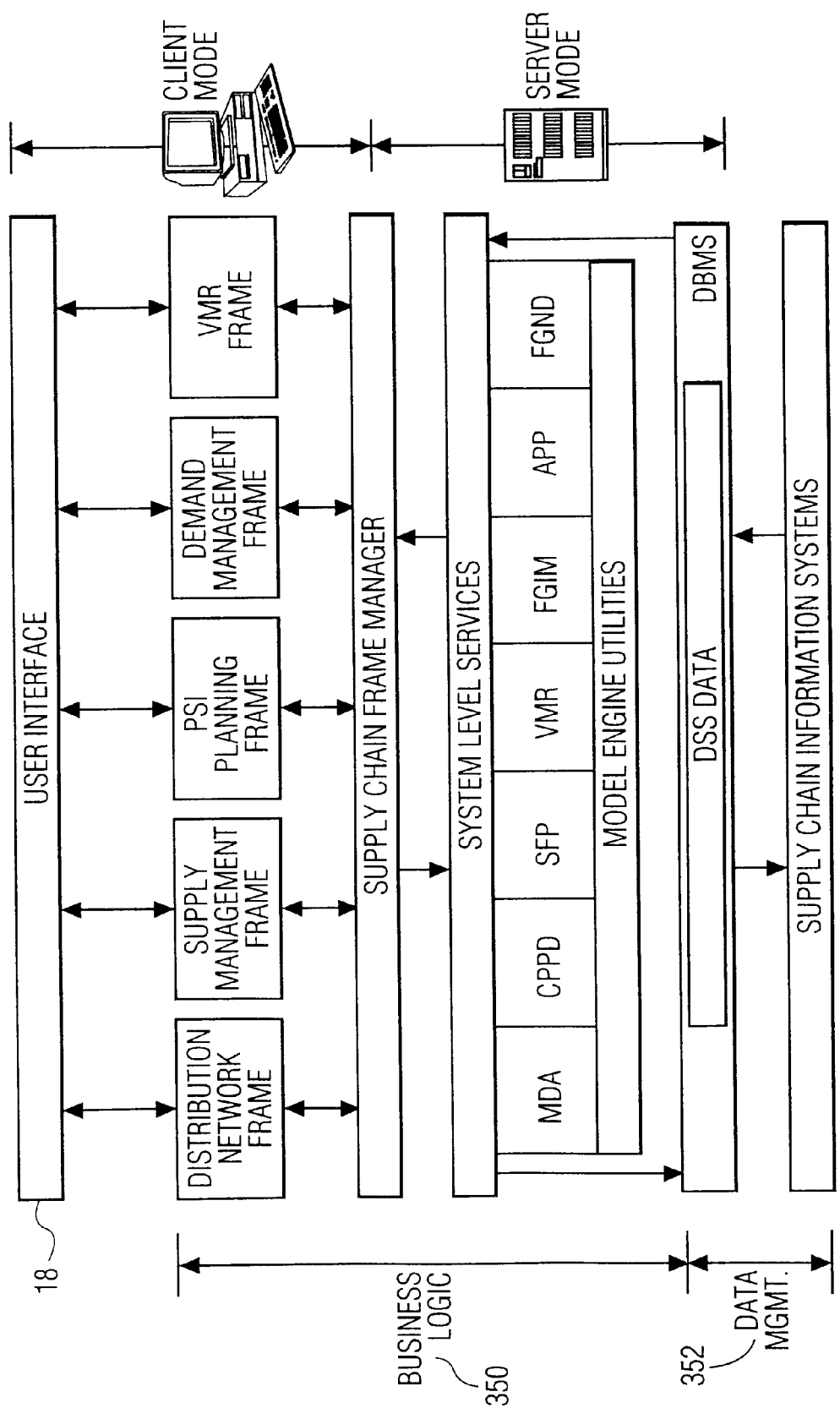
FIG. 44 Three-tier Application Development Architecture.

To that end, we have developed a layered systems architecture design for the DSS 10 as shown in FIG. 44 in which all major system components interact with each other in a layered fashion. Aside from other benefits, the layered design makes the choice of platforms as well as implementation of individual system components relatively independent, and permits standardized interfaces among various system components. The DSS architecture can also be viewed as a three-tier architecture consistent with the commonly understood three-tier client-server information systems architecture consisting of the User Interface 18, the Business Logic 350 and the Data Management tiers 352 as illustrated in FIG. 44.

Each of the three tiers in the DSS architecture has its distinctive functional roles and presents various levels of the system complexities. The platform for the three tiers is preferably chosen to best fit the user's unique functional and system needs. The choice is complicated by the availability of a number of competitive software and hardware platforms and the realization that there may not exist a single "optimal" suite of platforms. In the following, however, we describe a suite of platforms that can best serve the general DSS 10 needs and also be in line with the forecasted future development trends in information technology and enterprise-wide distributed computing technology.

Selection of DSS Development Platforms

To support the supply chain wide decision making, the DSS 10 needs to be integrated, flexible, responsive and comprehensive. One major obstacle, however, is that most of the data required by the DSS Database 12 are stored in various Supply Chain Information Systems 15 that are based on an older information and computing technology, designed to support vertically integrated organizations, built in isolation, and usually very complex. Such systems are generally referred to as the legacy systems. Therefore, to meet business and systems needs, the DSS 10 environment should: provide common and easily understood interfaces to all users, enhance the current business knowledge and skills, model and incorporate business logic, and promote access to legacy data and application systems in a secure manner.

Figure 45:
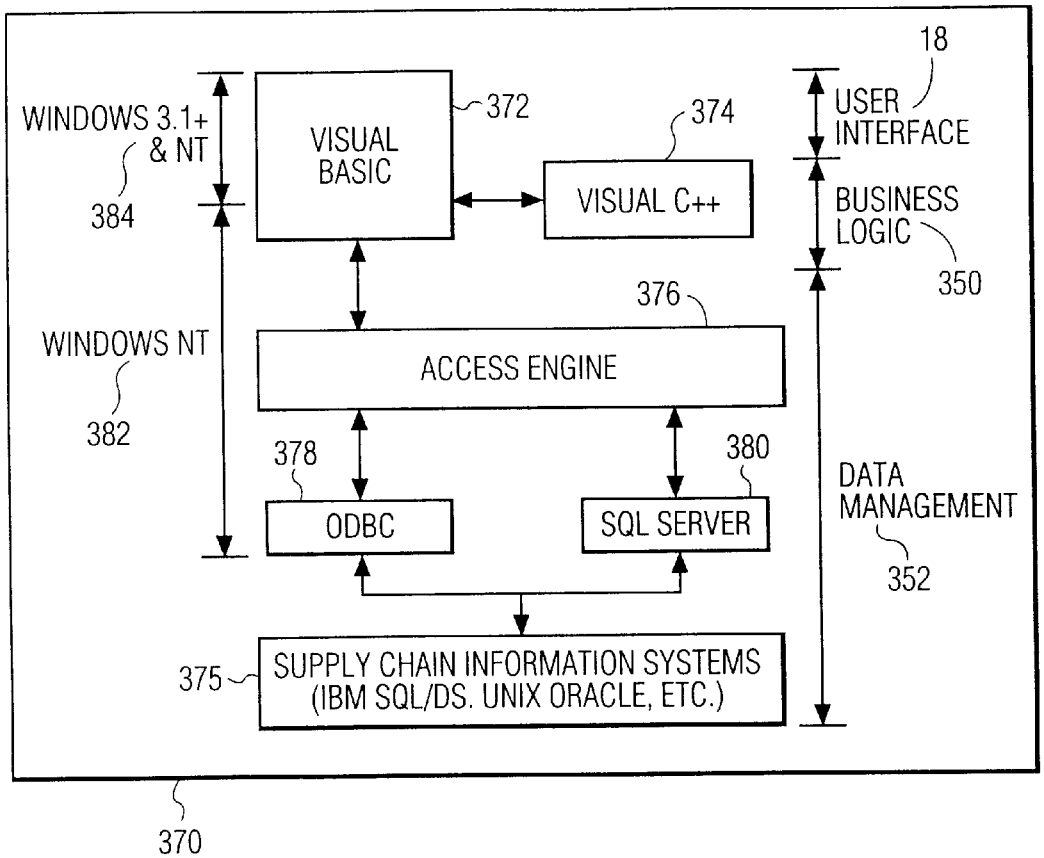
FIG. 45 DSS Development Platform Environment.

The development platform environment 370 illustrated in FIG. 45 has been chosen as the preferred environment to meet the above requirements.

In this development environment 370, Microsoft Visual Basic 372 is used to build the unified User Interface 18 and the Business Logic 350 that includes the Frames 16, Supply Chain Frame Manager 24, system level services and Model Engine 20. Portions of the Model Engine 20 that require more efficient and precise numerical computations are preferably implemented using the Visual C++ programming language 374.

The Visual Basic codes 372 directly interface with the DSS Database 12. The DSS Database 12 uses Microsoft Access 376 which, in turn, interfaces with the Supply Chain Information Systems 15 through either Windows ODBC (Open Database Connectivity) tools 378 or Microsoft SQL Server 380 in a client/server fashion. The Supply Chain Information Systems 15 can include data servers in IBM SQL/DS, UNIX Oracle, among other formats.

The Windows NT 382 is operating systems for the local area network server while the User Interface 18 can be in any Windows environment (3.1 and above) 384.

In this environment, it is important to establish the client/server data linkage between the DSS Database 12 (Access engine) and the supply chain information system data servers.

As described earlier, the DSS Database 12 is internal to the DSS 10 implementation and contains only the data needed for the execution of the DSS 10. The data in the DSS Database 12 is synthesized from a variety of sources in the Supply Chain Information System 15. The DSS Database 12 can be interfaced in a Client Mode 30 to the supply chain information sources for data retrieval and update, as needed. This client-server interface, rather than a hard link, has the advantages discussed below. It ensures that the DSS 10 can be linked to the heterogeneous information sources in the supply chain. This is particularly significant in the absence of an enterprise-wide integrated information system for the supply chain. It reduces the burden on DSS Database management by obtaining updated data only when necessary. It fosters independence of the DSS 10 for easy maintenance. It facilitates development of the DSS 10 for a generic supply chain architecture and minimizes application specific customization.

The architecture described herein is built upon the general client-server concept. In the following, we describe the hardware system architecture (see FIG. 46) for generic systems, in which the host 398 represents the Supply Chain Information Systems 15, and the PCs 400 in the Local Area Network (LAN) 402 supports the DSS 10 applications. This architecture supports storing the invention described herein on various types of storage including RAM, ROM, hard and floppy disks, etc.

Figure 46:
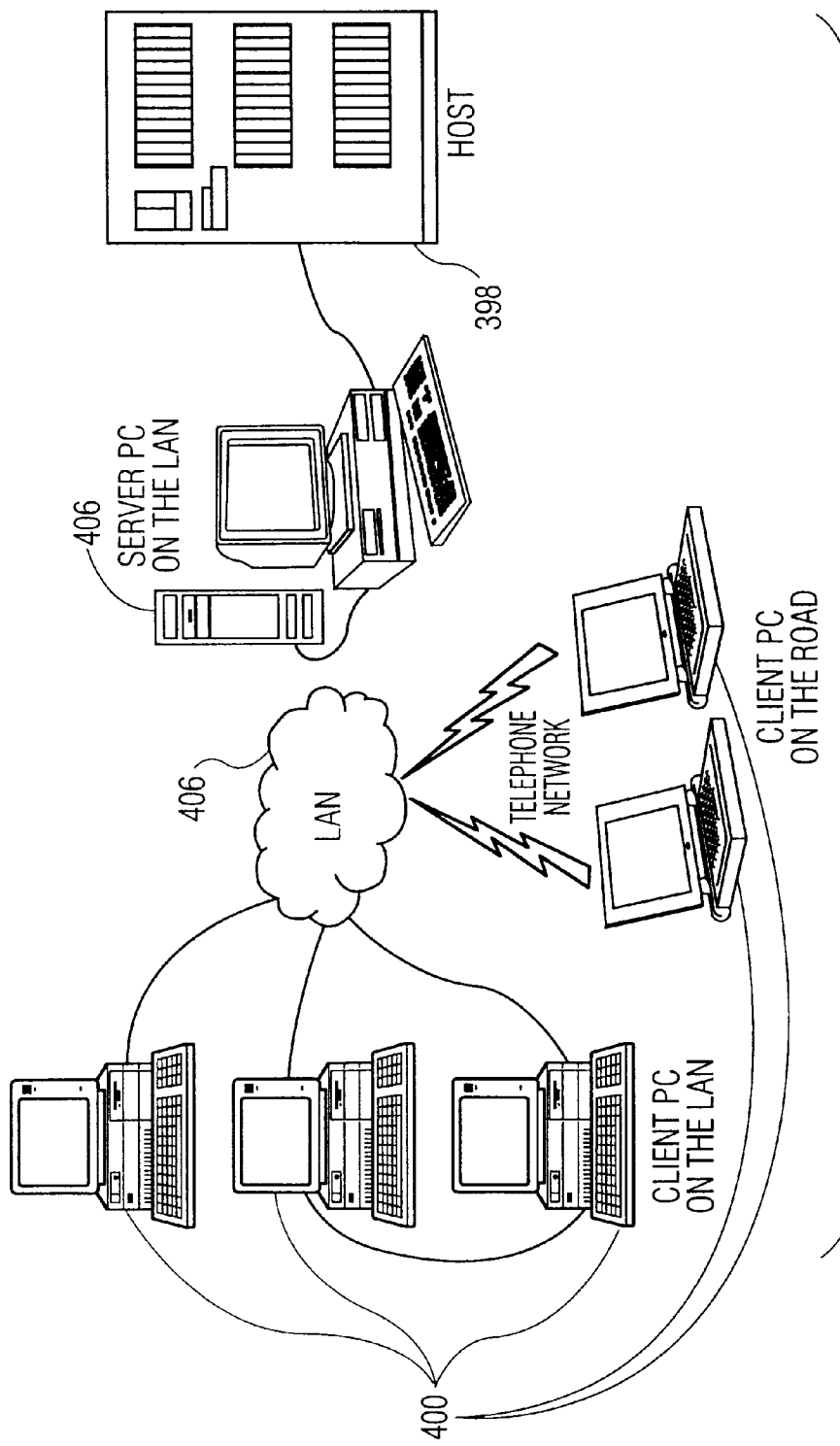
FIG. 46 Generic System Architecture.
Figure 47:
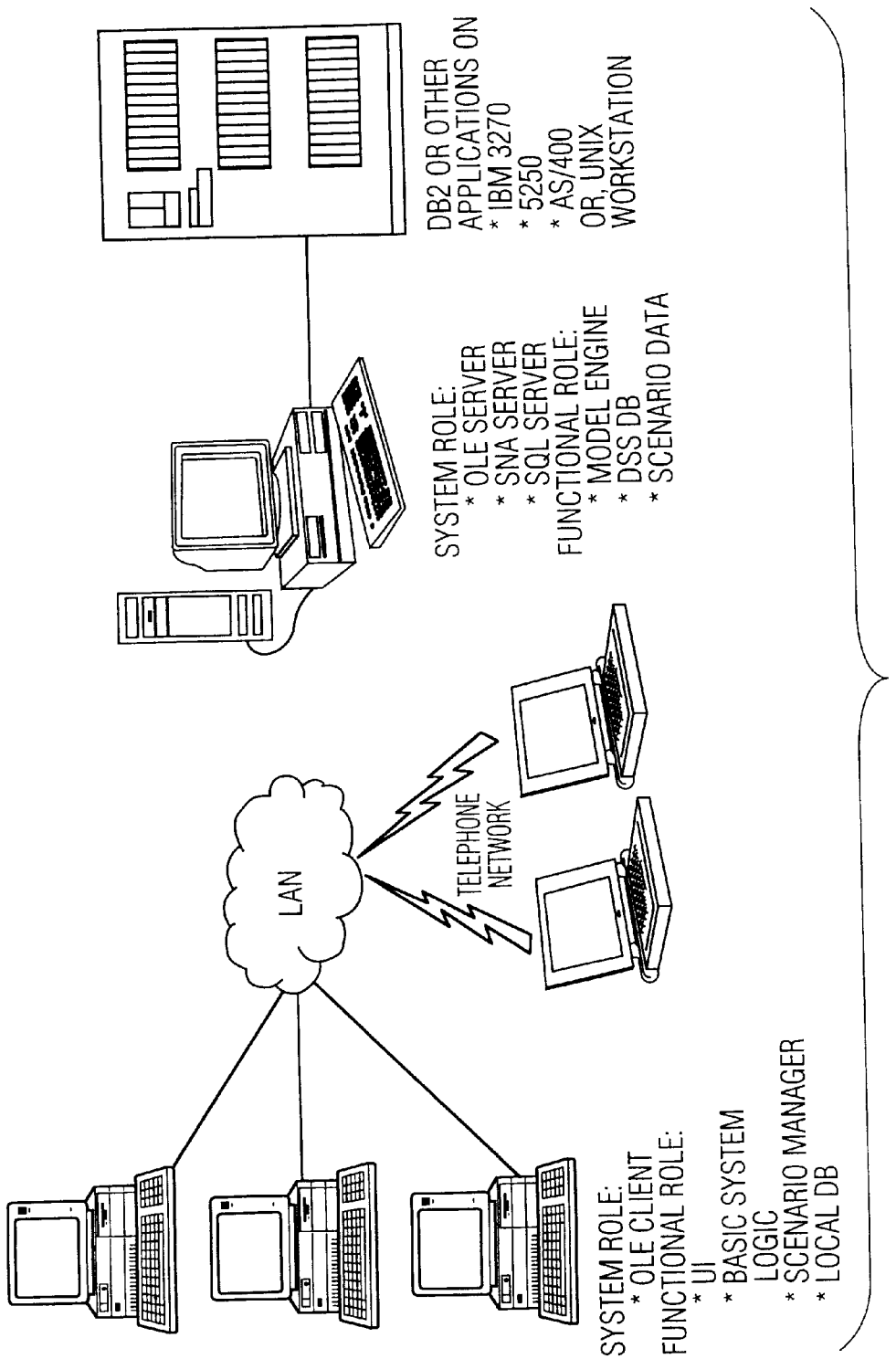
FIG. 47 System Architecture in View of the DSS Prototype.

In the architecture of FIG. 46, we assume that the hosts 398 contain the majority of transaction level data and they will communicate with an LAN 402 where the DSS 10 resides. Here, we do not make specific assumptions about the type of the hosts (IBM mainframe or UNIX workstation). On the LAN 402, there will be a server(s) PC 406 and a set of linked client PCs 400. Specifically, the functions of the DSS 10 can be partitioned as illustrated in FIG. 47.

Below we describe the basic system requirements and functions for the system components in the above diagram.

LAN:
  Basic Requirements:
    Local area network supporting standard protocols such as TCP/IP, IPX/SPX, Named Pipes/NetBEUI etc.
    PCs can run Windows NT or 95
  Basic Functions:
    Provide the communication media between client PCs to server PCs
    Permit external PCs to dial into the network using regular telephone lines
    Allow connection to the IBM hosts Client PCs:
  Basic Requirements:
    Have sufficient speed and memory
    Have network connection (on the LAN or dial-up through telephone line)

Figure 48:
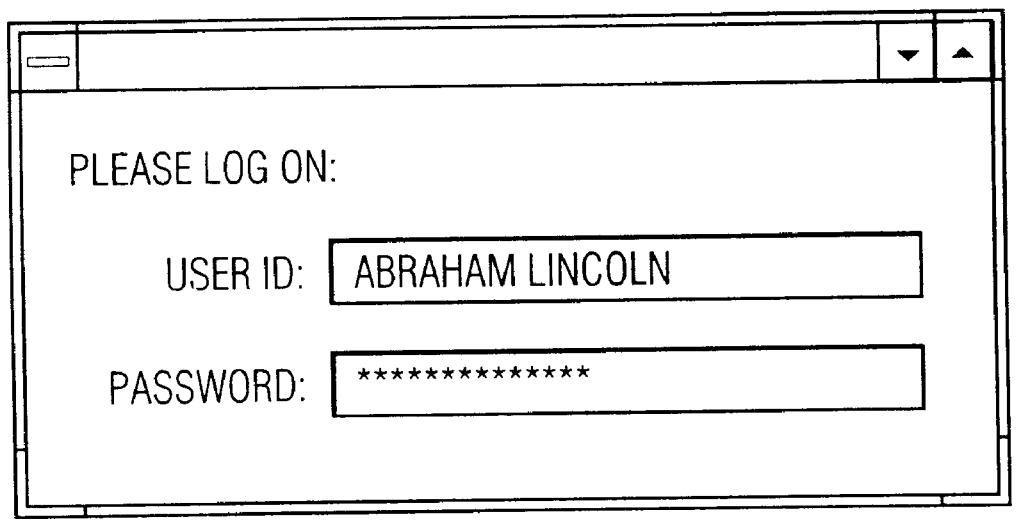
FIG. 48 The Logon Dialog Box.

Can run Windows 95 or NT
Basic Functions:
  Serve as OLE clients
  Provide primary User Interface
  Implement what-if scenario manager
  Contain localized database
Server PCs:
Basic Requirements:
  Have maximum speed, storage space, memory and network connectivity
  Run Windows NT, SQL Server and SNA Server
Basic Functions:
  Be the OLE server
  Host main DSS Database 12 with a library of SQL queries
  Serve as the SNA Server to exchange data between the DSS DB and host data tables
  Implement model object library
  Contain external optimization solver
Hosts:
Basic Requirements:
  Standard IBM database and applications or UNIX based database
  Support any combination of the options (Ethernet, Token-Ring, or FDDI)
  SDLC
  X,25.QLLC, etc.
Basic Functions:
  Provide raw supply chain wide transaction data
  Contain EDI or other connections with customers and suppliers
  Support overall business information requirement of the company Example of Use User Access and Privileges When the DSS 10 is invoked, the DSS logon dialog box will be displayed to the user (see FIG. 48). Failure to enter a valid User ID/Password combination results in the DSS 10 immediately terminating. Correct entry of a valid user ID and password results in the DSS 10 being started and the opening screen being displayed to the user. The user ID is visible as it is typed by the user, but the password is blocked to prevent casual observation while it is being typed. The user ID is checked against an internally maintained table to ensure authenticity and user's privilege.

Opening Screen

Figure 49:
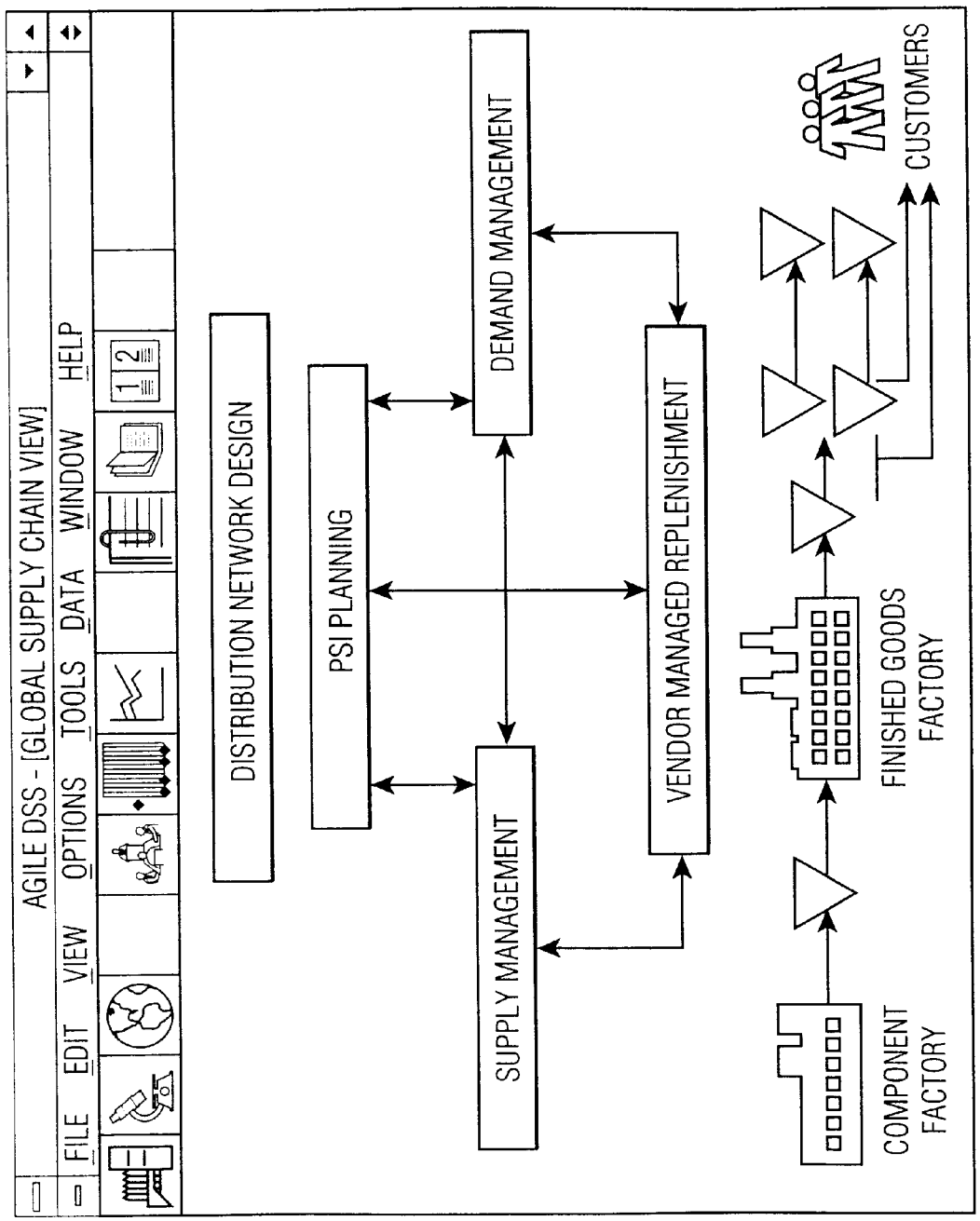
FIG. 49 The Opening Screen of the DSS.

Once the user has successfully logged on to the DSS 10, the opening screen is presented. Presenting the opening screen and deciding which frame the user is able to access is the responsibility of the Supply Frame Chain Manager 24. The main feature of the opening screen is a graphical outline of the supply chain overlaid with the relevant Frames 16 and showing the relevant portion of the supply chain. The user may move the mouse pointer over any of the Frame Boxes and click within the box to launch the frame (see FIG. 49).

The user may also directly access the Frames 16 from the Toolbar buttons. The user must have the correct privileges to access the selected group, or an error message will be displayed alerting the user that he does not have the correct privileges.

User Preferences

Figure 50:
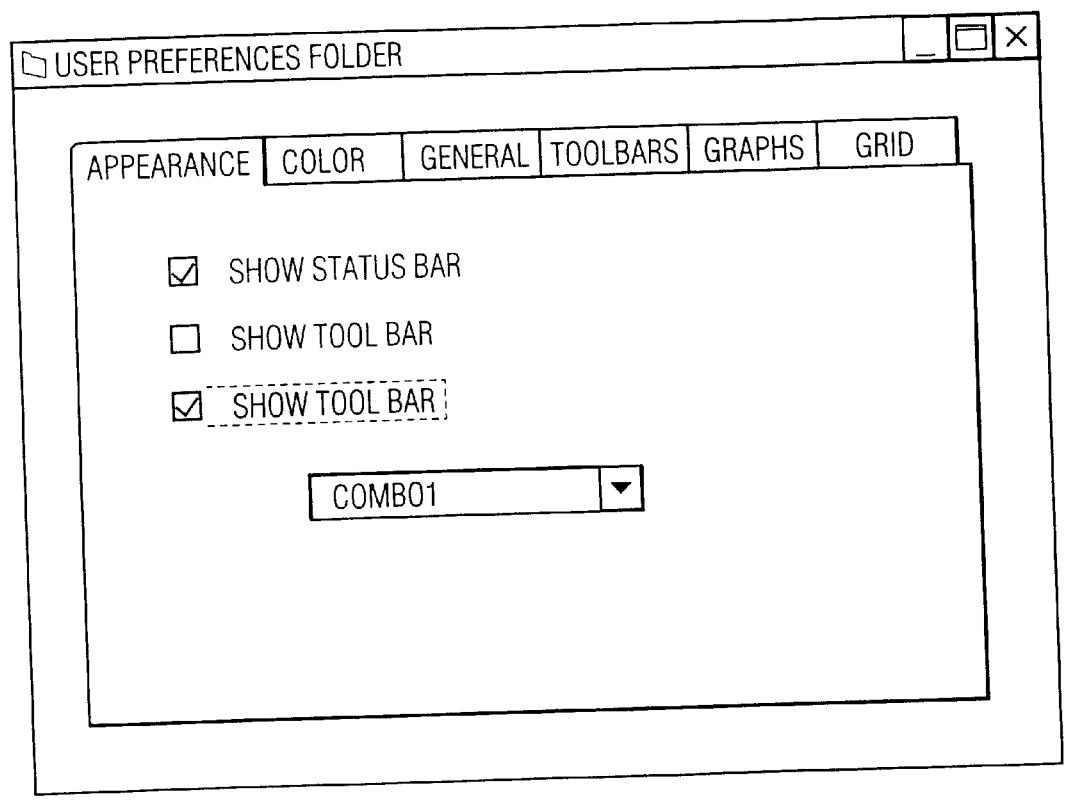
FIG. 50 User Preferences Selection Dialog Box.

A feature of the DSS 10 available from the main DSS screen is the User Preferences Folder. This folder allows the user to change certain features of the DSS 10 to preferred settings. Aspects of the screen appearance, layout and functionality will be modifiable by the user. These preferences are saved and remembered between different DSS 10 user sessions (see FIG. 50).

Domains

Select Data Domain

Figure 51:
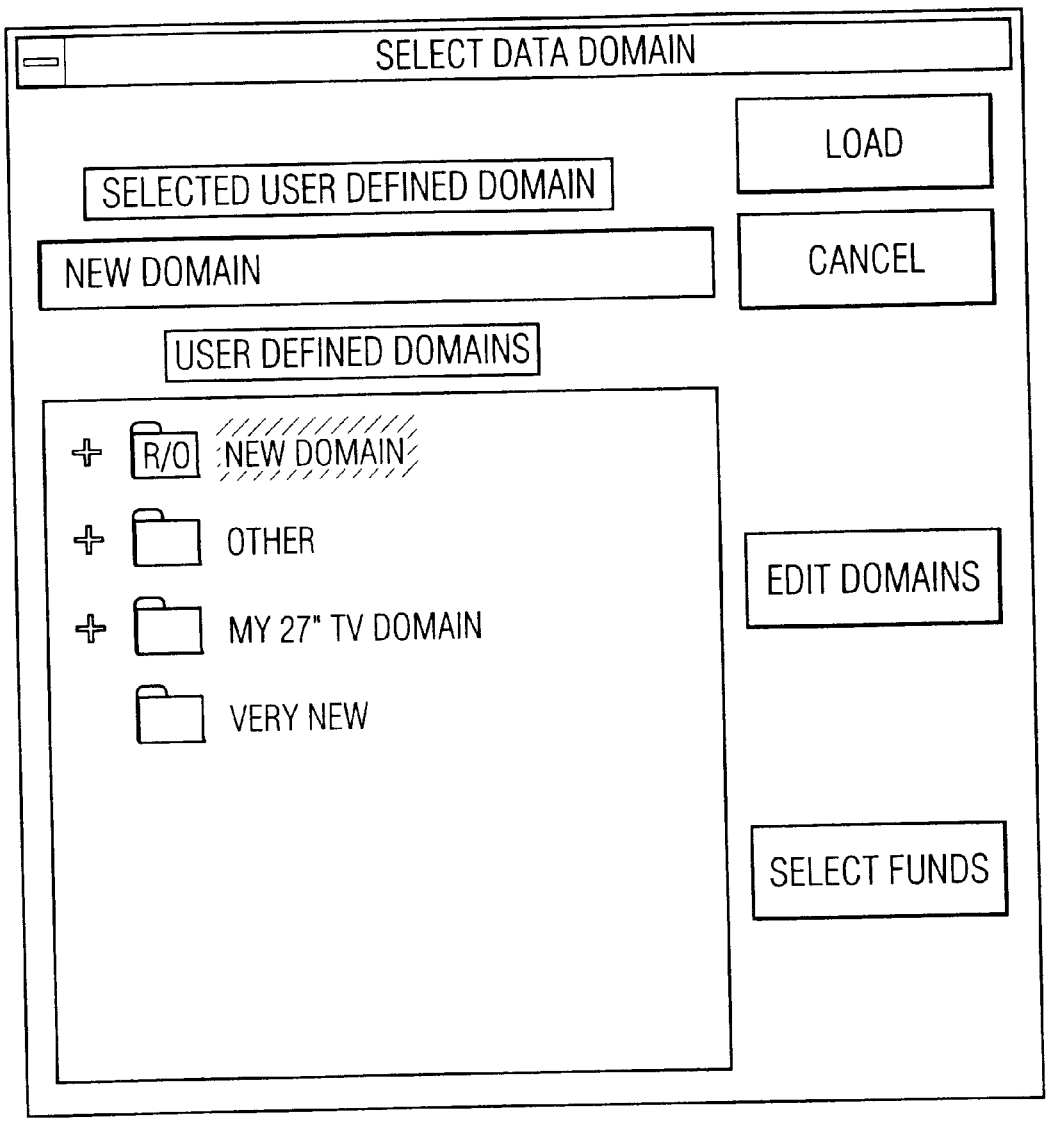
FIG. 51 The Select Data Domain Form.

The primary interaction screen for the Domain functionality is the Select Data Domain dialog box (see FIG. 51). The purpose of this dialog box is to display a list of all domains available to the user. It also allows the user access to dialog boxes for, editing, creating and deleting user domains. This set of functions constitutes the core functionality for the domain object.

The major features and functionalities of the Select Data Domain dialog box are discussed below. An area showing, in a graphical way, the available domains. This list is built from two separate lists of domains. One set of domains is a default list of domains available to all users. The second set of domains is a user-specific set of domains. This set of domains can be created, edited and deleted by the user. The default set of domains is immutable. Each domain is represented by a folder. Double clicking on a folder selects the folder and adds it to the Currently Selected Domain text box. Double clicking on a folder expands the folder and shows the customer-product tuples that are within the domain. An area showing the currently selected domain name. A button to allow Loading of the currently selected domain. A Cancel button to allow the user to exit the dialog box without selecting any domain and without initiating a load operation. The Cancel is only valid for operations performed on the current dialog box. Editing operation performed during the session will persist. An Edit Domain button to allow users to modify existing domains, create new domains and delete unneeded domains. This functionality is only available for user-created domains and not for default domains.

Edit Domain

Figure 52:
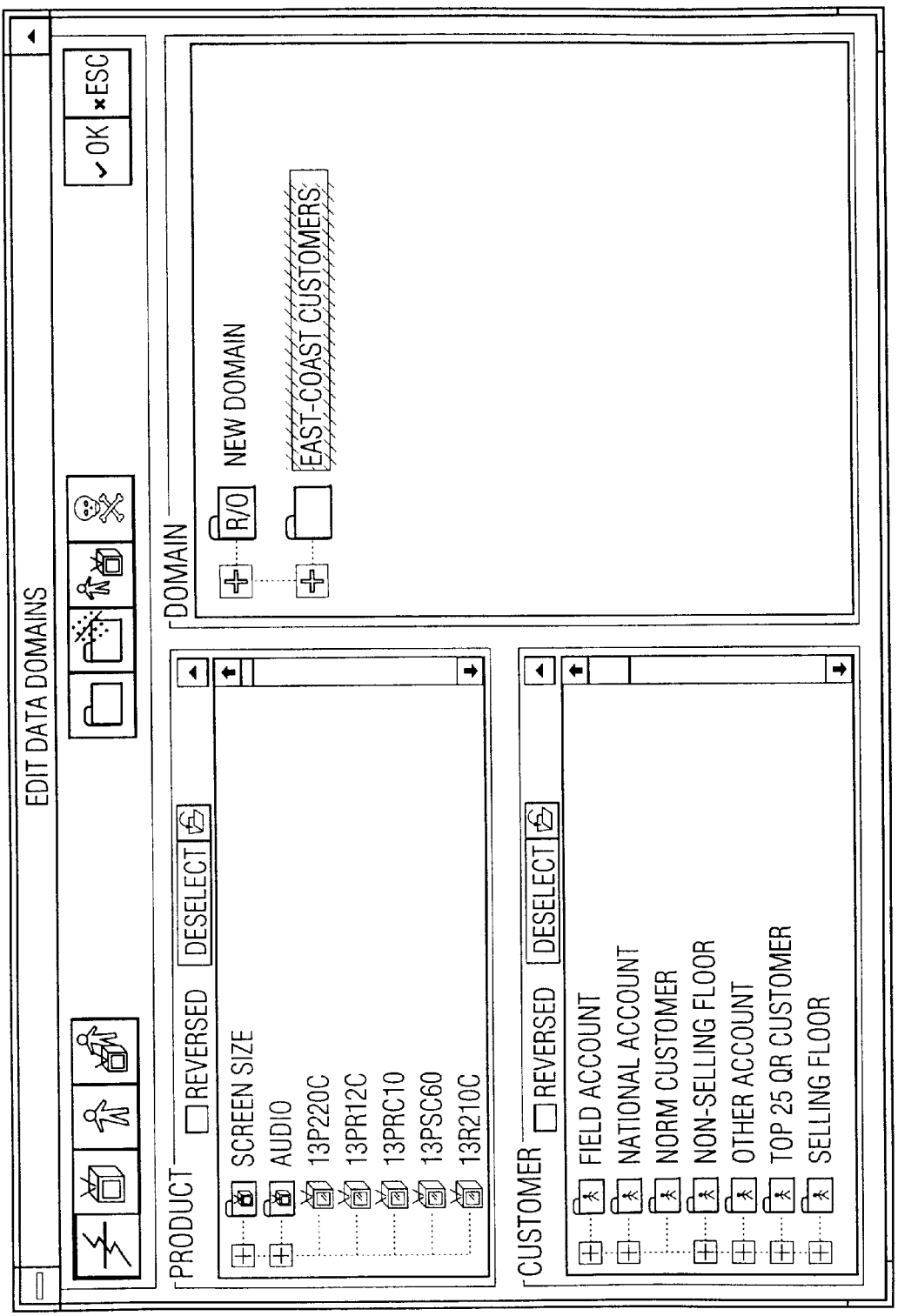
FIG. 52 Edit Data Domain Dialog box.

The Edit Data Domain function allows the user to create new, user-defined domains and add them to the list of existing domains. In addition, the edit domain window allows the user to modify existing domains and delete unneeded domains. The user can create tuples from a tree-like listing of all available products and product groupings and all available customer/customer groupings. The user may add as many tuples to the new domain as necessary. The user must give the domain a unique name and save it. It is then added to the list of available domains for the user (See FIG. 52).

The major features and the usage of the features of the Edit Data Domain dialog box are discussed below. To create a new domain, the user must click the Add New Domain button on the tool bar. This will create a new domain in the list of existing domain and open a name change box over the name of the domain so the user may give the new domain a unique name. To add a new tuple to a domain the user must have a selected domain in the domain list. Next the user must click on a product or product group in the product tree and/or a customer or customer group in the customer tree and click the Add to Domain button on the toolbar to add the selected tuple to the selected domain. Only one product/product group and one customer/customer group may be selected at a time. Selecting a group will result in aggregated data for the selected group being displayed. If data for the members of the group will be needed, the system will assist the user by displaying the data at appropriate resolution. However, some analysis may require that all of the data for the members be loaded. A shortcut key will be provided to allow the user to select all of the products or customers that make up a selected group. The user may select as many tuples as necessary. To remove a tuple from the new domain, the user must select the tuple from the list of tuples to be added to the new domain and click the Delete button on the toolbar. To delete an entire domain, highlight the domain to be deleted in the list of domains and click the Delete button on the toolbar. The user will be warned that this action will result in the elimination of a domain from the DSS 10. If the user clicks OK, the domain is deleted. If Cancel is clicked, the domain will not be deleted. When naming a new domain: the new domain may not have the same name as an existing user domain nor the same name as an existing default domain; and the domain name should be something descriptive to the user so he will remember what the domain represents. The user saves the new data domain and exits the dialog box by selecting the OK button. If the user exits without saving the new domain, he/she will be asked whether the new domain should be saved. The user can exit the dialog box without saving the new data domain by clicking the Cancel button. Default domains cannot be added by the user. Default Data Domains are created and added to the DSS Database 12 by a systems administrator with this access privilege. The user may choose between four different modes for viewing the Customer and Product trees as discussed below. The "Product View" enables the user to first click on a product or product group in the Product tree. When a product or product group has been selected, the Customer tree is updated to display only the customers and customer groups that are relevant. The "Customer View" enables the user to first click on a customers or customer group in the Customer tree. When a customer or customer group has been selected, the Product tree is updated to display only the product and product groups that are relevant. The "Customer-Product View" enables the user to first click on either an element of the Customer tree or an element of the Product tree and see the existing related elements in the other tree. The "Neutral View" displays all customer and customer groups and all product and product groups with no linkage between them. This view allows users to select tuples without regard for the existing relationship between the products and a customer. The user also has the ability to reverse the tree and show all the parental relationships involving a selected element of the tree. This is accomplished by way of the Reversed check box located at the top of the Customer and Product trees. By clicking the check box the tree is reversed, based on the currently selected element of the tree. Either a group or an individual product or customer may be selected. The tree may then be rotated to show the groups it belongs to. To restore the view to the normal view, uncheck the check box.

Figure 53:
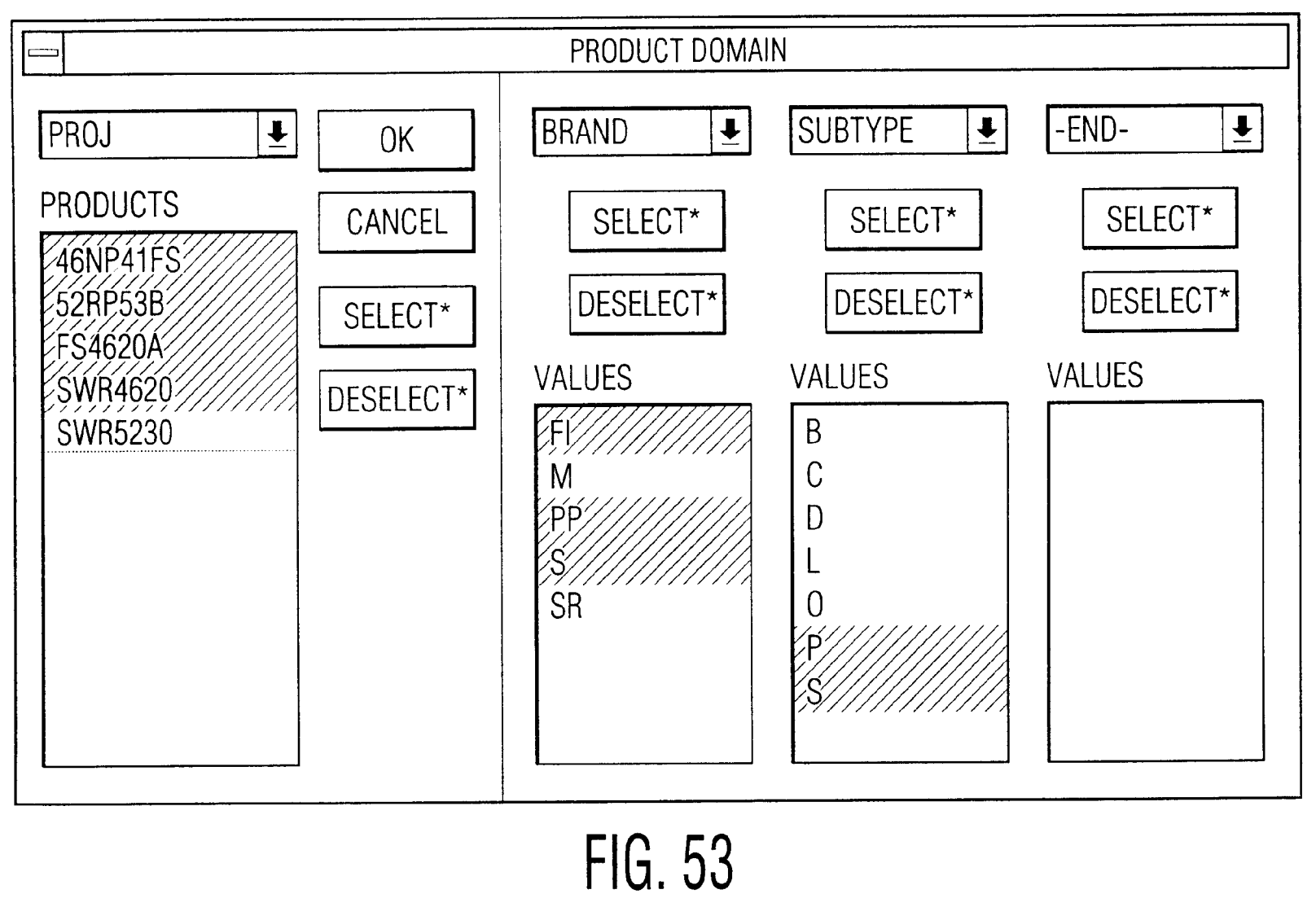

The user may deselect any selection made in a Product or Customer tree by clicking the Deselect button located above the desired tree. This will remove the highlight bar from the currently selected tree element and leave all elements of the tree in the unselected state. This is useful if the user wishes to select an element from only one or two trees, but not all.
Make Product Set The Make Product Set dialog box gives the user an alternate way to make a domain which only consists of products and product groups (see FIG. 53). Using this dialog box, the user may select groups of product numbers based on features of the products. This function can be accessed from the Edit Data Domain dialog box by clicking the Make Product Set button on the toolbar. This will open the Make Product Set dialog box.

First, the user selects a product category from the product category list. Then, the user selects a feature (or features) that will be used as selection criteria(i.e., the Brand) in a combo box in the right part of the dialog box. Once the feature selection is made, the possible values for that feature will appear in a list box below the selected feature name. The user may then highlight the features desired. Immediately after the feature type (i.e., Brand) is selected, a new blank feature type selection box appears to the right of the selected feature type. This allows the user to select a second feature choice to use as a selection criteria (i.e., Subtype). Once again, the possible values are then listed in a list box below the selected feature type and a third feature type selection combo box appears to the right of the last selection combo box. This process will repeat until there are no more feature types related to the products. The user may select all of the choices for the feature by clicking the Select * button located directly below the Feature Type dialog box. In the following example, the resulting domain consists of products in the "PROJ" product category with brand being "FI", "PP" or "S" and subtype being "P" or "S". The products that satisfy these selection criteria are shown in the "Products" list.

As the user makes selections from among the Feature choices, the list of products matching the selection criteria is updated in the Products list box. The user may select a set of these selected products to use as the domain, or may choose all of the products selected using the Select button. When the user has the desired set of products, OK is clicked to copy the selection to the Edit Data Domain dialog box.
Scenarios 78

Scenarios 78 are the vehicle for saving and reloading experimental work. From each frame a user has the ability to save a scenario to retain the what-if analysis work performed. Once a scenario is saved, it may be accessed by other users as a means of sharing analysis and planning results among different users. A scenario may also be used to save the logic behind a business decision, so the factors contributing to the decision may be analyzed at a later date and possibly reused.

When the user chooses Save Scenario from the File menu group, the Save Scenario dialog box is presented (see FIG. 54). At the top of the dialog box is an edit box showing the name of the selected scenario the current information should be saved to. If the user wishes to create a new scenario, the name of the scenario is typed into this edit box and the data will be saved under this new scenario name. Scenario names must be unique.

The user has write access to a Scenario 78 to save the modified information to an existing scenario. Scenarios 78 for which the user does not have write-privileges will appear grayed-out in the Save Scenario dialog box, and the DSS 10 will not allow the user to save to this scenario. The user may also add a description to the scenario and this description will appear at the bottom of the Save Scenario screen. This is a free text area where the user may type any words to describe the scenario. Each time the scenario is saved, the Date Updated field of the scenario is automatically changed to the current date and time. The scenario is saved when the user clicks the OK button. If the user clicks the Cancel button, the scenario is not saved.

If the user wishes to load an existing Scenario 78 , the Open Scenario menu choice on the File menu is selected (see FIG. 55). Scenarios 78 that were created by other users appear with a RO tag, for read only. These Scenarios 78 may be loaded but cannot be saved. The user may always save these Scenarios 78 to a new scenario, if desired.
Demand Management Frame The User Interface for Demand Management (DM) Frame 130 provides the user with a consistent environment for carrying out these five activities: Demand Characterization; Bottom-up Forecasting; Top-down Forecasting; Sales Promotion Analysis; and Forecast Performance Evaluation.

Each of these activities requires a slightly different User Interface to accomplish the task at hand. Therefore, a different screen is used for each, although they will share many common elements, tools, and procedures. Within the DM Frame, any number of activities can be operative, however, the user may view only one screen at a time. The user may change the view from one screen to another without losing any data or configuration information associated with each screen.

All DM activities take place within the same data domain, although different Data Domains may be active in other Frames 16 of the DSS 10. The user can select a new data domain for the DM activities at any time using the standard DSS 10 data domain selection dialog box.

There are several desirable features common to each of the DM screens. Regardless of the area in which the user is working, the user is able to perform the following operations: save and retrieve DM configuration information; save and retrieve data from the DSS Database 12; save and retrieve DM data as a scenario; display point-of-sales or shipment data (where applicable); specify limits on data time series; specify the resolution of data time series (yearly, monthly, weekly); display data as absolute values, or as percentages of some total values; display data in tabular or graphical form; clear, cut, copy, paste data series within the DSS 10 and Windows environment; and apply functions to data in a "scratch" or work area.

Work Area Pop-Up Screen

In addition to the dedicated screens, a pop-up window is available to act as a scratch or work area. Data series can be cut, copied, and pasted to and from this window and other DSS windows, as well as other Windows applications. Users can use this window to process and analyze data.

The following sections describe each of the DM screens in more detail.

Demand Characterization

This area of the demand characterization screen enables the user to visualize the selected domain in outline form. The user can then select one or more data streams at any level of aggregation, and by using the option menu, specify the type of data to be displayed: sales history, sales characteristics, or Market Data 140. The Market Data 140 may not be always available at the same resolution as the firm's Demand History Data 136. Therefore, special "market Data Domains" are created to facilitate access to the Market Data 140.

On the right hand side of the grid the user can choose between a set of summary statistics to be displayed: YTD Year to date; YTG Year to go; YTDL Year to date last year; YTDB Year to date budget; YTGB Year to go budget; and L12M Last 12 months.

Several analysis tools are available: Trend, Moving average, Pattern changes, Pareto analysis, and correlation between products. The output of these analyses can be displayed in table or in graph.

Sales Characteristics Screen

A set of Sales Characteristics can be computed and displayed in a special table: average level of demand, trend, volatility, and lumpiness. Accessing this table can be done through the menu under the option entry Bottom-Up Forecast The Bottom-Up (BU) forecast screen (see FIG. 56) contains a Customer Table and a Product Table which have several configurable columns and data display options. BU operations and functions are accessed from the BU screen menu and subsequent dialog boxes.

Customer Table

Since BU forecasting is a customer-driven operation, the topmost table displays the customer tree for the selected domain. Only those domain entries which are strictly customer-oriented are shown in the customer table. Entries are displayed in an outline form as they were defined in the domain. The first column in the table lists the names of customer groups or customers, while the remaining columns contain the total sales data for that customer. A split line in the table divides historical and Forecast Data 146. The time spans for historical and Forecast Data 146 can be specified by the user.

Customer groups may be expanded or collapsed by double clicking their names in the Customer column entry.

Product Table

The bottom table displays all products carried by the selected customer (group). Sales data for each product shown is presented in outline form, which may be expanded or collapsed by double clicking on a product name. The entries beneath each product include actual orders, forward orders, and orientation orders. As with the Customer Table, the table is split to show both historical and Forecast Data 146. The user may specify the position in the time series for the historical and Forecast Data 146. Promotion periods are highlighted on the display.

Total Columns

On the right side of the Product table is three columns which can display a selection of user-defined totals from the following choices: YTD Year to date; YTG Year to go; YTDL Year to date last year; YTDB Year to date budget; YTGB Year to go budget; and L12M Last 12 months.

General Features

Promotions periods are displayed highlighted. The impact of promoted verses unpromoted sales can be displayed separately in drop-off cells. The mix percentage can be used to disaggregate a forecast generated at the aggregated level of the customer or customer group.

Disaggregation can also be done based on the total for the year and some user defined seasonality factors when the menu option "Disaggregate Total year" is chosen. Time series of user defined "leading indicators" can be displayed for reference and forecasting purposes.

Top-Down Forecast

As would be expected, the Top-Down (TD) forecast screen (see FIG. 57) is similar to the Bottom-Up Forecast screen, except that the interface is arranged for product-driven forecast operations. On the TD screen the Product table appears at the top, while the Customer table appears below it. Data display options and forecasting tools for TD operations are accessed from the TD screen menu and subsequent dialog boxes.

Product Table

The Product table displays the list of products from the selected domain. Only those entries which are strictly product-oriented are shown in this table, and are displayed in an outline form as they were defined in the domain. The first column in the table lists the names of product groups or individual products, while the remaining columns contain the sales data for that product aggregated at the appropriate level. A split line in the table divides historical and Forecast Data 146.

Then the user selects a product group or product from the Product table, the list of customers carrying the product(s) is displayed in the Customer table as described below. Product groups may be expanded or collapsed by double clicking their names in the Product column entry.

Customer Table

The bottom table displays all customers who carry any of the products selected in the Product table. If a customer carries all of the selected products, it is displayed in a focused font, otherwise it is shown in normal font. Sales data for each customer is shown. The entries beneath each product include actual orders, forward orders, and orientation orders. As with the Product table, the customer table is split to show both historical and Forecast Data 146. The user may specify the position in the time series for the historical and Forecast Data 146. Promotion periods are highlighted on the display.

Total Columns

On the right side of the Customer table are three columns which can display a selection of user-defined totals from the following choices: YTD Year to date; YTG Year to go; YTDL Year to date last year; YTDB Year to date budget; YTGB Year to go budget; and L12M Last 12 months.

General Features

Promotion periods are displayed highlighted. The impact of promoted verses unpromoted sales can be displayed separately in drop-off cells. The mix percentage can be used to disaggregate a forecast generated at the aggregated level of the customer or customer group.

Disaggregation can also be done based on the total for the year and some user defined seasonality factors when the menu option "Disaggregate Total Year" is chosen. Time series of user defined "leading indicators" can be displayed for reference and forecasting purposes.

Sales Promotion Analysis

The User Interface that supports Sales Promotion Analysis is built around the promotion calendar. The promotion calendar shows the list of all the past and planned promotions for the set of products and customers defined by the selected domain.

For each promotion the following is displayed in the promotion calendar: starting date of the promotion; end date of the promotion; promotion type; promotion class; product being promoted; customers supporting the promotions; promotion intensity; and impact of the promotion.

Figure 58:
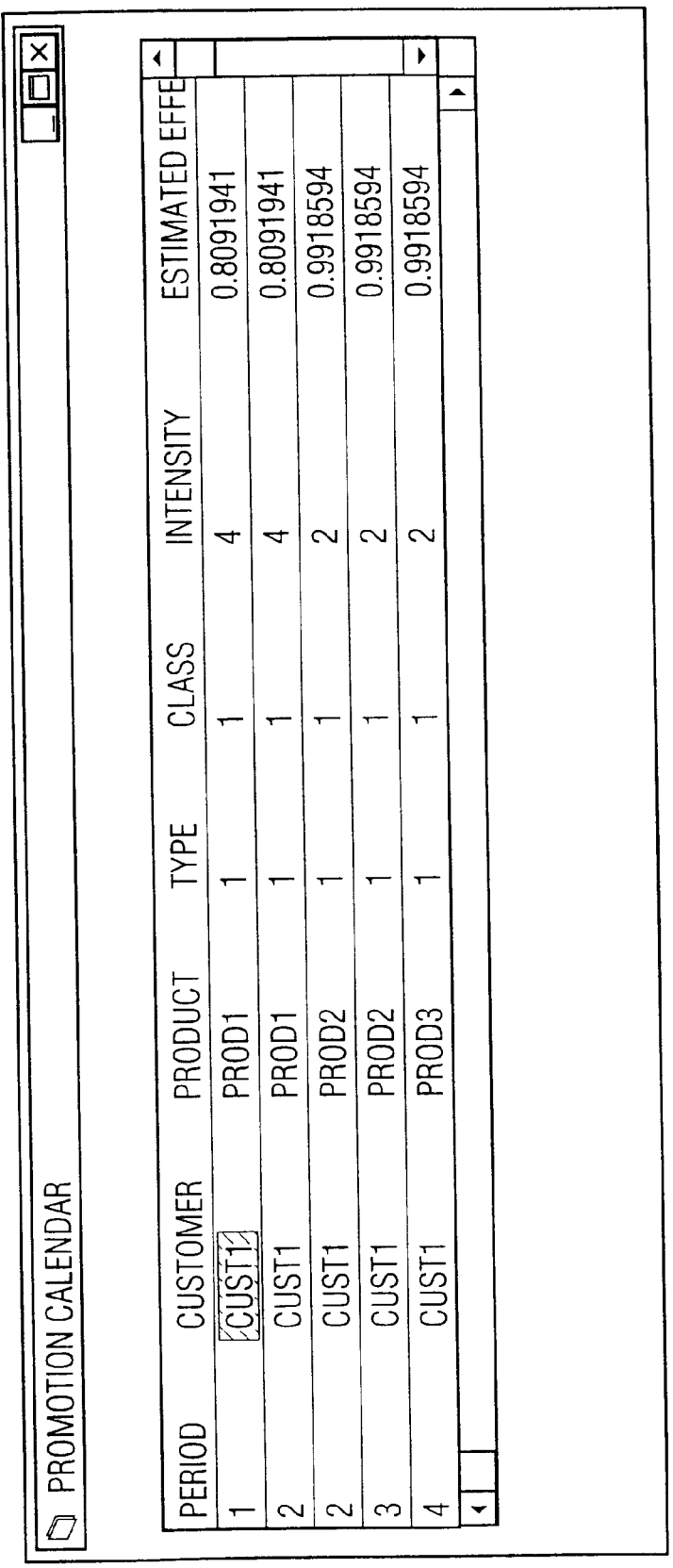
FIG. 58 Promotion Calendar Main Display.

When the user clicks on the promotion calendar button on the toolbar, the promotion calendar Main Display Window is displayed (see FIG. 58).

The user can select one or several promotions in the promotion calendar. For these promotions the user can perform the operations discussed below. Display shipment and POS Data 138 in table formats similar to the one used in BU and TD forecasts. Compute the promotion impact for past promotions. Estimate the impact of future promotions. Display graphically the impact of the promotions on sales.

Figure 59:
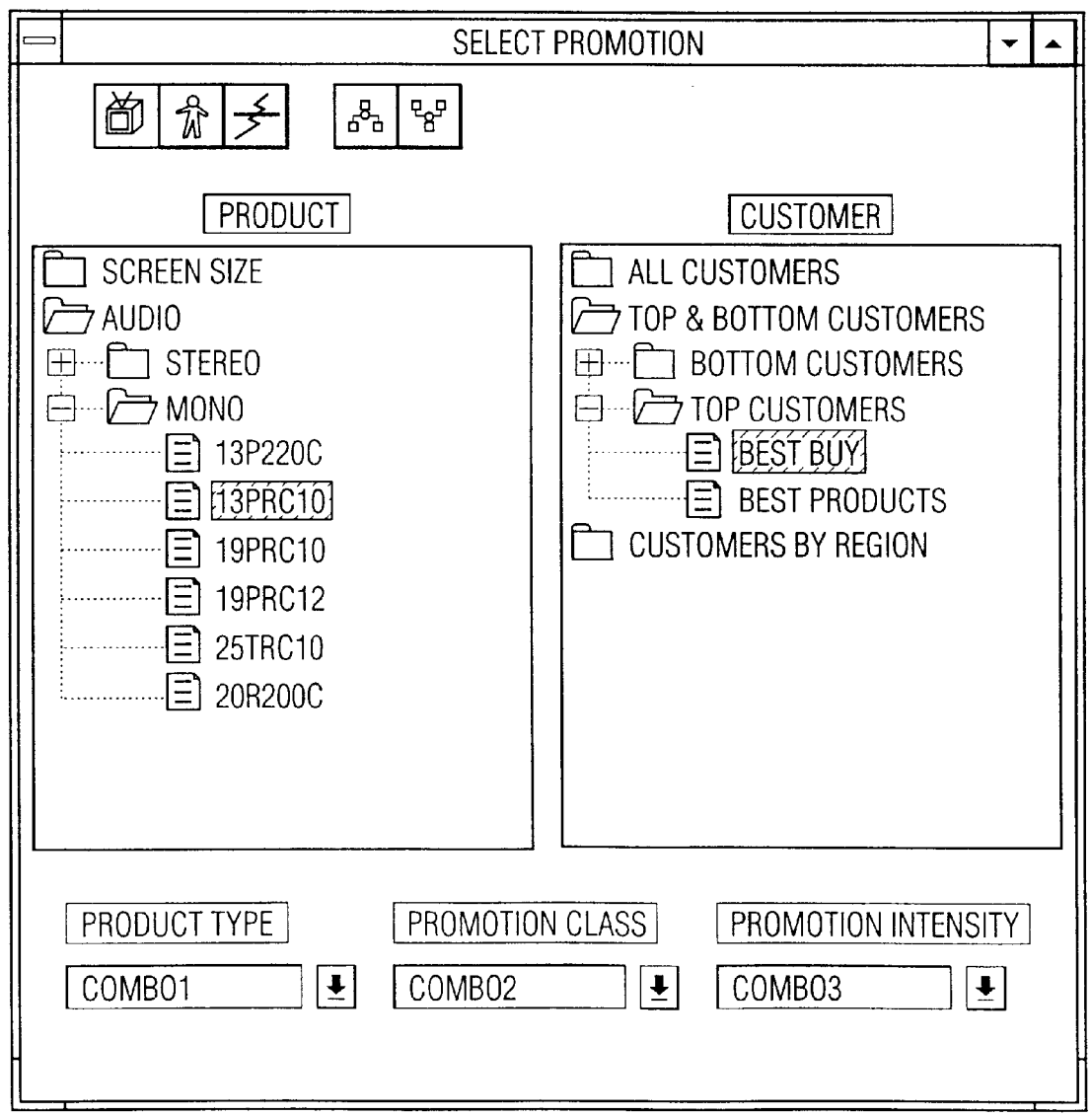
FIG. 59 The Promotion Selection Wizard.

If the user wishes to view the customer-product tuple (domain) that promotions are displayed for, or wishes to limit the promotions shown by choosing what Promotion Type, Promotion Class and Promotion Intensity he wishes to analyze, the Promotion Selection Wizard may be invoked. The user selects the customer-product pairs that analysis is to take place on and can limit the selection by choosing what Promotion Type, Promotion Class and Promotion Intensity he wishes to analyze. When the OK button is clicked, the Promotion Calendar dialog box is populated with all promotions that match the selection criteria (See FIG. 59).

PSI Frame

The PSI main screen is a work area where the user can experiment with different Production, Inventory and Sales figures and see the effects caused by these changes to eventually converge to the most desirable PSI plan 190. The Main PSI Screen (see FIG. 61) initially shows the Production, Inventory and Sales for all of the products in the user selected domain. The figures for all of the products are aggregated together and shown. The user may also select any individual product in the aggregation and show the numbers for this product alone. This can be done by choosing the desired product number from the Product selection combo box located near the top left of the screen. The first choice in the combo box is always All Products to allow the aggregation of all products to be shown. The user may change the products being analyzed by selecting a new set of products from all available products. This may be done by selecting a new domain.

Directly following the Production (P), Inventory (I) and Sales (S) lines are Temporary P, S and I lines (see FIG. 60). This is a work area where the user may copy and experiment with the real P, S or I figures and modify them to create new Scenarios 78. Copy and Paste are enabled on this form so the user may copy the original numbers to the work areas. The user may also copy a time series from another part of the DSS 10 or a separate application to the temporary lines through copy and paste. Lastly, the user may load data from a saved scenario to the temporary lines on the form. The individual cells that comprise the temporary work area may be manually edited by the user by clicking on the desired cell and changing the value in the cell.

Also present on the work area of the form are Top-Down, Bottom Up, Customer demand information, a Top-Down minus Bottom Up (TD-BU) and Top-Down minus Sales (TD-S) lines. These lines give the user different and useful views into the planning data under analysis. These lines are calculated based on the values in the temporary P, S and I lines of the form.

The last column displayed on the screen is a sum of the data displayed on the screen for the current year. This column remains on the screen and does not scroll left to right as other columns are being scrolled horizontally. The titles of the various horizontal lines of data also does not scroll, but the data series may be scrolled forward or backward through time. The month and year associated with the data are displayed immediately above the working area of the screen.

PSI Reconciliation

Figure 62:
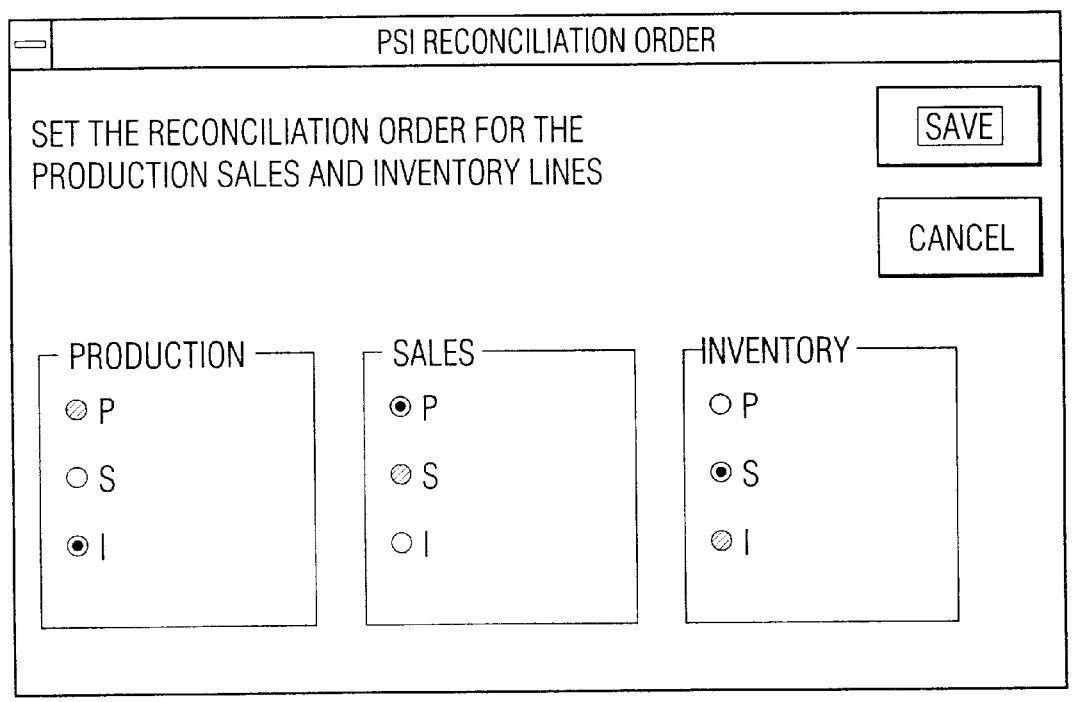
FIG. 62 PSI Reconciliation Order Dialog Box.

While working with the data in the temporary P, I and S lines, the user may want to make sure the three lines are always consistent. This may be accomplished by selecting PSI Reconciliation on the Options menu (see FIG. 62).

When selected, a check mark will appear next to this menu choice and the PSI screen will reconcile all data input by the user. PSI Reconciliation 170 functions by updating one line of data based on a new value input into a different line. The user has control over which line gets updated by setting the PSI reconciliation order.

Figure 61:
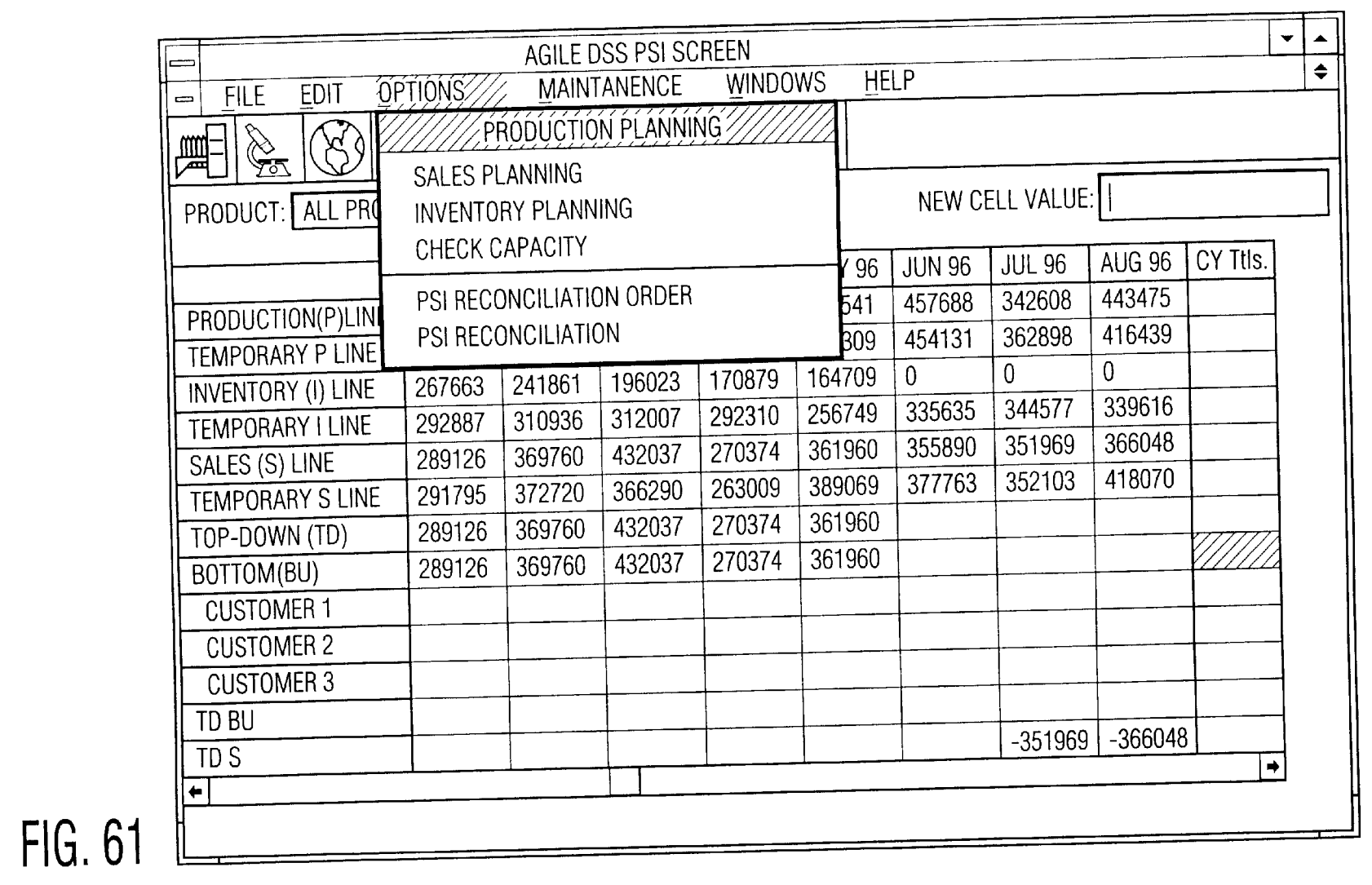

The user sets the PSI reconciliation order by choosing PSI Reconciliation Order from the Options Menu (see FIG. 61). This will open the PSI Reconciliation Dialog Box (see FIG. 62). From this window the user can choose which line(P, S or I) is updated when the selected line is modified by the user. In the example shown, the I line would be updated when the Production line is changed.

Capacity Checking

Figure 63:
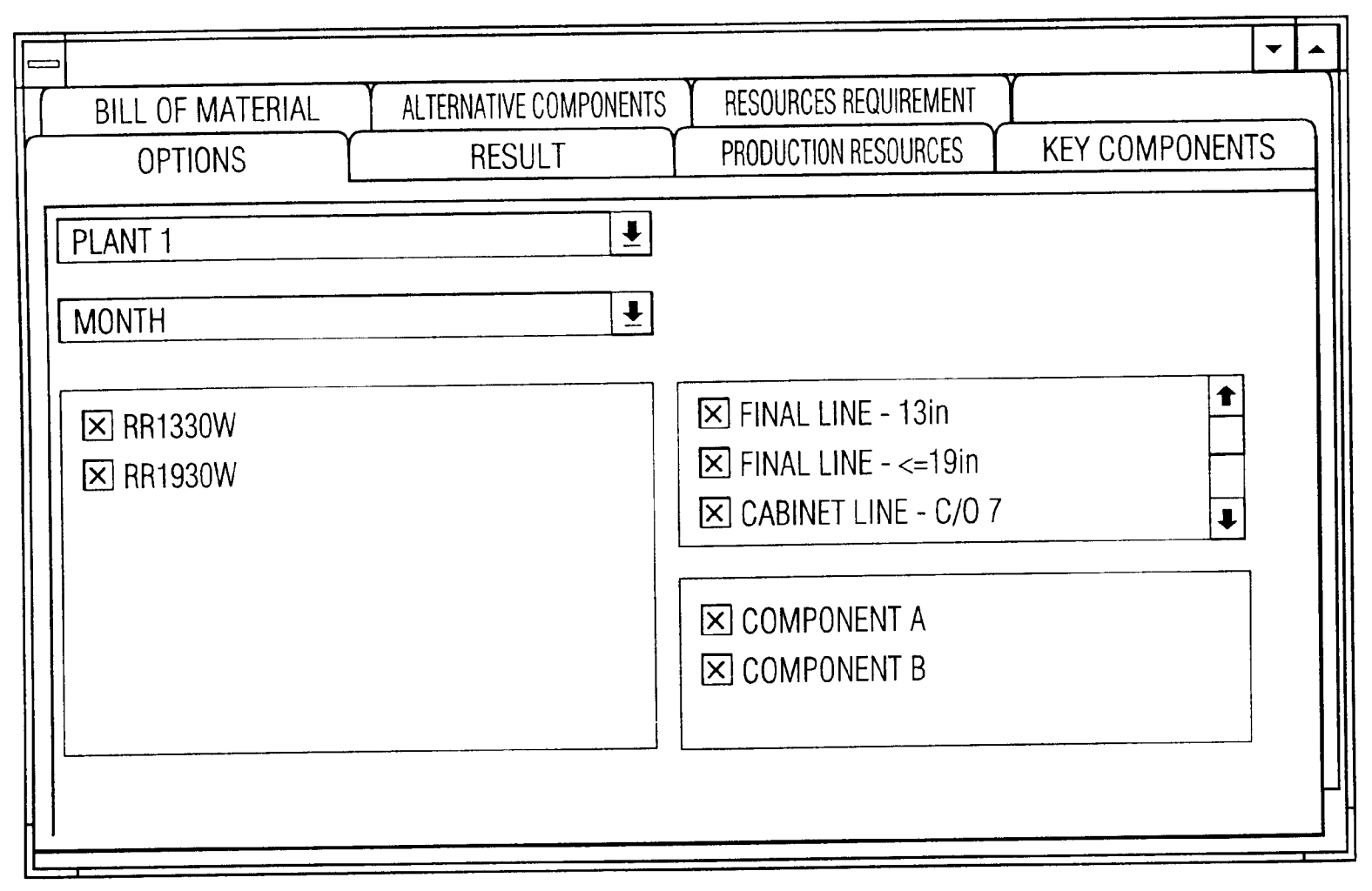

While working with the Production, Inventory and Sales figures, the user may wish to check the capacity of the existing production resources to determine if the current plan is feasible. This is known as capacity checking. This can be accessed by clicking the Check Capacity button on the Options menu group on the main PSI screen. The main capacity checking dialog box will then be displayed (see FIG. 63).

The Options tab allows the user to select the desired plant location and the feature of interest and pick the existing lines that may produce the products with the selected feature. The user may remove selected products from the list of products that he wishes to analyze. The user may select the Production resources he wishes to analyze from the list of available production resources. The user may select the key components of the products that he wishes to analyze. The user may change the options before performing capacity checking to restrict the scope of the Model Engine 20, and after checking capacity for viewing purposes.

The results tab shows (see FIG. 64) the results of the capacity checking. For all products selected, a production plan is displayed, and at the top of the screen, whether or not the plan is feasible is indicated. The capacity checking may be viewed product by product or by product group.

The production resource tab (see FIG. 65) is used to show the available capacity for the selected line for two months. If this line has enough capacity, it is indicated at the top of the screen to be feasible. The user can also see how much capacity remains or how much more is needed by looking at the Over and Under lines.

The Key Components tab (see FIG. 66) is used to view the important components required to assemble a final product and check whether, using the current figures, there is sufficient quantity of these components. If too much production requiring one key component is scheduled and the part will run out, then the key component is indicated as infeasible.

The Bill of Material tab (see FIG. 67) allows the user to see which components are used in which products. By selecting specific components, the user can see which products use the components.

Figure 68:
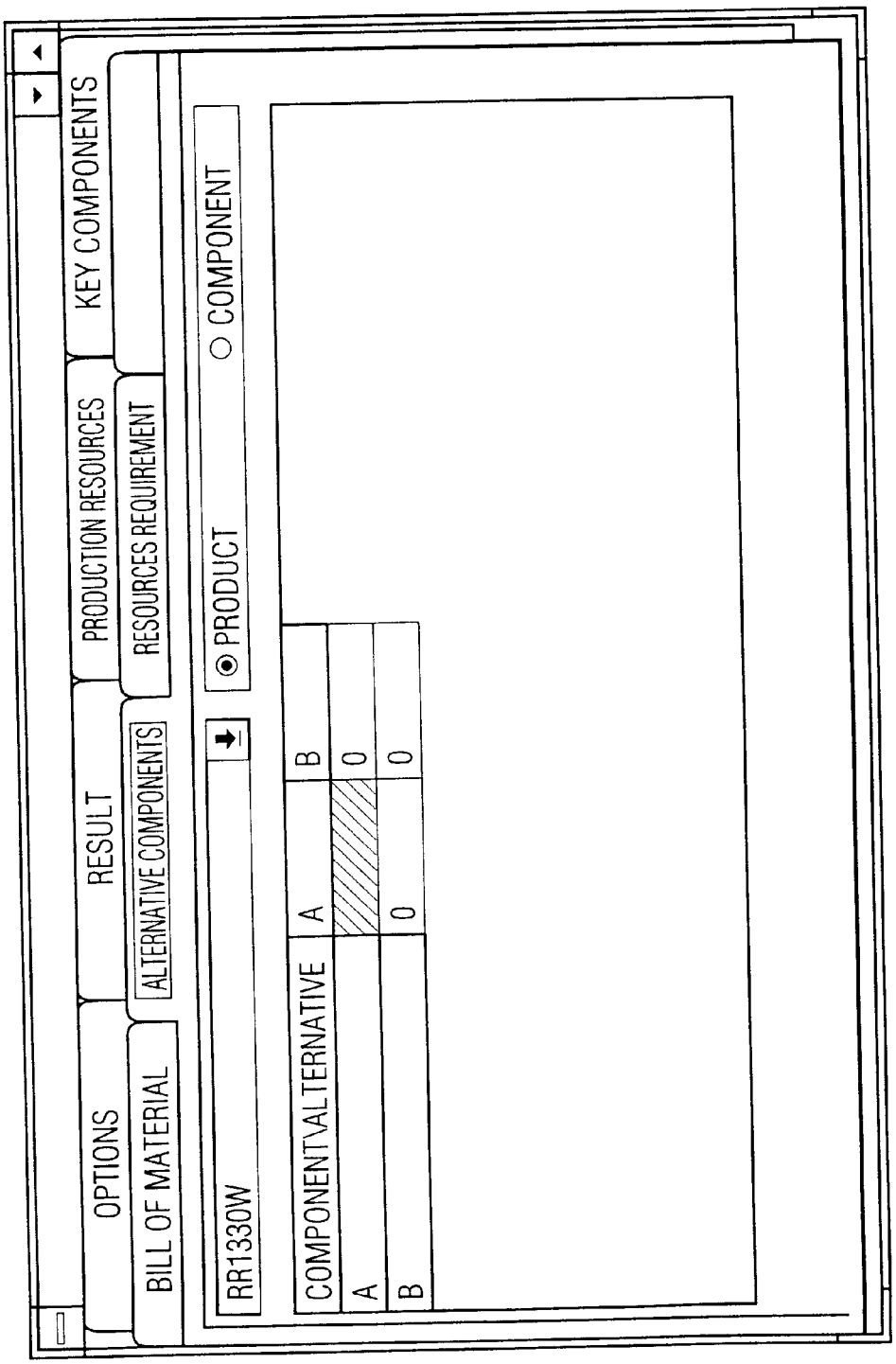
FIG. 68 The Alternative Components Tab.

The Alternative Components tab (see FIG. 68) allows the user to see components that may be substituted for other components during production. The user may view the list in two ways. By selecting Product, the user can see the components that are used to assemble the product and any alternative for the components. By selecting Component, the user can see specific components and any alternative parts that exist.

Figure 69:
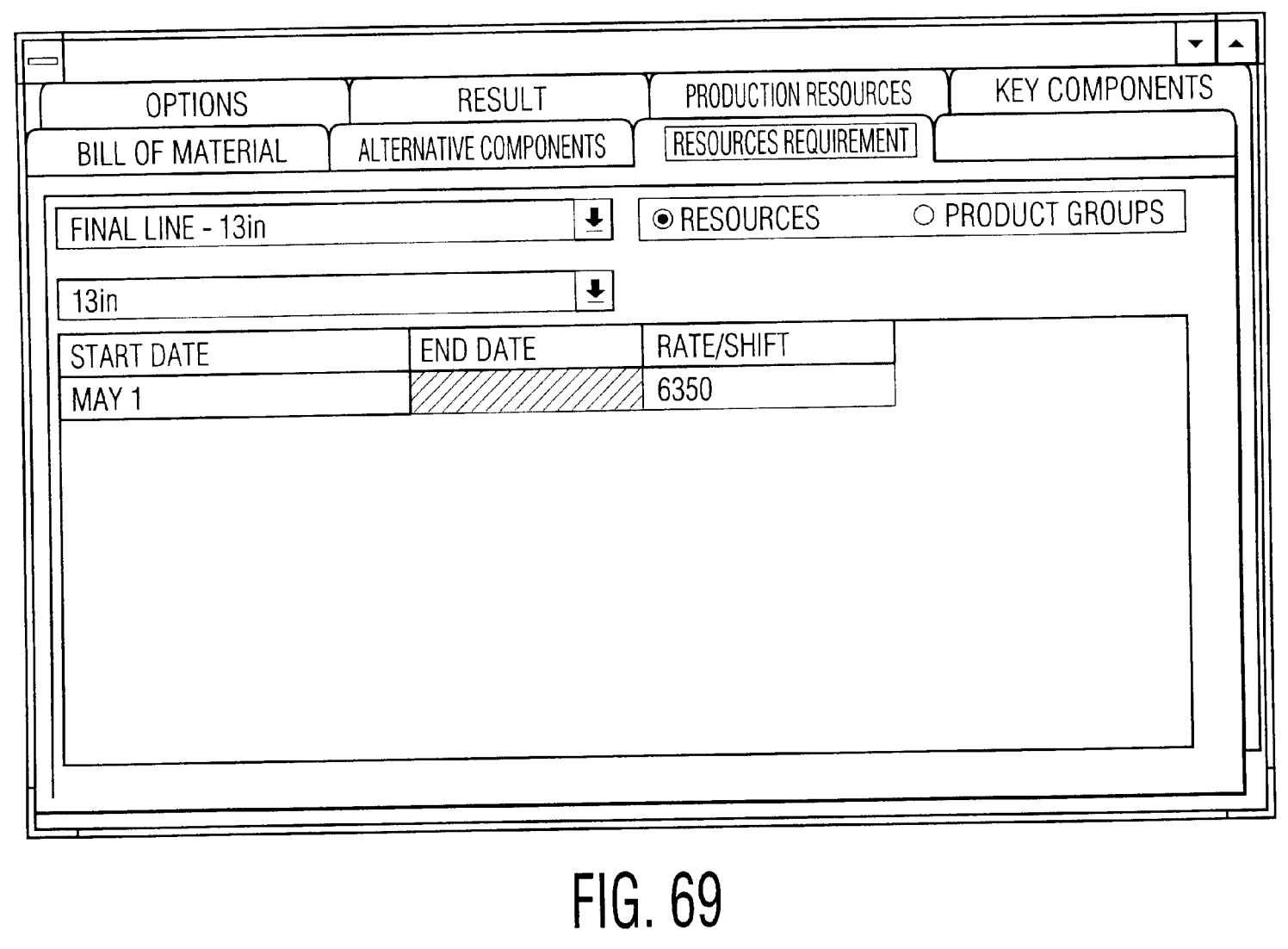

The Resource Requirement tab (see FIG. 69) allows the user to see the projected production plan for a selected assembly line and product feature type. The user may view this by selecting a line then a product group that may be produced on the line or by selecting a product group then a line and viewing the schedule for the selected product groups.

Key Components Selection

To analyze production of a product the user must work with the components that are used to build the product. The user does not need to exhaustively analyze all components, but just a subset of the components. These are the major components of the product and are usually referred to as the Key Components. Which components are considered key may change over time, so the user must have a way of selecting the current key components. This task is performed by using the Key Component Selection dialog box (see FIG. 70).

The Key Components column of the main display area indicates whether the component is a key component. All key components are also shown in a list at the right of the dialog box. The user may change the setting of a component or multiple components by selecting them and clicking the Key Components button to set them to be key or Not Key Components to make the components not key. The user may sort the components so all key components are shown at the top of the list by clicking the Sort Components button.

The second column of the main display area is a total for a selected range of months. The default is for the entire year. The user may select a different range by using the mouse to highlight a range of months and clicking the Ordered Based on Months button. This will retotal the column for the selected range of months and change the caption for the column to indicate the month range selected. It will also sort the list of components to show the products from greatest availability over usage to least availability over usage over the selected time period.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

Appendix A
Database Specifications for Manufacturing Supply Chain
The following are the specifications of the data tables for the manufacturing supply chain.

| Field Identifier | Field Type | Description |
| --- | --- | --- |
| Aggregate Production Plan Data Data related to the aggregate production plan for the product and resource identified in the APP header | | |
| APPHeaderID | Long | APP Header identifier (see aggregate production plan Header table). |
| TimePeriod | Date/Time | Time period number |
| SupplyOrderID | Text | Supply order pegged to (if available) |
| Quantity | Double | Number of units of production |
| ProposedChange | Double | Recommended change in the planned quantity (to store changes between regeneration of APPS) |
| Aggregate Production Plan Header Header file for defining the Product X Resource X Time resolutions and values for various aggregate production plans. | | |
| APPHeaderID | Long | APP Data Series Identifier |
| APPID | Text | Identifier for an aggregate production plan |
| ResourceResolution | Text | Resource Resolution: R-Resource, G-Group, N-Node |
| ResourceID | Text | Resource associated with an aggregate production plan |
| ProductResolution | Text | Product Resolution: P-Product, G-Group |
| ProductID | Text | Product associated with an aggregate production plan |
| TimeResolution | Text | D for day; W for week; F for bi-weekly; M for monthly; B for bi-monthly; Q for quarterly; and A for annually. |
| CalendarID | Integer | Pegged to a predefined calendar |
| DateCreated | Date/Time | Date when the aggregate production plan was created (based on the time resolution) |
| ScenarioData | Boolean | Yes if it is scenario data, No otherwise |
| ScenarioCounter | Byte | Number of scenarios in Which this header participates |

-continued

Appendix A
Database Specifications for Manufacturing Supply Chain
The following are the specifications of the data tables for the manufacturing supply chain.

| Field Identifier | Field Type | Description |
| --- | --- | --- |
| Budget Data | | |
| Data for budgeted costs and revenues | | |
| BudgetHeaderID | Long | Budget header identifier |
| TimePeriod | Date/Time | Time period number |
| TargetRevenue | Double | Target revenue in $ |
| BudgetCost | Double | Allocated cost in $ |
| Budget Header | | |
| Header file for defining the Product X Resource X Customer X Time resolutions (not all need be present) for various budgets | | |
| BudgetHeaderID | Long | Identifier for the BudgetHeader |
| ProductResolution | Text | |
| ProductID | Text | |
| CustomerResolution | Text | Customer Resolution: C for Customer, G for Customer Group, A for all |
| CustomerID | Text | Customer associated with the budget |
| ResourceResolution | Text | Resource Resolution: R-Resource, G-Group, N-Node |
| ResourceID | Text | Resource associated with the budget |
| TimeResolution | Text | W for week; F for bi-weekly; M for monthly; B for bi-monthly; Q for quarterly; and A for annually |
| CalendarID | Long | Pegged to a predefined calendar |
| DateCreated | Date/Time | Date of creation for this header |
| ScenarioData | Boolean | Yes if it is scenario data, No otherwise |
| ScenarioCounter | Byte | Number of scenarios in which this header participates |
| Calendar | | |
| Predefined calendars to peg the various data to | | |
| CalendarID | Long | Unique calendar identifier |
| Date | Date/Time | Julian Calendar Date |
| DayNo | Double | Unique number for a day in the calendar year (typically 1 through 365) |
| WeekNo | Double | Unique number for a week in the calendar year (typically 1 through 52) |
| BiWeekNo | Double | Unique number for a bi-week in the calendar year (typically 1 through 26) |
| MonthNo | Double | Unqiue number for a month in the calendar year (typically 1 through 12) |
| BiMonthNo | Double | Unique number for a bi-month in the calendar year (typically 1 through 6) |
| QuarterNo | Double | Unique number for a quarter in the calendar year (typically 1 through 4). |
| HolidayIndicator | Boolean | To indicate whether it is a holiday or not |
| Component | | |
| Data related to components of the products | | |
| ComponentID | Text | ComponentID in the planning BOM from corporate master (e.g. 3317307) |
| ComponentName | Text | Name of the component |
| MinPackQuantity | Double | Minimum pack quantity |
| PhysicalParameter | Text | Physical dimensions for the component |

-continued

Appendix A
Database Specifications for Manufacturing Supply Chain
The following are the specifications of the data tables for the manufacturing supply chain.

| Field Identifier | Field Type | Description |
| --- | --- | --- |
| CompCategory | Text | S for Off-the-Shelf; C for Customized |
| PackagingInstruction | Text | Special packaging requirements |
| Component Accommodation Matrix | | |
| Equivalence of the key components to produce different products. | | |
| ProductID | Text | SKU number |
| PrimaryComponentID | Text | Primary component identifier |
| AlternativeComponentID | Text | Alternative component identifier |
| Quantity | Text | Number of components of the Alternative Component that can substitute for one unit of the Primary component to product ProductID |
| Component Requirement Data | | |
| Data related to requirements for the component identified in the header | | |
| CompReqHeaderID | Long | Identifier for the component requirement header |
| TimePeriod | Date/Time | Time period number |
| Quantity | Double | Number of units during the time period |
| Proposed Change | Double | Proposed Change in required quantity |
| Component Requirement Header | | |
| Header file defining the Component X Time resolutions and values for various component requirement data | | |
| CompReqHeaderID | Long | Component Requirement Header Identifier |
| ComponentID | Text | Component associated with an components requirements plan |
| BOMID | Text | Unique identifier for BOM |
| DateCreated | Date/Time | Date when the component requirements plan was created (based bn the time resolution) |
| TimeResolution | Text | D for day; W for week; F for bi-weekly; M for monthly; B for bi-monthly; Q for quarterly; and A for annually |
| CalendarID | Integer | Pegged to a predefined calendar |
| APPID | Text | Pegged to an aggregate production plan (if warranted) |
| ScenarioData | Boolean | Yes if it is scenario data, No otherwise |
| ScenarioCounter | Byte | Number of scenarios in which this header participates |
| Component Supplier | | |
| Data for the supplier of components | | |
| CompSupplierID | Text | Unique identifier for the component supplier |
| SupplierName | Text | Name of the component supplier |
| PaymentTerms | Text | Example: Net-60 |
| StreetAddress | Text | Street Address |
| StateID | Text | Name of the State |
| PostalCode | Text | Postal code |
| Country | Text | Name of the country |

Appendix A
Database Specifications for Manufacturing Supply Chain
The following are the specifications of the data tables for the manufacturing supply chain.

| Field Identifier | Field Type | Description |
| --- | --- | --- |
| Component Supply Contract | | |
| Data associated with the component supply contract | | |
| SupplyContractID | Text | Identifier for the supply contract |
| ContractDate | Text | Date of the contract |
| NomialLeadTime | Text | Negotiated nominal lead time for a defined average quantity |
| UnitPrice | Double | Negotiated unit price of the component |
| QtyDiscount | Double | Percentage of discount if the quantity is above QtyforDiscount |
| QtyforDiscount | Double | Minimum size of the Order to qualify for the quantity discount |
| MinOrderQty | Double | Minimum quantity that can be ordered from the supplier |
| Component Supply Node | | |
| Data associated with the component supply node | | |
| CompSupplyNodeID | Text | Unique identifier for the supply node (e.g., CVTCabinetNode1) |
| CompSupplierID | Text | Identifier of the component supplier |
| AvgSupplyLeadtime | Double | Average lead time to supply the components (from the time of order) |
| SupplyContractID | Text | ID for the Supply Contract (See Component Supply Contract Table) |
| PreferredCarrier | Text | Preferred transportation carrier for shipping (e.g., FEDEX) |
| Customer | | |
| Data for individual customers | | |
| CustomerID | Text | Customer from corporate customer master (e.g. BestP) |
| ShipToLocation | Text | Specific customer location, (e.g. DC1) |
| DemandNodeID | Text | The demand node this customer is associated with |
| CustomerName | Text | Name of the customer |
| Address | Text | Street address |
| State | Text | Name of the state |
| PostalCode | Text | Postal code (Zipcode for domestic) |
| Country | Text | Name of the Country |
| Customer Group | | |
| Data for customer groups | | |
| CustomerGroupID | Text | Identifier for the customer group |
| CustomerGroupName | Text | Descriptive name of customer group (e.g., Stereo CTV) |
| CustomerGroupTag | Text | Organizational entity who defined the build criteria for the customer group (e.g. Marketing) |
| Comment | Text | |
| ScenarioGroup | Boolean | yes if this is scenario group; No otherwise |
| Customer Group Definition | | |
| Table that identifies the parent-child relationship between customer groups and customers | | |
| CustomerGroupID | Text | Name of the customer group |
| CustomerID | Text | Name of the member customer (or customer group) |
| Customer Orders | | |
| Data for actual customer orders | | |
| CustomerOrderId | Text | ID for the actual customer order (e.g. pcec type 1 orders) |
| LineitemID | Text | Line item within the order |
| CustomerOrderRefNo | Text | Customer's purchase order identifier |
| CustomerID | Text | Customer identified with the order |
| ShipToLocation | Text | Ship to location for the order |
| ProductID | Text | Product associated with the order |
| CalendarID | Long | Pegged to a calendar |
| TimeResolution | Text | D for day; W for week; F for bi-weekly; M for monthly; B for bi-monthly; Q for quarterly; and A for annually. |
| OrderEntryDate | Date/Time | Expressed in terms of the calendar and time resolution |
| RequestedDate | Date/Time | Expressed in terms of the calendar and time resolution |
| DueDate | Date/Time | Expressed in term of the calendar and time resolution |
| ShipDate | Date/Time | Expressed in terms of the calendar and time resolution |
| DeliveryDate | Date/Time | Expressed in terms of the calendar and time resolution |
| Quantity | Double | Quantity of the order |
| Comments | Memo | Such as value added services associated with the order |
| Customer Product Resource Relationship Matrix | | |
| Table that identifies the Customers, Product and Resources that have pairwise relationships | | |
| ProductResolution | Text | Resolution of the product; P for product, G for product group |
| ProductID | Text | Identifier for the product or product group |
| CustomerResolution | Text | Resolution of the customer: C for customer, G for customer group |
| CustomerID | Text | Identifier for the customer or customer group. |
| DatatypeID | Text | POS Data, Top Down Forecast, Bottom Up Forecast |
| ResourceResolution | Text | Resolution of the resource: R for |

-continued

Appendix A
Database Specifications for Manufacturing Supply Chain
The following are the specifications of the data tables for the manufacturing supply chain.

| Field Identifier | Field Type | Description |
| --- | --- | --- |
| ResourceID | Text | resource, G for resource group Identifier for the resource or resource group |
| Demand History Data | | |
| Data for the demand history for the product defined in the header | | |
| DemandHistHeaderID | Long | Identifier for a demand history |
| TimePeriod | Date/Time | Time period number |
| DemandQty | Long | Demand Quantity |
| Demand History Header | | |
| Header file defining the Customer X Product X Time resolutions & values for various demand histories | | |
| DemandHistHeaderID | Long | Identifier for a demand history header |
| ProductResolution | Text | P for product; G for product Group; A for all products |
| ProductID | Text | Product associated with demand history |
| CustomerResolution | Text | S for customer ship to; C for customer; G for customer group; M for market; A for all customers |
| CustomerID | Text | Customer associated with demand history |
| TimeResolution | Text | D for day; W for week; F for bi-weekly; M for monthly; B for bi-monthly; Q for quarterly; and A for annually. |
| CalendarID | Integer | Pegged to a predefined calendar |
| DateCreated | Date/Time | Date of creation of the header |
| ScenarioData | Boolean | Yes if it is scenario data, No otherwise |
| ScenarioCounter | Byte | Number of scenarios in which this header participates |
| Demand Node | | |
| Data associated with the demand node | | |
| DemandNodeID | Text | Unique identifier for the demand node (e.g., SEARS or a region) from the enterprise point of view |
| DemandNodeName | Text | Description of demand node |
| Comment | Text | |
| Demand Orientation Data | | |
| Data associated with the demand orientation for the product identified in the header | | |
| OrientationHeaderID | Long | Orientation Header Identifier |
| TimePeriod | Date/Time | Date when the order is projected as required |
| Quantity | Double | Quantity of the orientation |
| Demand Orientation Header | | |
| Header file defining the Customer X Product X Time resolutions and values for various demand orientations | | |
| OrientationHeaderID | Long | Orientation Header Identifier |

-continued

Appendix A
Database Specifications for Manufacturing Supply Chain
The following are the specifications of the data tables for the manufacturing supply chain.

| Field Identifier | Field Type | Description |
| --- | --- | --- |
| CustomerResolution | Text | S for customer ship to; C for customer; G for customer group; M for market; A for all customers |
| CustomerID | Text | Customer identified with the place keeping order |
| ProductResolution | Text | P for product; G for product group; A for all products |
| ProductID | Text | Product associated with the orientation order |
| TimeResolution | Text | D for day; W for week; F for bi-weekly; M for monthly; B for bi-monthly; Q for quarterly; and A for annually |
| CalendarID | Long | Pegged to a calendar |
| DateCreated | Date/Time | Date the header was created |
| ScenarioData | Boolean | Yes if it is scenario data, No otherwise |
| ScenarioCounter | Byte | Number of scenarios in which this header participates |
| Domain | | |
| User and domain description for various domains | | |
| DomainID | Long | |
| DomainName | Text | The name of the domain |
| DomainOwner | Text | The owner of the domain |
| Domain Definition | | |
| Domain definitions in terms of product, customer and resource groups | | |
| DomainID | Long | |
| ProductResolution | Text | P for product; G for Product Group; A for all products |
| Product | Text | |
| CustomerResolution | Text | C for customer; G for customer group; M for market; A for all customers |
| Customer | Text | |
| Feature Choices | | |
| The various unique values for the different product features-generated on a batch basis | | |
| ProductType | Text | The type of the Product that these features belong to |
| Feature | Integer | Feature of the Product |
| Choice | Text | Name of the Feature possibility |
| Forecast Data | | |
| Data associated with forecasts for the product-customers identified in the forecast header | | |
| FcstHeaderID | Long | Pegged to the Forecast Header Table |
| TimePeriod | Date/Time | Time period number |
| ForecastValue | Double | Forecast data value |
| ForecastCV | Double | Coefficient of variation of forecast |

-continued

Appendix A
Database Specifications for Manufacturing Supply Chain
The following are the specifications of the data tables for the manufacturing supply chain.

| Field Identifier | Field Type | Description |
| --- | --- | --- |
| Forecast Header | | |
| Header file defining the Customer X Product X Time resolutions & values for various forecasts | | |
| FcstHeaderID | Long | Forecast Header Identifier |
| ProductResolution | Text | P for Product, G for Product Group, A for all Products |
| ProductID | Text | Product associated with forecast |
| CustomerResolution | Text | S for Ship-to, C for Customer, G for Customer Group, A for all Customers |
| CustomerID | Text | Customer associated with forecast. |
| TimeResolution | Text | D for day; W for week; F for bi-weekly; M for monthly; B for bi-monthly; Q for quarterly; and A for annually. |
| CalendarID | Integer | Pegged to a predefined calendar |
| DateCreated | Date/Time | Date when the forecast was created (based on the time resolution) |
| ForecastType | Text | B for bottom-up; T for top-down |
| ForecastAssumptions | Memo | Assumptions associated with the forecast |
| ForecastOwner | Text | Author of the forecast |
| ScenarioData | Boolean | Yes if it is a scenario data; No otherwise |
| ScenarioCounter | Byte | Number of scenarios in which this header participates |
| Freight Rate | | |
| Table that summarizes the various freight rates | | |
| FreightRateTableID | Text | Freight rate table identifier |
| FreightDescription | Text | Description of the rate table |
| MaxWeight | Double | Maximum weight limit (e.g. truck capacity) |
| MaxCube | Double | Maximum volume limit |
| WeightCategory | Text | e.g. 0–100 lb, 100–500 lb, etc. |
| MileageCategory | Text | e.g. less than 100 miles, less than 500 miles, etc. |
| MinimumCharge | Double | Minimum charge associated with a trip |
| StdCost | Double | e.g. $ per hundred weight charge for LTL and $/mile for TL |
| EconomyCost | Double | e.g. for fedex economy rate |
| PremiumCost | Double | e.g. for fedex next day service |
| Inventory Data | | |
| Inventory data for items (products or components) identified in the header | | |
| InventoryHeaderID | Long | Inventory Data Series Identifier |
| TimePeriod | Date/Time | Time period number |
| OnHandInventory | Double | On-hand available inventory for allocation |
| OnOrderInventory | Double | On-order inventory |

-continued

Appendix A
Database Specifications for Manufacturing Supply Chain
The following are the specifications of the data tables for the manufacturing supply chain.

| Field Identifier | Field Type | Description |
| --- | --- | --- |
| BackOrderInventory | Double | Back-ordered inventory |
| InTransit | Double | In-transit quantity |
| ReservedInventory | Double | Reserved inventory on-hand but available for allocation only in case of emergency |
| Inventory Header | | |
| Header file defining the item (Product or Component) X Time & and values for various inventory data | | |
| InventoryHeaderID | Long | Inventory Data Series Identifier |
| InventoryNodeID | Text | Identifier for an inventory logical warehouse |
| InventoryControlID | Text | Identifier for inventory control parameters |
| ItemID | Text | Product Item ID |
| ItemResolution | Text | Item Resolution: C for Component, P for Product, G for Product Group and A for All |
| TimeResolution | Text | D for day; W for week; F for bi-weekly; M for monthly; B for bi-monthly; Q for quarterly; and A for annually. |
| CalendarID | Integer | Pegged to a predefined calendar |
| MinInventoryLevel | Double | Minimum inventory level for the item |
| MaxInventoryLevel | Double | Maximum inventory level for the item |
| DateCreated | Date/Time | Date the inventory header was created |
| ScenarioData | Boolean | Yes if it is scenario data, No otherwise |
| ScenarioCounter | Byte | Number of scenarios in which this header participates |
| Inventory Node | | |
| Data associated with the inventory node | | |
| InventoryNodeID | Text | Unique identifier for the inventory node (e.g., ArdenWarehouse2) |
| FacilityID | Text | Physical Facility identifier |
| InventoryCategory | Text | Component or FG-Enterprise |
| InventoryEchelon | Double | 1 or 2 |
| InventoryNodeName | Text | Name for the inventory node |
| ServiceLevel | Double | Service level for the inventory node |
| Address | Text | Address for the inventory node |
| StorageCapacity | Double | Physical storage capacity of the inventory node (in cubic feet for example) |
| Inventory Parameters | | |
| Data for the inventory control parameters | | |
| InventoryControlID | Text | Identifier for inventory control parameters: Assume inventory planning = inventory control |
| SafetyStockFactor | Double | Safety stock factor |
| TargetServiceLevel | Double | Target service level |
| PolicyType | Text | Policy type: SS, Min/Max, QR, etc. |

-continued

Appendix A
Database Specifications for Manufacturing Supply Chain
The following are the specifications of the data tables for the manufacturing supply chain.

| Field Identifier | Field Type | Description |
|---|---|---|
| MinInventoryFactor | Double | Minimum inventory factor (e.g., in terms of weeks of sales) |
| MaxInventoryFactor | Double | Maximum inventory factory (e.g., in terms of weeks of sales) |
| MinOrderQtyFactor | Double | Minimum order quantity factor |
| CarryChargeFactor | Double | Carrying cost factor |
| OrderChargeFactor | Double | Ordering cost factor |
| InventoryClass | Text | Inventory classification |
| ReplenishmentFrequency | Double | Frequency of replenishment w.r.t. the time resolution in the header |

Market Data
Data for the market defined in the header

| Field Identifier | Field Type | Description |
|---|---|---|
| MarketHeaderID | Long | ID for market header (see Market Header table) |
| TimePeriod | Date/Time | Time period |
| MarketShare | Double | Percentage of share held by the company |
| ConsumerDemand | Double | Total demand quantity |
| AverageSellingPrice | Currency | Average Unit Price of the product |
| DemandForecast | Double | Forecasted demand |

Market Header
Header for defining the market (Product X Customer resolutions) and values

| Field Identifier | Field Type | Description |
|---|---|---|
| MarketHeaderID | Long | Identifier for the market header |
| MarketDefinitionID | Text | Unique identifier for a market (e.g., PTV-S) |
| MarketName | Text | Market Description (e.g. Projection TV in Selling floor) |
| DataScope | Text | Suitable tag: Brand name (e.g., Sony) or industry-wide |
| DataSourceID | Text | Source of market data (e.g, NIELSEN) |
| TimeResolution | Text | D for day; W for week; F for bi-weekly; M for monthly; B for bi-monthly;- Q for quarterly; and A for annually. |
| CalendarID | Integer | Pegged to a predefined calendar |
| ProductResolution | Text | P-Product, PG-Product Group, A-All products |
| ProductID | Text | Identifier for the product |
| CustomerResolution | Text | C-Customer, CG-Customer Group, A-All |
| CustomerID | Text | Identifier for the customer |
| DateCreated | Date/Time | Date the header was created |
| ScenarioData | Boolean | Yes if it is scenario data; No otherwise |
| ScenarioCounter | Byte | Number of scenarios in which this header participates |

-continued

Appendix A
Database Specifications for Manufacturing Supply Chain
The following are the specifications of the data tables for the manufacturing supply chain.

| Field Identifier | Field Type | Description |
|---|---|---|

Material Delivery Schedule Data
Material Delivery Schedule for the Component identified in the header

| Field Identifier | Field Type | Description |
|---|---|---|
| MDSHeaderID | Long | Identifier for the Material Delivery Schedule Header |
| DeliveryDate | Date/Time | Material Delivery Date |
| Quantity | Double | Number of units of material delivery |

Material Delivery Schedule Header
Header file defining the Component X Supplier X Time resolutions & values for various material delivery schedules

| Field Identifier | Field Type | Description |
|---|---|---|
| MDSHeaderID | Long | Identifier for the Material Delivery Schedule Header |
| ComponentSupplyNodeID | Text | Identifier for component supply node |
| SupplierID | Text | Supplier associated with a Material Delivery Schedule |
| TimeResolution | Text | D for day; W for week; F for bi-weekly; M for monthly; B for bi-monthly; Q for quarterly; and A for annually. |
| CalendarID | Integer | Pegged to a predefined calendar |
| DateCreated | Date/Time | Date when a Material Delivery Schedule was created (based on consistent time units) |
| ScenarioData | Boolean | Yes if it is scenario data, No otherwise |
| ScenarioCounter | Byte | Number of scenarios in which this header participates |

Planning BOM
Imploded Bill of Material used for Planning

| Field Identifier | Field Type | Description |
|---|---|---|
| BOMID | Text | Unique identifier for the planning BOM (defined external to the DSS database) |
| ComponentID | Text | Unique component identifier |
| ProductID | Text | SKU number |
| Quantity | Double | Number of components used in SKU |

POS Data
Point of Sale data for the customer-products identified in the header

| Field Identifier | Field Type | Description |
|---|---|---|
| POSHeaderID | Long | POS Header Identifier |
| TimePeriod | Date/Time | Timer period number (beginning of the time period) |
| SellThrough | Double | Sale to end user |
| Shipments | Double | Shipments from the customer DC to the stores |
| Receipts | Double | Shipments from the vendor (e.g. pcec) to the customer dc |
| DCInventoryStatus | Double | Onhand inventory at the ship to location (customer dc) |

Appendix A
Database Specifications for Manufacturing Supply Chain
The following are the specifications of the data tables for the manufacturing supply chain.

| Field Identifier | Field Type | Description |
| --- | --- | --- |
| StoreInventoryStatus | Double | Aggregate onhand inventory of stores served by the customer ship to location (e.g. dc) |
| StoresOnOrderQty | Double | On order quantity from the stores to the customer dc |
| POS Header | | |
| Header file defining the Customer X Product X Time resolutions & values for various POS Data | | |
| POSHeaderID | Long | Identifier for the Point of Sales Header |
| CustomerResolution | Text | Customer Resolution: S for Customer Shipto, C for Customer, G for Customer Group, A for all |
| CustomerID | Text | Should be a valid customer group or a null set (e.g., Selling floor) |
| ProductResolution | Text | Product Resolution: P for Product, G for Product Group, A for all |
| ProductID | Text | Product associated with the POS Data |
| TimeResolution | Text | D for day; W for week; F for bi-weekly; M for monthly; B for bi-monthly; Q for quarterly; and A for annually. |
| CalendarID | Long | Pegged to a specific calendar |
| DateCreated | Date/Time | Date the POS Header was created or modified |
| ScenarioData | Boolean | Yes if it is sceriario data; No otherwise |
| ScenarioCounter | Byte | Number of scenarios in which this header participates |
| Product | | |
| Data for end products | | |
| ProductID | Text | SKU from corporate item master (e.g. RR1330W) |
| ProductName | Text | Name of the Product |
| ProductCategory | Text | Product Category |
| Feature1 | Text | Example: Brand |
| Feature2 | Text | Example: Screen size |
| Feature3 | Text | Example: Audio: M-Mono, S-Stereo, P-Prologic, D-Dolby Prologic |
| Feature4 | Text | Example: Subtype |
| Feature5 | Text | Example: Cabinet type |
| Feature6 | Text | Example: Chassis type |
| ProductDescription | Text | Description of the product |
| SKUSize | Double | Number of product units in a SKU (e.g.1) |
| PhysicalDimensions | Text | Height X Depth X Width |
| Weight | Double | Weight of the SKU |
| Product Features | | |
| The feature list of the products | | |
| ProductCategory | Text | Product Category |
| FeatureNumber | Long | Feature Field Number |
| FeatureName | Text | Feature Name Description |
| Product Group | | |
| Data for product groups | | |
| ProductGroupID | Text | Identifier for the product group |
| ProductGroupName | Text | Descriptive name of product group (e.g. 19Stereo) |
| ProductGroupTag | Text | Organizational entity who defined the build criteria for the product group (e.g. Marketing) |
| ScenarioGroup | Boolean | Yes if this is scenario group; No otherwise |
| Product Group Definition | | |
| Table that identifies the parent-child relationship between product groups and products | | |
| ProductGroupParentID | Text | Identifier for the product group that is the parent |
| ProductGroupChildID | Text | Identifier for the product group or product that is the child |
| Production Accommodation Matrix | | |
| Table that identifies alternative production resources for producing various products | | |
| ProductID | Text | Identifier for the Product |
| PrimaryResourceID | Text | Identifier for the Primary Production Resource |
| AlternativeResourceID | Text | Identifier for the Alternative Production Resource |
| Quantity | Double | Number of units of Alternative Resource that can substitute for Primary Resource to Product |
| Production Capacity Data | | |
| Production Capacity Data of the production resource identified in the header | | |
| ProductionCapacityHeaderID | Long | Production Capacity Header ID (See Production Capacity Header Table) |
| TimePeriod | Date/Time | Timer period number |
| NoShifts | Double | Number of planned shifts during the time period |
| LoadingFactor | Double | Planned loading rate (e.g. % utilization) |
| YieldFactor | Double | Target yield values |
| DowntimeFactor | Double | Projected downtime |
| CapacityRequired | Double | Capacity required |
| CapacityAvailable | Double | Capacity available |
| Production Capacity Header | | |
| Header file defining the Production Resource & Time resolutions & values for various Production Capacity Data | | |
| ProductCapacityHeaderID | Long | Production Capacity Header ID |
| ResourceResolution | Text | N for Production Node, RG for Production Group and R for Production Resource |
| ResourceID | Text | Resource (Resource, Group or Node) associated with an aggregate production plan |

-continued

Appendix A
Database Specifications for Manufacturing Supply Chain
The following are the specifications of the data tables for the manufacturing supply chain.

| Field Identifier | Field Type | Description |
| --- | --- | --- |
| CapacityUnit | Text | Example, number of production hours, shifts, etc. (related to the time resolution) |
| TimeResolution | Text | D for day; W for week; F for bi-weekly; M for monthly; B for bi-monthly; Q for quarterly; and A for annually. |
| CalendarID | Integer | Pegged to a predefined calendar |
| DateCreated | Date/Time | Date when the aggregate production plan was created (based on the time resolution) |
| ScenarioData | Boolean | Yes if it is scenario data, No otherwise |
| ScenarioCounter | Byte | Number of scenarios in which this header participates |
| Production Matrix | | |
| Aggregate matrix defining the production rates for Product X Resource combinations | | |
| ProductMatrixID | Text | Identifier for the production matrix |
| ResourceResolution | Text | Resource resolution identifier |
| ResourceID | Text | Unique identifier for the production resource (e.g., FA1G) |
| ProductResolution | Text | Product resolution: C for Component, P for Product, G for Product Group. |
| ProductID | Text | Unique identifier for input product (group) |
| YieldRate | Double | Actual yield rate for the product on the resource |
| TimeResolution | Text | D for day; W for week; F for bi-weekly; M for monthly; B for bi-monthly; Q for quarterly; and A for annually. |
| ProcessTime | Double | Actual time of production |
| SetupMatrixID | Text | Identifier for the setup time matrix |
| Production Node | | |
| Data for the production node | | |
| ProductionNodeID | Text | Unique identifier for the production node (e.g., PTVNode1) |
| ProductionNodeName | Text | Name of the production node |
| Comment | Text | |
| Production Requirements Data | | |
| Production Requirements Data for the product identified in the header | | |
| ProdReqHeaderID | Long | Production Requirement Header identifier (see Production Requirements Data Header table) |
| TimePeriod | Date/Time | Time period number |
| Quantity | Double | Number of units of production |
| ProposedChange | Double | Proposed change with respect to the quantity |
| Production Requirements Header | | |
| Header file defining the Product X Time resolutions & values for various Product Requirements data | | |
| ProdReqHeaderID | Long | Production Requirement Header Identifier |
| APPID | Text | Identifier for an aggregate production plan |
| ProductResolution | Text | Product Resolution: P-Prodct, G-Group |
| ProductID | Text | Product associated with the production requirements plan |
| TimeResolution | Text | D for day; W for week; F for bi-weekly; M for monthly; B for bi-monthly; Q for quarterly; and A for annually. |
| CalendarID | Integer | Pegged to a predefined calendar |
| DateCreated | Date/Time | Date when the production requirements plan was created (based on the time resolution |
| ScenarioDate | Boolean | Yes if it is scenario data, No otherwise |
| ScenarioCounter | Byte | Number of scenarios in which this header participates |
| Promotional Data | | |
| Data related to past and future prormotions for Products & Customers in the header | | |
| PromotionHeaderID | Long | Promotion Header Identifier |
| TimePeriod | Date/Time | Timer period number (beginning of the time period) |
| PromotionDuration | Double | Time duration for the promotion |
| Pre-evaluationQty | Text | Estimate before the promotion for the sales qty due to the promotion |
| Post-evaluationQty | Text | Estimate after the promotion for the sales qty due to the promotion |
| Promotion Header | | |
| Header file defining the Product X Customer X Time resolutions & values for various Promotion data | | |
| PromotionHeaderID | Long | Identifier for the Promotion Header |
| CustomerResolution | Text | Customer Resolution: S for Customer Shipto, C for Customer, G for Customer Group, A for all |
| CustomerID | Long | Should be a valid customer group or a null set (e.g., Selling floor) |
| ProductResolution | Text | Product Resolution: P for Product, G for Product Group, A for all |
| ProductID | Text | Product associated with the promotion Data |
| TimeResolution | Text | D for day; W for week; F for bi-weekly; M for monthly; B for bi-monthly; Q for quarterly; and A for annually. |
| CalendarID | Text | Pegged to a specific calendar |

-continued

Appendix A
Database Specifications for Manufacturing Supply Chain
The following are the specifications of the data tables for the manufacturing supply chain.

| Field Identifier | Field Type | Description |
|---|---|---|
| PromotionType | Text | R for Retailer; P for PCEC; C for Competitor |
| PromotionClass | Text | Promotion class (e.g. Price Reductions) |
| PromotionIntensity | Double | Intensity of the promotion (low, medium, high) |
| PromotionShapeID | Long | |
| DateCreated | Date/Time | Date of creation of the Promotion Header |
| ScenarioData | Boolean | |
| ScenarioCounter | Byte | |
| Resource | | |
| Data related to production resource | | |
| ResourceID | Text | Unique identifier for a production resource (e.g., FA1G) |
| ResourceName | Text | Descriptive name |
| ResourceGroupID | Text | Production group this resource belongs to |
| MaxLineRate | Double | Maximum line rate |
| NoWorkstations | Double | Number of workstations |
| MaxBuffers | Double | Maximum number of buffers |
| Resource Group | | |
| Data related to production resource group | | |
| ResourceGroupID | Text | Unique identifier for the production group (e.g., Plant4) |
| ResourceGroupName | Text | Descriptive name |
| ProductionNodeID | Text | Production node this group belongs to |
| Attribute1 | Text | Attribute (e.g., Category, Location) |
| Attribute2 | Text | Attribute (e.g., Category, Location) |
| Attribute3 | Text | Attribute (e.g., Category, Location) |
| ScenarioGroup | Boolean | Yes if this is scenario group; No otherwise |
| Resource Group Definition | | |
| Table that defines the parent-child relationship of the production resource group and production resources | | |
| ResourceGroupParentID | Text | Identifier for the resource group that is the parent |
| ResourceGroupChildID | Text | Identifier for the resource group or product that is the child |
| Sales Requirements Data | | |
| Sales Requirements data for the product identified in the header | | |
| SalesReqHeaderID | Long | HeaderID pegged to the Sales Requirement Header table |
| TimePeriod | Date/Time | Time Period pegged to the time resolution in the Sales requirements header table |
| Quantity | Double | Quantity required |
| Sales Requirements Header | | |
| Header file defining the Product X Time resolutions & values for the sales requirements data | | |
| SalesReqHeaderID | Long | Header ID of the sales requirements |

-continued

Appendix A
Database Specifications for Manufacturing Supply Chain
The following are the specifications of the data tables for the manufacturing supply chain.

| Field Identifier | Field Type | Description |
|---|---|---|
| ProductResolution | Text | Production Resolution: P = Product, PG = Product Group, A = All |
| ProductID | Text | Product ID |
| TimeResolution | Text | Time Resolution: D-Day, W-Weekly, M-Monthly, Q-Quarterly, Y-Yearly |
| CalendarID | Long | Calendar ID |
| DateCreated | Date/Time | Date of creation of the sales requirements |
| ScenarioData | Boolean | Yes if it is scenario data, No otherwise |
| ScenarioCounter | Byte | Number of scenarios in which this header participates |
| Scenario | | |
| Scenario description and user information | | |
| ScenarioID | Long | |
| ScenarioName | Text | |
| User | Text | |
| Description | Memo | |
| DateCreated | Date/Time | |
| DateUpdated | Date/Time | |
| Scenario Data Compatibility | | |
| Table that specifies what data headers can be loaded into each of the data pockets on each form for each frame | | |
| Frame | Text | Frame Name |
| Form | Integer | Form Number |
| Pocket | Integer | Pocket Number |
| TableName | Text | Table name for the (Frame, Form, Pocket) triple |
| Scenario Definition | | |
| The table that contains the header ids of the various data that exists in each pocket, in each form in each frame for different scenarios | | |
| ScenarioID | Long | |
| Frame | Text | |
| Form | Integer | |
| Pocket | Integer | |
| HeaderID | Long | |
| DateCreated | Date/Time | |
| DateUpdated | Date/Time | |
| Setup Matrix | | |
| Aggregate matrix defining the sequence-dependent setup times for product changeovers | | |
| SetupMatrixID | Text | Identifier for the Setup Matrix |
| PrevProductID | Text | Identifier of the product that has just finished processing |
| NextProductID | Text | Identifier of the product to be set-up on the resource |
| TimeResolution | Text | D for day; W for week; F for bi-weekly; M for monthly; B for bi-monthly; Q for quarterly; and A for annually. |
| SetupTime | Double | Actual time to set up |
| Supply Chain Network | | |
| Structural data specifying the supply chain network | | |
| LinkID | Text | Supply chain network link identifier |

Appendix A
Database Specifications for Manufacturing Supply Chain
The following are the specifications of the data tables for the manufacturing supply chain.

| Field Identifier | Field Type | Description |
| --- | --- | --- |
| FromNodeID | Text | A node ID from any of the three node classes: component supply, production inventory |
| ToNodeID | Text | A node ID from any of the three node classes: production, inventory, demand |
| Linkcapacity | Double | Capacity of the link |
| TransportLeadTime | Double | Transport Lead time associated with the link |
| Distance | Double | Transportation distance |
| LinkIndicator | Boolean | Yes if it is currently active and in use and No otherwise |
| Supply Order Data | | |
| Data for the supply orders identified in the header | | |
| SupplyOrderHeaderID | Long | Production or supply order (e.g. pcec type 4 orders) |
| OrderDate | Date/Time | Date of creation expressed with respect to calendar |
| OrientationDataID | Text | Orientation order associated with supply order |
| DueDate | Date/Time | Date the supply order is due |
| Quantity | Double | Quantity of the supply order |
| Supply Order Header | | |
| Header file defining the Product X Customer X Time resolutions & values for supply orders | | |
| SupplyOrderHeaderID | Long | Production or supply order (e.g. pcec type 4 orders) |
| CustomerResolution | Text | S for customer ship to; C for customer; G for customer group; M for market; A for all customers |
| CustomerID | Text | Customer identified with the place keeping order |
| ProductResolution | Text | P for product; G for product group; A for all products |
| ProductID | Text | Product associated with the supply order |
| TimeResolution | Text | D for day; W for week; F for bi-weekly; M for monthly; B for bi-monthly; Q for quarterly; and A for annually. |
| CalendarID | Long | Pegged to a calendar |
| DateCreated | Date/Time | Date the Supply Order Header was created/modified |
| ScenarioData | Boolean | Yes if it is scenario data, No otherwise |
| ScenarioCounter | Byte | Number of scenarios in which this header participates |

Appendix A
Database Specifications for Manufacturing Supply Chain
The following are the specifications of the data tables for the manufacturing supply chain.

| Field Identifier | Field Type | Description |
| --- | --- | --- |
| Temporary Product List | | |
| System table that contains a temporary product list | | |
| ProductID | Text | |
| VMR Contract | | |
| Data associated with a Vendor Managed Replenishment Contract | | |
| VMRContractID | Text | Identifier for the VMR Contract |
| ContractDate | Date/Time | Date of the contract |
| ExpirationDate | Date/Time | Expiration date of the contract |
| PaymentTerms | Text | Example: Net-60, Net-30 |
| ProductResolution | Text | Product Resolution: P for Product, G for Product Group, A for all |
| ProductID | Text | Product associated with the VMR contract |
| TargetFillRate | Double | Fill rate promised in the VMR contract |
| TurnAroundTime | Double | Nominal turnaround time |
| MinInventoryFactor | Double | Minimum inventory factor agreed in the VMR contract |
| MaxInventoryFactor | Double | Maximum inventory factor agreed in the VMR contract |
| OrderRevisionFactor | Double | Customer's rights to revise order |
| VMR Data | | |
| Data associated with Vendor Managed Replenishment for the customers identified in the header | | |
| VMRHeaderID | Long | VMR Header Identifier |
| OrderDate | Date/Time | Date when the VMR order data was entered |
| PurchaseOrderID | Text | Customer purchase order reference |
| OrderStatus | Text | A for allocated; B for backordered; |
| OrderQty | Double | Quantity associated with the order |
| CumDeliveryQty | Double | Quantity delivered against the order (cumulative measure) |
| DueDate | Date/Time | Date when the order is planned to be delivered at the customer site |
| DeliveredDate | Date/Time | Date when the order was actually received at the customer site |
| ShipDate | Date/Time | Date when the order is planned to be shipped |
| LastShipmentDate | Date/Time | Date of the latest shipment - made to fulfill an order |
| ShipCarrier | Date/Time | The carrier used in delivering the order (to keep track of the intransit inventory) |
| LinkID | Text | Pegged to a defined supply chain link in the supply chain network table |
| FreightRateTableID | Text | Based on transportation mode |

-continued

Appendix A
Database Specifications for Manufacturing Supply Chain
The following are the specifications of the data tables for the manufacturing supply chain.

| Field Identifier | Field Type | Description |
|---|---|---|
| VMR Header | | |
| Header file defining the Product X Customer X Time resolutions & vales for VMR | | |
| VMRHeaderID | Long | VMR Header Identifier |
| CustomerResolution | Text | Customer Resolution: S for Customer Shipto; C for Customer; G for Customer Group, A for all |
| CustomerID | Text | Should be a valid customer group or a null set (e.g., Selling floor) |
| ProductResolution | Text | Product Resolution: P for Product, G for Product Group, A for all |
| ProductID | Text | Product covered by the VMR contract |
| TimeResolution | Text | D for day; W for week; F for bi-weekly; M for monthly; B for bi-monthly; Q for quarterly; and A for annually. |
| CalendarID | Integer | Pegged to a predefined calendar |
| InventoryControlID | Text | Pegged to inventory control parameters ID |
| VMRContractID | Text | Pegged to the VMR Contract table |
| DateCreated | Date/Time | Date the VMR Header was created/modified |
| ScenarioData | Boolean | Yes if it is scenario data, No otherwise |
| ScenarioCounter | Byte | Number of scenarios in which this header participates |

APPENDIX B
Database Specifications for Equipment Repair Supply Chain
The following are the specifications of the data tables for the equipment repair supply chain.

Equipment

Information to classify equipment into groups. This information is relevant to identify reliability characteristics of equipment parts.

| Field Identifier | Field Description |
|---|---|
| EquipmentID | Unique identifier for the equipment |
| EquipmentLocation | Location of the equipment |
| InspectionLocation | Location where the equipment is inspected/maintained |
| DateofMfg | Year of manufacture of equipment |
| RunningHours | Total Cumulative running hours so far |
| Region | Region of reconnaissance associated with the equipment |
| Characteristic (Identify) | Other critical characteristic, e.g., total running time |
| etc. | |

APPENDIX B-continued
Database Specifications for Equipment Repair Supply Chain
The following are the specifications of the data tables for the equipment repair supply chain.

Repairable Item and Component Information

Component

| Field Identifier | Field Description |
|---|---|
| ComponentID | Component ID in the BOM |
| ComponentName | Name of the component |
| MinPackQuantity | Minimum pack quantity |
| PhysicalParameter | Physical dimensions for the component |
| CompCategory | S for Off-the-Shelf; C for Customized |
| PackagingInstruction | Special packaging requirements |

BOM

Engineering Bill of Material that describes the product structure from equipment to repair items to components

| Field Identifier | Field Description |
|---|---|
| BOMID | Unique identifier for the engineering BOM |
| ParentType | Type of the parent: Equipment/Repair Item/Component |
| ParentID | Identifier of the parent (EquipmentID or RepairItemID or ComponentID) |
| ChildType | Type of the child (Repair Item/Component) |
| ChildID | Unique identifier for the child (RepairItemID or ComponentID) |
| Quantity | Number of components used in parent |

Repairable Item

Characteristics of repairable item

| Field Identifier | Field Description |
|---|---|
| RepairItemID | Unique identifier of the repair item |
| RepairItemName | Name/Description of the repair item |
| PhysicalDimensions | Height XDepth XWidth |
| Weight | Weight of the SKU |

Component Supplier

Information related to component supplier

| Field Identifier | Field Description |
|---|---|
| CompSupplierID | Unique identifier for the component supplier |
| SupplierName | Name of the component supplier |
| PaymentTerms | Example: Net-60 |
| StreetAddress | Street Address |
| StateID | Name of the State |
| PostalCode | Postal code |
| Country | Name of the country |

Supply Information

Repair Time Matrix
Aggregate matrix defining the repair rates for Repair Item X Repair Resource combinations

| Field Identifier | Field Description |
|---|---|
| RepairMatrixID | Identifier for the repair matrix |
| ResourceResolution | Resource resolution identifier |
| ResourceID | Unique identifier for the repair resource |
| RepairItemID | Unique identifier for the repair item |
| TimeResolution | D for day; W for week; F for bi-weekly; M for monthly; B for bi-monthly; Q for quarterly; and A for annually. |
| ProcessTime | Mean time to repair |
| SetupMatrixID | Identifier for the setup time matrix |

APPENDIX B-continued

Database Specifications for Equipment Repair Supply Chain
The following are the specifications of the data tables for the equipment repair supply chain.

Repair Setup Matrix

Aggregate matrix defining the sequence dependent setup times for repair item changeovers

| Field Identifier | Field Description |
|---|---|
| SetupMatrixID | Identifier for the Setup Matrix |
| PrevProductID | Identifier of the repair item that has must been repaired |
| NextProductID | Identifier of the repair item that needs to be repaired |
| TimeResolution | D for day; W for week; F for bi-weekly; M for monthly; B for bi-monthly; Q for quarterly; and A for annually. |
| SetupTime | Actual time to setup |

Repair Capacity Header

Header file defining the Repair Resource X Time resolutions & values for various Repair Capacity Data

| Field Identifier | Field Description |
|---|---|
| RepairCapacityHeader | Repair Capacity Header ID |
| ResourceResolution | Resource Group or Resource |
| ResourceID | Resource ID |
| CapacityUnit | Example, number of production hours, shifts, etc. (related to the time resolution) |
| TimeResolution | D for day; W for week; F for bi-weekly; M for monthly; B for bi-monthly; Q for quarterly; and A for annually. |
| CalendarID | Pegged to a predefined calendar |
| DateCreated | Date when the aggregate repair plan was created (based on the time resolution) |

Repair Capacity Data

Repair Capacity Data of the repair resource identified in the header

| Field Identifier | Field Description |
|---|---|
| RepairCapacityDataID | Repair Capacity Data ID |
| TimePeriod | Time period number |
| RepairCapacityHeaderID | Repair Capacity Header ID (See Repair Capacity Header Table) |
| NoShifts | Number of planned shifts during the time period |
| LoadingFactor | Planned loading rate (e.g. % utilization) |
| DowntimeFactor | Projected downtime |
| CapacityRequired | Capacity required |
| CapacityAvailable | Capacity available |

Repair Estimation Header

Header file defining the Item X Time resolutions & values for various Repair Estimation data

| Field Identifier | Field Description |
|---|---|
| RepairEstHeaderID | Repair Estimation Header Identifier |
| ARPID | Identifier for an aggregate repair plan |
| ItemID | Item associated with the production requirements plan |
| TimeResolution | D for day; W for week; F for bi-weekly; M for monthly; B for bi-monthly; Q for quarterly; and A for annually |
| CalendarID | Pegged to a predefined calendar |
| DateCreated | Date when the Repair Estimation plan was created (based on the time resolution) |

Repair Estimation Data

Repair Estimation Data for the repair item identified in the header

| Field Identifier | Field Description |
|---|---|
| RepairEstDataID | Repair Estimation Data ID |
| TimePeriod | Time period number |
| RepairEstHeaderID | Repair Estimation Header Identifier |
| Quantity | Number of units of production |
| ProposedChange | Proposed change with respect to the quantity |

Aggregate Repair Plan Header header file defining the Repair Item X Resource X Time resolutions & values for various Aggregate Repair Plans

| Field Identifier | Field Description |
|---|---|
| RepairPlanHeaderID | Repair Plan Data Series Identifier |
| RepairID | Identifier for an aggregate repair plan |
| ResourceResolution | Resource Resolution: R-Resource, G-Group, N-Node |
| ResourceID | Resource associated with the repair plan |
| RepairItemResolution | Repair Item Resolution: P-Repair Item, G-Group |
| RepairItemID | Repair Item associated with the repair plan |
| TimeResolution | D for day; W for week; F for bi-weekly; M for monthly; B for bi-monthly; Q for quarterly; and A for annually. |
| CalendarID | Pegged to a predefined calendar |
| DateCreated | Date when the aggregate production plan was created (based on the time resolution) |

Aggregate Repair Plan Data

Data related to the aggregate repair plan for the repair item identified in the APP header

| Field Identifier | Field Description |
|---|---|
| RepairPlanDataID | Identifier for the Repair Plan Data |
| TimePeriod | Time period number |
| RepairPlanHeaderID | Repair Plan Head identifier (see aggregate repair plan Header table) |
| Quantity | Number of units to be repaired |
| ProposedChange | Recommended change in the planned quantity (to store changes between regeneration of Repair Plans) |

Component Estimation Header

Header file defining the Component X Time values for various component requirement data

| Field Identifier | Field Description |
|---|---|
| CompEstHeaderID | Component Estimation Header Identifier |
| ComponentID | Component associated with an component estimation header |
| BOMID | Unique identifier for BOM |
| DateCreated | Date when the component estimation was created (based on the time resolution) |
| TimeResolution | D for day; W for week; F for bi-weekly; M for monthly; B for bi-monthly; Q for quarterly; and A for annually. |
| CalendarID | Pegged to a predefined calendar |
| RepairPlanID | Pegged to an aggregate repair plan (if warranted) |

APPENDIX B-continued

Database Specifications for Equipment Repair Supply Chain
The following are the specifications of the data tables for the equipment repair supply chain.

Component Estimation Data

Data related to requirements for the component identified in the header

| Field Identifier | Field Description |
|---|---|
| CompEstDataID | Component Estimation Header ID (See Component Estimation Header Table) |
| TimePeriod | Time period number |
| ComReqHeaderID | Identifier for the component estimation header |
| Quantity | Number of units during the time period |
| ProposedChange | Proposed Change in required quantity |

Material Delivery Schedule Header

Header file defining the Component XSupplier XTime resolutions & values for various material delivery schedules

| Field Identifier | Field Description |
|---|---|
| MDSHeaderID | Identifier for the Material Delivery Schedule Header |
| ComponentSupplyNodeID | Identifier for component supply node |
| SupplierID | Supplier associated with a Material Delivery Schedule |
| TimeResolution | D for day; W for week; F for bi-weekly; M for monthly; B for bi-monthly; Q for quarterly; and A for annually. |
| CalendarID | Pegged to a predefined calendar |
| DateCreated | Date when a Material Delivery Schedule was created (based on consistent time units) |

Material Delivery Schedule Data

Material Delivery Schedule for the Component identified in the header

| Field Identifier | Field Description |
|---|---|
| MDSDataID | Identifier for Material Delivery Schedule Data |
| DeliveryDate | Material Delivery Date |
| MDSHeaderID | Identifier for the Material Delivery Schedule Header |
| Quantity | Number of units of material delivery |

Requirements Information

Requirements History Header
Header file defining Equipment XRepair Item X Time resolutions & values for various demand histories

| Field Identifier | Field Description |
|---|---|
| ReqHistHeaderID | Identifier for a requirements history header |
| RepairItemResolution | P for repair item; G for repair item Group; A for all repair items |
| RepairItemID | Repair Item associated with requirements history |
| EquipmentResolution | C for Equipment; CG for equipment group; A for all equipment |
| EquipmentID | Equipment (Group) associated with requirements history |
| TimeResolution | D for day; W for week; F for bi-weekly; M for monthly; B for bi-monthly; Q for quarterly; and A for annually. |
| CalendarID | Pegged to a predefined calendar |

Requirements History Data

Data for the demand history for the product defined in the header

| Field Identifier | Field Description |
|---|---|
| ReqHistDataID | Requirements History Data identifier (see Requirements History Header table) |
| TimePeriod | Time period number |
| ReqHistHeaderID | Identifier for a requirements history header |
| RequirementsQty | Requirements Quantity |

Equipment Repair Orders

Data for actual equipment repair orders

| Field Identifier | Field Description |
|---|---|
| RepairOrderID | ID for the actual equipment repair order |
| LineItemID | Line item within the order |
| RepairOrderRefNo | Repair order identifier |
| EquipmentID | Equipment identified with the order |
| RepairItemID | Repair Item associated with the order |
| CalendarID | Pegged to a calendar |
| TimeResolution | D for day; W for week; F for bi-weekly; M for monthly; B for bi-monthly; Q for quarterly; and A for annually. |
| OrderEntryDate | Expressed in terms of the calendar and time resolution |
| RequestedDate | Expressed in terms of the calendar and time resolution |
| DueDate | Expressed in terms of the calendar and time resolution |
| ShipDate | Expressed in terms of the calendar and time resolution |
| DeliveryDate | Expressed in terms of the calendar and time resolution |
| Quantity | Quantity of the order |
| Comments | Such as value added services associated with the order |

Future Requirements Header

Header file defining the Customer XProduct XTime resolutions & values for various future requirements.

| Field Identifier | Field Description |
|---|---|
| FutureReqHeaderID | Future Requirements Header Identifier |
| RepairItemResolution | P for Repair Item, G for Repair Item Group, A for all Repaired Items |
| RepairItemID | Repair Item (Group) associated with forecast |
| EquipmentResolution | C for Equipment, CG for equipment group; A for all equipment |
| EquipmentID | Equipment (Group) associated with requirements history |
| TimeResolution | D for day; W for week; F for bi-weekly; M for monthly; B for bi-monthly; Q for quarterly; and A for annually |
| CalendarID | Pegged to a predefined calendar |
| DateCreated | Date when the forecast was created (based on the time resolution) |
| FutReqType | B for bottom-up; T for top-down |
| EstimationAssumptions | Assumptions associated with the estimation |
| EstimateOwner | Author of the future requirements |

Future Requirements Data

Data associated with the future requirements for the equipment-repair items identified in the header

| Field Identifier | Field Description |
|---|---|
| FutureReqDataID | Future requirements data series identifier |
| TimePeriod | Time period number |

APPENDIX B-continued

Database Specifications for Equipment Repair Supply Chain
The following are the specifications of the data tables for the equipment repair supply chain.

| Field Identifier | Field Description |
|---|---|
| FutureReqHeaderID | Pegged to the Future Requirements Header Table |
| EstimateValue | Future requirements data value |
| EstimateCV | Coefficient of variation of estimate |

Activity Header

Header file defining the Equipment Group XRepair Item XTime resolutions & values for various Activity data

| Field Identifier | Field Description |
|---|---|
| ActivityHeaderID | Identifier for the Activity Header |
| EquipmentResolution | Equipment Group Resolution: C for Equipment, G for Equipment Group, A for all |
| EquipmentID | ID of the equipment associated with the activity |
| RepairItemResolution | Repair Item Resolution: P for Repair Item, G for Repair Item Group, A for all |
| RepairItemID | Repair Item associated with the activity Data |
| TimeResolution | D for day; W for week; F for bi-weekly; M for monthly; B for bi-monthly; Q for quarterly; and A for annually. |
| CalendarID | Pegged to a specific calendar |
| ActivityType | Company wide, location level, etc. |
| ActivityClass | Activity class |
| ActivityIntensity | Intensity of the activity (low, medium, high) |
| ActivityShapeID | Intensity of the activity (low, medium, high) |

Activity Data

Data related to past and future activities for the equipment

| Field Identifier | Field Description |
|---|---|
| ActivityDataID | Activity Data Series Identifier |
| TimePeriod | Timer period number (beginning of the time period) |
| ActivityHeaderID | Activity Header Identifier |
| ActivityDuration | Time duration for the activity |
| Pre-evaluationQty | Estimate before the activity for the quantity due to the activity |
| Post-evaluationQty | Estimate after the activity for the quantity due to the activity |

Inventory Information

Inventory Header
Header file defining the Repair Item X Time resolutions & values for various inventory data

| Field Identifier | Field Description |
|---|---|
| InventoryHeaderID | Inventory Data Series Identifier |
| InventoryNodeID | Identifier for an inventory logic warehouse |
| InventoryControlID | Identifier for inventory control parameters |
| ItemResolution | Item Resolution: C for Component, P for Product, G for Product Group and A for All |
| RepairItemID | Repair Item ID |
| TimeResolution | D for day; W for week; F for bi-weekly; M for monthly; B for bi- monthly; 9 for quarterly; and A for annually. |
| CalendarID | Pegged to a predefined calendar |
| MinInventoryLevel | Minimum inventory level for the item |
| MaxInventoryLevel | Maximum inventory level for the item |

Inventory Data

Inventory data for items identified in the header

| Field Identifier | Field Description |
|---|---|
| InventoryDataID | Inventory data identifier (see Inventory Header table) |
| TimePeriod | Time period number |
| InventoryHeaderID | Inventory Data Series Identifier |
| OnHandInventory | On-hand available inventory for allocation |
| OnOrderInventory | On- order inventory |
| BackorderInventory | Back-ordered inventory |
| InTransit | In-transit quantity |
| ReservedInventory | Reserved inventory on-hand but available for allocation only in case of emergency |

Inventory Parameters

Data for the inventory control parameters

| Field Identifier | Field Description |
|---|---|
| InventoryControlID | Identifier for inventory control parameters: Assume inventory planning = inventory control |
| SafetyStockFactor | Safety stock factor |
| TargetServiceLevel | Target service level |
| PolicyType | Policy type: SS, Min/Max, QR, etc. |
| MinInventoryFactor | Minimum inventory factor (e.g., in terms of weeks of sales) |
| MaxInventoryFactor | Maximum inventory factor (e.g., in terms of weeks of sales) |
| MinOrderQtyFactor | Minimum order quantity factor |
| CarryChargeFactor | Carrying cost factor |
| OrderChargeFactor | Ordering cost factor |
| InventoryClass | Inventory classification |
| ReplenishmentFrequency | Frequency of replenishment w.r.t. the time resolution in the header |

Repair Resource Information

Information related to the repair technician and test equipment
Repair Resource
Data related to repair resource

| Field Identifier | Field Description |
|---|---|
| RepairResID | Unique identifier for a repair resource (e.g., FA1G) |
| RepairResName | Descriptive name |
| RepairResGroupID | Repair resource group this resource belongs to |
| MaxLineRate | Maximum line rate |
| NoWorkStations | Number of workstations |

Repair Resource Group

Data related to production resource group

| Field Identifier | Field Description |
|---|---|
| RepairResGroupID | Unique identifier for the repair resource group (e.g., Plant4) |
| RepairResGroupName | Descriptive name |
| RepairNodeID | Repair node this group belongs to |
| Attribute1 | Attribute (e.g., Category, Location) |
| Attribute2 | Attribute (e.g., Category, Location) |
| Attribute3 | Attribute (e.g., Category, Location) |

APPENDIX C

Interim Design Documentation for the System Integrator of the Supply Frame Chain Manager Class name:
    FrameManager
    Category:        Supply Frame Chain Manager
    Documentation:
        This is a singleton class. It is running on the server. It has to be started before a client can start and make connection to it. The FrameManager is responsible to facilitate the integration of the client side of the system (the User Interface 18) with the server side of the system where the mathematical Model Engines and the DSS 10 database reside. The FrameManager is composed of a ClientManager, a ServerManager, a collection of RequestInterpreter and objects which form the Functional Integrator 312. When a client program start up, it will connect to the FrameManager (obtain the object reference of the FrameManager) and call the initialization function. As part of the initialization of the client with the FrameManager, a RequestInterpreter object will be created, inserted into the collection and the object reference will be return back to the client. The client will also be registered with the ClientManager object of the FrameManager. The initialization also includes the user authentication.
    Export Control:    Public
    Cardinality:        1
    Hierarchy:
    Superclasses:    none
    Associations:
        <no rolename>  : ClientManager in association
        <no rolename>  : RequestInterpreter in association
        <no rolename>  : ServerManager in association
    Public Interface:
    Operations:
                FrameManager
                initializeClient
    Private Interface:
    Attributes:
                mClientManager : ClientManager
                mServerManager : ServerManager
                mRequestInterpreter : List<RequestInterpreter>
                A linked list of RequestInterpreter. Each RequestInterpreter will run in a separate thread or a separate process. This way, requests from multiple clients can be handled concurrently.
    State machine:    No
    Concurrency:     Sequential
    Persistence:      Transient
    Operation name:
    FrameManager
    Public member of:    FrameManager
    Arguments:
        char*           frameMgrConfigFile
    Documentation:
        This is the constructor is the FrameManager. At the construction time, it will read in the configuration information from a file ("frameMgrConfigFile"). The information include things such as the name of the DSS Database and on which host it is running, where are the Model Engines (installed on which machines), how many number of simultaneous client are allowed to connect to the FrameManager, etc. The constructor is also responsible to initialize all other data member of this class.
    Concurrency:     Sequential
    Operation name:
    initializeClient
    Public member of:    FrameManager
    Return Class:      RequestInterpreter&
    Arguments:
        char*           userName
        char*           hostName
        char*           password
        NotifyMsg&     notifyMsg
    Documentation:
        Once the client program has started and obtained the object reference of the FrameManager, it will call this function to initial itself with the FrameManager. It will pass in the user name, password, host name, etc. The information will be used for authentication and registering with the ClientManager. The object reference of a NotifyMsg on the client side will pass in. This object reference will be used to notify the client about its request when it make an asynchronous request. (Asynchronous request will be allowed when the client request to run some of the strategic decision model.)
        This function will return the object reference of a RequestInterpreter through which the client will make all its requests.
    Concurrency:     Sequential
Class name:
    ClientManager
    Category:        Supply Frame Chain Manager
    Documentation:
        Manage and monitor the client connection. Implement client connection policy, such as "after certain period of inactive time disconnect the client", "the total number of client connection can not exceed certain number". Also resposible to delete the corresponding RequestInterpreter object after a client is disconnected (in such case as the client machine goes down, or the network connection is lost).
    Export Control:    Public
    Cardinality:        1
    Hierarchy:
    Superclasses:    none
    Associations:
        <no rolename>  : FrameManager in association
    Public Interface:
    Operations:
                registerClient
                maintainClient
    Private Interface:
    Attributes:
                clients : List<Client>
                A linked list of Client. The Client class contain the basic information about the client, such as, the user name, the client host name, the corresponding RequestInterpreter, time of initial connection, time of last request, pending requests, etc.
    State machine:    No
    Concurrency:     Sequential
    Persistence:      Transient
    Operation name:
    registerClient
    Public member of:    ClientManager
    Return Class:      bool
    Arguments:
        Client&          aClient
    Documentation:
        Add a client to the client list. Enforce the relevant FrameManager policy such as the maximum

APPENDIX C-continued

Interim Design Documentation for the System Integrator of the Supply Frame Chain Manager number of simultaneous client.
    Concurrency:    Sequential
    Operation name:
    maintainClient
    Public member of:    ClientManager
    Documentation:
    This function will be called periodically from the FrameManager. Within the function, each client will be checked to see if it needs to be disconnected. If a client needs to be disconnected, it will be removed from the list and the corresponding RequestInterpreter object will be deleted.
    Concurrency:    Sequential
    Class name:
    Request Interpreter
    Category:    Supply Frame Chain Manager
    Documentation:
    This is the object the client is normally interact with. Each object of this type has to run in its own thread or process so that multiple client can request server services concurrently.
    Export Control:    Public
    Cardinality:    n
    Hierarchy:
    Superclasses:    none
    Associations:
        <no rolename>  : FrameManager in association
    Public Interface:
    Operations:
        request
    Private Interface:
    Attributes:
    theClient : Client*
        Reference to the client with whom this Interpreter is associated.
    State machine:    No
    Concurrency:    Sequential
    Persistence:    Transient
    Operation name:
    request
    Public member of:    RequestInterpreter
    Return Class:    bool
    Arguments:
        long scenarioID
        long domainID
        long requestID
        bool asynch
        long&    resultID
    Documentation:
    This function will be called by the client to make a request to perform certain task by the server(s). The scenarioID and domainID will identify the data associated with the request. The requestID will identify what kind of action need to be performed (by looking up a table within the system). If the request is not asynchronous ("asynch" false") the result will be returned immediately through the value of resultID. The client can retrieve the actual data from the DSS Database through the resultID in the table associated with that type of request. If the request of aynchronous, the result will be sent to the client later by calling the NotifyMsg object of the client.
    Concurrency:    Sequential
    Class name:
    ServerManager
    Category:    Supply Frame Chain Manager
    Documentation:
    Manage the server connection. A server is a program (an object) from which we can request specific service. For example, we may have a server being able to compute the optimal delivery frequency given the maximum inventory and service level constrain in a VMR setting. This is referred as Model Engine Server. A Model Engine Server can run on the same machine where the FrameManager is running, or it can run on different machine. Two Model Engine Servers of the same type can run on the same machine, or they can run on different machines. The information governing the policy is stored in the FrameManager configuration file which was read in at the time of constructing the FrameManager. The ServerManager will enforce the policy such as on which machine to start which server, load balancing, etc. The ServerManager is also responsible to shutdown the servers when they are not needed.
    Export Control:    Public
    Cardinality.:    1
    Hierarchy:
    Superclasses:    none
    Associations:
        <no rolename>  : FrameManager in association
    Public Interface:
    Operations:
        addServer
        maintainServer
        getServer
    Private Interface:
    Attributes:
        servers    : List<Server>
        A linked list of Server object. A Server is a class which record the basic information about a server, such as name, type, which host it is running on, status, etc.
    State machine:    No
    Concurrency:    Sequential
    Persistence:    Transient
    Operation name:
    addServer
    Public member of:    ServerManager
    Return Class:    bool
    Arguments:
        char*    aServer
    Documentation:
    Try to start a new server of certain type and add it to the server list. Here some of the server management policy will be enforced. For example, we may have a policy says that there should be no more than x number of Linear Programming servers in the entire system. Or we may have another policy says that we can not put more than x number of servers (of all types) on machine A. When the function is called only the name (type) of the server is passed in. Which machine the server should be on is determined within this function.
    Concurrency:    Sequential
    Operation name:
    maintainServer
    Public member of:    ServerManager
    Documentation:
    This function is periodically called from FrameManager. It will check each server to see if any one needs to be shutdown.
    Concurrency:    Sequential
    Operation name:
    getServer
    Public member of:    ServerManager
    Return Class:    Server&
    Arguments:
        char*    aServer
    Documentation:
    Return a server of the specified type. It first check the server list to see if any one of that type is idle. If it is, it return the reference to that one and update the status. If not, it will call the addServer function to try to add one.
    Concurrency:    Sequential

What is claimed is:

1. A decision support system, comprising:

decision support frames providing a plurality of views into a supply chain, said frames including decision logic;

a model engine comprising modeling processes for analyzing the supply chain, the modeling processes being assembled by the decision logic to address a decision related to one of the plurality of views; and a frame manager managing the execution of the modeling processes to provide information for said frames.

2. A system as recited in claim 1, further comprising a database management system supplying database information to the modeling processes and said frame manager.

3. A system as recited in claim 1, wherein said system comprises a server mode including said model engine and said frame manager and a client mode comprising said decision frames.

4. A system as recited in claim 2, wherein a database of said database management system comprises an inventory data space, a supply data space and a demand data space.

5. A system as recited in claim 2, wherein a database of said database management system includes a supply chain network including a component supply node, a production node, an inventory node and a demand node.

6. A system as recited in claim 1, wherein said modeling processes comprise a component procurement policy development module, a finished goods distribution network design module, an aggregate production planning module, a finished goods inventory management module, a sales forecasting and planning module, a market data analysis module and a vendor managed replenishment module.

7. A system as recited in claim 1, wherein said manager comprises a system integrator and a functional integrator.

8. A system as recited in claim 1, wherein the supply chain includes sales, inventory and production.

9. A decision support system, comprising:

a plurality of frames which provide viewing information for a supply chain;

a model engine including at least one module capable of analyzing changes on the supply chain; and a frame manager coupled to the model engine capable of managing execution of the module and providing an output to at least one of the plurality of frames.

* * * * *